United States Patent
Bhattacharjee et al.

(10) Patent No.: US 10,795,884 B2
(45) Date of Patent: Oct. 6, 2020

(54) DYNAMIC RESOURCE ALLOCATION FOR COMMON STORAGE QUERY

(71) Applicant: Splunk Inc., San Francisco, CA (US)

(72) Inventors: Arindam Bhattacharjee, Fremont, CA (US); Sourav Pal, Foster City, CA (US); Ramkumar Chandrasekharan, San Jose, CA (US)

(73) Assignee: Splunk Inc., San Francisco, CA (US)

( * ) Notice: Subject to any disclaimer, the term of this patent is extended or adjusted under 35 U.S.C. 154(b) by 437 days.

(21) Appl. No.: 15/665,302

(22) Filed: Jul. 31, 2017

(65) Prior Publication Data

US 2018/0089262 A1     Mar. 29, 2018

Related U.S. Application Data

(63) Continuation-in-part of application No. 15/276,717, filed on Sep. 26, 2016, now Pat. No. 10,353,965.

(51) Int. Cl.
| | |
|---|---|
| *G06F 16/00* | (2019.01) |
| *G06F 16/2453* | (2019.01) |
| *G06F 16/2458* | (2019.01) |
| *G06F 16/33* | (2019.01) |
| *G06F 16/2455* | (2019.01) |

(52) U.S. Cl.
CPC .... *G06F 16/24532* (2019.01); *G06F 16/2465* (2019.01); *G06F 16/24535* (2019.01); *G06F 16/24554* (2019.01); *G06F 16/3334* (2019.01); *G06F 16/3349* (2019.01)

(58) Field of Classification Search
CPC .......... G06F 16/2453; G06F 16/24554; G06F 16/24535; G06F 16/3349; G06F 16/3334; G06F 16/2465
See application file for complete search history.

(56) References Cited

U.S. PATENT DOCUMENTS

| | | |
|---|---|---|
| 5,918,049 A | 6/1999 | Syväniemi |
| 6,009,422 A | 12/1999 | Ciccarelli |
| 6,786,418 B1 | 9/2004 | Francois |
| (Continued) | | |

OTHER PUBLICATIONS

U.S. Appl. No. 15/339,886, filed Oct. 31, 2016, Bhattacharjee et al.

(Continued)

*Primary Examiner* — Cheryl Lewis
(74) *Attorney, Agent, or Firm* — Knobbe Martens, Olson & Bear, LLP

(57) ABSTRACT

Systems and methods are disclosed for processing queries against a common storage utilizing dynamically allocated partitions operating on one or more worker nodes. The common storage can include one or more data stores, which collectively contain a data set divided across multiple buckets of data. To query the common storage, a query coordinator can retrieve metadata regarding the multiple buckets, in order to determine a subset of buckets that are potentially relevant to a query. The query coordinator can then dynamically allocate partitions operating on worker nodes to retrieve and intake individual buckets of the subset into a phased search process. The dynamic allocation can be selected to maximize parallelization of the buckets across partitions, thus increasing a speed at which the common storage can be searched.

30 Claims, 62 Drawing Sheets

(56) References Cited

U.S. PATENT DOCUMENTS

| | | |
|---|---|---|
| 7,698,267 B2 | 4/2010 | Papakonstantinou et al. |
| 8,527,645 B1 | 9/2013 | Proffit et al. |
| 8,682,925 B1 | 3/2014 | Marquardt et al. |
| 8,762,367 B2 | 6/2014 | Burger et al. |
| 8,793,225 B1 | 7/2014 | Bitincka et al. |
| 8,874,755 B1 | 10/2014 | Deklich et al. |
| 8,935,257 B1 | 1/2015 | Vermuri et al. |
| 8,935,302 B2 | 1/2015 | Flynn et al. |
| 8,959,221 B2 | 2/2015 | Morgan |
| 9,128,636 B2 | 9/2015 | Arakawa |
| 9,244,999 B2 | 1/2016 | Jin et al. |
| 9,292,620 B1 | 3/2016 | Hoover et al. |
| 9,438,515 B2 | 9/2016 | McCormick et al. |
| 9,779,015 B1 | 10/2017 | Oikarinen et al. |
| 9,900,397 B1 | 2/2018 | Cope et al. |
| 9,959,062 B1 | 5/2018 | Piszczek et al. |
| 10,095,993 B1 | 10/2018 | Bar-Menachem et al. |
| 10,318,491 B1 | 6/2019 | Graham et al. |
| 10,318,511 B2 | 6/2019 | De Smet et al. |
| 10,353,965 B2 | 7/2019 | Pal et al. |
| 10,474,723 B2 | 11/2019 | Hodge et al. |
| 2001/0016821 A1 | 8/2001 | DeBusk et al. |
| 2003/0014403 A1 | 1/2003 | Chandrasekar et al. |
| 2003/0066033 A1 | 4/2003 | Direen, Jr. et al. |
| 2003/0229620 A1 | 12/2003 | Carlson et al. |
| 2004/0117345 A1 | 6/2004 | Bamford et al. |
| 2005/0066027 A1 | 3/2005 | Hakiel et al. |
| 2005/0289232 A1 | 12/2005 | Ebert |
| 2006/0026211 A1 | 2/2006 | Potteiger |
| 2006/0224603 A1 | 10/2006 | Correll, Jr. |
| 2006/0248045 A1 | 11/2006 | Toledano et al. |
| 2006/0271504 A1 | 11/2006 | Anderson et al. |
| 2007/0208669 A1 | 9/2007 | Rivette et al. |
| 2008/0065591 A1 | 3/2008 | Guzenda |
| 2008/0071755 A1 | 3/2008 | Barsness et al. |
| 2008/0208844 A1 | 8/2008 | Jenkins |
| 2009/0006148 A1 | 1/2009 | Bacalski et al. |
| 2009/0006527 A1 | 1/2009 | Gingell et al. |
| 2009/0007125 A1 | 1/2009 | Barsness et al. |
| 2009/0129163 A1 | 5/2009 | Danilak |
| 2009/0183162 A1 | 7/2009 | Kindel et al. |
| 2009/0234799 A1 | 9/2009 | Betawadkar-Norwood et al. |
| 2010/0011252 A1 | 1/2010 | Rivoir |
| 2010/0125565 A1 | 5/2010 | Burger et al. |
| 2010/0153431 A1 | 6/2010 | Burger |
| 2011/0093491 A1* | 4/2011 | Zabback ............ G06F 16/24535 707/769 |
| 2011/0099500 A1 | 4/2011 | Smith et al. |
| 2011/0191373 A1 | 8/2011 | Botros et al. |
| 2011/0213778 A1 | 9/2011 | Hess et al. |
| 2011/0213870 A1 | 9/2011 | Cai et al. |
| 2011/0246294 A1 | 10/2011 | Robb et al. |
| 2012/0066205 A1 | 3/2012 | Chappell et al. |
| 2012/0130986 A1 | 5/2012 | Abdellatif et al. |
| 2012/0130997 A1 | 5/2012 | Risvik et al. |
| 2012/0143873 A1 | 6/2012 | Saadat |
| 2013/0018868 A1 | 1/2013 | Chi et al. |
| 2013/0060783 A1 | 3/2013 | Baum et al. |
| 2013/0084826 A1 | 4/2013 | Mo et al. |
| 2013/0110828 A1 | 5/2013 | Meyerzon et al. |
| 2013/0173160 A1 | 7/2013 | Meisels et al. |
| 2013/0238706 A1 | 9/2013 | Desai |
| 2013/0254761 A1 | 9/2013 | Reddy et al. |
| 2013/0311488 A1 | 11/2013 | Erdogan et al. |
| 2013/0325850 A1 | 12/2013 | Redmond et al. |
| 2013/0339567 A1 | 12/2013 | Carpentier et al. |
| 2014/0149355 A1 | 5/2014 | Gupta et al. |
| 2014/0156642 A1* | 6/2014 | Johnson ............ G06F 16/24573 707/722 |
| 2014/0180651 A1 | 6/2014 | Lysak et al. |
| 2014/0181373 A1 | 6/2014 | George et al. |
| 2014/0189858 A1 | 7/2014 | Chen et al. |
| 2014/0195558 A1 | 7/2014 | Murthy et al. |
| 2014/0236890 A1 | 8/2014 | Vasan et al. |
| 2014/0258295 A1 | 9/2014 | Wang et al. |
| 2014/0380322 A1 | 12/2014 | Ailamaki et al. |
| 2015/0058293 A1 | 2/2015 | Kobayashi et al. |
| 2015/0095570 A1 | 4/2015 | Lee |
| 2015/0134796 A1 | 5/2015 | Theimer et al. |
| 2015/0149509 A1 | 5/2015 | Leu et al. |
| 2015/0169684 A1 | 6/2015 | Li et al. |
| 2015/0172148 A1 | 6/2015 | Ishida et al. |
| 2015/0189033 A1 | 7/2015 | Han et al. |
| 2015/0234682 A1 | 8/2015 | Dageville et al. |
| 2015/0254245 A1 | 9/2015 | Marais et al. |
| 2015/0254346 A1 | 9/2015 | Chang et al. |
| 2015/0324433 A1 | 11/2015 | Duffy et al. |
| 2015/0339312 A1 | 11/2015 | Lin et al. |
| 2015/0381725 A1 | 12/2015 | Haapaoja et al. |
| 2016/0026438 A1 | 1/2016 | Wolfram |
| 2016/0044108 A1 | 2/2016 | Vermeulen et al. |
| 2016/0050129 A1 | 2/2016 | Hoyne |
| 2016/0055184 A1 | 2/2016 | Fokoue-Nkoutche et al. |
| 2016/0070750 A1 | 3/2016 | Beutlberger et al. |
| 2016/0087880 A1 | 3/2016 | Shalita et al. |
| 2016/0092493 A1 | 3/2016 | Ko et al. |
| 2016/0110109 A1 | 4/2016 | Cowling et al. |
| 2016/0140174 A1 | 5/2016 | Weyerhaeuser et al. |
| 2016/0170987 A1 | 6/2016 | Kesselman |
| 2016/0188742 A1 | 6/2016 | Ingvoldstad et al. |
| 2016/0283511 A1 | 9/2016 | Fokoue-Nkoutche et al. |
| 2016/0306849 A1 | 10/2016 | Curino et al. |
| 2016/0335352 A1 | 11/2016 | Teodorescu et al. |
| 2016/0357828 A1 | 12/2016 | Tobin et al. |
| 2016/0373521 A1 | 12/2016 | Washbrook et al. |
| 2017/0006135 A1 | 1/2017 | Siebel et al. |
| 2017/0010947 A1 | 1/2017 | Lu et al. |
| 2017/0024390 A1 | 1/2017 | Vuppala et al. |
| 2017/0031599 A1 | 2/2017 | Bowman et al. |
| 2017/0103116 A1 | 4/2017 | Hu et al. |
| 2017/0124151 A1 | 5/2017 | Ji et al. |
| 2017/0178253 A1 | 6/2017 | Koufogiannakis et al. |
| 2017/0185574 A1 | 6/2017 | Fern et al. |
| 2017/0185648 A1 | 6/2017 | Kavulya et al. |
| 2017/0199910 A1 | 7/2017 | Konik et al. |
| 2017/0213257 A1 | 7/2017 | Murugesan et al. |
| 2017/0255790 A1 | 9/2017 | Barrett et al. |
| 2017/0286507 A1 | 10/2017 | Hosogi et al. |
| 2017/0300702 A1 | 10/2017 | Tegegne et al. |
| 2018/0032570 A1 | 2/2018 | Miller et al. |
| 2018/0060389 A1 | 3/2018 | Hwang |
| 2018/0089258 A1 | 3/2018 | Bhattacharjee et al. |
| 2018/0089259 A1 | 3/2018 | James et al. |
| 2018/0089269 A1 | 3/2018 | Pal et al. |
| 2018/0089276 A1 | 3/2018 | Victor et al. |
| 2018/0089278 A1 | 3/2018 | Bhattacharjee et al. |
| 2018/0089306 A1 | 3/2018 | Pal et al. |
| 2018/0089312 A1 | 3/2018 | Pal et al. |
| 2018/0089324 A1 | 3/2018 | Bhattacharjee et al. |
| 2018/0121426 A1 | 5/2018 | Barsness et al. |
| 2018/0123918 A1 | 5/2018 | Steinhauser et al. |
| 2018/0157711 A1 | 6/2018 | Lee |
| 2018/0218045 A1 | 8/2018 | Pal et al. |
| 2018/0285417 A1 | 10/2018 | Lazovic et al. |
| 2018/0322168 A1 | 11/2018 | Levine et al. |
| 2019/0095493 A1 | 3/2019 | Bhattacharjee et al. |
| 2019/0095494 A1 | 3/2019 | Bhattacharjee et al. |
| 2019/0138638 A1 | 5/2019 | Pal et al. |
| 2019/0138639 A1 | 5/2019 | Pal et al. |
| 2019/0138640 A1 | 5/2019 | Pal et al. |
| 2019/0138641 A1 | 5/2019 | Pal et al. |
| 2019/0138642 A1 | 5/2019 | Pal et al. |
| 2019/0147084 A1 | 5/2019 | Pal et al. |
| 2019/0147085 A1 | 5/2019 | Pal et al. |
| 2019/0147086 A1 | 5/2019 | Pal et al. |
| 2019/0147092 A1 | 5/2019 | Pal et al. |
| 2019/0163822 A1 | 5/2019 | Bhattacharjee et al. |
| 2019/0163823 A1 | 5/2019 | Bhattacharjee et al. |
| 2019/0163824 A1 | 5/2019 | Pal et al. |
| 2019/0163840 A1 | 5/2019 | Pal et al. |
| 2019/0163841 A1 | 5/2019 | Bhattacharjee et al. |
| 2019/0163842 A1 | 5/2019 | Pal et al. |
| 2019/0171676 A1 | 6/2019 | Pal et al. |
| 2019/0171677 A1 | 6/2019 | Pal et al. |

(56) References Cited

U.S. PATENT DOCUMENTS

| | | |
|---|---|---|
| 2019/0171678 A1 | 6/2019 | Pal et al. |
| 2019/0258631 A1 | 8/2019 | Pal et al. |
| 2019/0258632 A1 | 8/2019 | Pal et al. |
| 2019/0258635 A1 | 8/2019 | Pal et al. |
| 2019/0258636 A1 | 8/2019 | Bhattacharjee et al. |
| 2019/0258637 A1 | 8/2019 | Bhattacharjee et al. |
| 2019/0272271 A1 | 9/2019 | Bhattacharjee et al. |
| 2019/0310977 A1 | 10/2019 | Pal et al. |
| 2020/0004794 A1 | 1/2020 | Pal et al. |

OTHER PUBLICATIONS

U.S. Appl. No. 15/339,889, filed Oct. 31, 2016, Bath et al.
U.S. Appl. No. 15/967,567, filed Apr. 30, 2018, Batsakis et al.
U.S. Appl. No. 15/967,570, filed Apr. 30, 2018, Sammer et al.
U.S. Appl. No. 15/967,573, filed Apr. 30, 2018, Batsakis et al.
U.S. Appl. No. 15/967,574, filed Apr. 30, 2018, Sammer et al.
U.S. Appl. No. 15/967,578, filed Apr. 30, 2018, Batsakis et al.
U.S. Appl. No. 15/967,581, filed Apr. 30, 2018, Sammer et al.
U.S. Appl. No. 15/967,582, filed Apr. 30, 2018, Batsakis et al.
U.S. Appl. No. 15/967,585, filed Apr. 30, 2018, Batsakis et al.
U.S. Appl. No. 15/967,586, filed Apr. 30, 2018, Batsakis et al.
U.S. Appl. No. 15/967,588, filed Apr. 30, 2018, Batsakis et al.
U.S. Appl. No. 15/967,590, filed Apr. 30, 2018, Batsakis et al.
U.S. Appl. No. 15/967,591, filed Apr. 30, 2018, Batsakis et al.
U.S. Appl. No. 15/967,595, filed Apr. 30, 2018, Batsakis et al.
U.S. Appl. No. 16/000,664, filed Jun. 5, 2018, Batsakis et al.
U.S. Appl. No. 16/000,688, filed Jun. 5, 2019, Sammer et al.
U.S. Appl. No. 16/430,983, filed Jun. 4, 2019, Pal et al.
U.S. Appl. No. 16/657,867, filed Oct. 18, 2019, Bhattacharjee et al.
U.S. Appl. No. 16/657,872, filed Oct. 18, 2019, Pal et al.
U.S. Appl. No. 16/657,894, filed Oct. 18, 2019, Pal et al.
U.S. Appl. No. 16/657,916, filed Oct. 18, 2019, Bhattacharjee et al.
U.S. Appl. No. 16/657,026, filed Nov. 5, 2019, Hodge et al.
Nadanam et al., "QoS Evaluation for Web Services in Cloud computing," IEEE, 2012, ICCCNT'12, Jul. 26-28, 2012, Coimbatore, India.
Vaid, Workshop on Managing Systems via log Analysis and Machine Learning Techniques (SLAML '10), ;login: vol. 36, No. 1, Oct. 3, 2010, Vancouver, BC, Canada.
U.S. Appl. No. 15/665,159, filed Jul. 31, 2017.
U.S. Appl. No. 15/665,148, filed Jul. 31, 2017.
U.S. Appl. No. 15/665,187, filed Jul. 31, 2017.
U.S. Appl. No. 15/665,248, filed Jul. 31, 2017.
U.S. Appl. No. 15/665,197, filed Jul. 31, 2017.
U.S. Appl. No. 15/665,279, filed Jul. 31, 2017.
U.S. Appl. No. 15/665,339, filed Jul. 31, 2017.
U.S. Appl. No. 15/276,717, filed Sep. 26, 2016.
U.S. Appl. No. 15/339,825, filed Oct. 31, 2016.
U.S. Appl. No. 15/339,833, filed Oct. 31, 2016.
U.S. Appl. No. 15/339,835, filed Oct. 31, 2016.
U.S. Appl. No. 15/339,840, filed Oct. 31, 2016.
U.S. Appl. No. 15/339,845, filed Oct. 31, 2016.
U.S. Appl. No. 15/339,847, filed Oct. 31, 2016.
U.S. Appl. No. 15/339,853, filed Oct. 31, 2016.
U.S. Appl. No. 16/264,430, filed Jan. 31, 2019.
U.S. Appl. No. 16/264,441, filed Jan. 31, 2019.
U.S. Appl. No. 16/264,462, filed Jan. 31, 2019.
U.S. Appl. No. 16/570,545, filed Sep. 13, 2019.
U.S. Appl. No. 16/675,026, filed Nov. 5, 2019.
U.S. Appl. No. 16/777,602, filed Jan. 30, 2020.
U.S. Appl. No. 16/000,668, filed Jun. 5, 2018.
U.S. Appl. No. 15/967,581, filed Apr. 30, 2018.
U.S. Appl. No. 15/967,588, filed Apr. 30, 2018.
U.S. Appl. No. 15/967,582, filed Apr. 30, 2018.
U.S. Appl. No. 15/967,573, filed Apr. 30, 2018.
U.S. Appl. No. 15/967,585, filed Apr. 30, 2018.
U.S. Appl. No. 15/967,587, filed Apr. 30, 2018.
U.S. Appl. No. 15/967,591, filed Apr. 30, 2018.
U.S. Appl. No. 15/967,586, filed Apr. 30, 2018.
U.S. Appl. No. 15/967,590, filed Apr. 30, 2018.
U.S. Appl. No. 16/000,664, filed Jun. 5, 2018.
U.S. Appl. No. 15/967,567, filed Apr. 30, 2018.
U.S. Appl. No. 15/967,574, filed Apr. 30, 2018.
U.S. Appl. No. 15/967,578, filed Apr. 30, 2018.
U.S. Appl. No. 16/051,197, filed Jul. 31, 2018.
U.S. Appl. No. 16/051,215, filed Jul. 31, 2018.
U.S. Appl. No. 16/051,203, filed Jul. 31, 2018.
U.S. Appl. No. 16/051,223, filed Jul. 31, 2018.
U.S. Appl. No. 16/051,304, filed Jul. 31, 2018.
U.S. Appl. No. 16/051,300, filed Jul. 31, 2018.
U.S. Appl. No. 16/051,310, filed Jul. 31, 2018.
U.S. Appl. No. 16/147,165, filed Sep. 28, 2018.
U.S. Appl. No. 16/147,350, filed Sep. 28, 2018.
U.S. Appl. No. 16/147,129, filed Sep. 28, 2018.
U.S. Appl. No. 16/177,256, filed Oct. 31, 2018.
U.S. Appl. No. 16/147,209, filed Sep. 28, 2018.
U.S. Appl. No. 16/147,344, filed Sep. 28, 2018.
U.S. Appl. No. 16/398,038, filed Apr. 29, 2019.
U.S. Appl. No. 16/397,970, filed Apr. 29, 2019.
U.S. Appl. No. 16/398,044, filed Apr. 29, 2019.
U.S. Appl. No. 16/397,930, filed Apr. 29, 2019.
U.S. Appl. No. 16/398,031, filed Apr. 29, 2019.
U.S. Appl. No. 16/397,968, filed Apr. 29, 2019.
U.S. Appl. No. 16/397,922, filed Apr. 29, 2019.
U.S. Appl. No. 16/657,916, filed Oct. 18, 2019.
U.S. Appl. No. 16/657,872, filed Oct. 18, 2019.
U.S. Appl. No. 16/657,894, filed Oct. 18, 2019.
U.S. Appl. No. 16/657,867, filed Oct. 18, 2019.

\* cited by examiner

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

| Row | Time | Host | Source | Source Type | Event |
|---|---|---|---|---|---|
| 55000 | 10/10/2016 1:55 p.m. | www2 | access.log | access_combined | 127.0.0.1 - frank [10/Oct/2016:13:55:36 -0700] "GET /apache.gif HTTP/1.0" 200 2326 0.0947 |
| 55001 | 10/10/2016 1:56 p.m. | www2 | access.log | access_combined | 127.0.0.2 - bob [10/Oct/2016:13:56:36 -0700] "GET /mickey_mouse.gif HTTP/1.0" 200 2980 0.0899 |
| 55002 | 10/10/2016 1:57 p.m. | www2 | access.log | access_combined | 127.0.0.1 - carlos [10/Oct/2016:13:57:36 -0700] "GET /donald_duck.gif HTTP/1.0" 200 2900 0.0857 |
| 55003 | 10/10/2016 1:58 p.m. | www2 | error.log | apache_error | [Sunday Oct 10 1:58:33 2016] [error] [client 127.10.1.01]: File does not exist: /home/reba/public_html/images/daisy_duck.gif |
| 55004 | 10/10/2016 1:59 p.m. | www1 | access.log | access_combined | 127.0.0.3 - virgil [10/Oct/2016:13:59:36 -0700] "GET /donald_duck.gif HTTP/1.0" 200 2900 0.0887 |
| 55005 | 10/10/2016 2:00 p.m. | www1 | access.log | access_combined | 127.0.0.1 - matt [10/Oct/2016:14:00:36 -0700] "GET /goofy.gif HTTP/1.0" 200 2920 0.0987 |
| 55006 | 10/10/2016 2:01 p.m. | www2 | error.log | apache_error | [Sunday Oct 10 2:01:33 2016] [error] [client 127.10.1.03]: File does not exist: /home/public_html/images/furby.gif |
| 55007 | 10/10/2016 2:02 p.m. | www1 | access.log | access_combined | 127.0.0.1 - jack [10/Oct/2016:14:02:36 -0700] "GET /muppets.gif HTTP/1.0" 200 5500 0.0567 |

731, 732, 733, 734 → 723

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

722

| Event Reference Value | Field Name | Field Value | User ID |
|---|---|---|---|
| 55000 | clientip | 127.0.0.1 | frank |
| 55005 | clientip | 127.0.0.1 | matt |

725

| Data Summary | | | |
|---|---|---|---|
| Hosts (5) | Sources (8) | Sourcetypes (3) | ✕ | filter

| Host ◇ | | Count ◇ | Last Update ◇ |
|---|---|---|---|
| mailsv | ⋎ | 9,829 | 4/29/14 1:32:47.000 PM |
| vendor_sales | ⋎ | 30,244 | 4/29/14 1:32:46.000 PM |
| www1 | ⋎ | 24,221 | 4/29/14 1:32:44.000 PM |
| www2 | ⋎ | 22,595 | 4/29/14 1:32:47.000 PM |
| www3 | ⋎ | 22,975 | 4/29/14 1:32:45.000 PM |

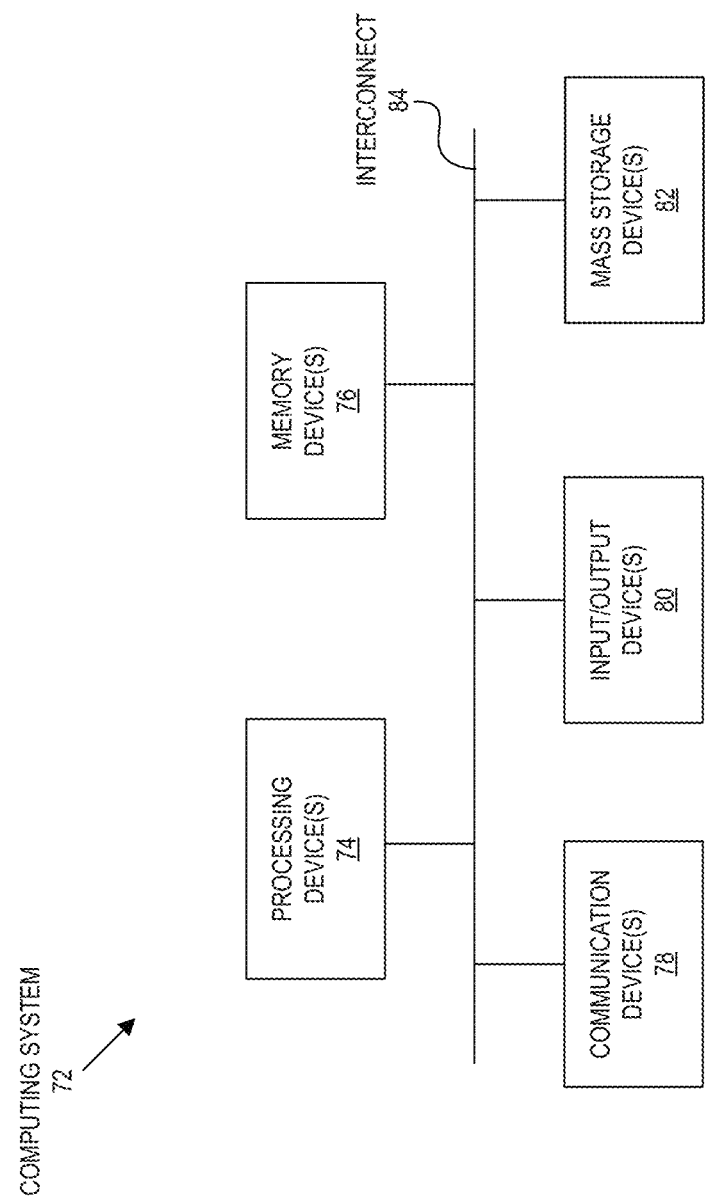

DYNAMIC RESOURCE ALLOCATION FOR COMMON STORAGE QUERY

RELATED APPLICATIONS

This application is a continuation-in-part of U.S. application Ser. No. 15/276,717, filed Sep. 26, 2016, the disclosure of which is hereby incorporated by reference in its entirety. Any and all applications for which a foreign or domestic priority claim is identified in the Application Data Sheet as filed with the present application are incorporated by reference under 37 CFR 1.57 and made a part of this specification. This application is being filed concurrently with the following U.S. Patent Applications, each of which is incorporated herein by reference in its entirety:

| FIELD | | |
| --- | --- | --- |
| U.S. Application Ser. No. | Title | Filing Date |
| 15/665,159 | MULTI-LAYER PARTITION ALLOCATION FOR QUERY EXECUTION | Jul. 31, 2017 |
| 15/665,148 | QUERY PROCESSING USING QUERY-RESOURCE USAGE AND NODE UTILIZATION DATA | Jul. 31, 2017 |
| 15/665,187 | RESOURCE ALLOCATION FOR MULTIPLE DATASETS | Jul. 31, 2017 |
| 15/665,248 | EXTERNAL DATASET CAPABILITY COMPENSATION | Jul. 31, 2017 |
| 15/665,197 | DATA CONDITIONING FOR DATASET DESTINATION | Jul. 31, 2017 |
| 15/665,279 | QUERY ACCELERATION DATA STORE | Jul. 31, 2017 |
| 15/665,339 | DYNAMIC RESOURCE ALLOCATION FOR REAL-TIME SEARCH | Jul. 31, 2017 |

At least one embodiment of the present disclosure pertains to one or more tools for facilitating searching and analyzing large sets of data to locate data of interest.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Although the availability of vastly greater amounts of diverse data on diverse data systems provides opportunities to derive new insights, it also gives rise to technical challenges to search and analyze the data. Tools exist that allow an analyst to search data systems separately and collect results over a network for the analyst to derive insights in a piecemeal manner. However, UI tools that allow analysts to quickly search and analyze large set of raw machine data to visually identify data subsets of interest, particularly via straightforward and easy-to-understand sets of tools and search functionality do not exist.

BRIEF DESCRIPTION OF THE DRAWINGS

The present disclosure is illustrated by way of example, and not limitation, in the figures of the accompanying drawings, in which like reference numerals indicate similar elements and in which:

FIG. 5C provides a visual representation of the manner in which a pipelined search language or query operates, in accordance with example embodiments;

FIG. 7C illustrates an example of creating and using an inverted index, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 31 illustrates a selected bin of a timeline visualization and the contents of the selected bin according to some embodiments of the present disclosure.

FIG. 50 is a block diagram illustrating a high-level example of a hardware architecture of a computing system in which an embodiment may be implemented.

DETAILED DESCRIPTION

Figure 1A:
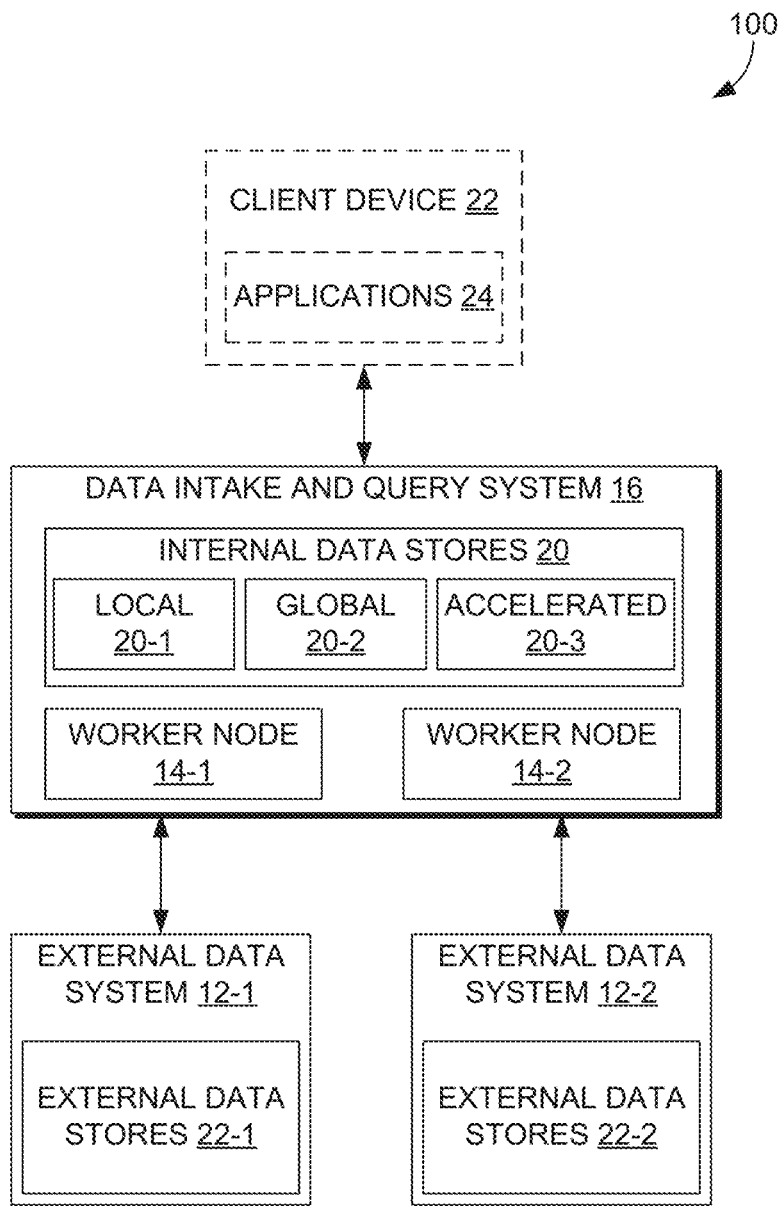
FIG. 1A is a block diagram of an example environment in which an embodiment may be implemented.

Embodiments are described herein according to the following outline:
1.0. GENERAL OVERVIEW
2.0. OVERVIEW OF DATA INTAKE AND QUERY SYSTEMS
  3.0. GENERAL OVERVIEW
  3.1 HOST DEVICES
  3.2 CLIENT DEVICES
  3.3. CLIENT DEVICE APPLICATIONS
  3.4. DATA SERVER SYSTEM
  3.5. CLOUD-BASED SYSTEM OVERVIEW
  3.6. SEARCHING EXTERNALLY-ARCHIVED DATA
  3.7. DATA INGESTION
    3.7.1. INPUT
    3.7.2. PARSING
    3.7.3. INDEXING
  3.8. QUERY PROCESSING
  3.9. PIPELINED SEARCH LANGUAGE
  3.10. FIELD EXTRACTION
  3.11. EXAMPLE SEARCH SCREEN
  3.12. DATA MODELS
  3.13. ACCELERATION TECHNIQUE
    3.13.1. AGGREGATION TECHNIQUE
    3.13.2. KEYWORD INDEX
    3.13.3. HIGH PERFORMANCE ANALYTICS STORE
    3.13.4. EXTRACTING EVENT DATA USING POSTING
    3.13.5. ACCELERATING REPORT GENERATION
  3.14. SECURITY FEATURES
  3.15. DATA CENTER MONITORING
  3.16. IT SERVICE MONITORING
4.0. DATA FABRIC SERVICE (DFS)
4.1. DFS SYSTEM ARCHITECTURE
4.2. DFS SYSTEM OPERATIONS
5.0. PARALLEL EXPORT TECHNIQUES
6.0. DFS QUERY PROCESSING
6.1. ORDERED SEARCH RESULTS
6.2. TRANSFORMED SEARCH RESULTS
7.0. CO-LOCATED DEPLOYMENT ARCHITECTURE
7.1. CO-LOCATED DEPLOYMENT OPERATIONS
8.0. CLOUD DEPLOYMENT ARCHITECTURE
8.1. CLOUD DEPLOYMENT OPERATIONS
9.0. TIMELINE VISUALIZATION
10.0. MONITORING AND METERING SERVICES
11.0. DATA INTAKE AND FABRIC SYSTEM ARCHITECTURE
  11.1. WORKER NODES
    11.1.1. SERIALIZATION/DESERIALIZATION
  11.2. SEARCH PROCESS MASTER
    11.2.1 WORKLOAD CATALOG
    11.2.2 NODE MONITOR
    11.2.3 DATASET COMPENSATION
  11.3. QUERY COORDINATOR
    11.3.1. QUERY PROCESSING
    11.3.2. QUERY EXECUTION AND NODE CONTROL
    11.3.3. RESULT PROCESSING
  11.4 QUERY ACCELERATION DATA STORE
12.0. QUERY DATA FLOW
13.0. QUERY COORDINATOR FLOW
14.0. QUERY PROCESSING FLOW
15.0. WORKLOAD MONITORING AND ADVISING FLOW
16.0. MULTIPLE DATASET SOURCES FLOW
17.0. EXTERNAL DATA SOURCE FLOW
18.0. DATASET DESTINATION FLOW
19.0. SERIALIZATION AND DESERIALIZATION FLOW
20.0. ACCELERATED QUERY RESULTS FLOW
21.0. COMMON STORAGE ARCHITECTURE
22.0. COMMON STORAGE FLOW
23.0. INGESTED DATA BUFFER ARCHITECTURE
24.0. INGESTED DATA BUFFER FLOW
25.0. HARDWARE EMBODIMENT
26.0. TERMINOLOGY In this description, references to "an embodiment," "one embodiment," or the like, mean that the particular feature, function, structure or characteristic being described is included in at least one embodiment of the technique introduced herein. Occurrences of such phrases in this specification do not necessarily all refer to the same embodiment. On the other hand, the embodiments referred to are also not necessarily mutually exclusive.

A data intake and query system can index and store data in data stores of indexers, and can receive search queries causing a search of the indexers to obtain search results. The data intake and query system typically has search, extraction, execution, and analytics capabilities that may be limited in scope to the data stores of the indexers ("internal data stores"). Hence, a seamless and comprehensive search and analysis that includes diverse data types from external data sources, common storage (may also be referred to as global data storage or global data stores), ingested data buffers, query acceleration data stores, etc. may be difficult. Thus, the capabilities of some data intake and query systems remain isolated from a variety of data sources that could improve search results to provide new insights. Furthermore, the processing flow of some data intake and query systems are unidirectional in that data is obtained from a data source, processed, and then communicated to a search head or client without the ability to route data to different destinations.

The disclosed embodiments overcome these drawbacks by extending the search and analytics capabilities of a data intake and query system to include diverse data types stored in diverse data systems internal to or external from the data intake and query system. As a result, an analyst can use the data intake and query system to search and analyze data from a wide variety of dataset sources, including enterprise systems and open source technologies of a big data ecosystem. The term "big data" refers to large data sets that may be analyzed computationally to reveal patterns, trends, and associations, in some cases, relating to human behavior and interactions.

In particular, introduced herein is a data intake and query system that that has the ability to execute big data analytics seamlessly and can scale across diverse data sources to enable processing large volumes of diverse data from diverse data systems. A "data source" can include a "data system," which may refer to a system that can process and/or store data. A "data storage system" may refer to a storage system that can store data such as unstructured, semi-structured, or structured data. Accordingly, a data source can include a data system that includes a data storage system.

The system can improve search and analytics capabilities of previous systems by employing a search process master and query coordinators combined with a scalable network of distributed nodes communicatively coupled to diverse data systems. The network of distributed nodes can act as agents of the data intake and query system to collect and process data of distributed data systems, and the search process master and coordinators can provide the processed data to the search head as search results.

For example, the data intake and query system can respond to a query by executing search operations on various internal and external data sources to obtain partial search results that are harmonized and presented as search results of the query. As such, the data intake and query system can offload search and analytics operations to the distributed nodes. Hence, the system enables search and analytics capabilities that can extend beyond the data stored on indexers to include external data systems, common storage, query acceleration data stores, ingested data buffers, etc.

The system can provide big data open stack integration to act as a big data pipeline that extends the search and analytics capabilities of a system over numerous and diverse data sources. For example, the system can extend the data execution scope of the data intake and query system to include data residing in external data systems such as MySQL, PostgreSQL, and Oracle databases; NoSQL data stores like Cassandra, Mongo DB; cloud storage like Amazon S3 and Hadoop distributed file system (HDFS); common storage; ingested data buffers; etc. Thus, the system can execute search and analytics operations for all possible combinations of data types stored in various data sources.

The distributed processing of the system enables scalability to include any number of distributed data systems. As such, queries received by the data intake and query system can be propagated to the network of distributed nodes to extend the search and analytics capabilities of the data intake and query system over different data sources. In this context, the network of distributed nodes can act as an extension of the local data intake in query system's data processing pipeline to facilitate scalable analytics across the diverse data systems. Accordingly, the system can extend and transform the data intake and query system to include data resources into a data fabric platform that can leverage computing assets from anywhere and access and execute on data regardless of type or origin.

The disclosed embodiments include services such as new search capabilities, visualization tools, and other services that are seamlessly integrated into the DFS system. For example, the disclosed techniques include new search services performed on internal data stores, external data stores, or a combination of both. The search operations can provide ordered or unordered search results, or search results derived from data of diverse data systems, which can be visualized to provide new and useful insights about the data contained in a big data ecosystem.

Various other features of the DFS system introduced here will become apparent from the description that follows. First, however, it is useful to consider an example of an environment and system in which the techniques can be employed, as will now be described.

1.0. General Overview

The embodiments disclosed herein generally refer to an environment that includes data intake and query system including a data fabric service system architecture ("DFS system"), services, a network of distributed nodes, and distributed data systems, all interconnected over one or more networks. However, embodiments of the disclosed environment can include many computing components including software, servers, routers, client devices, and host devices that are not specifically described herein. As used herein, a "node" can refer to one or more devices and/or software running on devices that enable the devices to provide execute a task of the system. For example, a node can include devices running software that enable the device to execute a portion of a query.

FIG. 1A is a high-level system diagram of an environment 10 in which an embodiment may be implemented. The environment 10 includes distributed external data systems 12-1 and 12-2 (also referred to collectively and individually as external data system(s) 12). The external data systems 12 are communicatively coupled (e.g., via a LAN, WAN, etc.) to worker nodes 14-1 and 14-2 of a data intake and query system 16, respectively (also referred to collectively and individually as worker node(s) 14). The environment 10 can also include a client device 22 and applications running on the client device 22. An example includes a personal computer, laptop, tablet, phone, or other computing device running a network browser application that enables a user of the client device 22 to access any of the data systems.

The data intake and query system 16 and the external data systems 12 can each store data obtained from various data sources. For example, the data intake and query system 16 can store data in internal data stores 20 (also referred to as an internal storage system), and the external data systems 12 can store data in respective external data stores 22 (also referred to as external storage systems). However, the data intake and query system 16 and external data systems 12 may process and store data differently. For example, as explained in greater detail below, the data intake and query system 16 may store minimally processed or unprocessed data ("raw data") in the internal data stores 20, which can be implemented as local data stores 20-1, common storage 20-2, or query acceleration data stores 20-3. In contrast, the external data systems 12 may store pre-processed data rather than raw data. Hence, the data intake and query system 16 and the external data systems 12 can operate independent of each other in a big data ecosystem.

The worker nodes 14 can act as agents of the data intake and query system 16 to process data collected from the internal data stores 20 and the external data stores 22. The worker nodes 14 may reside on one or more computing devices such as servers communicatively coupled to the external data systems 12. Other components of the data intake and query system 16 can finalize the results before returning the results to the client device 22. As such, the worker nodes 14 can extend the search and analytics capabilities of the data intake and query system 16 to act on diverse data systems.

The external data systems 12 may include one or more computing devices that can store structured, semi-structured, or unstructured data. Each external data system 12 can generate and/or collect generated data, and store the generated data in their respective external data stores 22. For example, the external data system 12-1 may include a server running a MySQL database that stores structured data objects such as time-stamped events, and the external data system 12-2 may be a server of cloud computing services such as Amazon web services (AWS) that can provide different data types ranging from unstructured (e.g., s3) to structured (e.g., redshift).

The internal data stores 20 are said to be internal because the data stored thereon has been processed or passed through the data intake and query system 16 in some form. Conversely, the external data systems 12 are said to be external to the data intake and query system 16 because the data stored at the external data stores 22 has not necessarily been processed or passed through the data intake and query system 16. In other words, the data intake and query system 16 may have no control or influence over how data is processed, controlled, or managed by the external data systems 12.

The external data systems 12 can process data, perform requests received from other computing systems, and perform numerous other computational tasks independent of each other and independent of the data intake and query system 16. For example, the external data system 12-1 may be a server that can process data locally that reflects correlations among the stored data. The external data systems 12 may generate and/or store ever increasing volumes of data without any interaction with the data intake and query system 16. As such, each of the external data system 12 may act independently to control, manage, and process the data they contain.

Data stored in the internal data stores 20 and external data stores 22 may be related. For example, an online transaction could generate various forms of data stored in disparate locations and in various formats. The generated data may include payment information, customer information, and information about suppliers, retailers, and the like. Other examples of data generated in a big data ecosystem include application program data, system logs, network packet data, error logs, stack traces, and performance data. The data can also include diagnostic information and many other types of data that can be analyzed to perform local actions, diagnose performance problems, monitor interactions, and derive other insights.

The volume of generated data can grow at very high rates as the number of transactions and diverse data systems grows. A portion of this large volume of data could be processed and stored by the data intake and query system 16 while other portions could be stored in any of the external data systems 12. In an effort to reduce the vast amounts of raw data generated in a big data ecosystem, some of the external data systems 12 may pre-process the raw data based on anticipated data analysis needs, store the pre-processed data, discard some or all of theremaining raw data, or store it in a different location that data intake and query system 16 does not have access to. However, discarding or not making the massive amounts of raw data available can result in the loss of valuable insights that could have been obtained by searching all of the raw data.

In contrast, the data intake and query system 16 can address some of these challenges by collecting and storing raw data as structured "events," as will be described in greater detail below. In some embodiments, an event includes a portion of raw data and is associated with a specific point in time. For example, events may be derived from "time series data," where the time series data comprises a sequence of data points (e.g., performance measurements from a computer system) that are associated with successive points in time.

In some embodiments, the external data systems 12 can store raw data as events that are indexed by timestamps but are also associated with predetermined data items. This structure is essentially a modification of conventional database systems that require predetermining data items for subsequent searches. These systems can be modified to retain the remaining raw data for subsequent re-processing for other predetermined data items.

Specifically, the raw data can be divided into segments and indexed by timestamps. The predetermined data items can be associated with the events indexed by timestamps. The events can be searched only for the predetermined data items during search time; the events can be re-processed later in time to re-index the raw data, and generate events with new predetermined data items. As such, the data systems of the system 10 can store related data in a variety of pre-processed data and raw data in a variety of structures.

A number of tools are available to search and analyze data contained in these diverse data systems. As such, an analyst can use a tool to search a database of the external data system 12-1. A different tool could be used to search a cloud services application of the external data system 12-2. Yet another different tool could be used to search the internal data stores 20. Moreover, different tools can perform analytics of data stored in proprietary or open source data stores. However, existing tools cannot obtain valuable insights from data contained in a combination of the data intake and query system 16 and/or any of the external data systems 12. Examples of these valuable insights may include correlations between the structured data of the external data stores 22 and raw data of the internal data stores 20.

The disclosed techniques can extend the search, extraction, execution, and analytics capabilities of data intake and query systems to seamlessly search and analyze multiple diverse data of diverse data systems in a big data ecosystem. The disclosed techniques can transform a big data ecosystem into a big data pipeline between external data systems and a data intake and query system, to enable seamless search and analytics operations on a variety of data sources, which can lead to new insights that were not previously available. Hence, the disclosed techniques include a data intake and query system 16 extended to search external data systems into a data fabric platform that can leverage computing assets from anywhere and access and execute on data regardless of type and origin. In addition, the data intake and query system 16 facilitates implementation of both iterative searches, to read datasets multiple times in a loop, and interactive or exploratory data analysis (e.g., for repeated database-style querying of data).

2.0. Overview of Data Intake and Query Systems

As indicated above, modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

3.0. General Overview

Figure 1B:
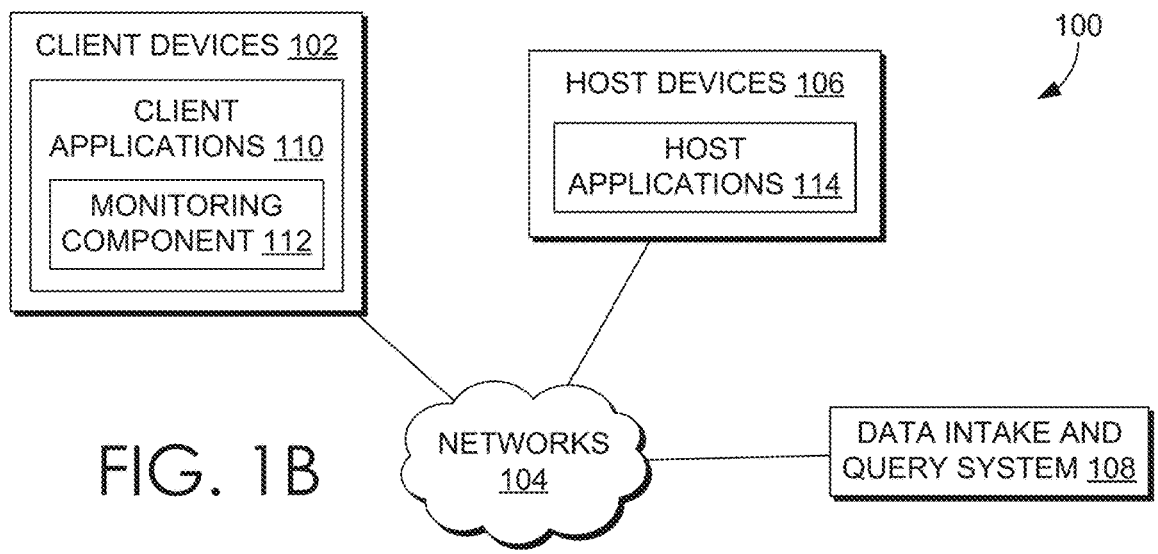
FIG. 1B is a block diagram of an example networked computer environment, in accordance with example embodiments.

FIG. 1B is a block diagram of an example networked computer environment 100, in accordance with example embodiments. Those skilled in the art would understand that FIG. 1B represents one example of a networked computer system and other embodiments, such as the embodiment illustrated in FIG. 1A may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

3.1 Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

3.2 Client Devices

Client devices 102 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

3.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer, and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

3.4. Data Server System

Figure 2:
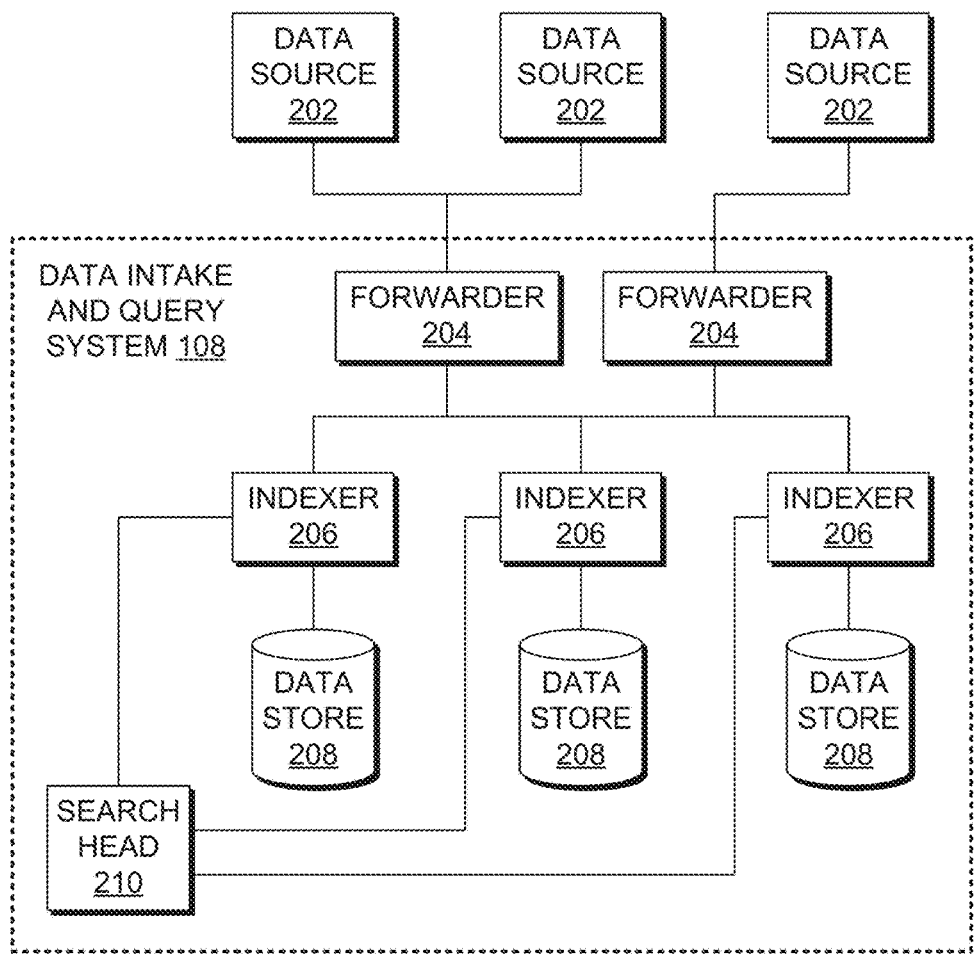
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 206 can comprise separate computer systems, or may alternatively comprise separate processes executing on one or more computer systems.

Each data source 202 broadly represents a distinct source of data that can be consumed by system 108. Examples of a data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

3.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
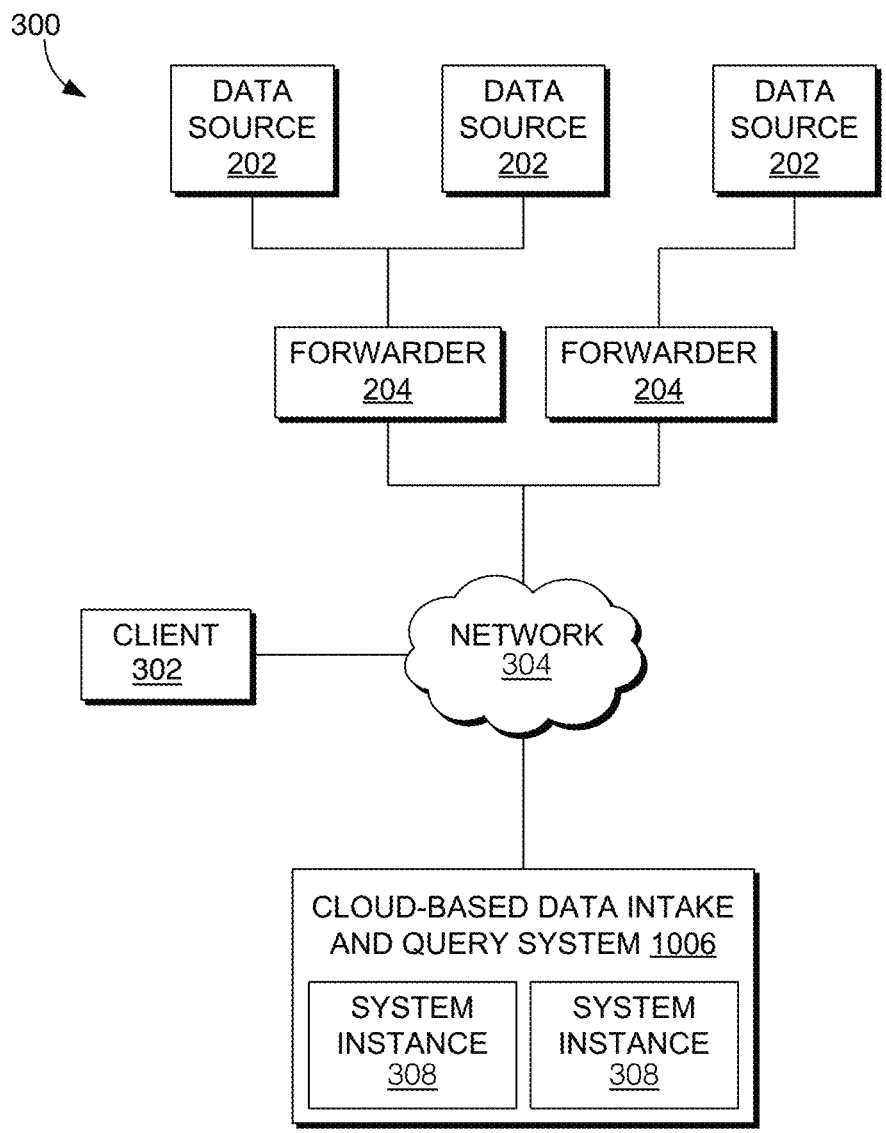
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

3.6. Searching Externally-Archived Data

Figure 4:
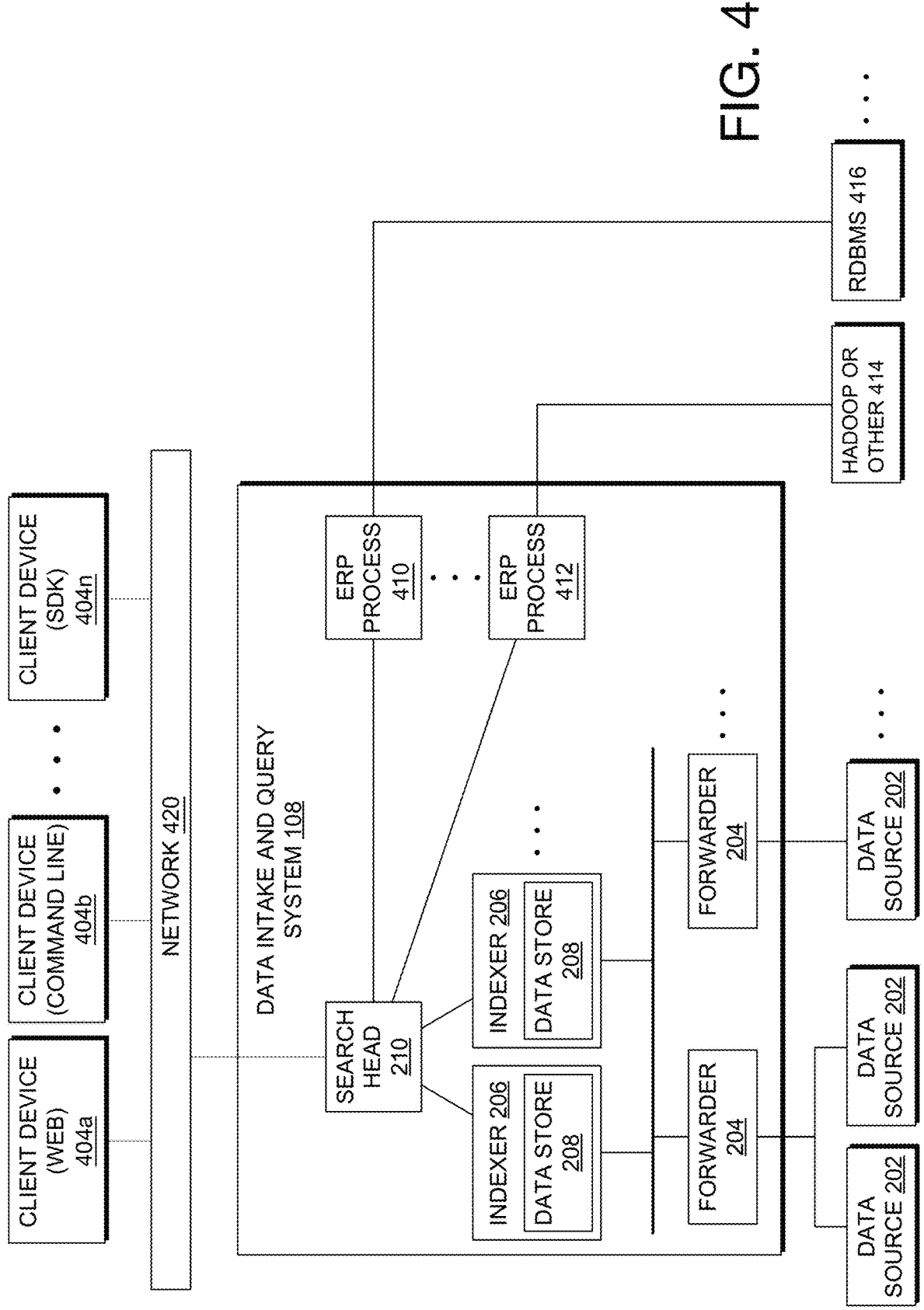
FIG. 4 is a block diagram of an example data intake and query system that performs searches across external data systems, in accordance with example embodiments.

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

3.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

3.7. Data Ingestion

Figure 5A:
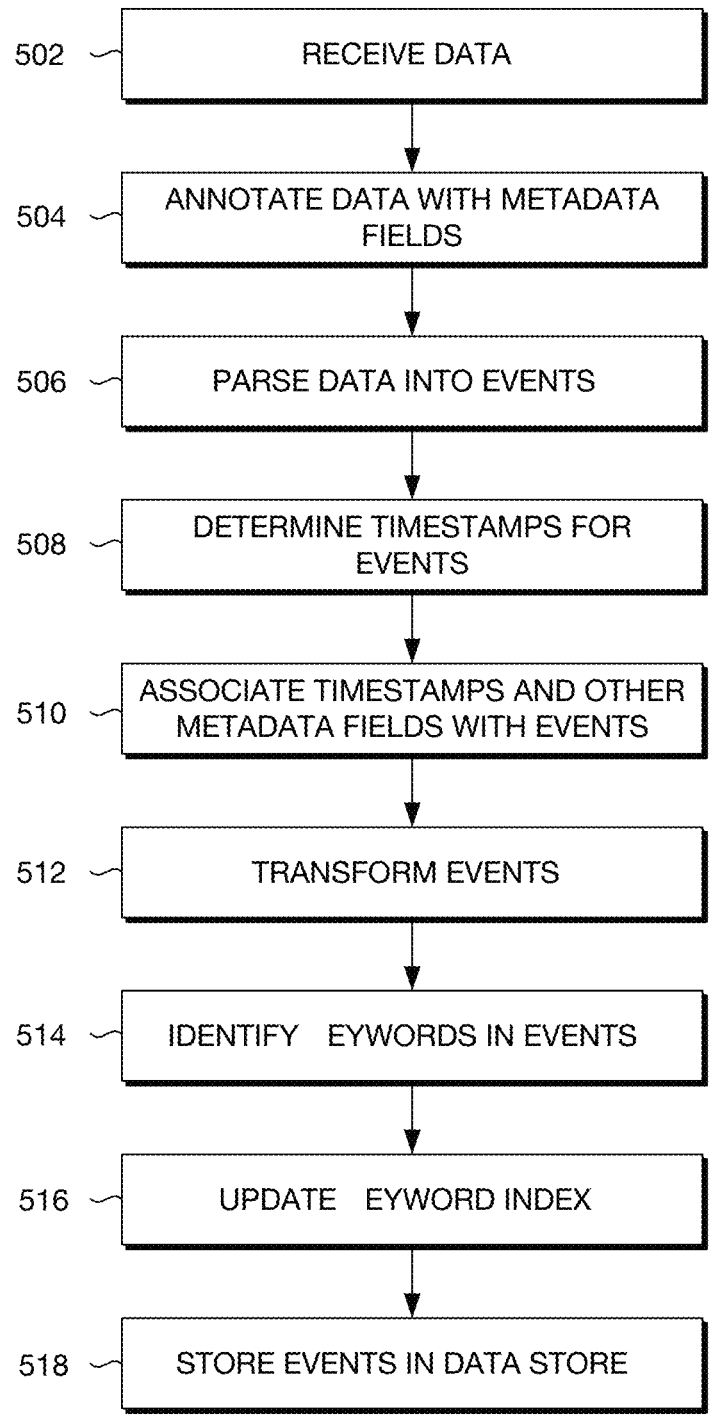
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

3.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

3.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one or more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538, and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537 that records errors that the server encountered when processing a client request. Similar to the events related to the server access log, all the raw machine data in the error log file pertaining to event 534 can be preserved and stored as part of the event 534. Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

3.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "SITE-BASED SEARCH AFFINITY", issued on 8 Sep. 2015, and in U.S. patent Ser. No. 14/266,817, entitled "MULTI-SITE CLUSTERING", issued on 1 Sep. 2015, each of which is hereby incorporated by reference in its entirety for all purposes.

As will be described in greater detail below with reference to, inter alia, FIGS. 18-49, some functionality of the indexer can be handled by different components of the system. For example, in some cases, the indexer indexes semi-processed, or cooked data (e.g., data that has been parsed and/or had some fields determined for it), and stores the results in common storage.

Figure 5B:
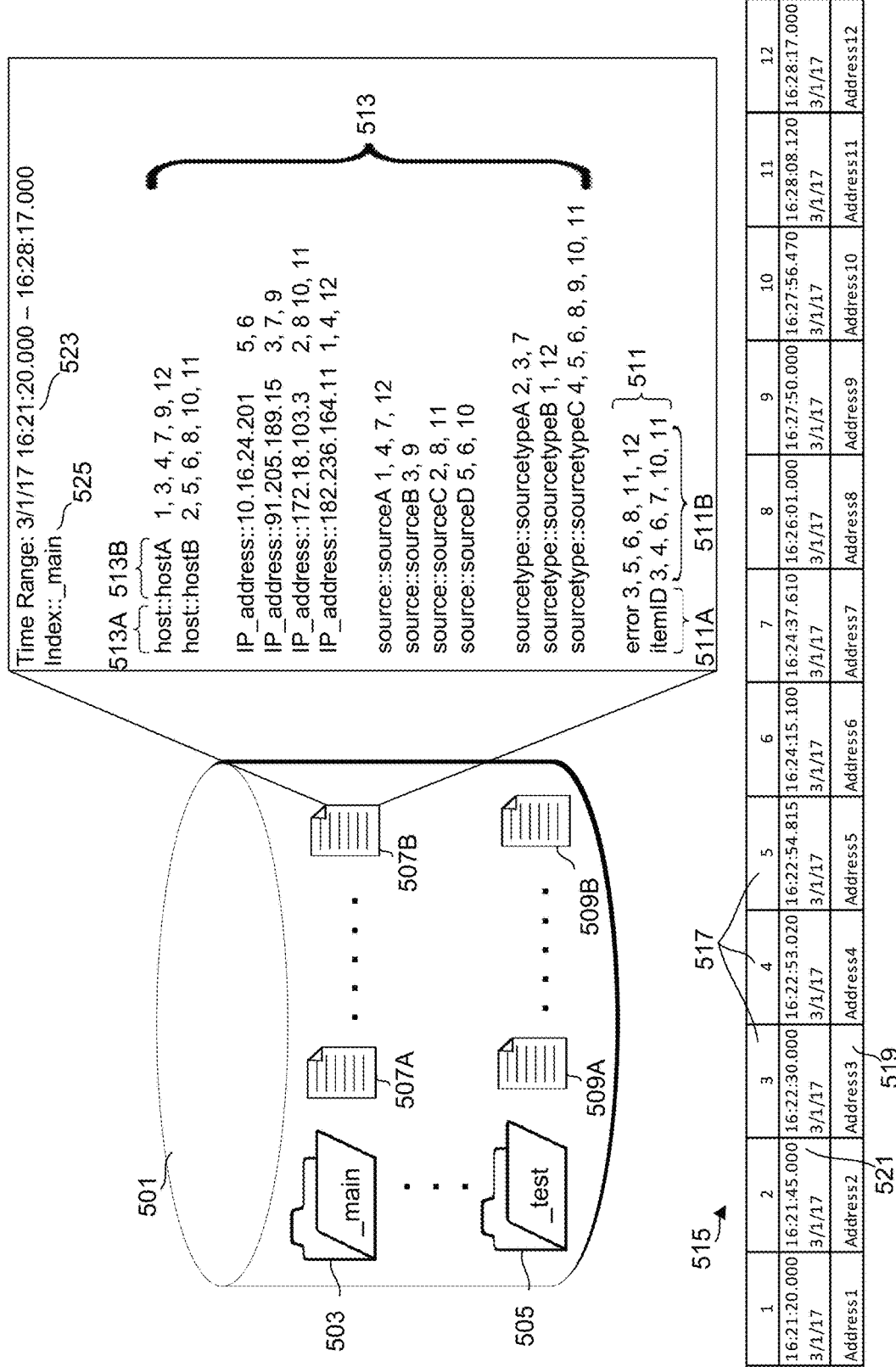
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a _main directory 503 associated with a _main index and a _test directory 505 associated with a _test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, each inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index _main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, a or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event reference 3 is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S 1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=main, time range=3/1/17 16:22.00.000-16:28.00.000, sourcetype= sourcetypeC, host=hostB, and the following categorization criteria: source.

Based on the above criteria, the indexer 206 identifies _main directory 503 and can ignore _test directory 505 and any other partition-specific directories. The indexer determines that inverted partition 507B is a relevant partition based on its location within the _main directory 503 and the time range associated with it. For sake of simplicity in this example, the indexer 206 determines that no other inverted indexes in the _main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=main, time range=3/1/17 3/1/17 16:21:20.000-16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with an partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

3.8. Query Processing

Figure 6A:
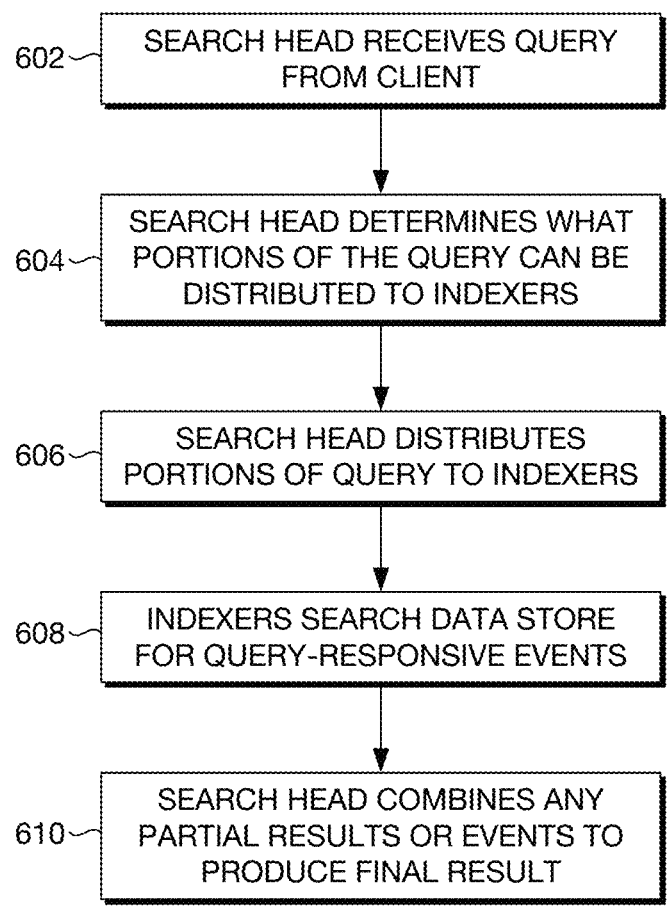
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

As will be described in greater detail below with reference to, inter alia, FIGS. 18-49, some functionality of the search head or indexers can be handled by different components of the system or removed altogether. For example, in some cases, a query coordinator analyzes the query, identifies dataset sources to be accessed, generates subqueries for execution by dataset sources, such as indexers, collects partial results to produce a final result and returns the final results to the search head for delivery to a client device or delivers the final results to the client device without the search head. In some cases, results from dataset sources, such as the indexers, are communicated to nodes, which further process the data, and communicate the results of the processing to the query coordinator, etc. In some embodiments, the search head spawns a search process, which communicates the query to a search process master. The search process master can communicate the query to the query coordinator for processing and execution.

In addition, in some embodiments, the indexers are not involved in search operations or only search some data, such as data in hot buckets, etc. For example, nodes can perform the search functionality described herein with respect to indexers. For example, nodes can use late-binding schema to extract values for specified fields from events at the time the query is processed and/or use one or more rules specified as part of a source type definition in a configuration file for extracting field values, etc. Furthermore, in some embodiments, nodes can perform search operations on data in common storage or found in other dataset sources, such as external data stores, query acceleration data stores, ingested data buffers, etc.

3.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
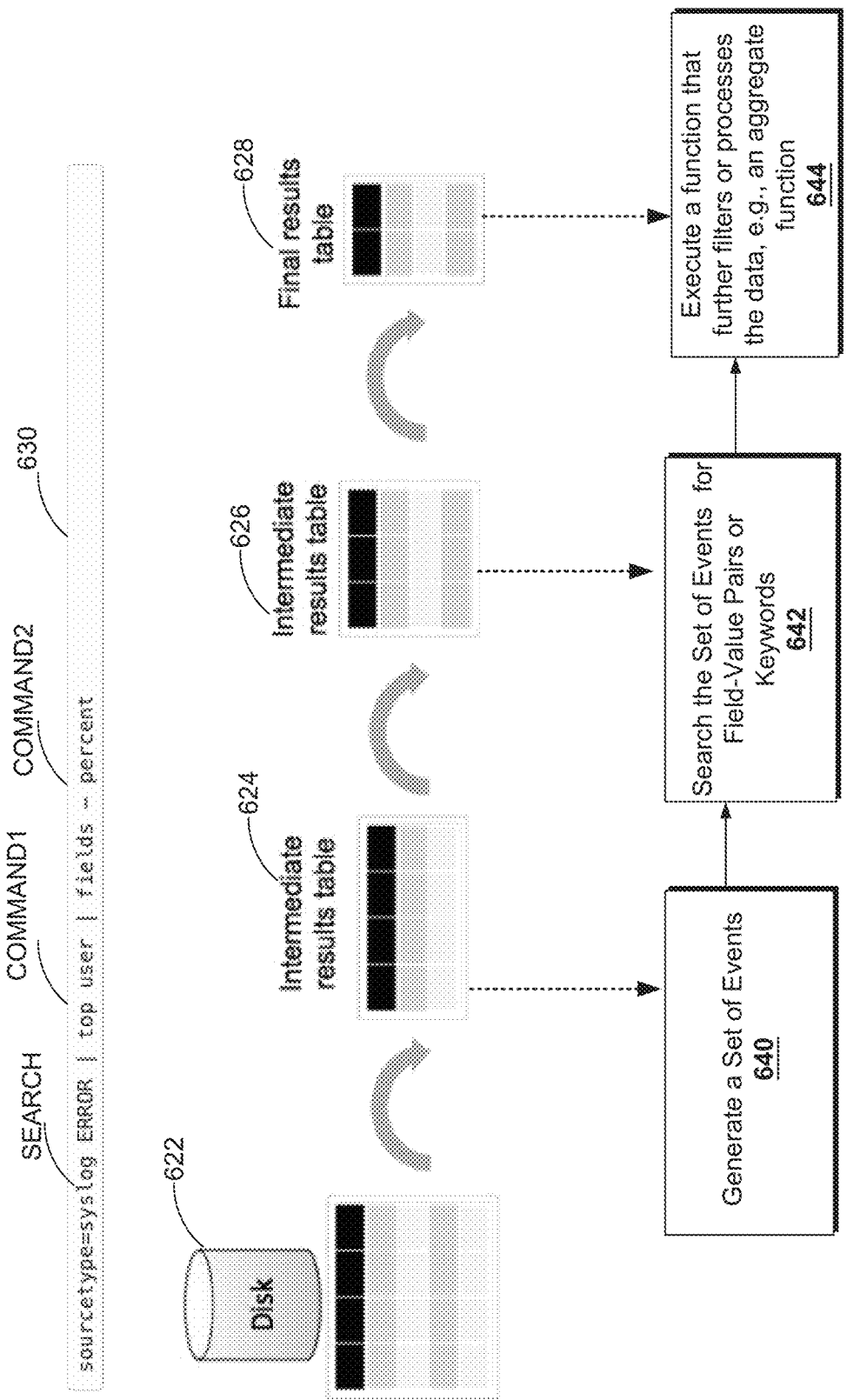
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which summarizes the events into a list of the top 10 users and displays the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields—percent" part of command 630 removes the column that shows the percentage, thereby, leaving a final results table 628 without a percentage column. In different embodiments, other query languages, such as the Structured Query Language ("SQL"), can be used to create a query. In some embodiments, each stage can correspond to a search phase or layer in a DAG. The processing performed in each stage can be handled by one or more partitions allocated to each stage.

3.10. Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

As mentioned above, and as will be described in greater detail below with reference to, inter alia, FIGS. 18-49, some functionality of the search head or indexers can be handled by different components of the system or removed altogether. For example, in some cases, a query coordinator or nodes use extraction rules to extract values for fields in the events being searched. The query coordinator or nodes obtain extraction rules that specify how to extract a value for fields from an event, etc., and apply the extraction rules to events that it receives from indexers, common storage, ingested data buffers, query acceleration data stores, or other dataset sources.

Figure 7A:
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
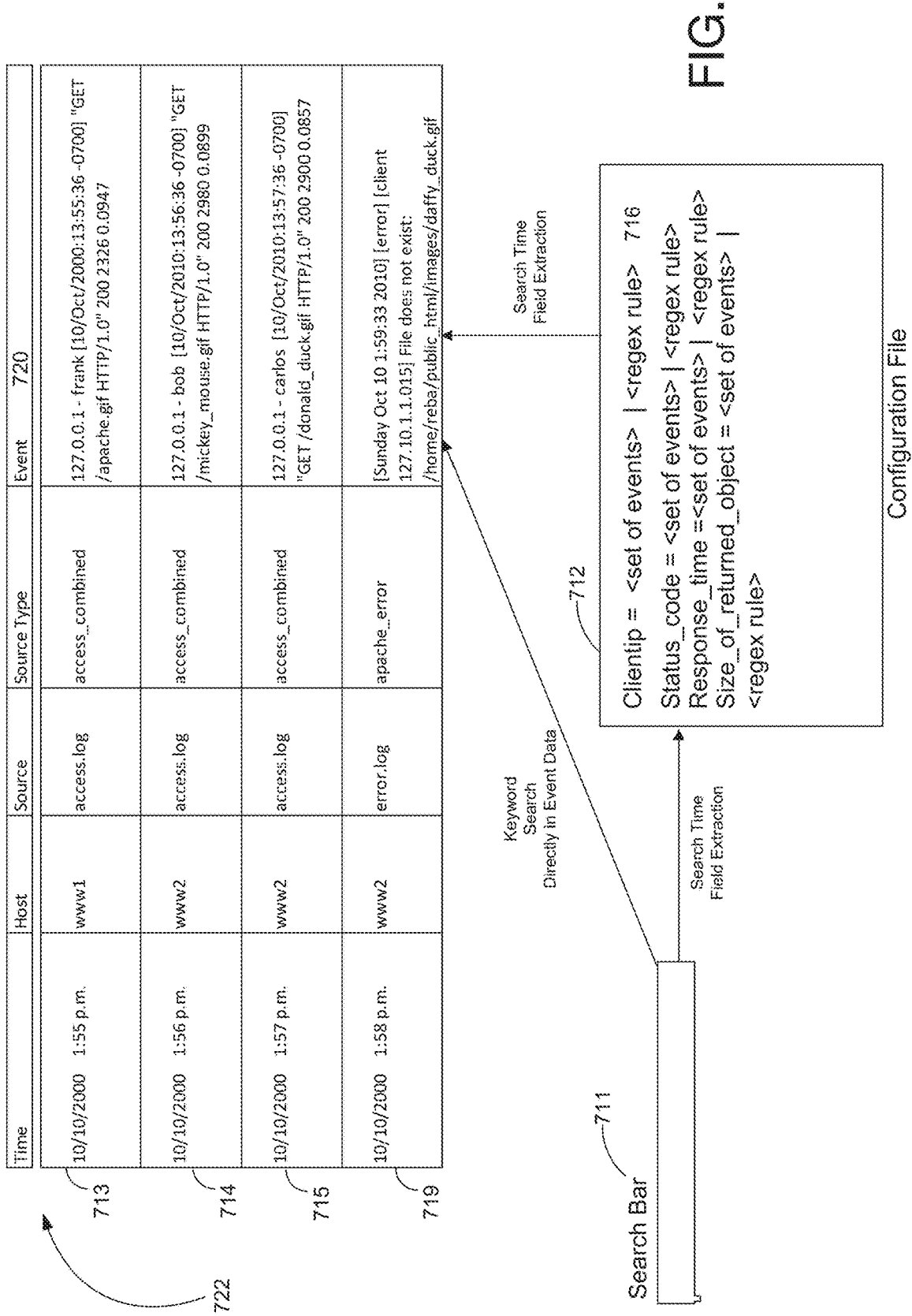
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

As mentioned above, and as will be described in greater detail below with reference to, inter alia, FIGS. 18-49, some functionality of the search head or indexers can be handled by different components of the system or removed altogether. For example, in some cases, the data is stored in a dataset source, which may be an indexer (or data store controlled by an indexer) or may be a different type of dataset source, such as a common storage or external data source. In addition, a query coordinator or node can request events from the indexers or other dataset source, apply extraction rules and correlate, automatically discover certain custom fields, etc., as described above.

3.11. Example Search Screen

Figure 8A:
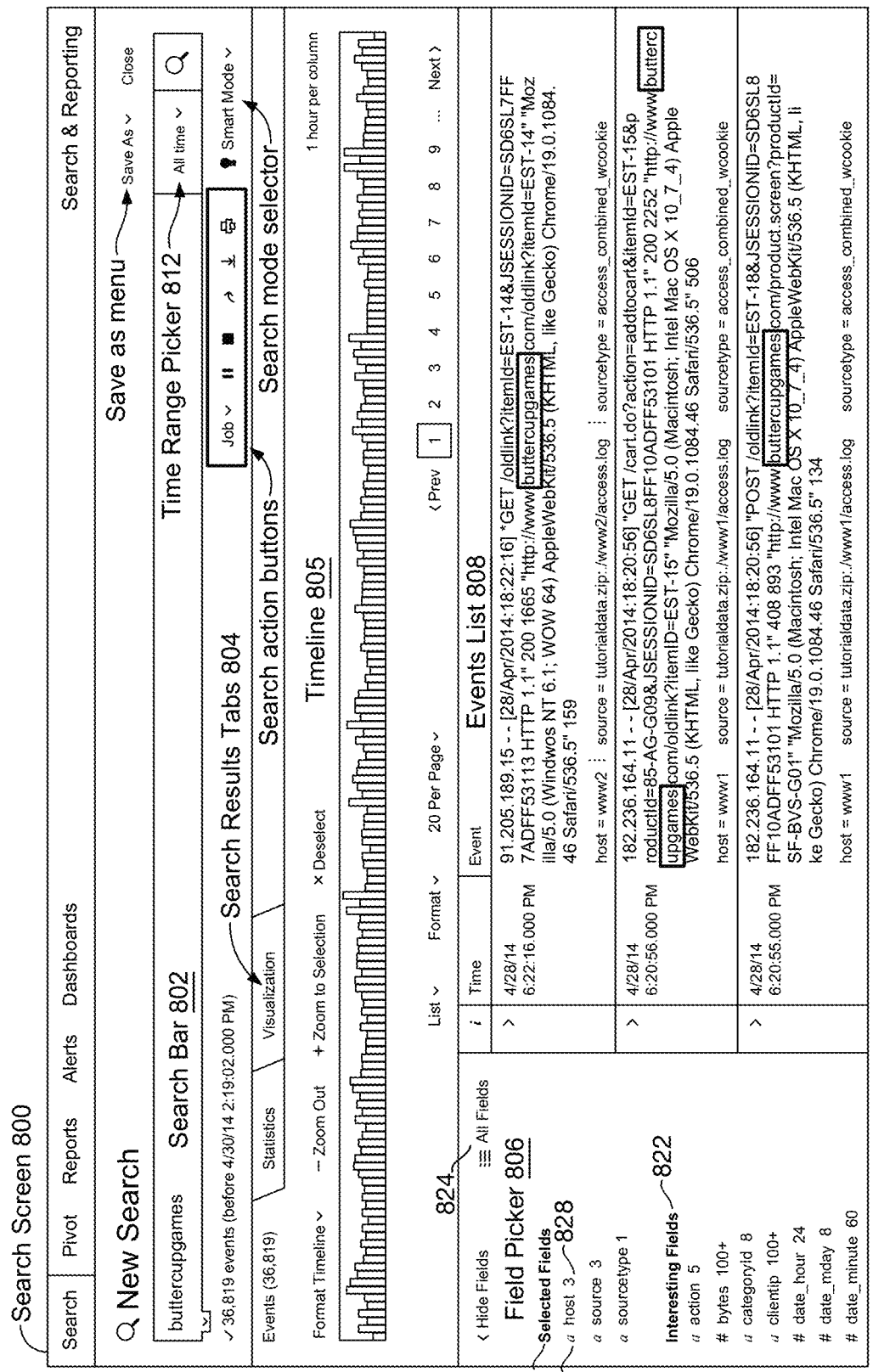
FIG. 8A is an interface diagram of an example user interface for a search screen, in accordance with example embodiments.

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a time window to search for real-time events. Search screen 800 also initially displays a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that displays various information about events returned by the search; a "statistics tab" that displays statistics about the search results; and a "visualization tab" that displays various visualizations of the search results. The events tab illustrated in FIG. 8A displays a timeline graph 805 that graphically illustrates the number of events that occurred in one-hour intervals over the selected time range. The events tab also displays an events list 808 that enables a user to view the machine data in each of the returned events.

The events tab additionally displays a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

3.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
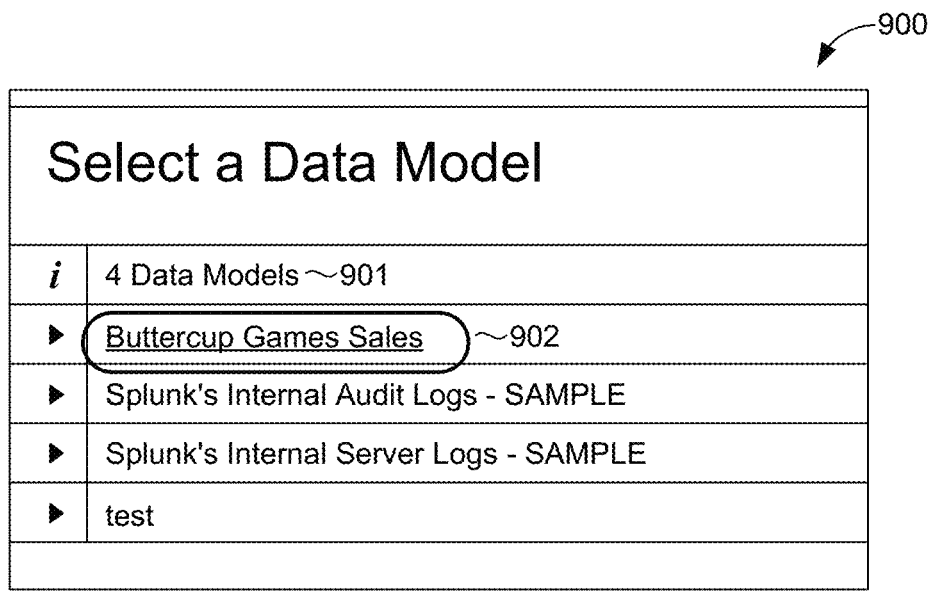

The selection of a data model object for use in driving a report generation may be facilitated by a data model object selection interface. FIG. 9 illustrates an example interactive data model selection graphical user interface 900 of a report editor that displays a listing of available data models 901. The user may select one of the data models 902.

Figure 10:
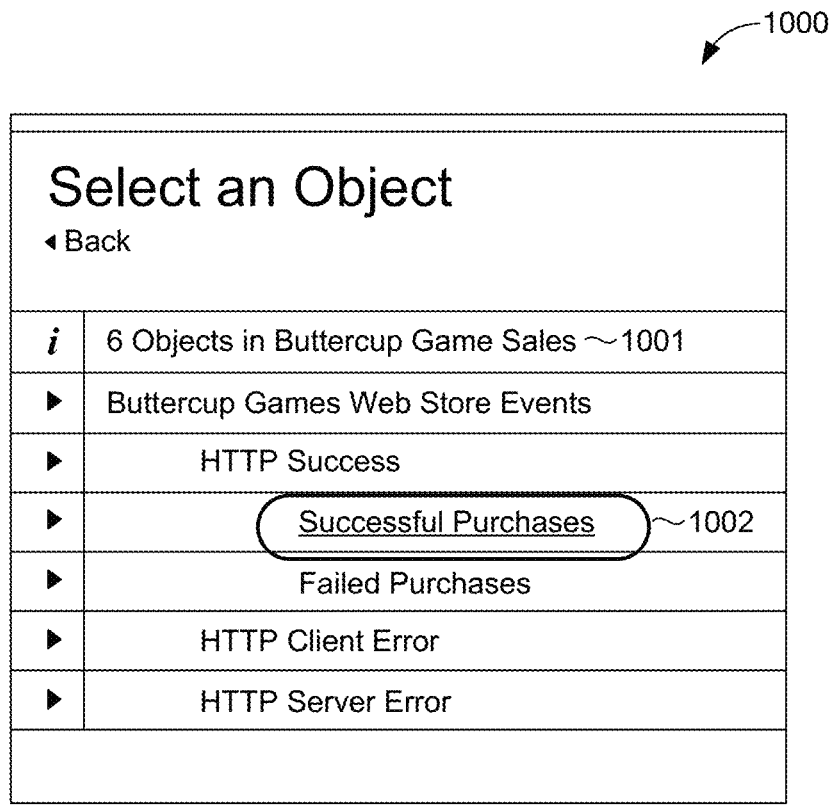

FIG. 10 illustrates an example data model object selection graphical user interface 1000 that displays available data objects 1001 for the selected data object model 902. The user may select one of the displayed data model objects 1002 for use in driving the report generation process.

Figure 11A:
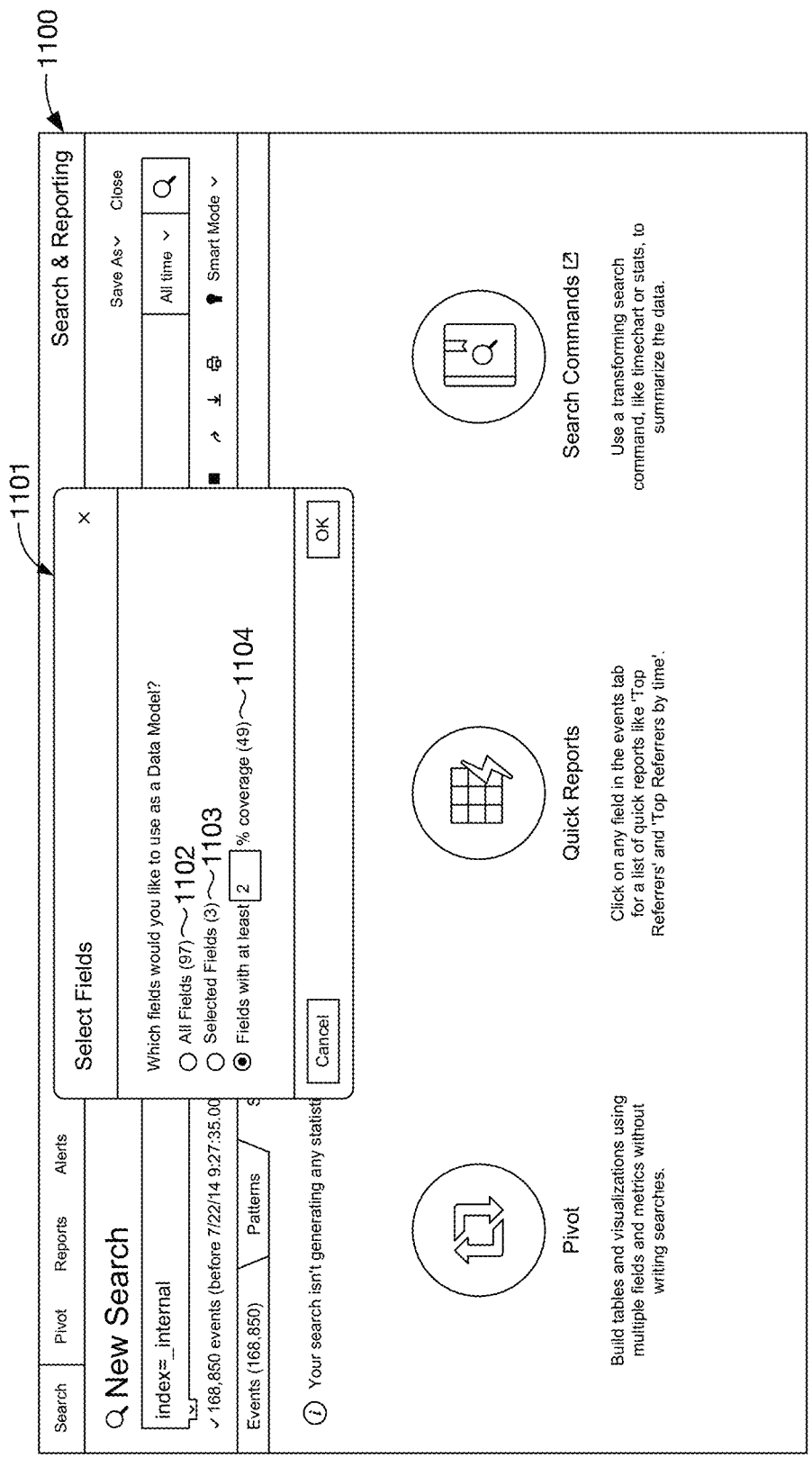

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
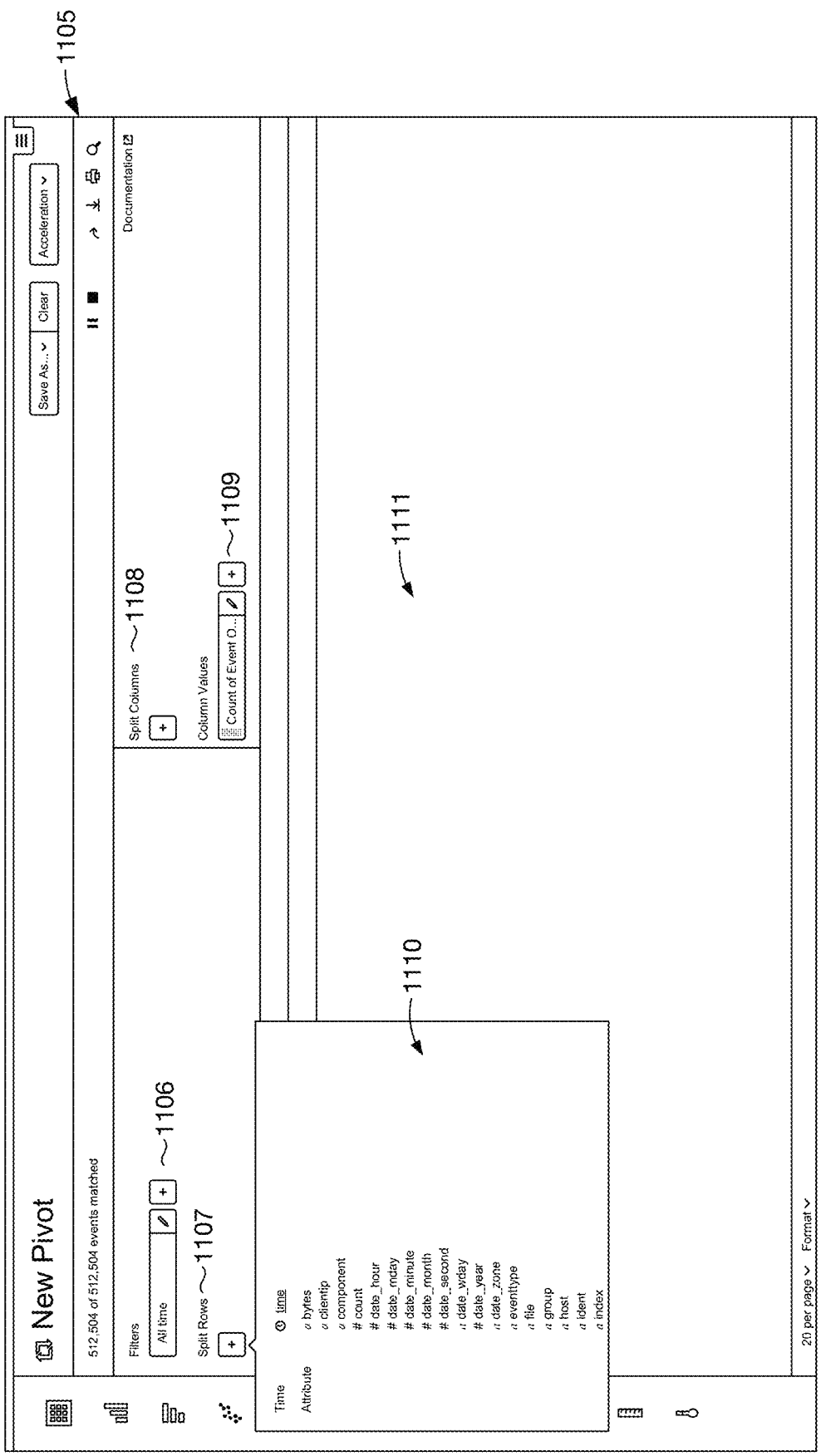
Figure 11C:
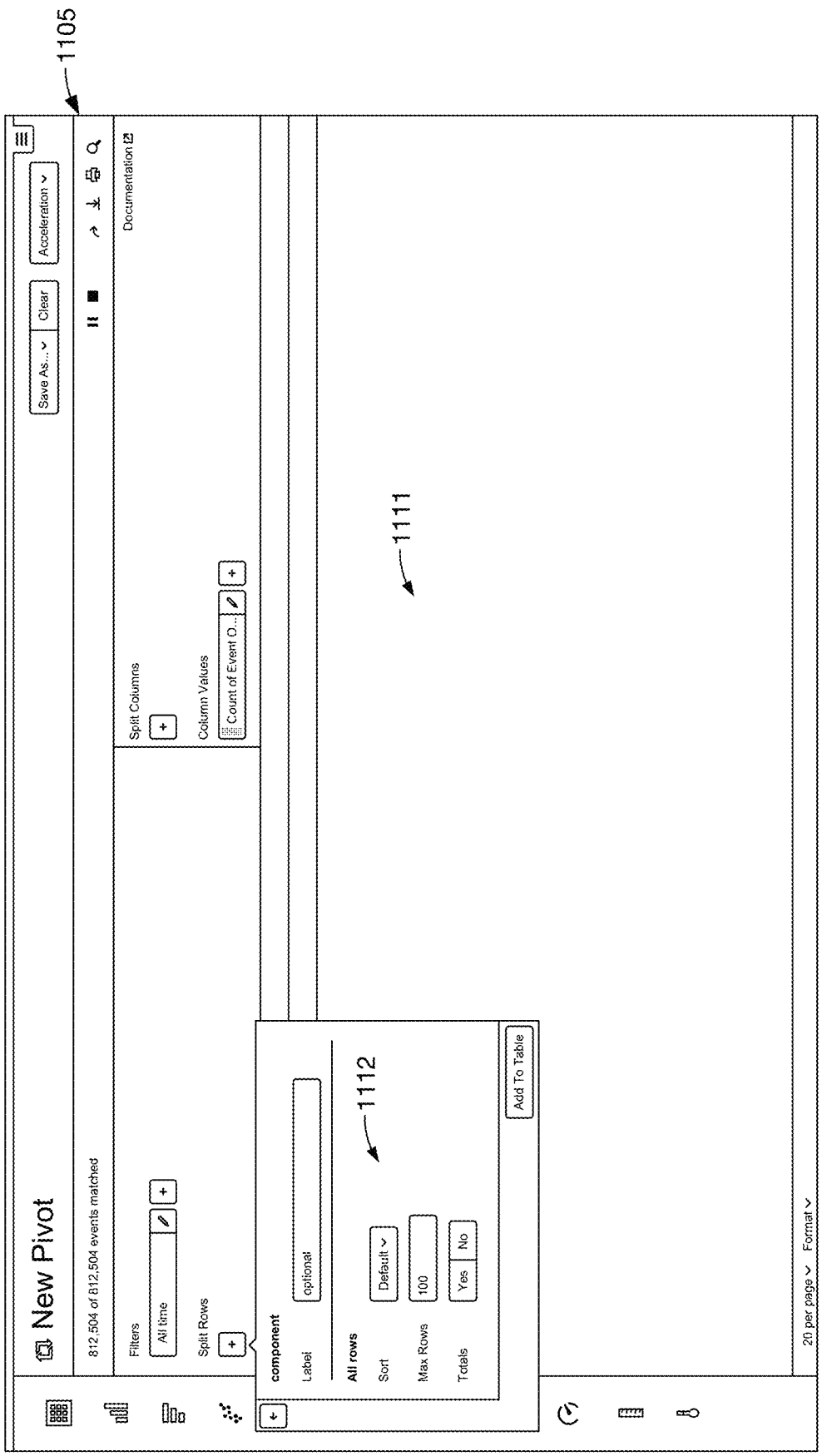

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
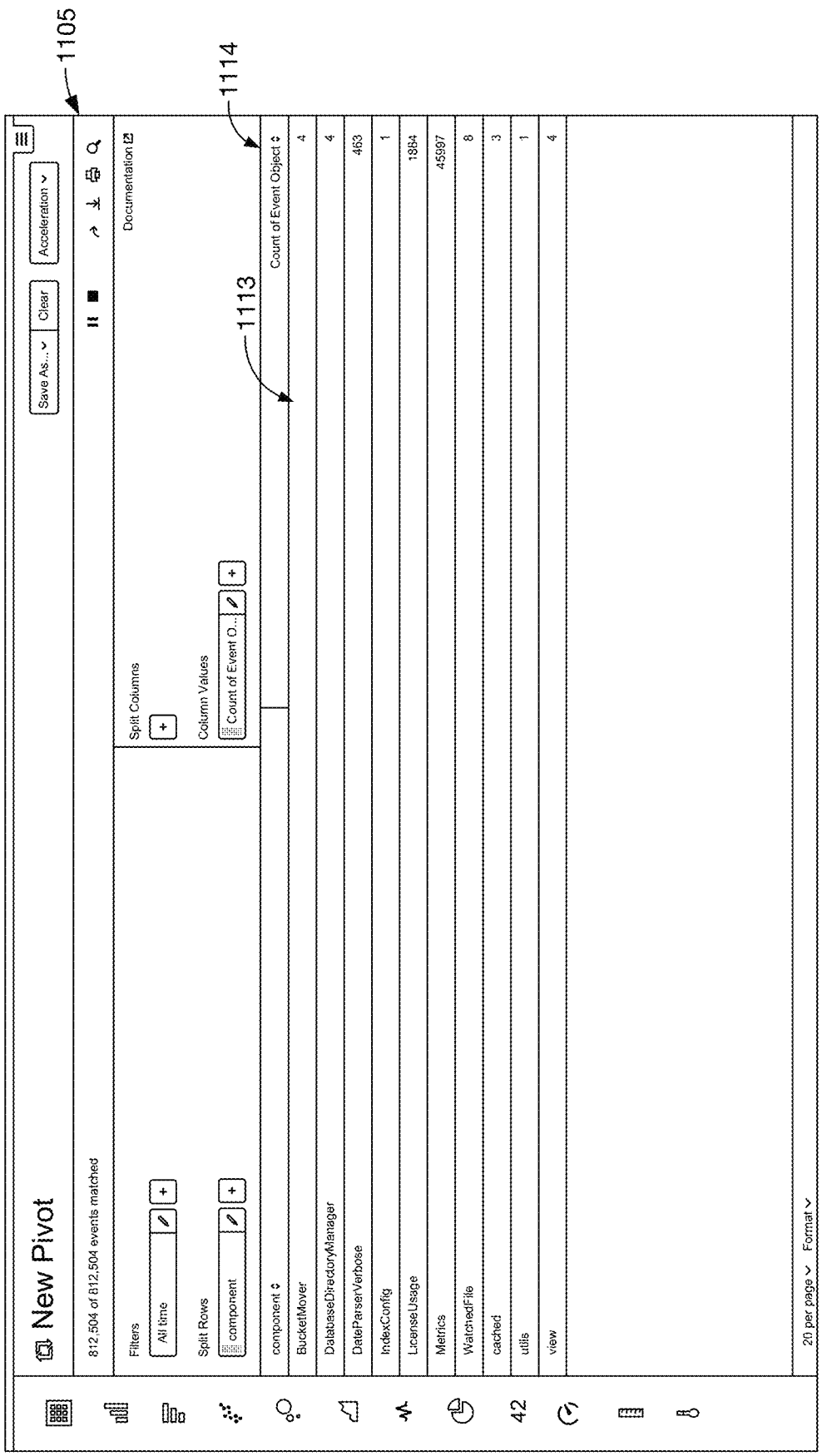

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
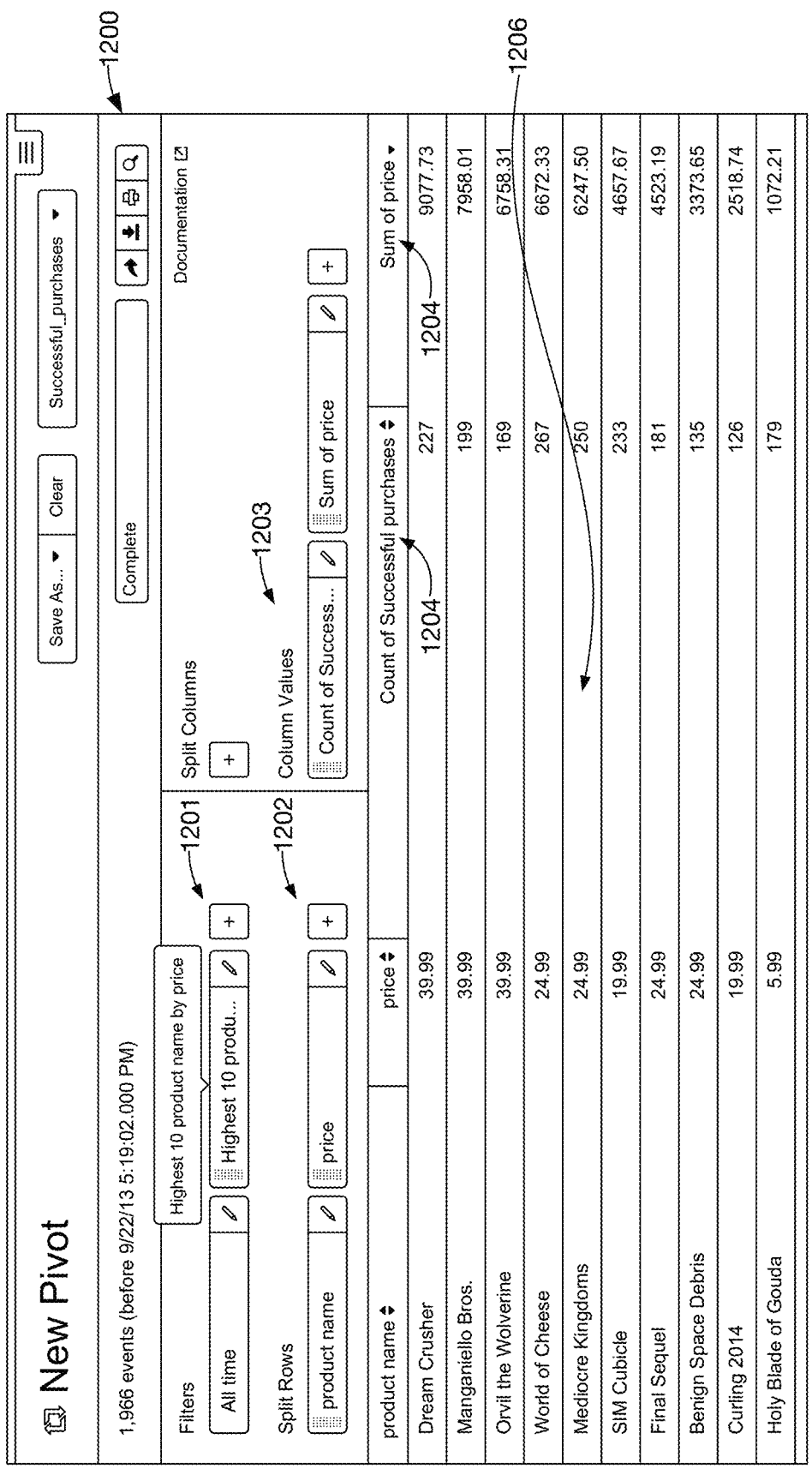

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
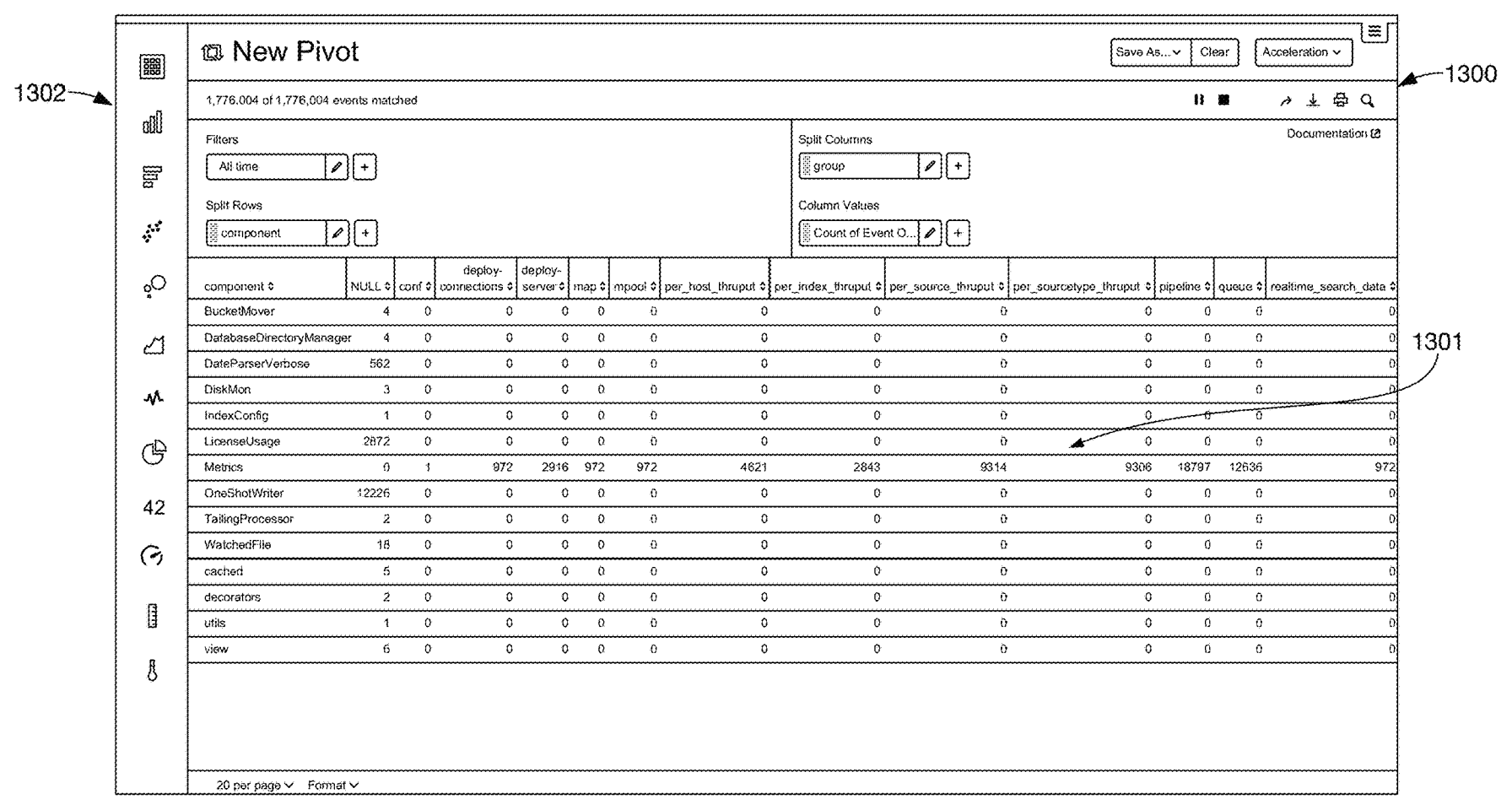
Figure 14:
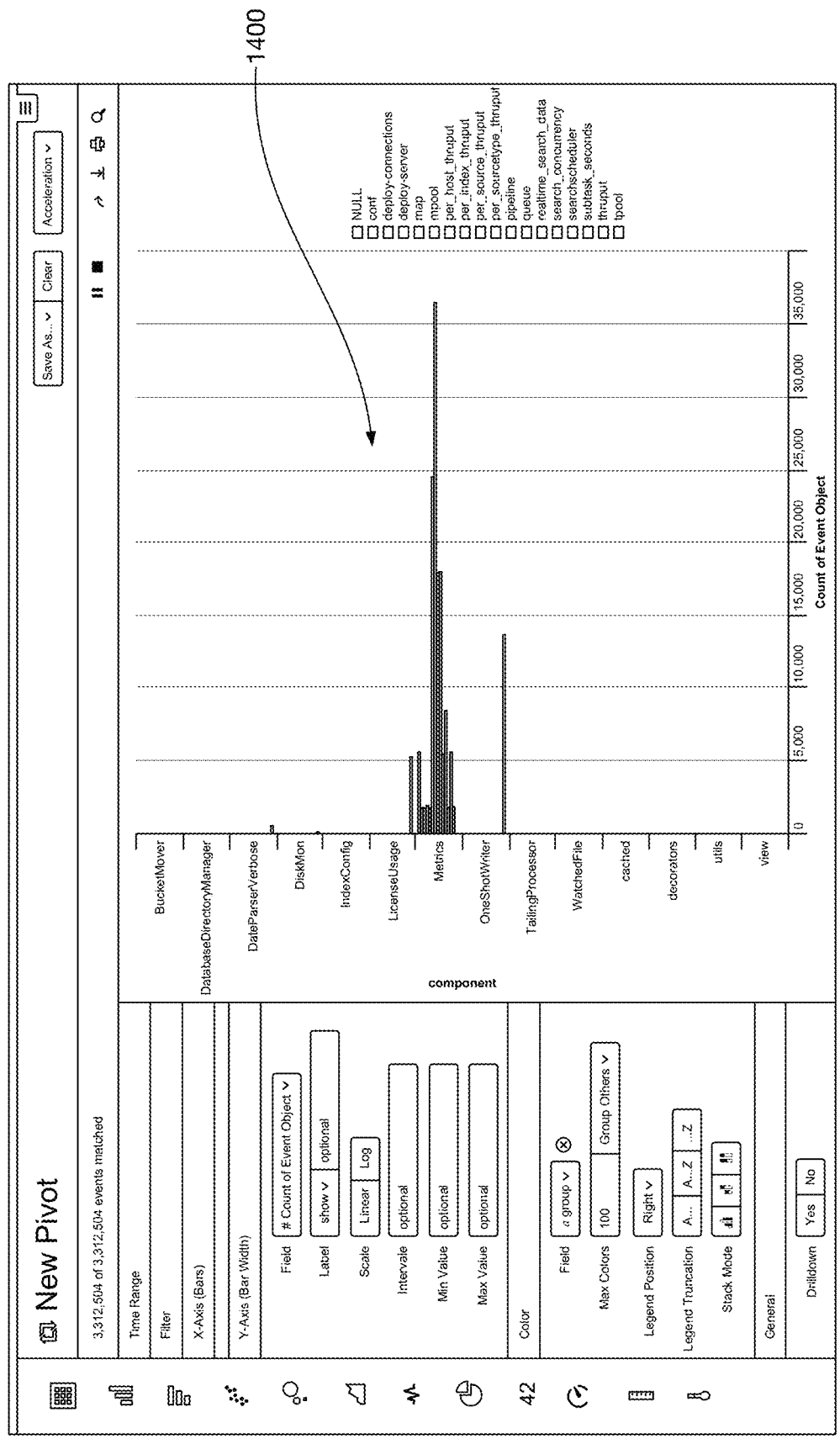
Figure 15:
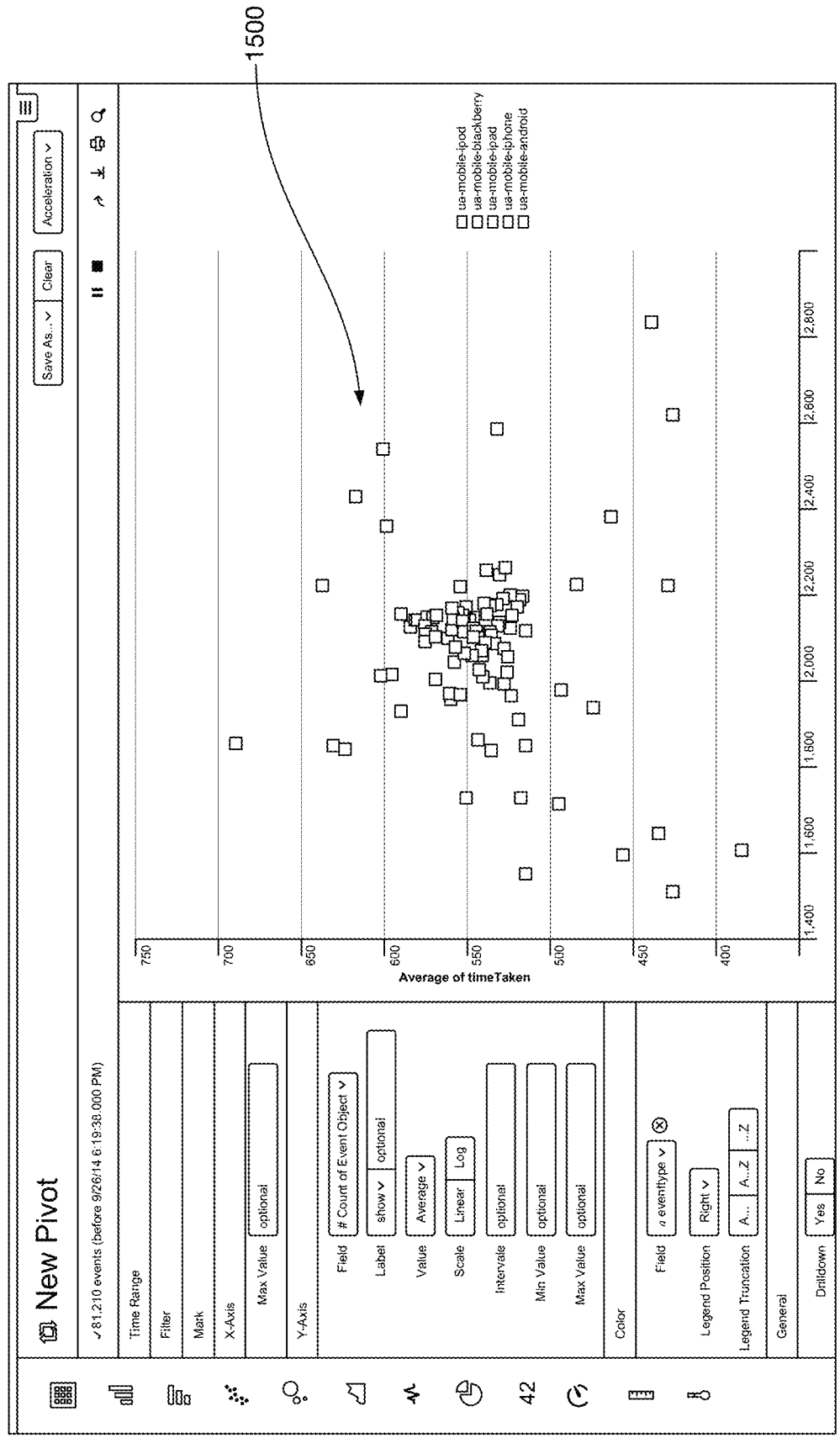

The reporting application allows the user to create graphical visualizations of the statistics generated for a report. For example, FIG. 13 illustrates an example graphical user interface 1300 that displays a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

3.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below. Although described as being performed by an indexer, it will be understood that various components can be used to perform similar functionality. For example, nodes can any one or any combination of the search functions described herein. In some cases, the nodes perform the search functions based on instructions received from a query coordinator.

3.13.1. Aggregation Technique

Figure 16:
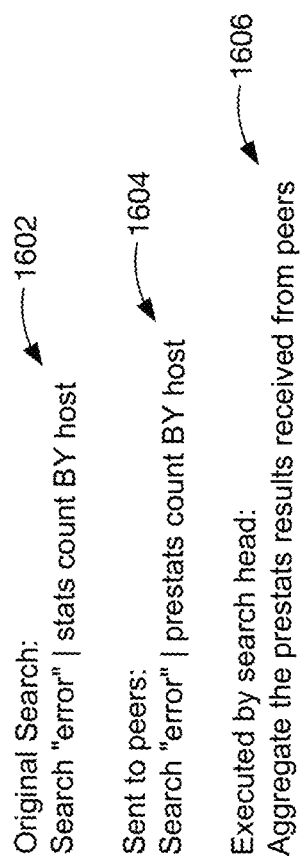
FIG. 16 is an example search query received from a client and executed by search peers, in accordance with example embodiments.

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields.

Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

As mentioned above, and as will be described in greater detail below with reference to, inter alia, 18-49, some functionality of the search head or indexers can be handled by different components of the system or removed altogether. For example, in some cases, the data is stored in one or more dataset sources, such as, but not limited to an indexer (or data store controlled by an indexer), common storage, external data source, ingested data buffer, query acceleration data store, etc. In addition, in some cases a query coordinator can aggregate results from multiple indexers or nodes, perform an aggregation operation 1606, determine what, if any, portion of the operations of the search query are to be performed locally the query coordinator, modify or translate a search query for an indexer or other dataset source, distribute the query to indexers, peers, or nodes, etc.

3.13.2. Keyword Index

As described above with reference to the flow charts in FIG. 5A, FIG. 5B, and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword. In some embodiments, a node or other components of the system that performs search operations can use the keyword index to identify events, etc.

3.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety. In some cases, the inverted indexes can be made available, as part of a common storage, to nodes or other components of the system that perform search operations.

3.13.4. Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
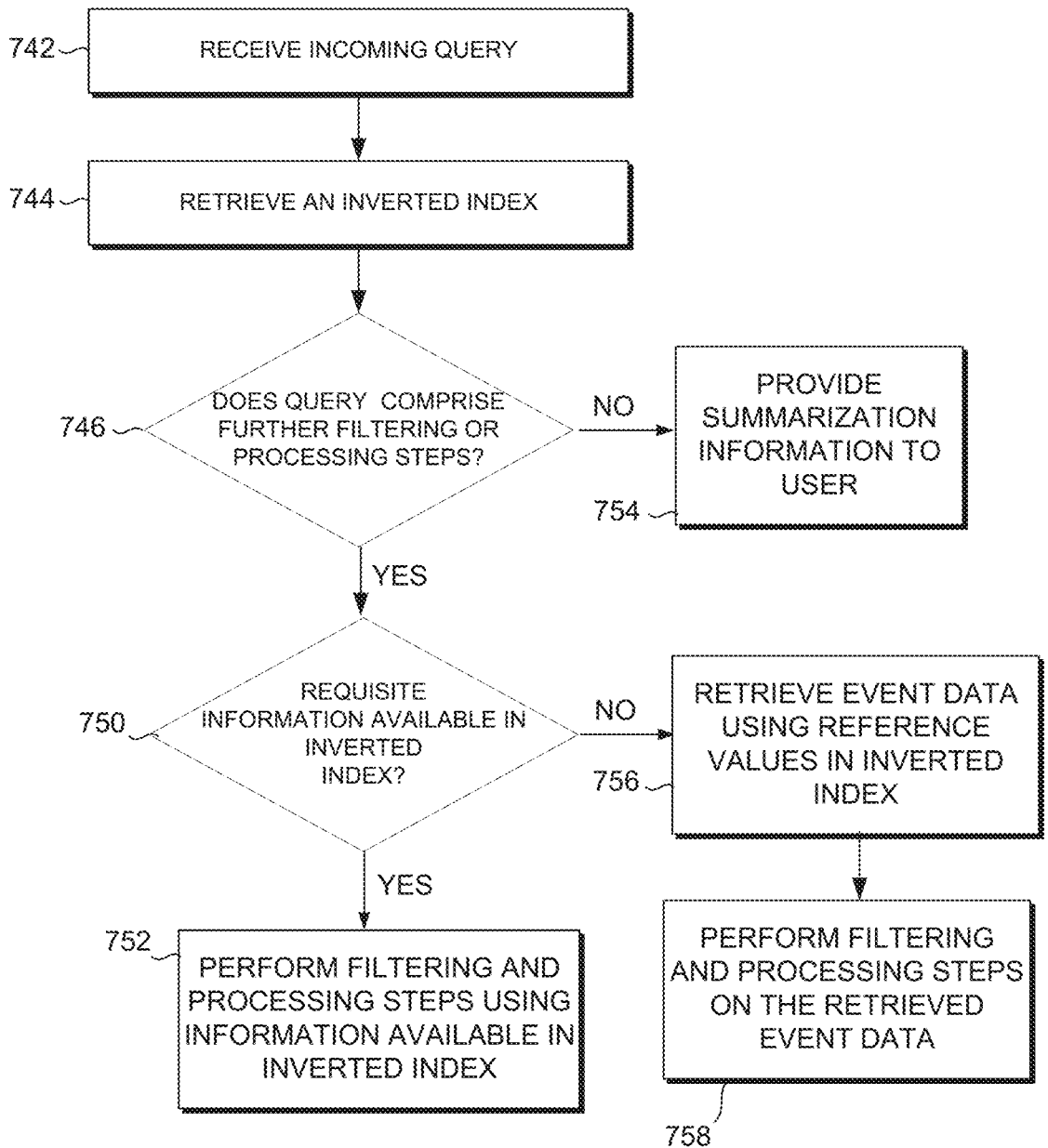
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be receive as a user generated query entered into search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

As described throughout, it will be understood that although described as being performed by an indexer, these functions can be performed by another component of the system, such as a query coordinator or node. For example, nodes can use inverted indexes to identify relevant data, etc. The inverted indexes can be stored with buckets in a common storage, etc.

3.13.5. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

3.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (SIEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning) criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
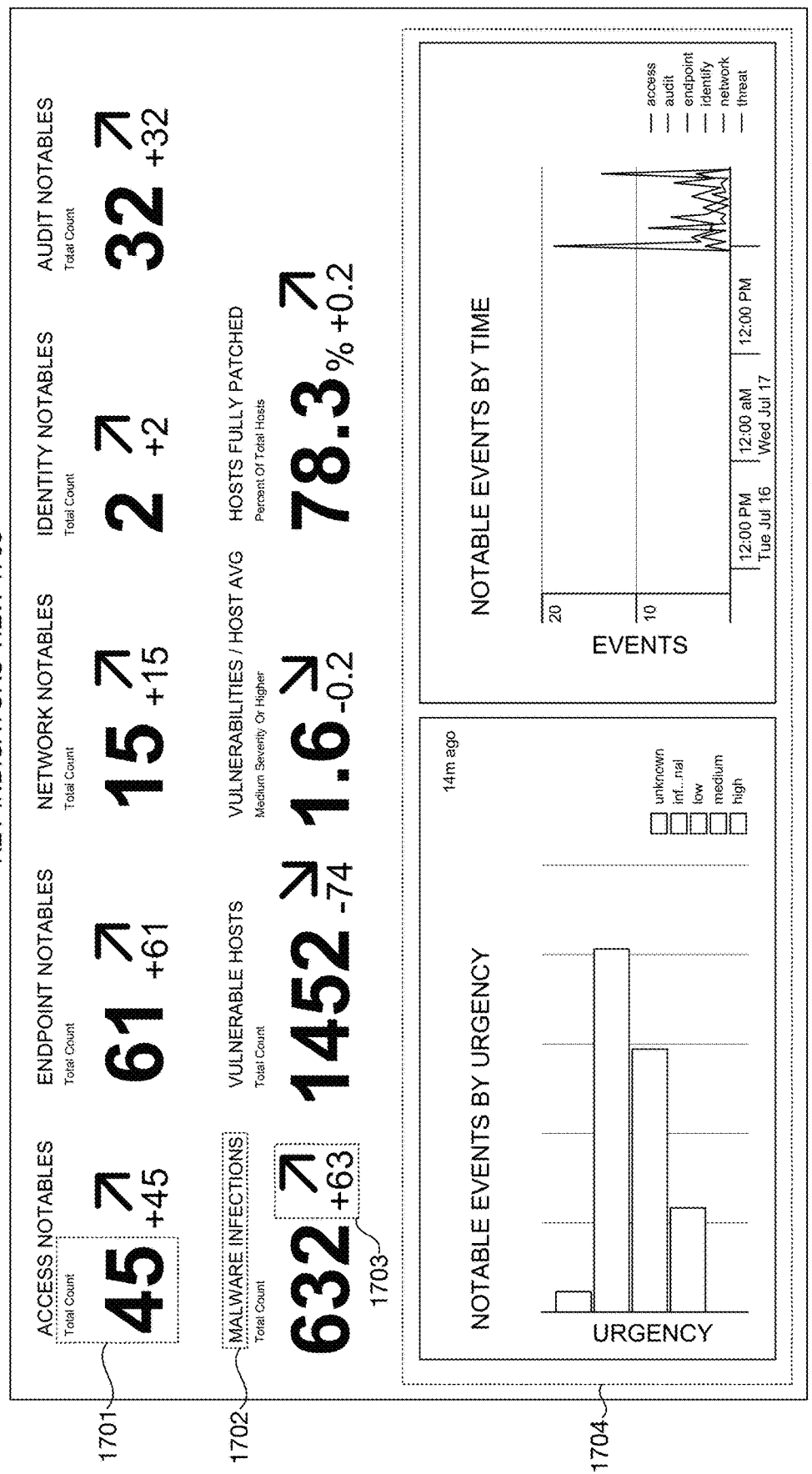
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 17B:
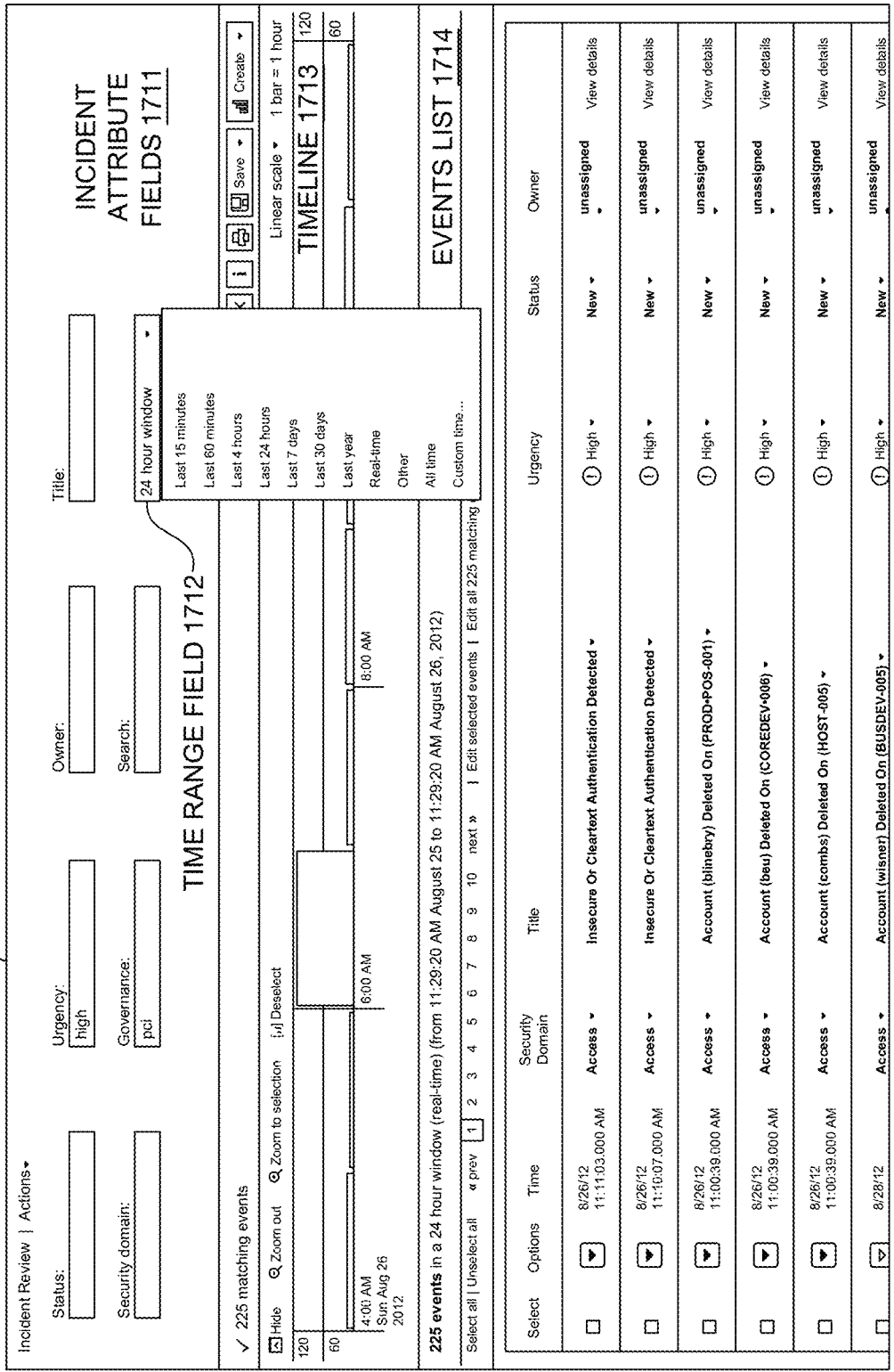
FIG. 17B is an interface diagram of an example user interface of an incident review dashboard, in accordance with example embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

3.15. Data Center Monitoring

As mentioned above, the data intake and query platform provides various features that simplify the developers' task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
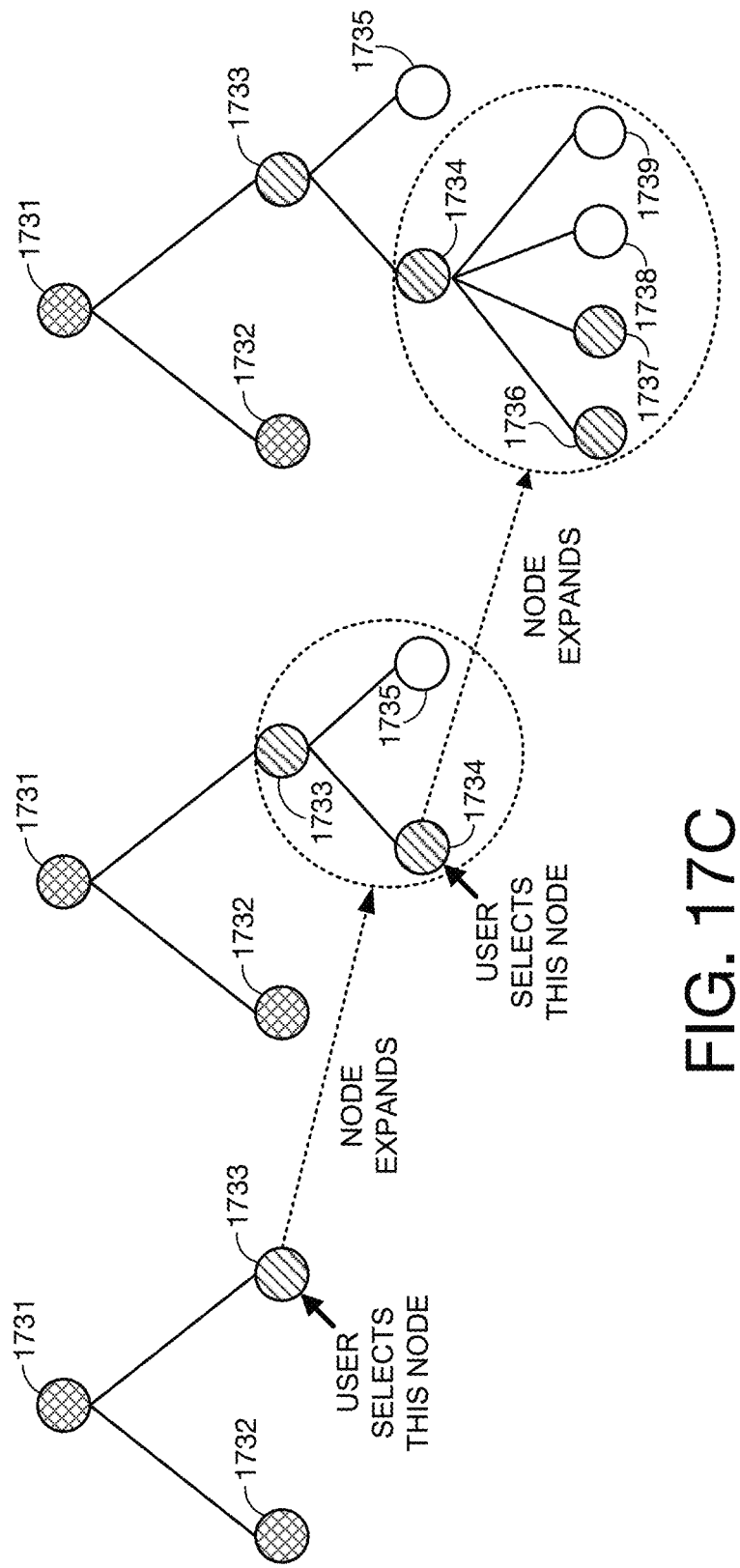
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
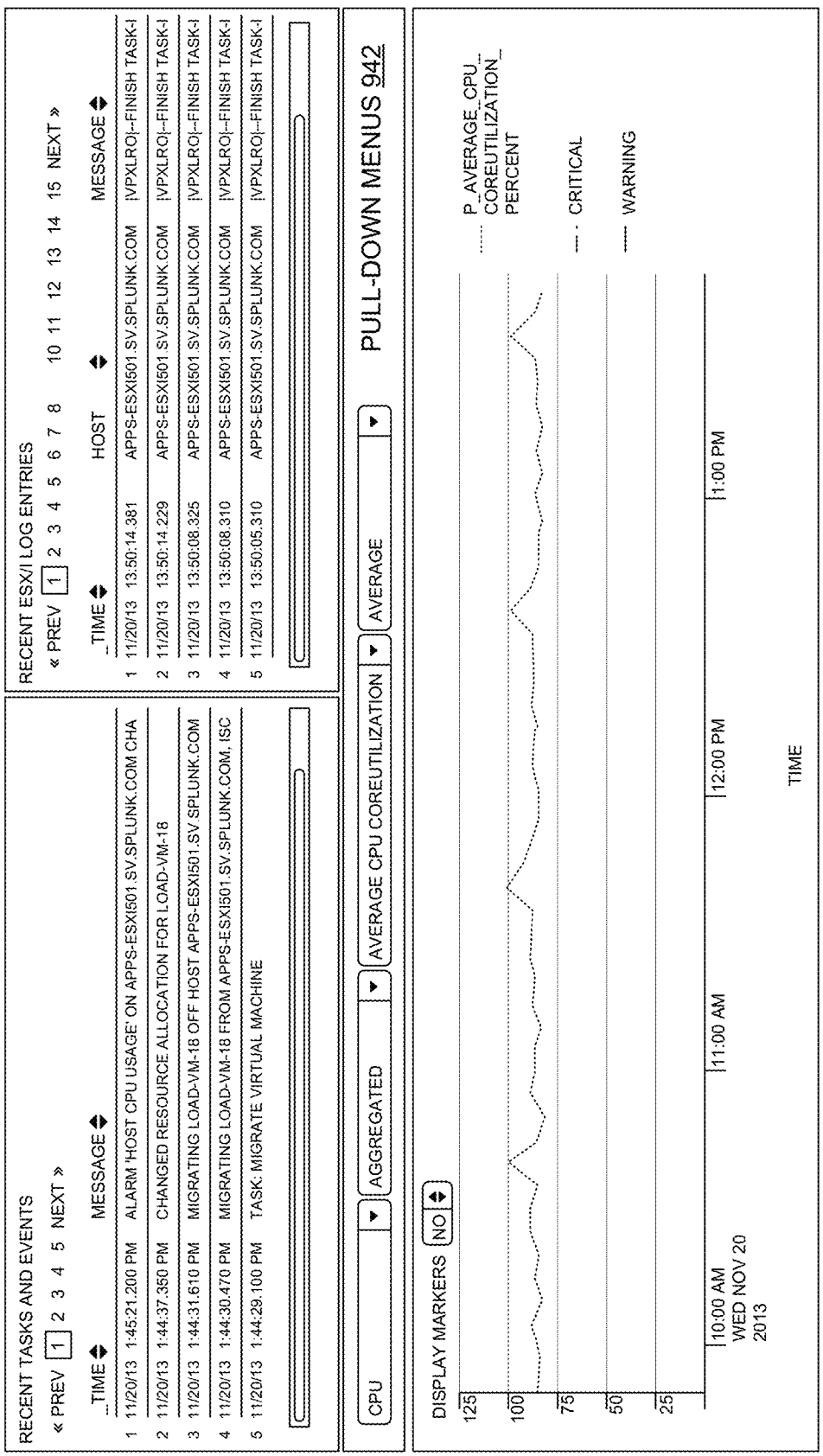
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

3.16. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

One or more Key Performance Indicators (KPI's) are defined for a service within the IT monitoring application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

The IT monitoring application facilitates the production of meaningful aggregate KPI's through a system of KPI thresholds and state values. Different KPI definitions may produce values in different ranges, and so the same value may mean something very different from one KPI definition to another. To address this, the IT monitoring application implements a translation of individual KPI values to a common domain of "state" values. For example, a KPI range of values may be 1-100, or 50-275, while values in the state domain may be 'critical,' 'warning,' normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. The IT monitoring application can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in the IT monitoring application can include informational fields that can serve as metadata, implied data fields, or attributed data fields for the events identified by other aspects of the entity definition. Entity definitions in the IT monitoring application can also be created and updated by an import of tabular data (as represented in a CSV, another delimited file, or a search query result set). The import may be GUI-mediated or processed using import parameters from a GUI-based import definition process. Entity definitions in the IT monitoring application can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, the IT monitoring application can recognize notable events that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of events and the KPI values generated and collected. Visualizations can be particularly useful for monitoring or investigating service performance. The IT monitoring application provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

The IT monitoring application provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

The IT monitoring application provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

The IT monitoring application provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

The IT monitoring application provides pre-specified schemas for extracting relevant values from the different types of service-related events. It also enables a user to define such schemas.

4.0. Data Fabric Service (DFS)

The capabilities of a data intake and query system are typically limited to resources contained within that system. For example, the data intake and query system has search and analytics capabilities that are limited in scope to the indexers responsible for storing and searching a subset of events contained in their corresponding internal data stores.

Even if a data intake and query system has access to external data stores that may include data relevant to a query, the data intake and query system typically has limited capabilities to process the combination of partial search results from the indexers and external data sources to produce comprehensive search results. In particular, the search head of a data intake and query system may retrieve partial search results from external data systems over a network. The search head may also retrieve partial results from its indexers, and combine those partial search results with the partial results of the external data sources to produce final results for a query.

For example, the search head can implement map-reduce techniques, where each data source returns partial search results and the search head can combine the partial search results to produce the final results of a query. However, obtaining results in this manner from distributed data systems including internal data stores and external data stores has limited value because the search head can act as a bottleneck for processing complex search queries on distributed data systems. The bottleneck effect at the search head worsens as the number of distributed data systems increases. Furthermore, even without processing queries on distributed data systems, the search head 210 and the indexers 206 can act as bottlenecks due to the number of queries received by the data intake and query system 108 and the amount of processing done by the indexers during data ingestion, indexing, and search.

Embodiments of the disclosed data fabric service (DFS) system 3301 overcome the aforementioned drawbacks by expanding on the capabilities of a data intake and query system to enable application of a query across distributed data systems, which may also be referred to as dataset sources, including internal data stores coupled to indexers (illustrated in FIG. 33), external data stores coupled to the data intake and query system over a network (illustrated in FIGS. 33, 46, 48), common storage (illustrated in FIGS. 46, 48), query acceleration data stores (e.g., query acceleration data store 3308 illustrated in FIGS. 33, 46, 48), ingested data buffers (illustrated in FIG. 48) that include ingested streaming data. Moreover, the disclosed embodiments are scalable to accommodate application of a query on a growing number of diverse data systems.

In certain embodiments, the disclosed DFS system extends the capabilities of the data intake and query system and mitigates the bottleneck effect at the search head by including one or more query coordinators communicatively coupled to worker nodes distributed in a big data ecosystem. In some embodiments, the worker nodes can be communicatively coupled to the various dataset sources (e.g., indexers, common storage, external data systems that contain external data stores, ingested data buffers, query acceleration data stores, etc.)

The data intake and query system can receive a query input by a user at a client device via a search head. The search head can coordinate with a search process master and/or one or more query coordinators (the search process master and query coordinators can collectively referred to as a search process service) to execute a search scheme applied to one or more dataset sources (e.g., indexers, common storage, ingested data buffer, query acceleration data store, external data stores, etc.). The worker nodes can collect, process, and aggregate the partial results from the dataset sources, and transfer the aggregate results to a query coordinator. In some embodiments, the query coordinator can operate on the aggregate results, and send finalized results to the search head, which can render the results of the query on a display device.

Hence, the search head in conjunction with the search process master and query coordinator(s) can apply a query to any one or more of the distributed dataset sources. The worker nodes can act in accordance with the instructions received by a query coordinator to obtain relevant datasets from the different dataset sources, process the datasets, aggregate the partial results of processing the different datasets, and communicate the aggregated results to the query coordinator, or elsewhere. In other words, the search head of the data intake and query system can offload at least some query processing to the query coordinator and worker nodes, to both obtain the datasets from the dataset sources and aggregate the results of processing the different datasets. This system is scalable to accommodate any number of worker nodes communicatively coupled to any number and types of data sources.

Thus, embodiments of the DFS system can extend the capabilities of a data intake and query system by leveraging computing assets from anywhere in a big data ecosystem to collectively execute queries on diverse data systems regardless of whether data stores are internal of the data intake and query system and/or external data stores that are communicatively coupled to the data intake and query system over a network.

4.1. DFS System Architecture

Figure 18:
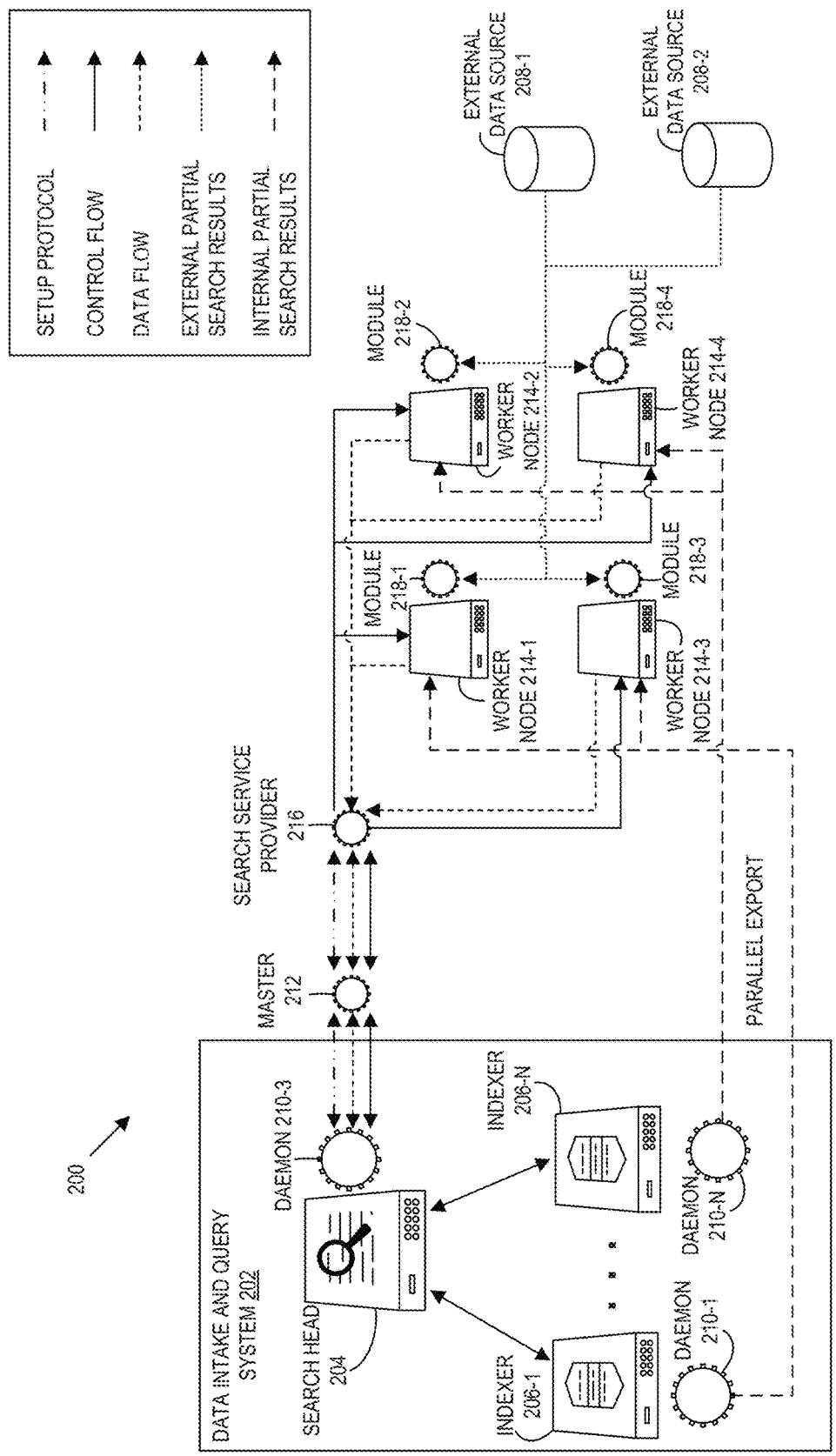
FIG. 18 is a system diagram illustrating a data fabric service system architecture ("DFS system") in which an embodiment may be implemented.

FIG. 18 is a system diagram illustrating a DFS system architecture in which an embodiment may be implemented. The DFS system 200 includes a data intake and query system 202 communicatively coupled to a network of distributed components that collectively form a big data ecosystem. The data intake and query system 202 may include the components of data intake and query systems discussed above including any combination of forwarders, indexers, data stores, and a search head. However, the data intake and query system 202 is illustrated with fewer components to aid in understanding how the disclosed embodiments extend the capabilities of data intake and query systems to apply search queries and analytics operations on distributed data systems including internal data systems (e.g., indexers with associated data stores) and/or external data systems in a big data ecosystem.

The data intake and query system 202 includes a search head 210 communicatively coupled to multiple peer indexers 206 (also referred to individually as indexer 206). Each indexer 206 is responsible for storing and searching a subset of events contained in a corresponding data store (not shown). The peer indexers 206 can analyze events for a search query in parallel. For example, each indexer 206 can return partial results in response to a search query as applied by the search head 210.

The disclosed technique expands the capabilities of the data intake and query system 202 to obtain and harmonize search results from external data sources 209, alone or in combination with the partial search results of the indexers 206. More specifically, the data intake and query system 202 runs various processes to apply a search query to the indexers 206 as well as external data sources 209. For example, a daemon 210 of the data intake and query system 202 can operate as a background process that coordinates the application of a search query on the indexers and/or the external data stores. As shown, the daemon 210 includes software components for the search head 210 and indexers 206 to interface with a DFS master 212 and a distributed network of worker nodes 214, respectively, which are external to the data intake and query system 202.

The DFS master 212 is communicatively coupled to the search head 210 via the daemon 210-3. In some embodiments, the DFS master 212 can include software components running on a device of any system, including the data intake and query system 202. As such, the DFS master 212 can include software and underlying logic for establishing a logical connection to the search head 210 when external data systems need to be searched. The DFS master 212 is part of the DFS search service ("search service") that includes a search service provider 216 (also referred to as a query coordinator), which interfaces with the worker nodes 214.

Although shown as separate components, the DFS master 212 and the search service provider 216 are components of the search service that may reside on the same machine, or may be distributed across multiple machines. In some embodiments, running the DFS master 212 and the search service provider 216 on the same machine can increase performance of the DFS system by reducing communications over networks. As such, the search head 210 can interact with the search service residing on the same machine or on different machines. For example, the search head 210 can dispatch requests for search queries to the DFS master 212, which can spawn search service providers 216 of the search service for each search query.

Other functions of the search service provider 216 can include providing data isolation across different searches based on role/access control, as well as fault tolerance (e.g., localized to a search head). For example, if a search operation fails, then its spawned search service provider may fail but other search service providers for other searches can continue to operate.

The search head 210 can analyze a query and determine that the DFS system 200 can execute the query. Accordingly, the search head 210 can send the query to the query master 212, which can send it to, or spawn, a search service provider 216. The search service provider can define a search scheme in response to a received search query that requires searching both the indexers 206 and the external data sources 209. A portion of the search scheme can be applied 210 to the indexers 206 and another portion of the search scheme can be communicated to the worker nodes 214 for application to the external data sources 209. The search service provider 216 can collect an aggregate of partial search results of the indexers 206 and of the external data sources 209 from the worker nodes 214, and communicate the aggregate partial search results to the search head 210. In some embodiments, the DFS master 212, search head 210, or the worker nodes 214 can produce the final search results, which the search head 210 can cause to be presented on a user interface of a display device.

More specifically, the worker nodes 214 can act as agents of the DFS master 212 via the search service provider 216, which can act on behalf of the search head 210 to apply a search query to distributed data systems. For example, the DFS master 212 can manage different search operations and balance workloads in the DFS system 200 by keeping track of resource utilization while the search service provider 216 is responsible for executing search operations and obtaining the search results.

For example, the search service provider 216 can cause the worker nodes 214 to apply a search query to the external data sources 209. The search service provider 216 can also cause the worker nodes 214 to collect the partial search results from the indexers 206 and/or the external data sources 209 over the computer network. Moreover, the search service provider 216 can cause the worker nodes 214 to aggregate the partial search results collected from the indexers 206 and/or the external data sources 209.

Hence, the search head 210 can offload at least some processing to the worker nodes 214 because the distributed worker nodes 214 can extract partial search results from the external data sources 209, and collect the partial search results of the indexers 206 and the external data sources 209. Moreover, the worker nodes 214 can aggregate the partial search results collected from the diverse data systems and transfer them to the search service, which can finalize the search results and send them to the search head 210. Aggregating the partial search results of the diverse data systems can include combining partial search results, arranging the partial search results in an ordered manner, and/or performing operations derive other search results from the collected partial search results (e.g., transform the partial search results).

Once a logical connection is established between the search head 210, the DFS master 212, the search service provider 216, and the worker nodes 214, control and data flows can traverse the components of the DFS system 200. For example, the control flow can include instructions from the DFS master 212 to the worker nodes 214 to carry out the operations detailed further below. Moreover, the data flow can include aggregate partial search results transferred to the search service provider 216 from the worker nodes 214. Further, the partial search results of the indexers 206 can be transferred by peer indexers to the worker nodes 214 in accordance with a parallel export technique. A more detailed description of the control flow, data flow, and parallel export techniques are provided further below.

In some embodiments, the DFS system 200 can use a redistribute operator of a data intake and query system. The redistribute operator can distribute data in a sharded manner to the different worker nodes 214. Use of the redistribute operator may be more efficient than the parallel exporting because it is closely coupled to the existing data intake and query system. However, the parallel exporting techniques have capabilities to interoperate with open source systems other than the worker nodes 214. Hence, use of the redistribute operator can provide greater efficiency but less interoperability and flexibility compared to using parallel export techniques.

The worker nodes 214 can be communicatively coupled to each other, and to the external data sources 209. Each worker node 214 can include one or more software components or modules 218 ("modules") operable to carry out the functions of the DFS system 200 by communicating with the search service provider 216, the indexers 206, and the external data sources 209. The modules 218 can run on a programming interface of the worker nodes 214. An example of such an interface is APACHE SPARK, which is an open source computing framework that can be used to execute the worker nodes 214 with implicit parallelism and fault-tolerance.

In particular, SPARK includes an application programming interface (API) centered on a data structure called a resilient distributed dataset (RDD), which is a read-only multiset of data items distributed over a cluster of machines (e.g., the devices running the worker nodes 214). The RDDs function as a working set for distributed programs that offer a form of distributed shared memory.

Thus, the search service provider 216 can act as a manager of the worker nodes 214, including their distributed data storage systems, to extract, collect, and store partial search results via their modules 218 running on a computing framework such as SPARK. However, the embodiments disclosed herein are not limited to an implementation that uses SPARK. Instead, any open source or proprietary computing framework running on a computing device that facilitates iterative, interactive, and/or exploratory data analysis coordinated with other computing devices can be employed to run the modules 218 for the DFS master 212 to apply search queries to the distributed data systems.

Accordingly, the worker nodes 214 can harmonize the partial search results of a distributed network of data storage systems, and provide those aggregated partial search results to the search service provider 216. In some embodiments, the search service provider 216 or DFS master 212 can further operate on the aggregated partial search results to obtain final results that are communicated to the search head 210, which can output the search results as reports or visualizations on a display device.

The DFS system 200 is scalable to accommodate any number of worker nodes 214.

As such, the DFS system can scale to accommodate any number of distributed data systems upon which a search query can be applied and the search results can be returned to the search head and presented in a concise or comprehensive way for an analyst to obtain insights into bid data that is greater in scope and provides deeper insights compared to existing systems.

4.2. DFS System Operations

Figure 19:
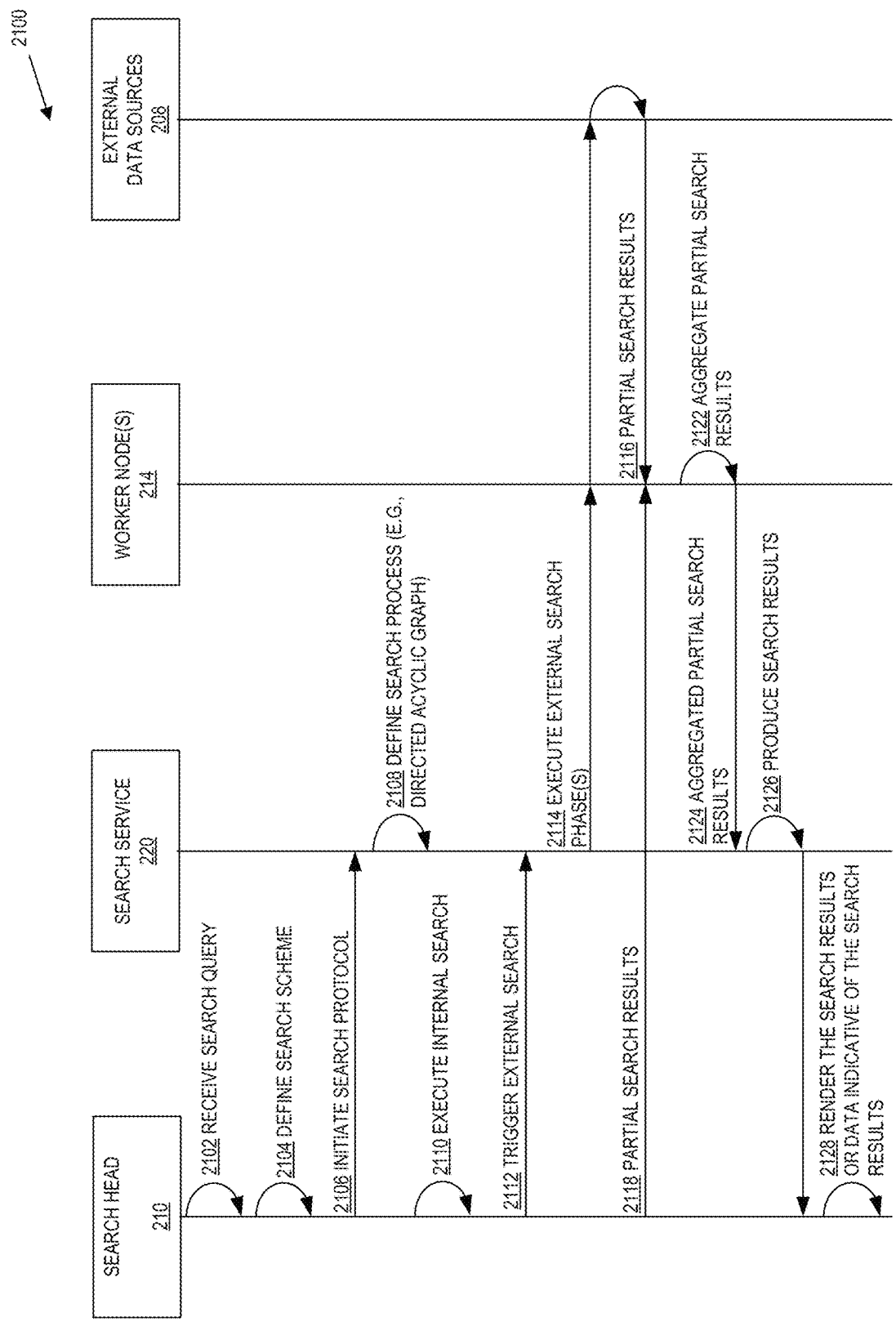
FIG. 19 is an operation flow diagram illustrating an example of an operation flow of a DFS system according to some embodiments of the present disclosure.

FIG. 19 is an operation flow diagram illustrating an example of an operation flow of the DFS system 200. The operation flow 2100 includes control flows and data flows of the data intake and query system 202, the DFS master 212 and/or the search service provider 216 (the DFS master 212 and search service provider 216 collectively the "search service 220"), one or more worker nodes 214, and/or one or more external data sources 209. A combination of the search service 220 and the worker nodes 214 collectively enable the data fabric services that can be implemented on the distributed data systems including, for example, the data intake and query system 202 and the external data sources 209.

In step 2102, the search head 210 of the data intake and query system 202 receives a search query. For example, an analyst may submit a search query to the search head 210 over a network from an application (e.g., web browser) running on a client device, through a network portal (e.g., website) administered by the data intake and query system 202. In another example, the search head 210 may receive the search query in accordance with a schedule of search queries. The search query can be expressed in a variety of languages such as a pipeline search language, a structured query language, etc.

In step 2104, the search head 210 processes the search query to determine whether the DFS system 200 is to handle the search query. In some embodiments, if the search query only requires searching the indexers 206, the search head 210 can conduct the search on the indexers 206 by using, for example, map-reduce techniques without invoking or engaging the DFS system. In some embodiments, however, the search head 210 can invoke or engage the DFS system to utilize the worker nodes 214 to search the indexers 206 alone, search the external data sources 209 alone, or search both and harmonize the partial search results of the indexers 206 alone, and return the search results to the search head 210 via the search service 220.

If, search head 210 determines that the DFS system 200 is to handle the search query, then the search head 210 can invoke and engage the DFS system 200. Accordingly, in some embodiments, the search head 210 can engage the search service 220 when a search query is to be applied to at least one external data system, such as a combination of the indexers 206 and at least one of the external data sources 209, or is otherwise to be handled by the DFS system 200. 210 The search head 210 can pass search query to the DFS master 212, which can create (e.g., spawn) a search service provider (e.g., search service provider 216) to conduct the search.

In some embodiments, the DFS system 200 can be launched by using a modular input, which refers to a platform add-on of the data intake and query system 202 that can be accessed in a variety of ways such as, for example, over the Internet on a network portal. For example, the search head 210 can use a modular input to launch the search service 220 and worker nodes 214 of the DFS system 200. In some embodiments, a modular input can be used to launch a monitor function used to monitor nodes of the DFS system. In the event that a launched service or node fails, the monitor allows the search head to detect the failed service or node, and re-launch the failed service or node or launch or reuse another launched service or node to provide the functions of the failed service or node. In some embodiments, the monitor function for monitoring nodes can be launched and controlled by the search service provider 216.

In step 2104, the search head 210 executes a search phase generation process to define a search scheme based on the scope of the search query. The search phase generation process involves an evaluation of the scope of the search query to define one or more phases to be executed by the data intake and query system 202 and/or the DFS system, to obtain search results that would satisfy the search query. The search phases, or layers, may include a combination of phases for initiating search operations, searching the indexers 206, searching the external data sources 209, and/or finalizing search results for return back to the search head 210.

In some embodiments, the combination of search phases can include phases for operating on the partial search results retrieved from the indexers 206 and/or the external data sources 209. For example, a search phase may require correlating or combining partial search results of the indexers 206 and/or the external data sources 209. In some embodiments, a combination of phases may be ordered as a sequence that requires an earlier phase to be completed before a subsequent phase can begin. However, the disclosure is not limited to any combination or order of search phases. Instead, a search scheme can include any number of search phases arranged in any order that could be different from another search scheme applied to the same or another arrangement or subset of data systems.

For example, a first search phase may be executed by the search head 210 to extract partial search results from the indexers 206. A second search phase may be executed by the worker nodes 214 to extract and collect partial search results from the external data sources 209. A third search phase may be executed by the indexers 206 and worker nodes 214 to export partial search results in parallel to the worker nodes 214 from the (peer) indexers 206. As such, the third phase involves collecting the partial search results from the indexers 206 by the worker nodes 214. A fourth search phase may be executed by the worker nodes 214 to aggregate (e.g., combine and/or operate on) the partial search results of the indexers 206 and/or the worker nodes 214. A sixth and seventh phase may involve transmitting the aggregate partial search results to the search service 220, and operating on the aggregate partial search results to produce final search results, respectively. The search results can then be transmitted to the search head 210. In some cases, an eighth search phase may involve further operating on the search results by the search head 210 to obtain final search results that can be, for example, rendered on a user interface of a display device.

In step 2106, the search head 210 initiates a communications search protocol that establishes a logical connection with the worker nodes 214 via the search service 220. Specifically, the search head 210 may communicate information to the search service 220 including a portion of the search scheme to be performed by the worker nodes 214. For example, a portion of the search scheme transmitted to the DFS master 212 may include search phase(s) to be performed by the DFS master 212 and the worker nodes 214. The information may also include specific control information enabling the worker nodes 214 to access the indexers 206 as well as the external data sources 209 subject to the search query.

In step 2108, the search service 220 can define an executable search process performed by the DFS system. For example, the DFS master 212 or the search service provider 216 can define a search process as a logical directed acyclic graph (DAG) based on the search phases included in the portion of the search scheme received from the search head 210.

The DAG includes a finite number of vertices and edges, with each edge directed from one vertex to another, such that there is no way to start at any vertex and follow a consistently-directed sequence of edges that eventually loops back to the same vertex. Here, the DAG can be a directed graph that defines a topological ordering of the search phases performed by the DFS system. As such, a sequence of the vertices represents a sequence of search phases such that every edge is directed from earlier to later in the sequence of search phases. For example, the DAG may be defined based on a search string for each phase or metadata associated with a search string. The metadata may be indicative of an ordering of the search phases such as, for example, whether results of any search string depend on results of another search string such that the later search string must follow the former search string sequentially in the DAG.

In step 2110, the search head 210 starts executing local search phases that operate on the indexers 206 if the search query requires doing so. If the scope of the search query requires searching at least one external data system, then, in step 2112, the search head 210 sends information to the DFS master 212 triggering execution of the executable search process defined in step 2108.

In step 2114, the search service 220 starts executing the search phases that cause the worker nodes 214 to extract partial search results from the external data stores 209 and collect the extracted partial search results at the worker nodes 214, respectively. For example, the search service 220 can start executing the search phases of the DAG that cause the worker nodes 214 to search the external data sources 209. Then, in step 2116, the worker nodes 214 collect the partial search results extracted from the external data sources 209.

The search phases executed by the DFS system can also cause the worker nodes 214 to communicate with the indexers 206. For example, in step 2118, the search head 210 can commence a search phase that triggers a remote pipeline executed on the indexers 206 to export their partial search results to the worker nodes 214. As such, the worker nodes 214 can collect the partial search results of the indexers 206. However, if the search query does not require searching the indexers 206, then the search head 210 may bypass triggering the pipeline of partial search results from the indexers 206.

In step 2122, the worker nodes 214 can aggregate the partial search results and send them to the search service 220. For example, the search service provider 216 can begin collecting the aggregated search results from the worker nodes 214. The aggregation of the partial search results may include combining the partial search results of indexers 206, the external data stores 209, or both. In some embodiments, the aggregated partial search results can be time-ordered or unordered depending on the requirements of the type of search query.

In some embodiments, aggregation of the partial search results may involve performing one or more operations on a combination of partial search results. For example, the worker nodes 214 may operate on a combination of partial search results with an operator to output a value derived from the combination of partial search results. This transformation may be required by the search query. For example, the search query may be an average or count of data events that include specific keywords. In another example, the transformation may involve determining a correlation among data from different data sources that have a common keyword. As such, transforming the search results may involve creating new data derived from the partial search results obtained from the indexers 206 and/or external data systems 209.

In step 2124, a data pipeline is formed to the search head 210 through the search service 220 once the worker nodes 214 have received the partial search results from the indexers 206 and the external data stores 209, and aggregated the partial search results (e.g., and transformed the partial search results).

In step 2126, the aggregate search received by the search service 220 may optionally be operated on to produce final search results. For example, the aggregate search results may include different statistical values of partial search results collected from different worker nodes 214. The search service 220 may operate on those statistical values to produce search results that reflect statistical values of the statistical values obtained from the all the worker nodes 214.

As such, the produced search results can be transferred in a big data pipeline to the search head 210. The big data pipeline is essentially a pipeline of the data intake and query system 202 extended into the big data ecosystem. Hence, the search results are transmitting to the search head 210 where the search query was received by a user. Lastly, in step 2128, the search head 210 can render the search results or data indicative of the search results on a display device. For example, the search head 210 can make the search results available for visualizing on a user interface rendered via a computer portal.

It will be understood that fewer or more steps can be included in the operation flow 2100. Further, some operations can be performed by different components of the system. In some embodiments, for example, some of the tasks described as being performed by the search head 210 can be performed by the search service 220, such as the search service provider 216. As a non-limiting example, step 2104 can be omitted and steps 2110, 2112, and 2118 can be performed by the search service provider 216. For example, upon receiving the search query at step 2102, the search head 210 can determine that the DFS system 200 will handle the query. Accordingly, at 2106, the search head can communicate the search query to the search service 220 to initiate the search. In turn, the search service provider 216 can define the search scheme 2104 and search process 2108. As part of defining the search scheme and process 2108, the search service provider 216 can determine whether any indexers 206 or external data sources 209 will be accessed. Once the scheme and process are defined, the search service provider 216 can trigger a search of the indexers (2110) and an external search of the external data sources (2112). The partial search results from both can be communicated to the worker nodes 214 for processing (2116, 2118), which can aggregate them together (2122). The results can then be provided to the search service 220 (2124), further processed (2126), and then communicated to the search head 210 for rendering for the client device (2128). In some cases, the further processing 2126 performed by the search service 220 can include additional transforms on the results received from the worker nodes 214 based on the query. Accordingly, in such an embodiment, the system can delegate some of the search head 210 processing to the search service 220, thereby freeing up the search head 210 to handle additional queries.

5.0. Parallel Export Techniques

The disclosed embodiments include techniques for exporting partial search results in parallel from peer indexers of a data intake and query system to the worker nodes. In particular, partial search results (e.g., time-indexed events) obtained from peer indexers can be exported in parallel from the peer indexers to worker nodes. Exporting the partial search results from the peer indexers in parallel can improve the rate at which the partial search results are transferred to the worker nodes for subsequent combination with partial search results of the external data systems. As such, the rate at which the search results of a search query can be obtained from the distributed data system can be improved by implementing parallel export techniques.

Figure 20:
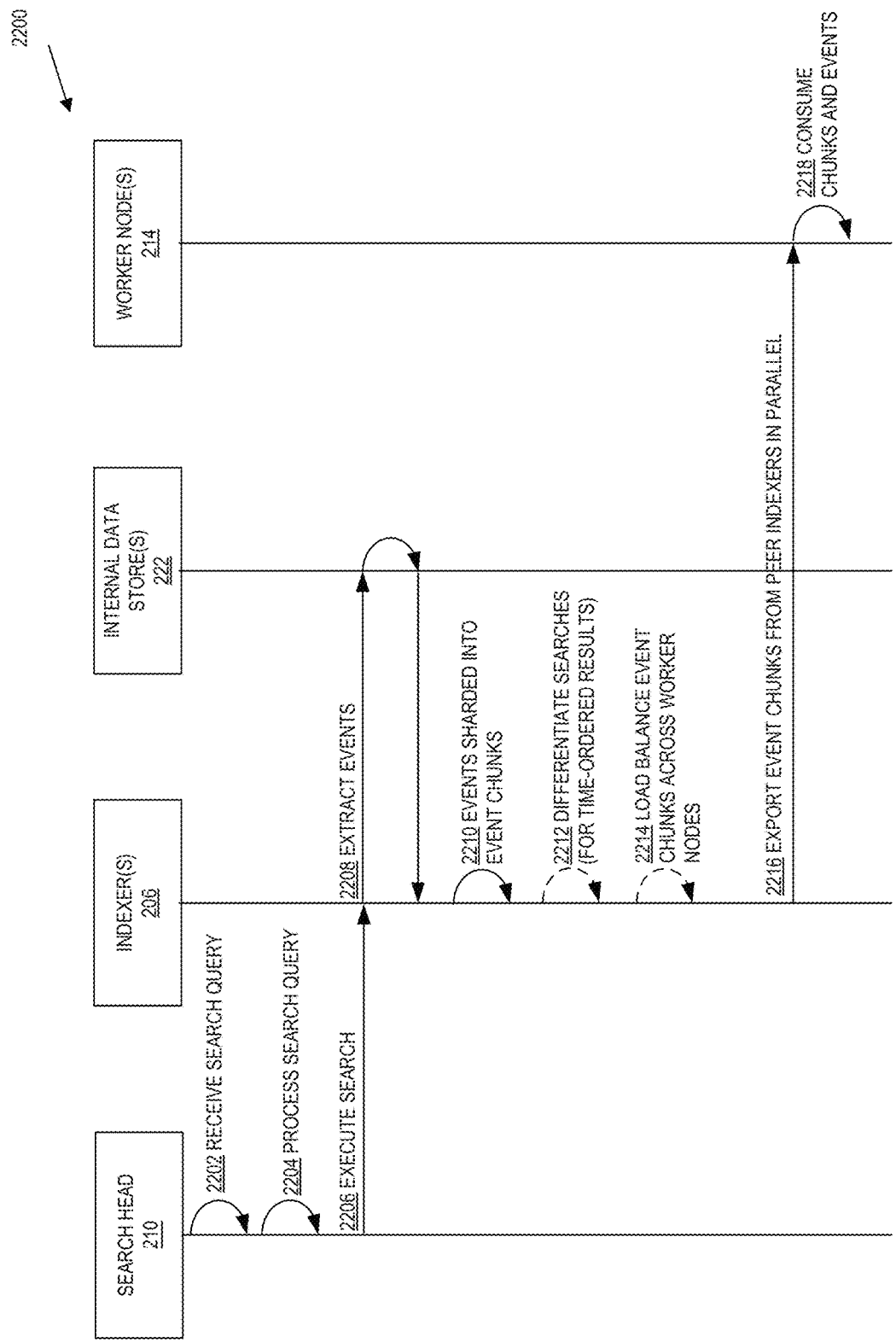
FIG. 20 is an operation flow diagram illustrating an example of a parallel export operation performed in a DFS system according to some embodiments of the present disclosure.

FIG. 20 is an operation flow diagram illustrating an example of a parallel export operation performed in a DFS system according to some embodiments of the present disclosure. The operation 2200 for parallel exporting of partial search results from peer indexers 206 begins by processing a search query that requires transferring of partial search results from the peer indexers 206 to the worker nodes 214.

In step 2202, the search head 210 receives a search query as, for example, input by a user of a client device. In step 2210, the search head 210 processes the search query to determine whether internal data stores 222 of peer indexers 206 must be searched for partial search results. If so, in step 2206, the search head 210 executes a process to search the peer indexers 206 and retrieve the partial search results. In step 2209, each peer indexer 206 can return its partial search results retrieved from respective internal data stores 222.

In step 2210, the partial search results (e.g., time-indexed events) obtained by the peer indexers 206 can be sharded into chunks of events ("event chunks"). Sharding involves partitioning large data sets into smaller, faster, more easily managed parts called data shards. The sharded partitions can be determined from policies, which can be based on hash values by default. Accordingly, the retrieved events can be grouped into chunks (i.e., micro-batches) based on a value associated with a search query and/or the corresponding retrieved events. For example, the retrieved events can be sharded in chunks based on the field names passed as part of a search query process of the data intake and query system. The event chunks can then be exported from the peer indexers 206 in parallel over the network to the worker nodes 214.

If time-ordering is required, the parallel exporting technique can include a mechanism to reconstruct the ordering of event chunks at the worker nodes 214. In particular, the order from which the event chunks flowed from peer indexers 206 can be tracked to enable collating the chunks in time order at the worker nodes 214. For example, metadata of event chunks can be preserved when parallel exporting such that the chunks can be collated by the worker nodes 214 that receive the event chunks. Examples of the metadata include SearchResultsInfo (SRI) (a data structure of SPLUNK®) which carries control and meta information for the search operations) or timestamps indicative of, for example, the times when respective events or event chunks started flowing out from the peer indexers 206. If time ordering is not required, preserving the time ordering of chunks by using timestamps may be unnecessary.

The parallel exporting technique can be modified in a variety of ways to improve performance of the DFS system. For example, in step 2214, the event chunks can be load balanced across the peer indexers 206 and/or receiving worker nodes 214 to improve network efficiency and utilization of network resources. In particular, a dynamic list of receivers (e.g., worker nodes 214) can be maintained by software running on hardware implementing the DFS system. The list may indicate a current availability of worker nodes to receive chunks from export processors of the peer indexers 206. The list can be updated dynamically to reflect the availability of the worker nodes 214. Further, parameters on the list indicative of the availability of the worker nodes 214 can be passed to the export processors periodically or upon the occurrence of an event (e.g., a worker node 214 becomes available). The export processors can then perform a load balancing operation on the event chunks over the receiving worker nodes 214.

The worker nodes 214 may include driver programs that consume the events and event chunks. In some embodiments, the worker nodes 214 can include a software development kit (SDK) that allows third party developers to control the consumption of events from the peer indexers 206 by the worker nodes 214. As such, third party developers can control the drivers causing the consumption of events and event chunks from the peer indexers 206 by the worker nodes 214. Lastly, in step 2216, the event chunks are exported from the peer indexers 206 in parallel to the worker nodes 214.

In some embodiments, the rate of exporting events or event chunks in parallel by the peer indexers 206 can be based on an amount of shared memory available to the worker nodes 214. Accordingly, techniques can be employed to reduce the amount of memory required to store transferred events. For example, when the worker nodes 214 are not local (e.g., remote from the peer indexers 206), compressed payloads of the event chunks can be transferred to improve performance.

Thus, the disclosed DFS system can provide a big data pipeline and native processor as a mechanism to execute infrastructure, analytics, and domain-based processors based on data from one or more external data sources over different compute engines. In addition, the mechanism can execute parallelized queries to extract results from external systems.

It will be understood that fewer or more steps can be included in the operation flow 2100. Further, some operations can be performed by different components of the system. In some embodiments, for example, some of the tasks described as being performed by the search head 210 can be performed by the search service 220, such as the search service provider 216.

As a non-limiting example, the search head 210 can process the search query to determine whether the search query is to be handled by the DFS system 202. For example, in some embodiments, the search head 210 can handle queries for the indexers 206 and in other embodiments, the search process 220 can handle queries for the indexers 206. Based on a determination that the search process is to handle the search query, the search head 210 can forward the query to the search process 220. The search service provider 216 can further process the query (2210) and determine that the search includes searching the indexer 206. As such, the search service provider can execute a process to search the peer indexers 206 and provide the partial search results to the worker nodes 214, or instruct the worker nodes 214 to instruct the indexers 206 to execute the search. Steps 2210, 2212, 2214, 2216, and 2218 can then perform as illustrated such that the partial search results are exported to the worker nodes 214 for further processing.

6.0. DFS Query Processing

The disclosed embodiments include techniques to process search queries in different ways by the DFS system depending on the type of search results sought in response to a search query. In other words, a data intake and query system can receive search queries that cause the DFS system to process the search queries differently based on the search results sought in accordance with the search queries. For example, some search queries may require ordered search results, and an order of the search results may be unimportant for other search queries.

To obtain ordered search results, a search query executed on internal data sources (e.g., indexers) and/or external data sources may require sorting and organizing timestamped partial search results across the multiple diverse data sources. However, the multiple internal or external data sources may not store timestamped data. That is, some data sources may store time-ordered data while other data sources may not store time-ordered data, which prevents returning time-ordered search results for a search query. The disclosed embodiments provide techniques for harmonizing time-ordered and unordered data from across multiple internal or external data sources to provide time-ordered search results.

In other instances, a search query may require search results that involve performing a transformation of data collected from multiple internal and/or external data sources. The transformed data can be provided as the search results in response to the search query. In some cases, the search query may be agnostic to the ordering of the search results. For example, the search results of a search query may require counts of different types of events generated over the same period of time. Hence, search results that satisfy the search query could be ordered or unordered counts. As such, there is no requirement to maintain the time order of the partial search results obtained from data systems subject to the count search query. Thus, the techniques described below provide mechanisms to obtain search result from the bid data ecosystem that are transformed, time-ordered, unordered, or any combinations of these types of search results.

6.1. Ordered Search Results

The disclosed embodiments include techniques to obtain ordered search results based on partial search results from across multiple diverse internal and/or external data sources. The ordering of the search results may be with respect to a parameter associated with the partial search results. An example of a parameter includes time. As such, the disclosed technique can provide a time-ordered search result based on partial search results obtained from across multiple internal and/or external data sources. Moreover, the disclosed technique can provide time-ordered search results regardless of whether the partial search results obtained from the diverse data sources are timestamped.

An ordered search (i.e., ordered data execution) can be referred to as "cursored" mode of data access. According to this mode of data access, the DFS system can execute time-ordered searches or retrieve events from multiple data sources and presents the events in a time ordered manner. For searches involving only local data sources, the DFS system can implement a micro-batching mechanism based on the event time across worker nodes. The DFS system can ensure that per peer ordering is enforced across the worker nodes and final collation is performed at a local search head or search service provider. In case of event retrieval from multiple data sources, the DFS system can maintain per source ordering prior to ordered collation in the local search head or search service provider.

Figure 21:
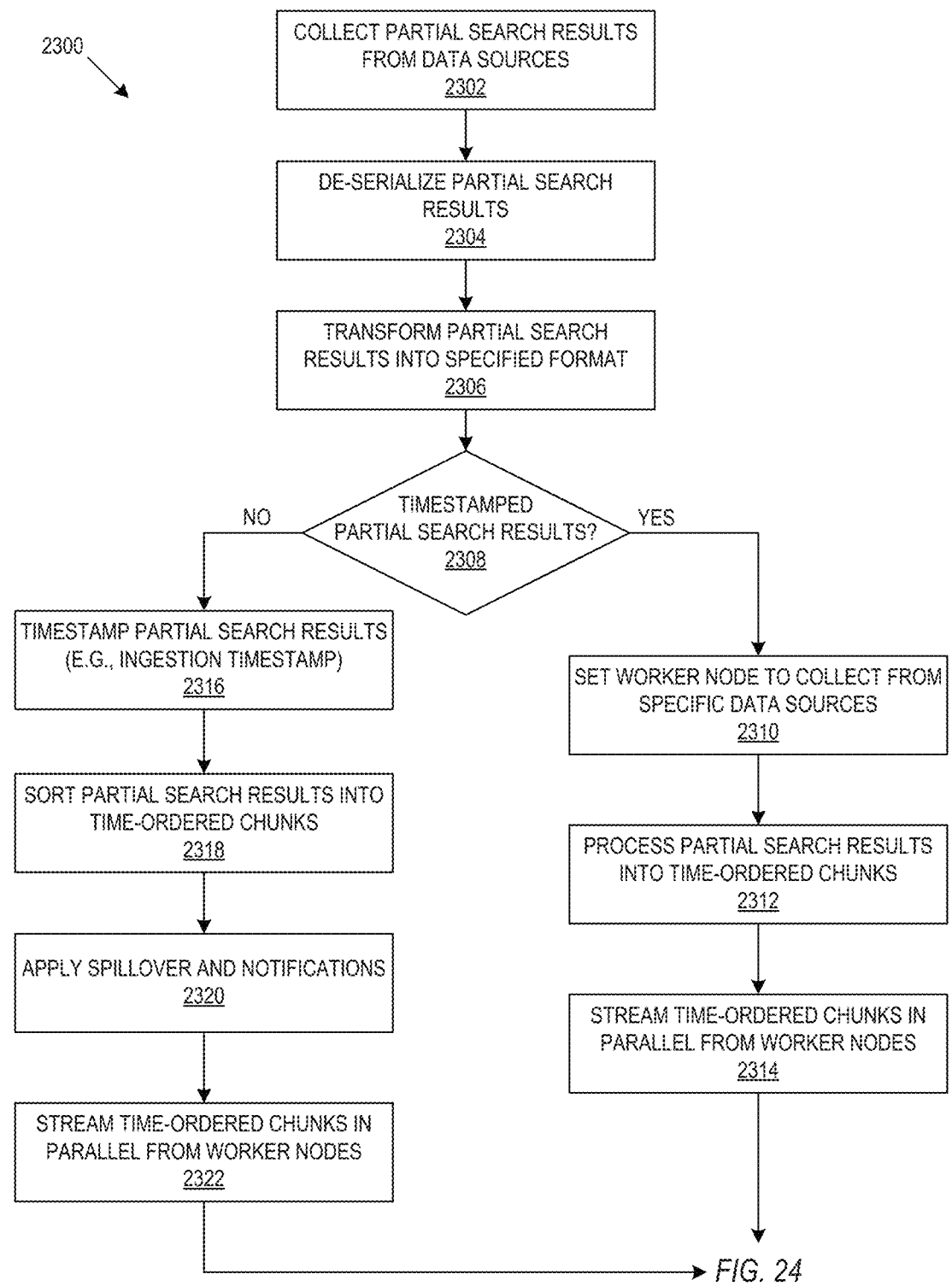
FIG. 21 is a flow diagram illustrating a method performed by the DFS system to obtain time-ordered search results according to some embodiments of the present disclosure.

FIG. 21 is a flowchart illustrating a method performed the DFS system to obtain time-ordered search results in response to a cursored search query according to some embodiments of the present disclosure. As described below, the method 2300 for processing cursored search queries can involve a micro-batching process executed by worker nodes to ensure time orderliness of partial search results obtained from data sources.

In step 2302, one or more worker nodes collect partial search results from the internal and/or external data sources. For example, the worker node may collect partial search results corresponding to data having a data structure as specified by the search query. In another example, the worker nodes may query an external data source for partial search results based on specific keywords specified by a cursored search query, and collect the partial search results. The worker nodes may also collect partial search results from indexers, which were returned in response to application of the search query by the search head (or search service provider) to the indexers. In some embodiments, the partial search results may be communicated from each data source to the worker node in chunks (i.e., micro-batches).

In step 2304, the worker nodes perform deserialization of the partial search results obtained from the data sources. Specifically, partial search results transmitted by the data sources could been serialized such that data objects were converted into a stream of bytes in order to transmit the object, or store the object in memory. The serialization process allows for saving the state of an object in order to reconstruct it at the worker node by using reverse process of deserialization.

In step 2306, the worker nodes receive the partial search results collected from the data sources and transform them into a specified format. As such, partial search results in diverse formats can be transformed into a common specified format. The specified format may be specified to facilitate processing by the worker nodes. Hence, diverse data types obtained from diverse data sources can be transformed into a common format to facilitate subsequent aggregation across all the partial search results obtained in response to the search query. As a result, the partial search results obtained by the worker nodes can be transformed into, for example, data events having structures that are compatible to the data intake and query system.

In step 2308, the worker nodes may determine whether the partial search results are associated with respective time values. For example, the worker nodes may determine that events or event chunks from an internal data source are timestamped as shown in FIG. 2, but events or event chunks from an external data source may not be timestamped. The timestamped events may also be marked with an "Origin-Type" (e.g., mysql-origin, cloud-aws-s), "SourceType" (e.g., cvs, json, sql), and "Host < >" (e.g., IP address where the event originated), or other data useful for ordering the partial search. If all the partial search results from across the diverse data systems are adequately marked, then harmonizing the partial search results may not require different types of processing. However, typically at least some partial search results from across the diverse distributed data systems are not adequately marked to facilitate harmonization.

Accordingly, the worker nodes can implement bifurcate processing of the partial search results depending on whether or not the partial search results are adequately marked. Specifically, the partial search results that are timestamped can be processed one way, and the partial search results that are not timestamped can be processed a different way. The worker nodes can execute the different types of processing interchangeably, or execute one type of processing after the other type of processing has completed.

In step 2310, for time-ordered partial search results, respective worker nodes can be assigned (e.g., fixed) to receive time-ordered partial search results (e.g., events or event chunks) from respective data sources in an effort to maintain the time orderliness of the data. Assigning a worker node to obtain time-ordered partial search results of the same data source avoids the need for additional processing among multiple nodes otherwise required if they each received different time-ordered chunks from the same data source. In other words, setting a worker node to collect all the time-ordered partial search results from its source avoids the added need to distribute the time-ordered partial search results between worker nodes to reconstruct the overall time orderliness of the partial search results.

For example, a worker node can respond to timestamped partial search results it receives by setting itself (or another worker node) to receive all of the partial search results from the source of the time-stamped partial search results. For example, the worker node can be set by broadcasting the assignment to other worker nodes, which collectively maintain a list of assigned worker nodes and data sources. In some embodiments, a worker node that receives time-stamped partial search results can communicate an indication about the timestamped partial search results to the DFS master or search service provider. Then the DFS master or search service provider can set a specific set of worker nodes to receive all the timestamped data from the specific source.

In step 2312, the worker nodes read the collected partial search results (e.g., events or event chunks) and arrange the partial search results in time order. For example, each collected event or event chunk may be associated with any combination of a start time, an end time, a creation time, or some other time value. The worker node can use the time values (e.g., timestamps) associated with the events or event chunks to arrange the events and/or the event chunks in a time-order. Lastly, in step 2314, the worker nodes may stream the time-ordered partial search results in parallel as time-ordered chunks via the search service (e.g., to the DFS master or search service provider of the DFS system).

Referring back to step 2308, the worker nodes can respond differently to partials search results that are not associated with timestamps (e.g., lack an associated time value that facilitates time ordering). In step 2316, the worker nodes can associate events or chunks with a time value indicative of the time of ingestion of the events or event chunks by the respective worker nodes (e.g., an ingestion timestamp). The worker nodes can associate the partial search results with any time value that can be measured relative to a reference time value (i.e., not limited to an ingestion timestamp). In some embodiments, the partial search results timestamped by the worker nodes can also be marked with a flag to distinguish those partial search results from the partial search results that were timestamped before being collected by the worker nodes.

In step 2318, the worker nodes sort the newly time-stamped partial search results and create chunks (e.g., micro-batches) upon completion of collecting all of the partial search results from the data sources. In some embodiments, the chunks may be created to contain a default minimum or maximum number of partial search results (i.e., a default chunk size). As such, the worker nodes can create time-ordered partial search results obtained from data sources that did not provide time-ordered partial search results.

In step 2320, the worker nodes can apply spillover techniques to disk as needed. In some embodiments, the worker nodes can provide an extensive HB/status update mechanism to notify the DFS master of its current blocked state. In some embodiments, the worker nodes can ensure a keep-alive to override timeout and provide notifications. Lastly, in step 2322, the worker nodes may stream the time-ordered partial search results in parallel as time-ordered chunks via the search service (e.g., to the DFS master or search service provider of the DFS system).

Accordingly, time-ordered partial search results can be created from a combination of time-ordered and non-time-ordered partial search collected from diverse data sources. The time-ordered partial search results can be streamed in parallel from multiple worker nodes to the service provider, which can stream each search stream to the search head of the data intake and query system. As such, time-ordered search results can be produced from diverse data types of diverse data systems when the scope of a search query requires doing so.

Figure 22:
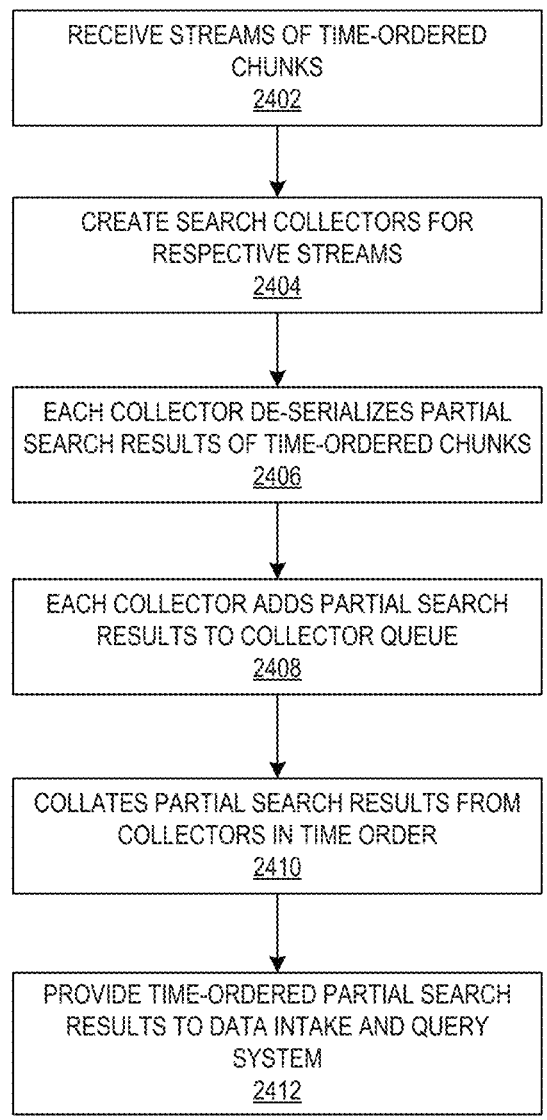
FIG. 22 is a flow diagram illustrating a method performed by a data intake and query system of a DFS system to obtain time-ordered search results according to some embodiments of the present disclosure.

FIG. 22 is a flowchart illustrating a method performed by a data intake and query system of a DFS system in response to a cursored search query according to some embodiments of the present disclosure. Specifically, the method 2400 can be performed by the data intake and query system to collate the time-ordered partial search results obtained by querying internal and/or external data sources.

In step 2402, the search head, search service provider, or one or more worker nodes receive one or more streams of time-ordered partial search results (e.g., event chunks) from a data source. In step 2404, the search head or search service provider creates multiple search collectors to collect the time ordered event chunks.

For example, the search head or search service provider can add a class of collectors to collate search results from the worker nodes. In some embodiments, the search head or search service provider can create multiple collectors; such as a collector for each indexer, as well as a single collector for each external data source or other data source. In some embodiments, the search head or search service provider may create a collector for each stream, which could include time-ordered chunks from a single worker node or a single data source. Hence, each collector receives time-ordered chunks.

In step 2406, the collectors perform a deserialization process on the received chunks and their contents, which had been serialized for transmission from the search service. In step 2408, each collector adds the de-serialized partial search or their chunks to a collector queue. The search head or search service provider may include any number of collector queues. For example, the search head or search service provider may include a collector queue for each collector or for each data source that provided partial search results.

In step 2410, the search head, search service provider, or designated worker node(s) can collate the time-ordered partial search results obtained from the data sources as time-ordered search results of the presented search query. For example, the search head, search service provider, or designated worker node(s) may apply a collation operation based on the time-order of events contained in the chunks from the queues of different collectors to provide time-ordered search results.

Lastly, in step 2412, the time-ordered search results could be provided to an analyst on a variety of mediums and in a variety of formats. For example, the time-ordered search results may be rendered as a timeline visualization on a user interface on a display device. In some embodiments, the raw search results (e.g., entire raw events) are provided for the timeline visualization.

The visualization can allow the analyst to investigate the search results. In another example, the time-ordered results may be provided to an analyst automatically on printed reports, or transmitted in a message sent over a network to a device to alert the analyst of a condition based on the search results.

Figure 23:
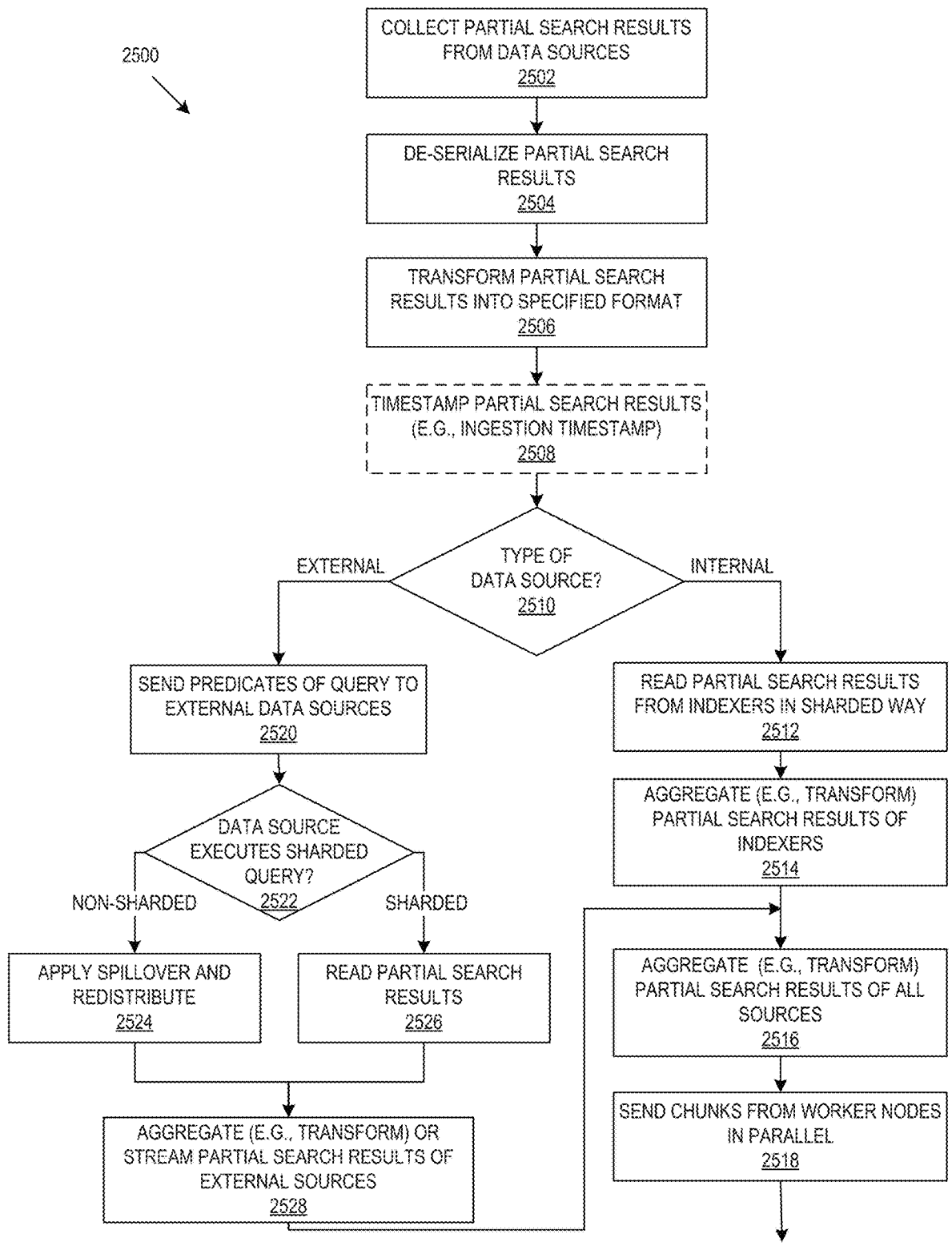
FIG. 23 is a flow diagram illustrating a method performed by nodes of a DFS system to obtain batch or reporting search results according to some embodiments of the present disclosure.
Figure 24:
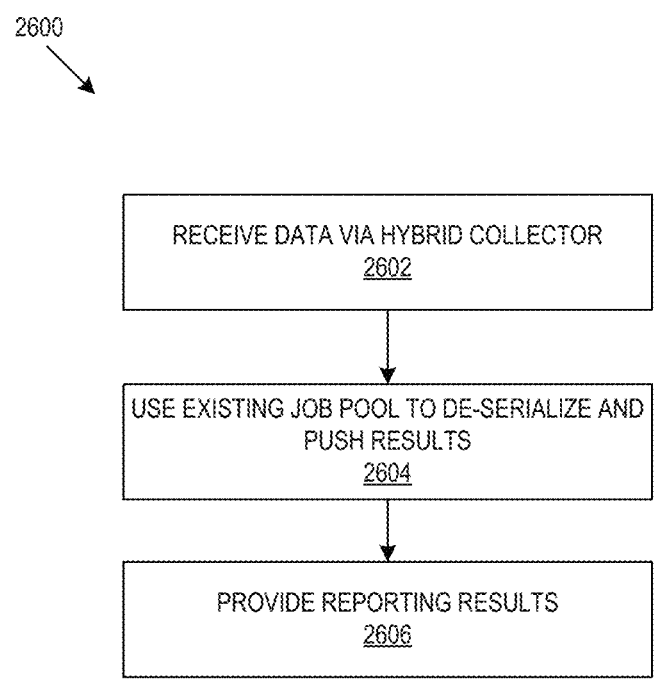
FIG. 24 is a flow diagram illustrating a method performed by a data intake and query system of a DFS system in response to a reporting search query according to some embodiments of the present disclosure.

Although the methods illustrated in FIGS. 23 and 24 include a combination of steps to obtain time-ordered search results from across diverse data sources that may or may not provide timestamped data, the disclosed embodiments are not so limited. Instead, any portion of the combination of steps illustrated in FIGS. 23 and 24 could be performed depending on the scope of the search query. For example, only a subset of steps may be performed when the search results for a search query are obtained exclusively from a single external data source that stores timestamped data.

6.2. Transformed Search Results

The disclosed embodiments include a technique to obtain search results from the application of transformation operations on partial search results obtained from across internal and/or external data sources. Examples of transformation operations include arithmetic operations such as an average, mean, count, or the like. Examples of reporting transformations include join operations, statistics, sort, top head. Hence, the search results of a search query can be derived from partial search results rather than include the actual partial search results. In this case, the ordering of the search results may be nonessential. An example of a search query that requires a transformation operation is a "batch" or "reporting" search query. The related disclosed techniques involve obtaining data stored in the bid data ecosystem, and returning that data or data derived from that data.

According to a reporting or batch mode of data access, the DFS system executes blocking transforming searches, for example, to join across one or multiple available data sources. Since ordering is not needed, the DFS system can implement sharding of the data from the various data sources and execute aggregation (e.g., reduction of map-reduction) in parallel. The DFS architecture can also execute multiple DFS operations in parallel to receive sharded data from the different sources.

FIG. 23 is a flowchart illustrating a method performed by nodes of a DFS system to obtain search results in response to a batch or reporting search query according to some embodiments of the present disclosure. The method 2500 for processing batch or reporting search queries can involve steps performed by the DFS master, the service provider, and/or worker nodes to transform partial search results into search results into batch or reporting search results. The disclosed techniques also support both streaming and non-streaming for multiple data sources.

The transformation operations generally occur at the worker nodes. For example, an operation may include a statistical count of events having a particular IP address. The DFS can shard the data in certain partitions, and then each worker node can apply the transformation to that particular partition. In case it is the last reporting/transforming processor, then the transformed results are collated at the search service provider, and then transmitted to the search head. However, if there is a reporting search beyond the statistical count, then another reshuffle of the partial search results can be executed among the worker nodes to put the different partitions on the same worker node, and then transforms can be applied. If this is the last reporting search, then results are sent back to the service provide node and then to the search head. This process continues as dictated by the DAG generated from the phase desired by the search head.

In step 2502, the worker nodes collect partial search results from the internal and/or external data sources. For example, a worker node may collect partial search results including data having data structures specified by the search query. In another example, the worker node may query an external data source for partial search results based on specific keywords included in a reporting search query, and collect the partial search results. The worker node may also collect partial search results from indexers, which were returned in response to application of the reporting search query by the search head (or search service provider or nodes) to the indexers. The partial search results may be communicated from each data source to the worker nodes individually or in chunks (i.e., micro-batches). The worker nodes thus ingest partial search results obtained from the data sources in response to a search query.

In step 2504, the worker nodes can perform deserialization of the partial search results obtained from the data sources. Specifically, the partial search results transmitted by the data sources can be serialized by converting objects into a stream of bytes, which allows for saving the state of an object for subsequent recreation of the object at the worker nodes by using the reverse process of deserialization.

In step 2506, the worker nodes transform the de-serialized partial search results into a specified format. As such, partial search results collected in diverse formats can be transformed into a common specified format. The specified format may be specified to facilitate processing by a worker node. As such, diverse data types obtained from diverse data sources can be transformed into a common format to facilitate subsequent aggregation across all the partial search results obtained in response to the search query. As a result, the partial search results obtained by worker nodes can be transformed into, for example, data events having structures that are compatible to the data intake and query system.

Unlike cursored search queries, the time-order of partial search results is not necessarily considered when processing reporting queries. However, in step 2508, if a data source returns partial search results that are not associated with time values (e.g., no timestamp), the worker nodes can associate events or event chunks with a time value indicative of the time of ingestion of the events or chunks by the worker nodes (e.g., ingestion timestamp). In some embodiments, the worker nodes can associate the partial search results with any time value that can be measured relative to a reference time value. Associating time values with partial search results may facilitate tracking partial search results when processing reporting searches, or may be necessary when performing reporting searches that require time-ordered results (e.g., a hybrid of cursored and reporting searches).

In step 2510, the worker nodes determine whether the ingested partial search results were obtained by an internal data source or an external data source to bifurcate processing respectively. In other words, the worker nodes process the ingested partial search results differently depending on whether they were obtained from an internal data source (e.g., indexers) or an external data source, if needed. That is, this can be the case only when reporting searches are run in the indexers; however, if all the processors in the indexers are streaming, then no processing unique to the indexer data is needed. However, data from external data sources can be sanitized in terms of coding, timestamped, and throttles based on the timestamp.

In step 2512, for internal data sources, the worker nodes read the partial search results obtained from indexers of a data intake and query system in a sharded way. In particular, the worker nodes may use a list identifying indexers from which to pull the sharded partial search results. As discussed above, sharding involves partitioning datasets into smaller, faster, and more manageable parts called data shards. The sharded partitions can be determined from policies, which can be based on hash values by default. In the context of map-reduce techniques, the map step can be determined by the sharding and a predicate passed, which maps records matching the predicate to whatever is needed as the search result. The reduce step involves the aggregation of the shards. The results of a query are those items for which the predicate returns true.

In step 2514, the partial search results of the indexers are aggregated (e.g., combined and/or transformed) by the worker nodes. In particular, the partial search results can be in a pre-streaming format (semi-reduced), and need to be aggregated (e.g., reduced or combined) prior to aggregation with partial search results of external data sources. In step 2516, the aggregated partial search results of the indexers are aggregated (e.g., combined and/or transformed) with the partial search results obtained from external data sources. Lastly, in step 2518, the aggregated partial search results of internal and external data stores can be transmitted from the worker nodes in parallel to the search service (e.g., to the DFS master or search service provider of the DFS system).

In step 2520, for external data sources, the worker nodes push predicates for the reporting search query to the external data sources. A predicate is a function that takes an argument, and returns a Boolean value indicating of true or false. The predicate can be passed as a query expression including candidate items, which can be evaluated to return a true or false value for each candidate item.

In step 2522, the network nodes can determine whether the external data sources may or may not be able to execute a sharded query. In step 2526, for an external data source that can execute a sharded query, the worker node reads the results in different shards. In some embodiments, the DFS master randomly chooses which worker nodes will execute the shards. In step 2524, for an external data sources that cannot execute a sharded query, a worker node has the ability to spillover to disk, and redistribute to other worker nodes.

In step 2528, the worker nodes can apply an aggregation (e.g., (e.g., combine and/or transform) or stream processing to have the partial search results ready for further processing against results from partial search results from the internal sources. Thus, referring back to step 2516, the worker nodes aggregate the partial search results from all data sources in response in response to the search query. For example, the worker nodes can apply a process similar to a reduction step of a map-reduce operation across all the partial search results obtained from diverse data sources. Then, in step 2518, the aggregate partial search results can be transmitted from the worker nodes in parallel to the search service provider 216. In particular, the search service provider, can collect all the finalized searches results from the worker nodes, and return the results to the search head.

FIG. 24 is a flowchart illustrating a method performed by a data intake and query system of a DFS system in response to a batch or reporting search query according to some embodiments of the present disclosure. In particular, the method 2600 is performed by the data intake and query system to provide the batch or reporting search results obtained by querying internal and/or external data sources.

In step 2602, a search head, search service provider, or designated worker node(s) of receives the aggregate partial search results via a hybrid collector. The number and function of the hybrid collectors is defined depending on the type of search executed. For example, for the transforming search, the search head or search service provider can create only one collector to receive the final results from the worker nodes and after serialization directly pushes into the search result queue. In step 2604, the search head or search service provider uses an existing job pool to de-serialize search results, and can push the search results out. In such an operation, collation is not needed.

Lastly, in step 2606, the transformed search results could be provided to an analyst on a variety of mediums and in a variety of formats. For example, the time-ordered search results may be rendered as a timeline visualization on a user interface on a display device. The visualization can allow the analyst to investigate the search results. In another example, the time-ordered results may be provided to an analyst automatically on printed reports, or transmitted in a message sent over a network to a device to alert the analyst of a condition based on the search results.

Although the methods illustrated in FIGS. 23 through 26 include a combination of steps to obtain time ordered, unordered, or transformed search results from across multiple data sources that may or may not store timestamped data, the disclosed embodiments are not so limited. Instead, a portion of a combination of steps illustrated in any of these figures could be performed depending on the scope of the search query. For example, only a subset of steps may be performed when the partial search results for a search query is obtained exclusively from an external data source.

7.0. Co-Located Deployment Architecture

Figure 25:
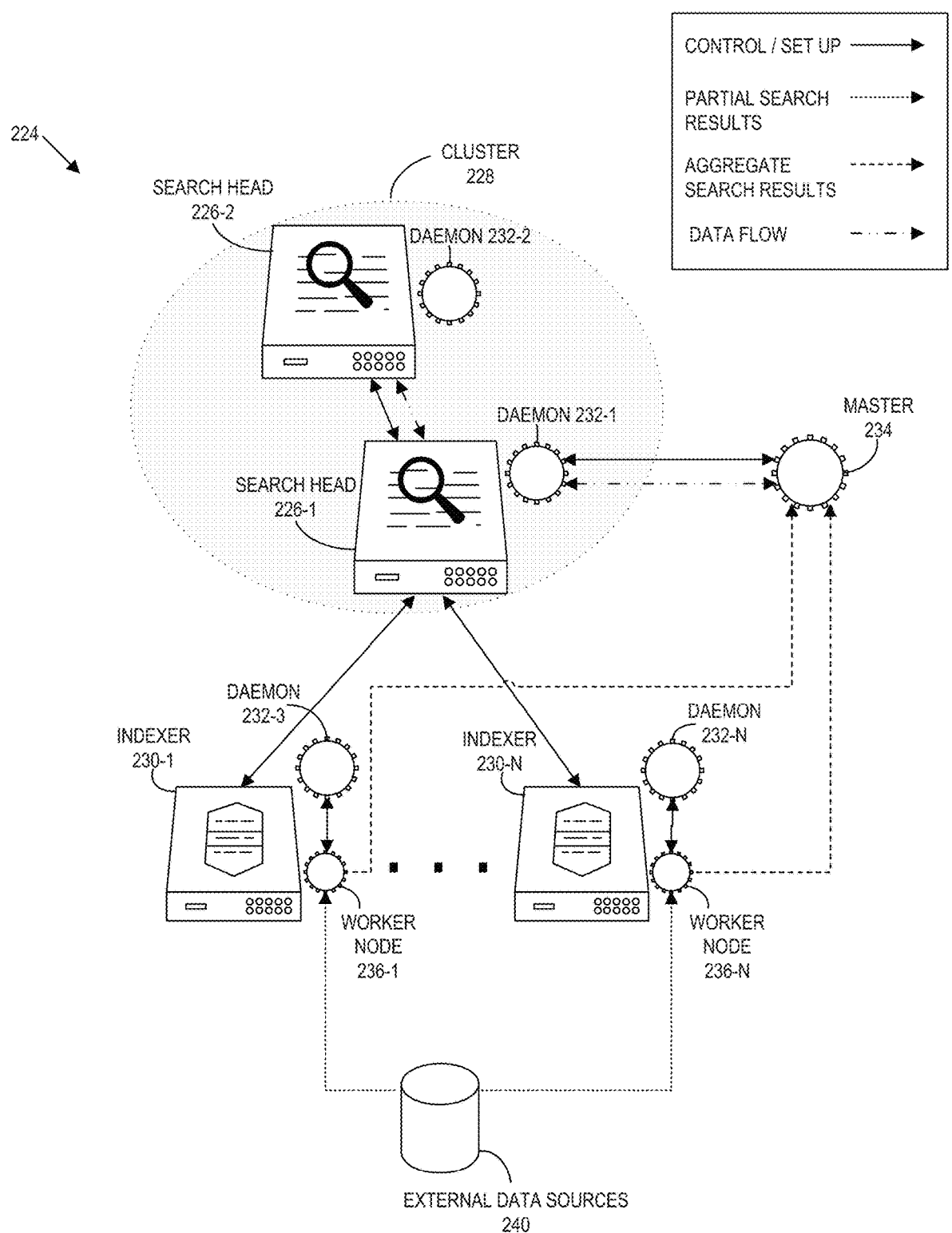
FIG. 25 is a system diagram illustrating a co-located deployment of a DFS system in which an embodiment may be implemented.

The capabilities of a data intake and query system can be improved by implementing the DFS system described above in a co-located deployment with the data intake and query system. For example, FIG. 25 is a system diagram illustrating a co-located deployment of a DFS system with the data intake and query system in which an embodiment may be implemented.

In the illustrated embodiment, the system 224 shows only some components of a data intake and query system but can include other components (e.g., forwarders, internal data stores) that have been omitted for brevity. In particular, the system 224 includes search heads 226-1 and 226-2 (referred to collectively as search heads 226). The search heads 226 collectively form a search head cluster 228. Although shown with only two search heads, the cluster 228 can include any number of search heads. Alternatively, an embodiment of the co-located deployment can include a single search head rather than the cluster 228.

The search heads 226 can operate alone or collectively to carry out search operations in the context of the co-located deployment. For example, a search head of the cluster 228 can operate as a leader that orchestrates search. As shown, the search head 226-1 is a leader of the cluster 228. Any of the search heads 226 can receive search queries that are processed collectively by the cluster 228. In some embodiments, a particular search head can be designated to receive a search query and coordinate the operations of some or all of the search heads of a cluster 228. In some embodiments, a search head of the cluster 228 can support failover operations in the event that another search head of the cluster 228 fails.

The cluster 228 is coupled to N peer indexers 230. In particular, the search head 226-1 can be a leader of the cluster 228 that is coupled to each of the N peer indexers 230. The system 224 can run one or more daemons 232 that can carry out the DFS operations of the co-located deployment. In particular, the daemon 232-1 of the search head 226-1 is communicatively coupled to a DFS master 234, which coordinates control of DFS operations. Moreover, each of the N peer indexers 230 run daemons 232 communicatively coupled to respective worker nodes 236. The worker nodes 236 are coupled to one or more data sources from which data can be collected as the partial search results of a search query. For example, the worker nodes 236 can collect partial search results of the indexers from internal data sources (not shown) and one or more of external data sources 240. Lastly, the worker nodes 236 are communicatively coupled to the DFS master 234 or a search service provider to form the DFS architecture of the illustrated co-located embodiment.

7.1. Co-Located Deployment Operations

Figure 26:
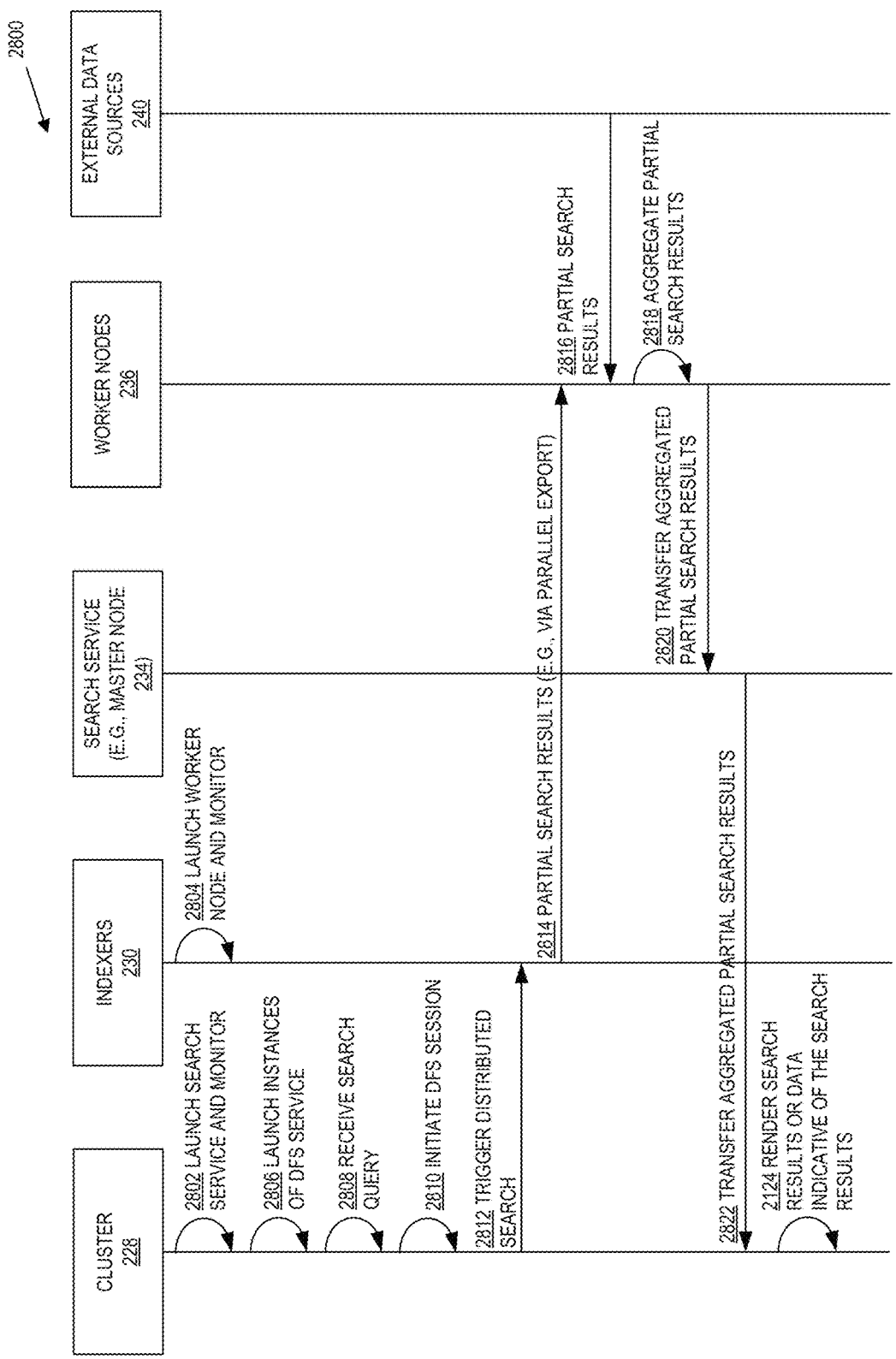
FIG. 26 is an operation flow diagram illustrating an example of an operation flow of a co-located deployment of a DFS system according to some embodiments of the present disclosure.

FIG. 26 is an operation flow diagram illustrating an example of an operation flow of a co-located deployment of a DFS system with a data intake and query system according to some embodiments of the present disclosure. The operational flow 2800 shows the processes for establishing the co-located DFS system and search operations carried out in the context of the co-located deployment.

In step 2802, a search head of the cluster 228 can launch the DFS master 234 and/or launch a connection to the DFS master 234. For example, a search head can use a modular input to launch an open source DFS master 234. Moreover, the search head can use the modular input to launch a monitor of the DFS master 234. The modular input can be a platform add-on of the data intake and query system that can be accessed in a variety of ways such as, for example, over the Internet on a network portal.

In step 2804, the peer indexers 230 can launch worker nodes 236. For example, each peer indexer 230 can use a modular input to launch an open source worker node. In some embodiments, only some of the peer indexers 230 launch worker nodes, which results in a topology where not all of the peer indexers 230 have an associated worker node. Moreover, the peer indexers 206 can use the modular input to launch a monitor of the worker nodes 236.

In step 2806, the cluster 228 can launch one or more instances of a DFS service. For example, any or each of the search heads of the cluster 228 can launch or communicate with an instance of the DFS service. Hence, the co-located deployment can launch and use multiple instances of a DFS service but need only launch and use a single DFS master 234. In the event that a launched DFS master fails, the lead search head using the monitoring modular input can restart the failed DFS master. However, if the DFS master fails along with the lead search head, another search head can be designated as the cluster 228's leader and can re-launch the DFS master.

In step 2808, a search head of the cluster 228 can receive a search query. For example, a search query may be input by a user on a user interface of a display device. In another example, the search query can be input to the search head in accordance with a scheduled search.

In step 2810, a search head of the cluster 228 can initiate a DFS search session with the local DFS service. For example, any of the member search heads of the cluster 228 can receive a search query and, in response to the search query, a search head can initiate a DFS search session using an instance of the DFS service.

In step 2812, a search head of the cluster 228 (or a search service provider) triggers a distributed search on the peer indexers 230 if the search query requires doing so. In other words, the search query is applied on the peer indexers 230 to collect partial search results from internal data stores (not shown).

In step 2814, the distributed search operations continue with the peer indexers 230 retrieving partial search results from internal data stores, and transporting those partial search results to the worker nodes 236. In some embodiments, the internal partial search results are partially reduced (e.g., combined), and transported by the peer indexers 230 to their respective worker nodes 236 in accordance with parallel exporting techniques. In some embodiments, if each peer indexer does not have an associated worker node, the peer indexer can transfer its partial search results to the nearest worker node in the topology of worker nodes. In step 2816, the worker nodes 236 collect the partial search results extracted from the external data sources 240.

In step 2818, the worker nodes 236 can aggregate (e.g., merge and reduce) the partial search results from the internal data sources and the external data sources 240. For example, the aggregation of the partial search results may include combining the partial search results of indexers 230 and/or the external data stores 240. Hence, the worker nodes 236 can aggregate the collective partial search results at scale based on DFS native processors residing at the worker nodes 236.

In some embodiments, the aggregated partial search results can be stored in memory at worker nodes before being transferred between other worker nodes to execute a multi-staged parallel aggregation operation. Once aggregation of the partial search results has been completed (e.g., completely reduced) at the worker node 236, the aggregated partial search results can be read by the DFS service running locally to the cluster 228. For example, the DFS service can commence reading the aggregated search results as event chunks.

In step 2820, the aggregate partial search results read by the DFS service are transferred to the DFS master 234 or search service provider. Then, in step 2822, the DFS master 234 can transfer the final search results to the cluster 228. For example, the aggregated partial search results can be transferred by the worker nodes 236 as event chunks at scale to the DFS master 234, which can transfer search results (e.g., those received or derived therefrom) to the lead search head orchestrating the DFS session.

Lastly, in step 2822, a search head can cause the search results or data indicative of the search results to be rendered on user interface of a display device. For example, the search head member can make the search results available for visualizing on a user interface rendered on the display device.

It will be understood that fewer or more, or different steps can be included in the operation flow 2800. Further, some operations can be performed by different components of the system. In some embodiments, for example, some of the tasks described as being performed by the search head 210 can be performed by the search service 220, such as the search service provider 216. In some cases, step 2806 can be omitted. In some cases, upon determining that a search query is to be handled by the search service, the cluster 228 can communicate the query to the search service. In turn, the search service can trigger the distributed search, etc.

8.0. Cloud Deployment Architecture

Figure 27:
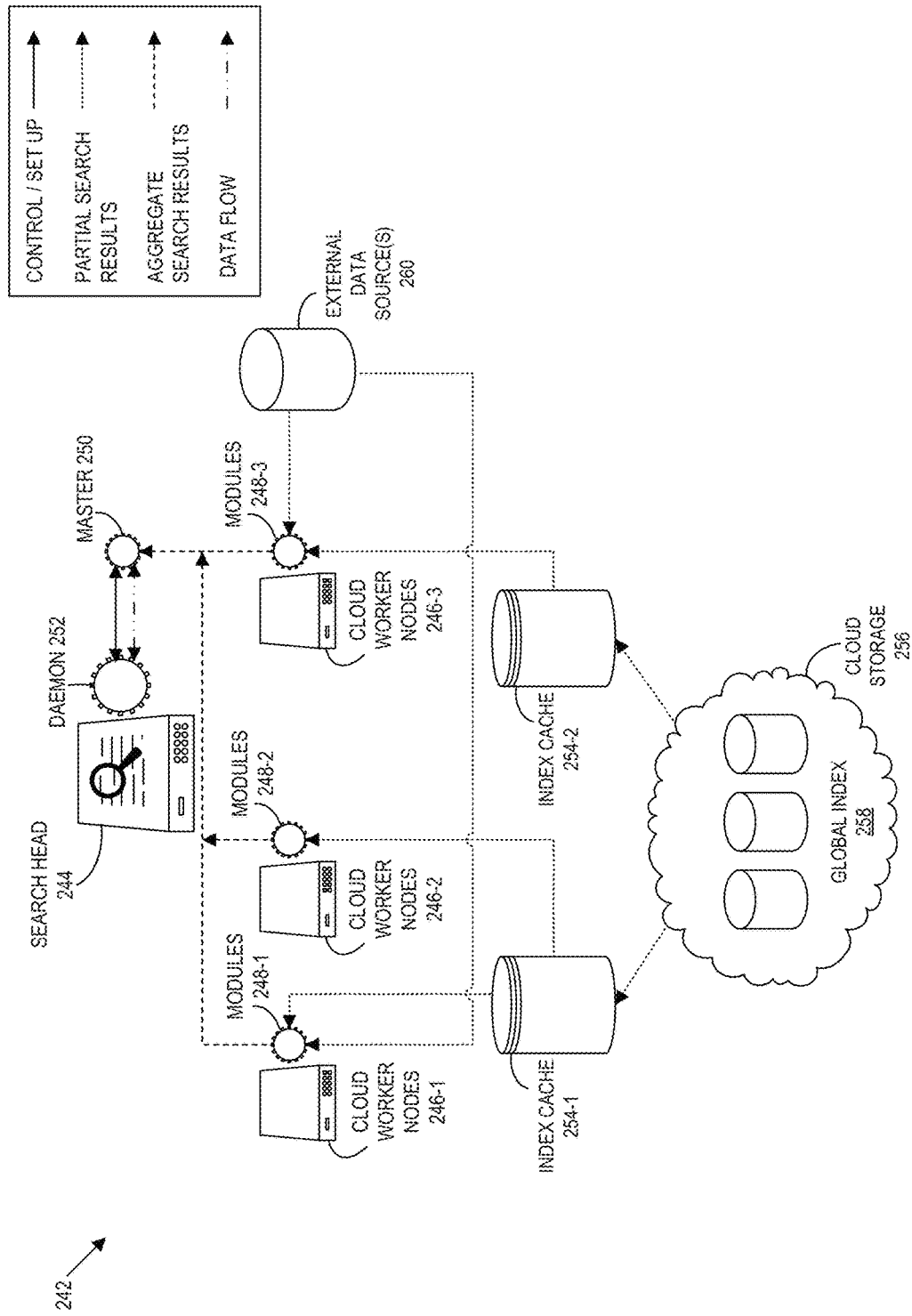
FIG. 27 is a cloud based system diagram illustrating a cloud deployment of a DFS system in which an embodiment may be implemented.

The performance and flexibility of a data intake and query system having capabilities extended by a DFS system can be improved with deployment on a cloud computing platform. For example, FIG. 27 is a cloud-based system diagram illustrating a cloud deployment of a DFS system in which an embodiment may be implemented.

In particular, a cloud computing platform can share processing resources and data in a multi-tenant network. As such, the platform's computing services can be used on demand in a cloud deployment of a DFS system. The platform's ubiquitous, on-demand access to a shared pool of configurable computing resources (e.g., networks, servers, storage, applications, and services), which can be rapidly provisioned and released with minimal effort, can be used to improve the performance and flexibility of a data intake and query system extended by a DFS system.

In the illustrated embodiment, a cloud-based system 242 includes components of a data intake and query system extended by the DFS system implemented on a cloud computing platform. However, the cloud-based system 242 is shown with only some components of a data intake and query system in a cloud deployment but can include other components (e.g., forwarders) that have been omitted for brevity. As such, the components of the cloud-based system 242 can be understood by analogy to other embodiments described elsewhere in this disclosure.

An example of a suitable cloud computing platform include Amazon web services (AWS), which includes elastic MapReduce (EMR) web services. However, the disclosed embodiments are not so limited. Instead, the cloud-based system 242 could include any cloud computing platform that uses EMR-like clusters ("EMR clusters").

In particular, the cloud-based system 242 includes a search head 244 as a tenant of a cloud computing platform. Although shown with only the search head 244, the cloud-based system 242 can include any number of search heads that act independently or collectively in a cluster. The search head 244 and other components of the cloud-based system 242 can be configured on the cloud computing platform.

The cloud-based system 242 also includes any number of worker nodes 246 as cloud instances ("cloud worker nodes 246"). The cloud worker nodes 246 can include software modules 248 running on hardware devices of a cloud computing platform. The software modules 248 of the cloud worker nodes 246 are communicatively coupled to a search service (e.g., including a DFS master 250 or search service provider), which is communicatively coupled to a daemon 252 of the search head 244 to collectively carry out operations of the cloud-based system 242.

The cloud-based system 242 includes index cache components 254. The index cache components 254 are communicatively coupled to cloud storage 256, which can form a global index 258. The index cache components 254 are analogous to indexers, and the cloud storage 256 is analogous to internal data stores described elsewhere in this disclosure. The index cache components 254 are communicatively coupled to the cloud worker nodes 246, which can collect partial search results from the cloud storage 256 by applying a search query to the index cache components 254.

Lastly, the cloud worker nodes 246 can be communicatively coupled to one or more external data sources 260. In some embodiments, only some of the cloud worker nodes 246 are coupled to the external data sources 260 while others are only coupled to the index cache components 254. For example, the cloud worker nodes 246-1 and 246-3 are coupled to both the external data sources 260 and the index cache component 254, while the cloud worker node 246-2 is coupled to the index cache component 254-1 but not the external data sources 260.

The scale of the cloud-based system 242 can be changed dynamically as needed based on any number of metrics. For example, the scale can change based on pricing constraints. In another example, the scale of the EMR cluster of nodes can be configured to improve the performance of search operations. For example, the cloud-based system 242 can scale the EMR cluster depending on the scope of a search query to improve the efficiency and performance of search processing.

In some embodiments, the EMR clusters can have access to flexible data stores such as a Hadoop distributed file system (HDFS), Amazon simple storage services (S3), NoSQL, SQL, and custom SQL. Moreover, in some embodiments, the cloud-based system 242 can allow for a sharded query of data within these flexible data stores in a manner which makes scaling and aggregating partial search results (e.g., merging) most efficient while in place (e.g., reduces shuffling of partial search results between cloud worker nodes).

8.1. Cloud Deployment Operations

Figure 28:
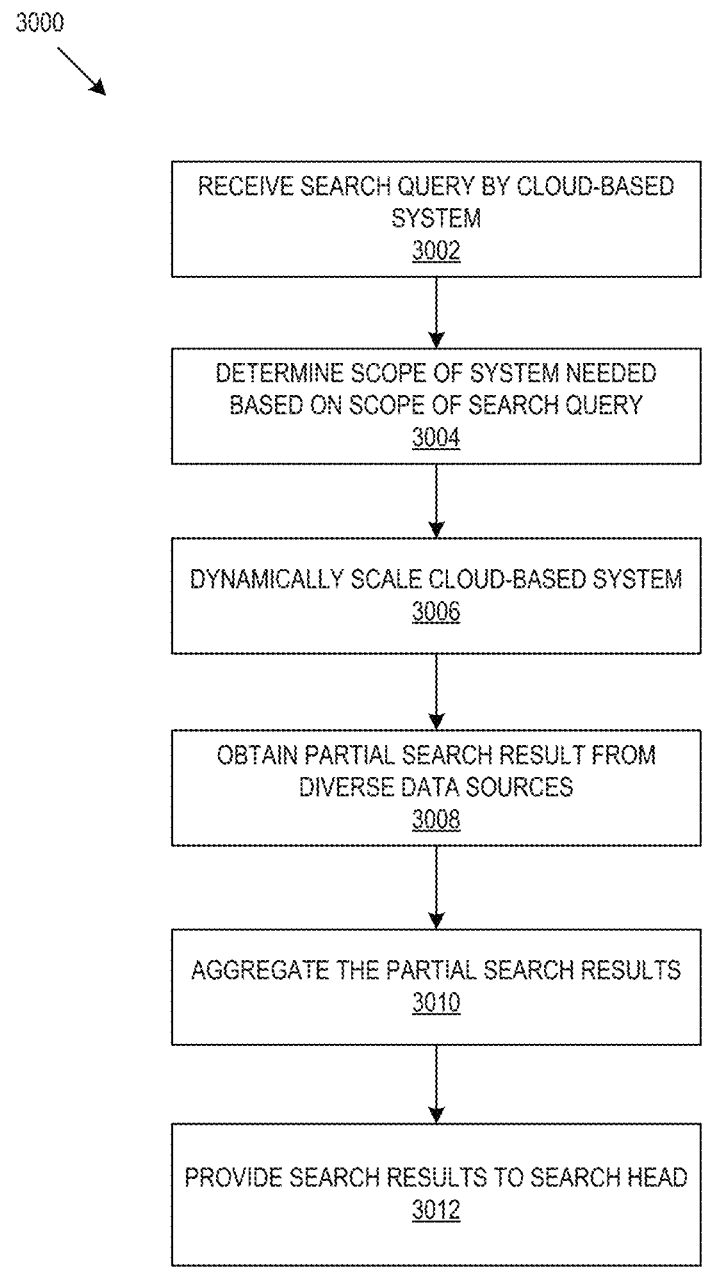
FIG. 28 is a flow diagram illustrating an example of a method performed in a cloud-based DFS system according to some embodiments of the present disclosure.

FIG. 28 is a flow diagram illustrating an example of a method performed in a cloud-based DFS system ("cloud-based system") according to some embodiments of the present disclosure. The operations of the cloud-based system are analogous to those described elsewhere in this disclosure with reference to other embodiments and, as such, a person skilled in the art would understand those operations in the context of a cloud deployment. Accordingly, a description of the flow diagram 3000 highlights some distinctions of the cloud deployment over other embodiments described herein.

In step 3002, the search head of the cloud-based system receives a search query. In step 3004, the cloud-based system determines the type of EMR cluster to use based on the scope of the received search query. For example, the cloud-based system can support two different types of EMR clusters. In a first type scenario, a single large EMR cluster could be used for all search operations. In a second type scenario, subsets of smaller EMR clusters can be used for each type of search load. That is, a smaller subset of an EMR cluster can be used for a less complex aggregation processing of partial search results from different data sources. In some embodiments, the scale of an EMR cluster for the first or second type can be set for each search load by a user or based on a role quota. In other words, the scale of the EMR cluster can depend on the user submitting the search query and/or the user's designated role in the cloud-based system.

In step 3006, the cloud-based system is dynamically scaled based on the needs determined from the received search query. For example, the search heads or cloud worker nodes can be scaled under the control of a search service to grow or shrink as needed based on the scale of the EMR cluster used to process search operations.

In step 3008, the cloud worker nodes can collect the partial search results from various data sources. Then, in step 3010, the cloud worker nodes can aggregate the partial search results collected from the various data sources. Since the cloud worker nodes can scale dynamically, this allows for aggregating (e.g., merging) partial search results in an EMR cluster of any scale.

In step 3012, the resulting aggregated search results can be computed and reported at scale to the search head or search service provider. Thus, the cloud-based system can ensure that data (e.g., partial search results) from diverse data sources (e.g., including time-indexed events with raw data or other type of data) are reduced (e.g., combined) at scale on each EMR node of the EMR cluster before sending the aggregated search results to the search head or search service provider.

The cloud-based system may include various other features that improve on the data intake and query system extended by the DFS system. For example, in some embodiments, the cloud-based system can collect metrics which can allow for a heuristic determination of spikes in DFS search requirements. The determination can also be accelerated through auto-scaling of the EMR clusters.

In some embodiments, the cloud-based system can allow DFS apps of the data intake and query system to be bundled and replicated over an EMR cluster to ensure that they are executed at scale. Lastly, the cloud-based system can include mechanisms that allow user- or role-quota-honoring based on a live synchronization between the data intake and query system user management features and a cloud access control features.

9.0. Timeline Visualization

The disclosed embodiments include techniques for organizing and presenting search results obtained from within a big data ecosystem via a data intake and query system. In particular, a data intake and query system may cause output of the search results or data indicative of the search results on a display device. An example of a display device is the client device 22 shown in FIG. 1A connected to the data intake and query system 16 over the network 33.

For example, the data intake and query system 16 can receive a search query input by a user at the client device 22. The data intake and query system 16 can run the query on distributed data systems to obtain search results. The search results are then communicated to the client device 22 over the network 33. The search results can be rendered in a visual way on the display of the client device 22 using items such as windows, icons, menus, and other graphics or controls.

For example, a client device can run a web browser that renders a website, which can grant a user access to the data intake and query system 16. In another example, the client device can run a dedicated application that grants a user access to the data intake and query system 16. In either case, the client device can render a graphical user interface (GUI), which includes components that facilitate submitting search queries, and facilitate interacting with and interpreting search results obtained by applying the submitted search queries on distributed data systems of a big data ecosystem.

The disclosed embodiments include a timeline tool for visualizing the search results obtained by applying a search query to a combination of internal data systems and/or external data systems. The timeline tool includes a mechanism that supports visualizing the search results by organizing the search results in a time-ordered manner. For example, the search results can be organized into graphical time bins. The timeline tool can present the time bins and the search results contained in one or more time bins. Hence, the timeline tool can be used by an analyst to visually investigate structured or raw data events which can be of interest to the analyst.

The timeline mechanism supports combining time-stamped and non-timestamped search results obtained from diverse data systems to present a visualization of the combined search results. For example, a search query may be applied to the external data systems that each use different compute resources and run different execution engines. The timeline mechanism can harmonize the search results from these data systems, and a GUI rendered on a display device can present the harmonized results in a time-ordered visualization.

Figure 29:
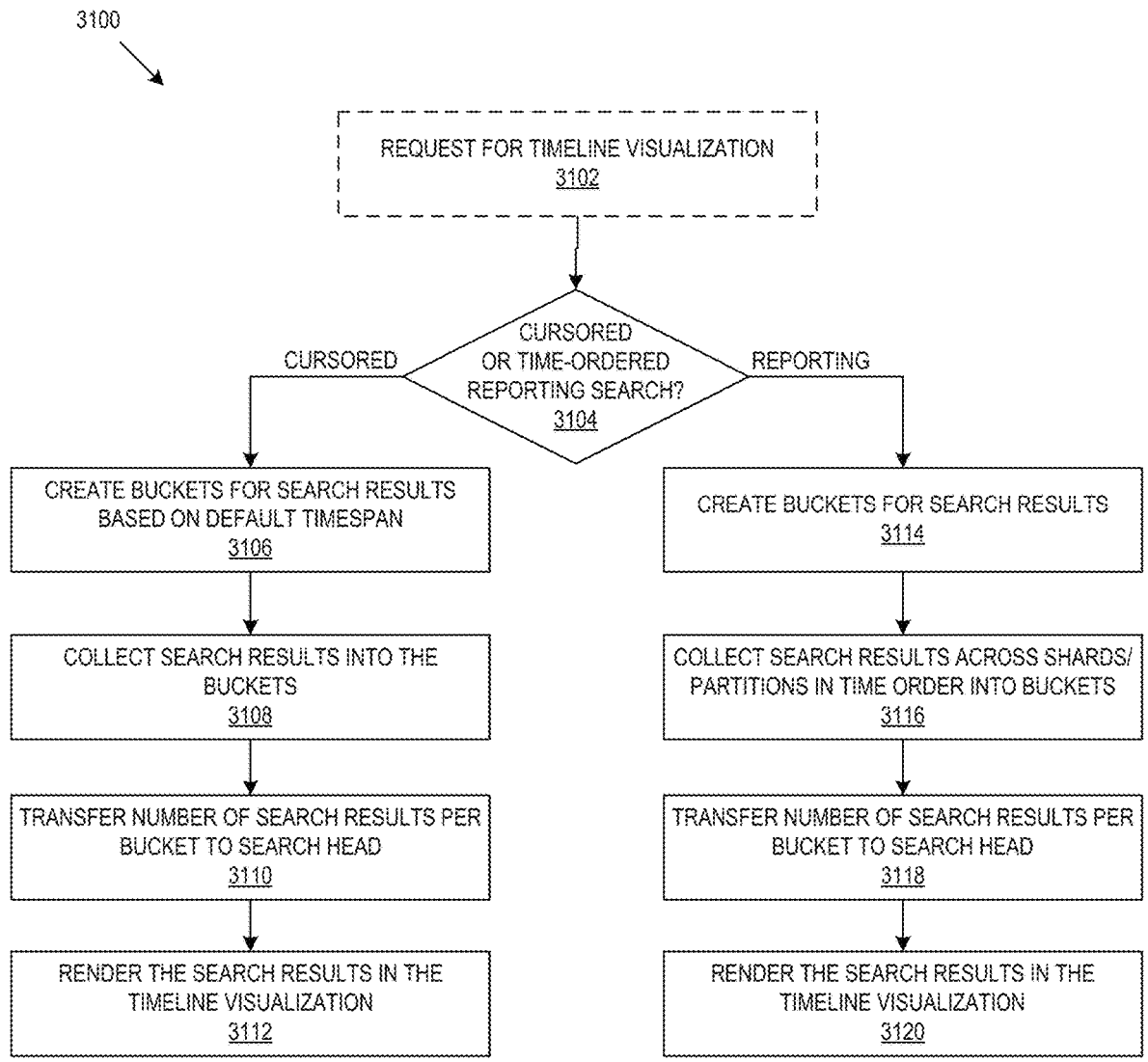
FIG. 29 is a flow diagram illustrating a timeline mechanism that supports rendering search results in a time-ordered visualization according to some embodiments of the present disclosure.

FIG. 29 is a flowchart illustrating a timeline mechanism that supports rendering search results in a time-ordered visualization according to some embodiments of the present disclosure. For example, the search head can dictate to the DFS master whether a cursored or reporting search should be executed, or a search service provider can make this determination. The search service provider can define a search scheme and/or search process and create a DAG. The DAG can orchestrate the search operations performed by the worker nodes for the cursored or reporting search.

In step 3102, the search service receives an indication that a request for a timeline visualization was received by the data intake and query system. For example, a user may input a request for a timeline visualization before, after, or when a search query is input at a client device. In another example, the data intake and query system automatically processes time-ordered requests to visualize in a timeline In step 3104, the search service determines whether the requested visualization is for the search results of a cursored search or a time-ordered reporting search. For example, a cursored search may query indexers of the data intake and query system as well as external data stores for a combination of time ordered partial search results. In another example, a time-ordered reporting search may require querying the indexers and external data stores for a time-ordered statistic based on the combination of time ordered partial search results.

The search results for the timeline tool can be obtained in accordance with a "Fast," "Smart," or "Verbose" search mode depending on whether a cursored search or a reporting search was received. In particular, a cursored search supports all three modes whereas a reporting search may only support the Verbose mode. The Fast mode prioritizes performance of the search and does not return nonessential search results. This means that the search returns what is essential and required. The Verbose mode returns all of the field and event data it possibly can, even if the search takes longer to complete, and even if the search includes reporting commands. Lastly, the default Smart mode switches between the Fast and Verbose modes depending on the type of search being run (e.g., cursored or reporting).

In step 3106, if the search is a cursored search, the search service creates buckets for the search results obtained from distributed data systems. The buckets are created based on a timespan value. The timespan value may be a default value or a value selected by a user. For example, a timespan value may be 24 hours. The buckets may each represent a distinct portion of the timespan. For example, each bucket may represent a distinct hour over a time-span of 24 hours.

The number of buckets that are created may be a default value depending on the timespan, or depending on the number of data systems from which search results were collected. For example, a default number of buckets (e.g., 1,000 buckets) may be created to span a default or selected timespan. In another example, distinct and unique buckets are created for portions of the timespan. In another example, a unique bucket is created per data system. In yet another example, buckets are created for the same portion of the timespan but for different data systems.

In step 3108, search results obtained by application of the search query to the different data systems are collected into the search buckets. For example, each bucket can collect the partial search results from different data systems that are timestamped with values within the range of the bucket. As such, the buckets support the timeline visualization by organizing the search results.

In step 3110, the search service transfers a number of search results contained in the buckets to the search head. However, the search service may need to collect all the search results from across the data systems into the buckets before transferring the search results to the search head to ensure that the timeline visualization is rendered accurately. Moreover, the search results of the bucket may be transferred from the buckets in chronological order. For example, the contents of the buckets representing beginning of the timespan are transferred first, and the contents of the next buckets in time are transferred next, and so on.

In some embodiments, the number of search results transferred to the search head from the buckets may be a default or maximum value. For example, the first 1,000 search results from the buckets at the beginning of the timespan may be first transferred to the search head first. In some embodiments, the search service transfer a maximum number of search results per bin to the search head. In other words, the number of search results transferred to the search head corresponds to the maximum number that can be contained in one or more bin of the timeline visualization. Lastly, in step 3112, the search results of the reporting search received by the search head from the buckets are rendered in a timeline visualization.

In step 3114, if the search is a time-ordered reporting search, the search service creates buckets for the search results obtained from distributed data systems. The buckets can be created based on the number of shards or partitions from which the search results are collected.

In step 3116, the search results are collected from across the partitions. For external data sources, partial search results (e.g., treated as raw events) are collected from across the shards/partitions in time-order and transferred to the timeline mechanism. In case of external data systems which have the capability to support sharded partitions, multiple worker nodes can request for each specific shard or partition. If needed, each partition can be sorted based on user specified constraints such as, for example, a time ordering constraint. For sorting purposes, sometimes instead of unique shards, the DFS system can provide overlapping shards. For overlapping buckets across multiple data sources, the search service may need to collect partial search results across the different data sources before sending search results to the search head.

In step 3118, the search service transfers a number of search results contained in the buckets to the search head. However, the search service may need to collect all the search results from across the data systems into the buckets before transferring the search results to the search head to ensure that the timeline visualization is rendered accurately. Moreover, the search results of the bucket may be transferred from the buckets in chronological order. For example, the contents of the buckets representing beginning of the timespan are transferred first, and the contents of the next buckets in time are next, and so on.

In some embodiments, the number of search results transferred to the search head from the buckets may be a default or maximum value. For example, the first 1,000 search results from the buckets at the beginning of the timespan may be first transferred to the search head first. In some embodiments, the search service transfers a maximum number of search results per bin to the search head. In other words, the number of search results transferred to the search head corresponds to the maximum number that can be contained in one or more bin of the timeline visualization. Lastly, in step 3120, the search results of the reporting search received by the search head from the buckets are rendered in a timeline visualization.

Figure 30:
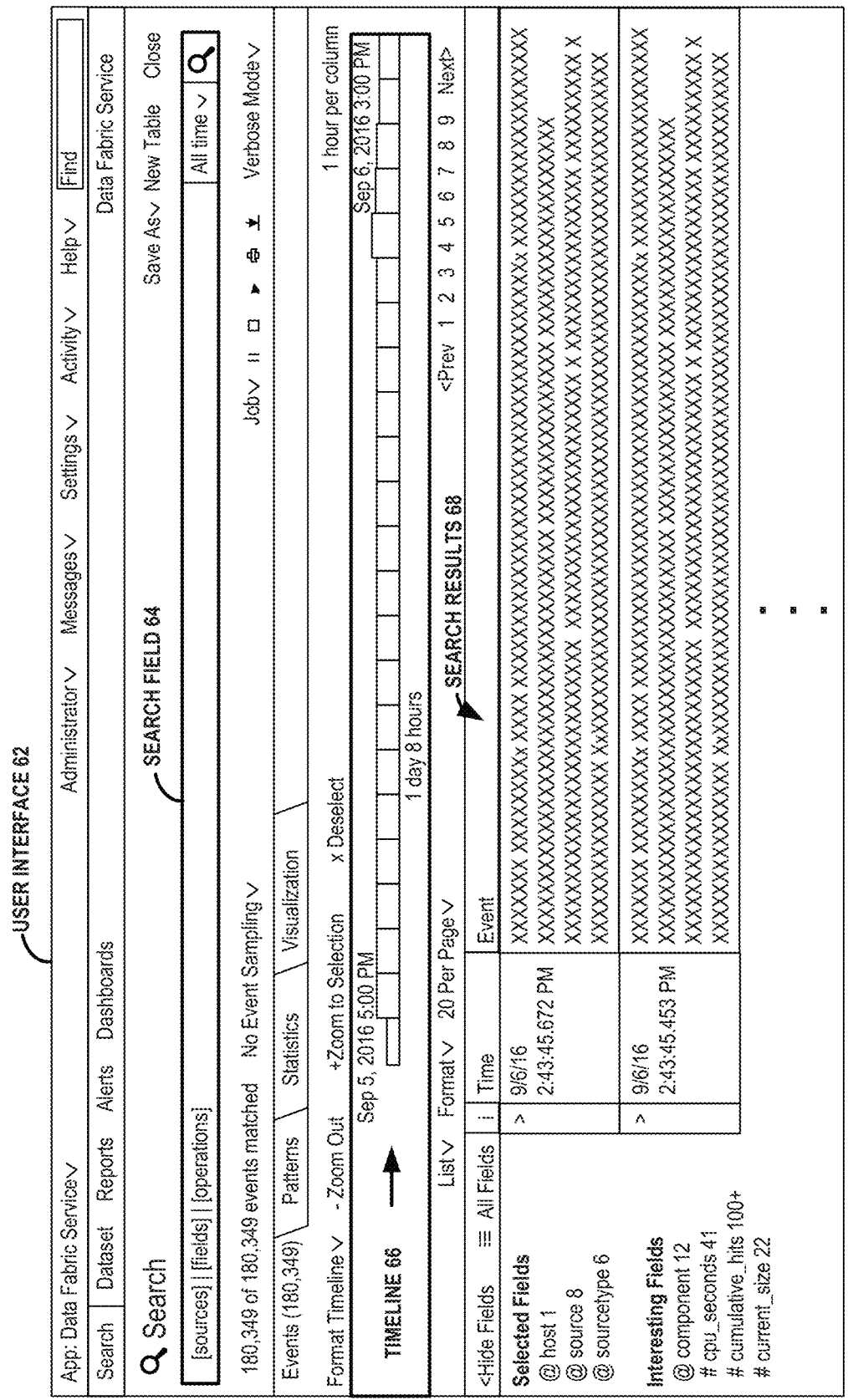
FIG. 30 illustrates a timeline visualization rendered on a GUI in which an embodiment may be implemented.

FIG. 30 illustrates a timeline visualization rendered on a user interface 62 in which an embodiment may be implemented. The timeline visualization presents event data obtained in accordance with a search query submitted to a data intake and query system. In the illustrated embodiment, the search query is input to search field 64 using SPL, in which a set of inputs is operated on by a first command line, and then a subsequent command following the pipe symbol "|" operates on the results produced by the first command, and so on for additional commands. As shown, a command on the left of the pipe symbol can set the scope of the search, which could include external data systems. Other commands on the right of the pipe symbol (and subsequent pipe symbols) can specify a field name and/or statistical operation to perform on the data sources.

In some embodiments, the search head or search service provider can implement specific mechanism to parse the SPL. The search head or search service provider can determine that some portion of the search query is to be executed on the worker nodes base on the scope of the search query. In some embodiments, the search query can include a specific search command that triggers the search head to realize which portion of the search query should be executed by the DFS system. As a result, the phase generator can define the search phases, and where each of those phases will be executed. In addition, once the phase generator decides an operation needs to be executed by the DFS system, the search head or search service provider can optimize to push as much of the search operation as possible, for example, first to the external data source and then to the DFS system. In some embodiments, only the commands not included in the DFS command set will be executed back on the search head or search service provider once the results are retrieved to the search head or search service provider.

The timeline visualization presents multiple dimensions of data in a compact view, which reduced the cognitive burden on analysts viewing a complex collection of data from internal and/or external data systems. That is, the timeline visualization provides a single unified view to facilitate analysis of events stored across the big data ecosystem. Moreover, the timeline visualization includes selectable components to manipulate the view in a manner suitable for the needs of an analyst.

The timeline visualization includes a graphic 66 that depicts a summary of the search results in a timeline lane (e.g., in the form of raw events), as well as a list of the specific search results 68. As shown, the timeline summary of the search results are presented as rectangular bins that are chronologically ordered and span a period of time (e.g., Sep. 5, 2016 5:00 PM through Sep. 6, 2016 3:00 PM). The height of a bin represents the magnitude of the quantity of events in that group relative to another group arranged along the timeline. As such, the height of each bin indicates a count of events for a subset of the period of events relative to other counts for other bins within the period of time. The events in a group represented by a bin may have a timestamp value included in the range of time values of the corresponding bin. Below the timeline summary is a listing of events of the search results presented in chronological order.

Figure 31:
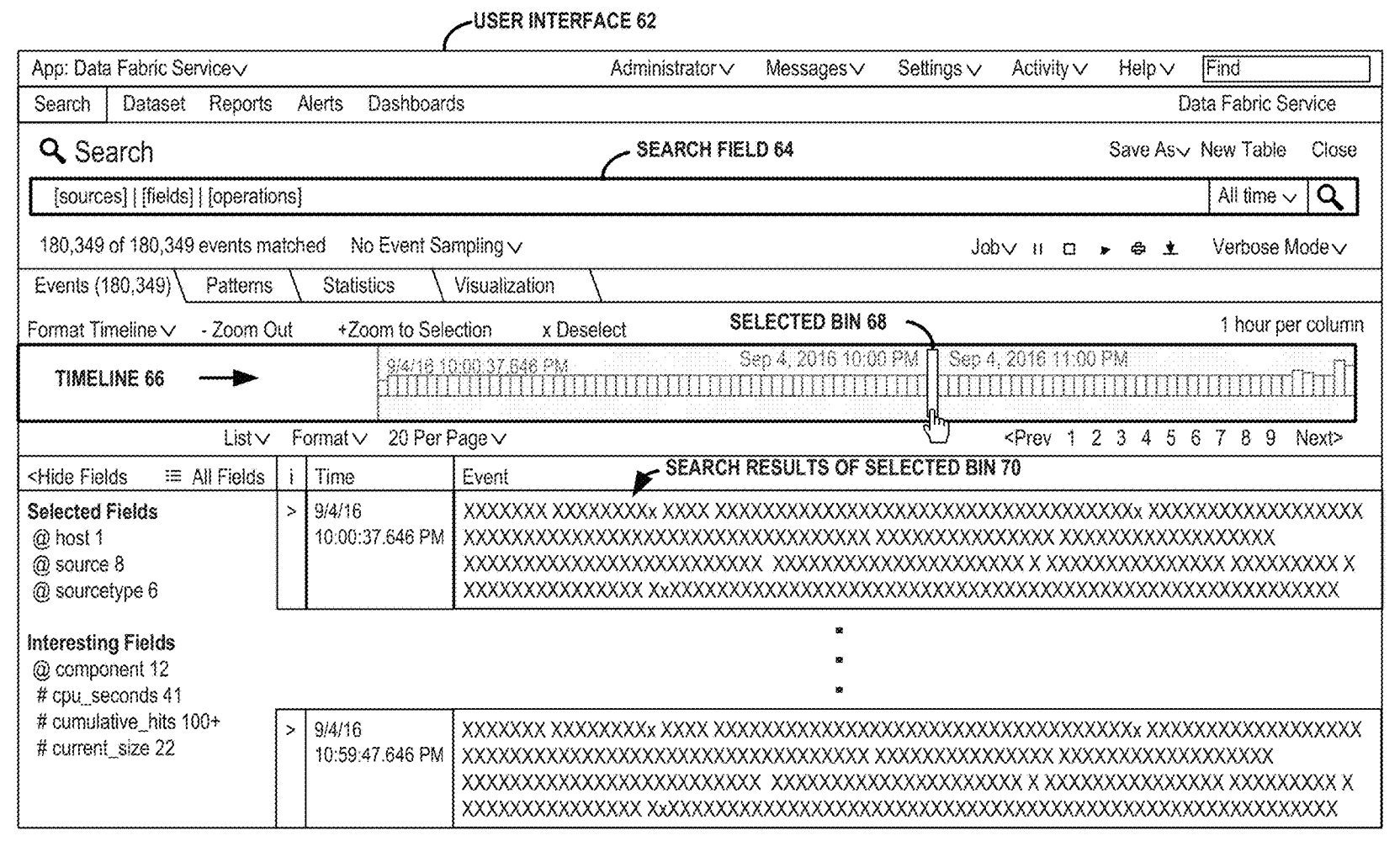

FIG. 31 illustrates a selected bin 68 of the timeline visualization and the contents of the selected bin 70 according to some embodiments of the present disclosure. Specifically, the timeline visualization may include graphic components that enable an analyst to investigate additional dimensions of the search results summarized in the timeline. As shown, each bin representing a group of events may be selectable by an analyst. Selecting a bin may cause the GUI to display the specific group of events associated with the bin in the list below the timeline summary. Specifically, selecting a bin may cause the GUI to display the events of the search results that are timestamped within a range of the corresponding group.

The timeline visualization is customizable and adaptable to present search results in various convenient manners. For example, a user can change the ordering of groups of events to obtain a different visualization of the same groups. In another example, a user can change the range of the timeline to obtain a filtered visualization of the search results. In yet another example, a user can hide some events to obtain a sorted visualization of a subset of the search results.

In some embodiments, the activity for each data system may appear in a separate timeline lane. If an activity start-time and duration are available for a particular data system, the respective timeline may show a duration interval as a horizontal bar in the lane. If a start time is available, the timeline visualization may render an icon of that time on the visualization. As such, the timeline visualization can be customized and provide interactive features to visualize search results, and communicate the results in dashboards and reports.

Thus, the timeline visualization can support a timeline visualization of external data systems, where each external data system may operate using different compute resources and engines. For example, the timeline visualization can depict search results obtained from one or more external data systems, collated and presented in a single and seamless visualization. As such, the timeline visualization is a tool of underlying logic that facilitates investigating events obtained from any of the external data systems, internal data systems (e.g., indexers), or a combination of both.

The underlying logic can manage and control the timeline visualization rendered on the GUI in response to data input and search results obtained from within the big data ecosystem. In some embodiments, the underlying logic is under the control and management of the data intake and query system. As such, an analyst can interface with the data intake and query system to use the timeline visualization. For example, the timeline logic can cause the timeline visualization to render activity time intervals and discrete data events obtained from various data system resources in internal and/or external data systems.

The underlying logic includes the search service. Since the bins may include events data from multiple data systems, each bin can represent an overlapping bin across multiple data systems. Accordingly, the search service can collect the data events across the different data systems before sending them to the search head. To finalize a search operation, the search service may transmit the maximum number of events per bin or the maximum size per bin to the search head.

In some embodiments, the underlying logic uses the search head of the data intake and query system to collect data events from the various data systems that are presented on the timeline visualization. In some embodiments, the events are collected in accordance with any of the methods detailed above, and the timeline visualization is a portal for viewing the search results obtained by implementing those methods. As such, the collected events can have timestamps indicative of, for example, times when the event was generated.

The timestamps can be used by the underlying logic to sort the events into the bins associated with any parameter such as a time range. For example, the underlying logic may include numerous bins delineated by respective chronological time ranges over a total period of time that includes all the bins. In some embodiments, a maximum amount of events transferred into the time bins could be set.

In some embodiments, the underlying logic of the timeline visualization can automatically create bins for a default timespan in response to cursored searches of ordered data. For example, an analyst may submit a cursored search, and the underlying logic may cause the timeline visualization to render a display for events within a default timespan. The amount and rate at which the events are transferred to the search head for subsequent display on the timeline visualization could vary under the control of the underlying logic. For example, a maximum number of events could be transferred on a per bin basis by the worker nodes to the search head. As such, the DFS system could balance the load on the network.

In some embodiments, the underlying logic of the timeline visualization can utilize the sharding mechanism detailed above for reporting searches of ordered data from external data systems. Specifically, the data could be sharded across partitions in response to a reporting search, where executors have overlapping partitions. Further, the underlying logic may control the search head or search service provider to collect the events data across the shards/partitions in time order for rendering on the timeline visualization. Under either the cursored search or reporting search, the underlying logic may impose the maximum size of total events transferred into bins.

10.0. Monitoring and Metering Services

The disclosed embodiments also include monitoring and metering services of the DFS system. Specifically, these services can include techniques for monitoring and metering metrics of the DFS system. The metrics are standards for measuring use or misuse of the DFS system. Examples of the metrics include data or components of the DFS system. For example, a metric can include data stored or communicated by the DFS system or components of the DFS system that are used or reserved for exclusive use by customers. The metrics can be measured with respect to time or computing resources (e.g., CPU utilization, memory usage) of the DFS system. For example, a DFS service can include metering the usage of particular worker nodes by a customer over a threshold period of time.

In some embodiments, a DFS service can meter the amount hours that a worker node spends running one or more tasks (e.g., a search requests) for a customer. In another example, a DFS service can meter the amount of resources used to run one or more tasks rather than, or in combination with, the amount of time taken to complete the task(s). In some embodiments, the licensing approaches include the total DFS hours used per month billed on a per hour basis; the maximum capacity that can be run at any one time, e.g. the total number of workers with a cap on the amount of size of each worker defined by CPU and RAM available to that worker; and finally a data volume based approach where the customer is charged by the amount of data brought into the DFS for processing.

Figure 32:
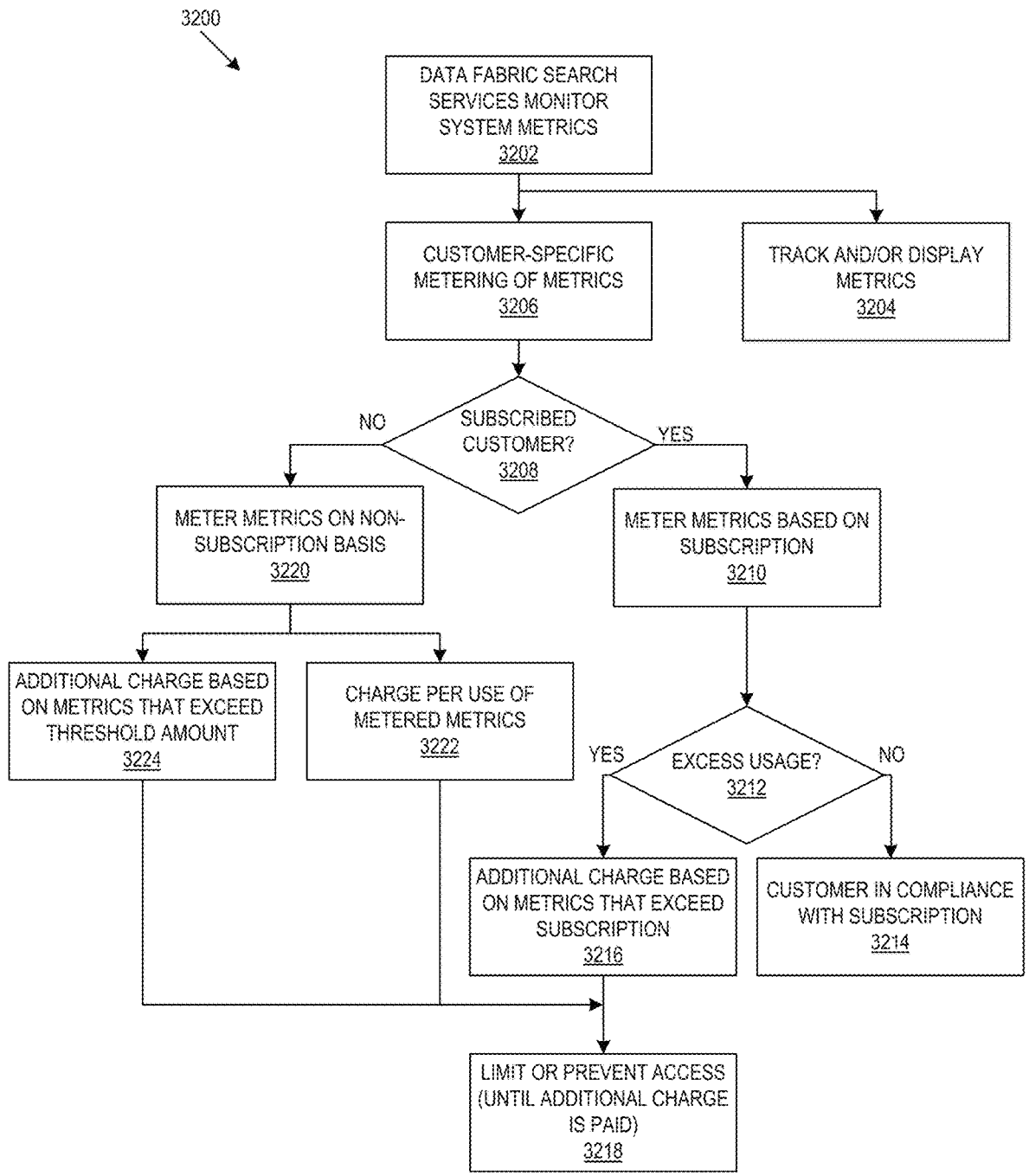
FIG. 32 is a flow diagram illustrating services of a DFS system according to some embodiments of the present disclosure.

FIG. 32 is a flow diagram illustrating monitoring and metering services of the DFS system according to some embodiments of the present disclosure. In the illustrated embodiment, in step 3202, the DFS services can monitor one or more metrics of a DFS system. The DFS services can monitor the DFS system for a variety of reasons. For example, in step 3204, a DFS service can track metrics and/or display monitored metrics or data indicative of the monitored metrics. Hence, the metrics can be preselected by, for example, a system operator or administrator seeking to analyze system stabilities, instabilities, or vulnerabilities.

In some embodiments, the DFS services can meter use of the DFS system as a mechanism for billing customers. For example, in step 3206, the DFS services can monitor specific metrics for specific customers that use the DFS system. The metering services can differ depending on whether the customer has a subscription to use the DFS system or is using the DFS system on an on-demand basis. As such, a DFS service can run a value-based licensing agreement that allows customers to have a fair exchange of value for their use of the DFS service.

In step 3208, a determination is made about whether a customer has a subscription to use the DFS system. The subscription can define the scope of a license granted to a customer to access or use the DFS system. The scope can define an amount of functionality available to the customer. The functionality can include, for example, the number or types of searches that can be performed on the DFS system. In some embodiments, the scope granted to a user can vary in proportion to cost. For example, customers can purchase subscriptions of different scope for different prices, depending on the needs of the customers. As such, a DFS service can run a value-based licensing agreement that allows customers to have a fair exchange of value for their use of the DFS service.

In step 3210, if the customer is subscribed, the DFS service can meter metrics based on a subscription purchased by the customer. For example, a subscription to a DFS service may limit the amount of searches that a customer can submit to the DFS system. As such, the DFS service will meter the number of searches that are submitted by the customer. In another example, a subscription to the DFS service may limit the time a user can actively access a DFS service. As such, the DFS service will meter the amount of time that a user spends actively using the DFS service.

In step 3212, a DFS service determines whether the customer's use of the DFS system exceeded a threshold amount granted by the subscription. For example, a customer may exceed the scope of a paid subscription by using functionality not included in the paid subscription or using more functionality than that granted by the subscription. In some embodiments, the excess use can be measured with respect to a metric such as time or use of computing resources.

In step 3212, a DFS service determines whether a customer exceeded the scope of the customer's subscription. In step 3214, if the customer did not exceed the subscription, no action is taken (e.g., the customer is not charged additional fees). Referring back to step 3212, a variety of actions can be taken if the customer has exceed the subscription. In step 3216, the DFS service can charge the customer for the excess amount of the metered metric. For example, the DFS service may begin metering the amount of time a customer spends using the DFS system after a threshold amount of time has been exceeded. In step 3218, the DFS service can alternatively or additionally prevent the customer from accessing the DFS system if the customer exceeds the subscription or has not paid the additional charges of step 3216.

Referring back to step 3208, if the customer is not subscribed to a DFS subscription service, then customer may still access the DFS system through a variety of other techniques. For example, a DFS service may provide limited or temporary access to the DFS system to a non-subscribed customer. In another example, a DFS service may provide access to the DFS service on-demand.

Either way, in step 3220, a DFS service meters metrics on a non-subscription basis. For example, in step 3222, the customer can pay for each instance the customer uses the DFS system. In another example, in step 3224, a DFS service can start charging a non-subscribed customer for using the DFS system once the metrics of the service exceed a threshold amount. For example, a DFS service may provide free limited access or temporary full access to the DFS system. When the measuring metrics exceed the free limited access, the customer may be charged for access that exceeds the free amount. In either case, in step 3218, the DFS service can prevent the customer from accessing the DFS system if the measuring metrics exceed the threshold amount or the customer has not paid the charges of step 3222 or 3224. In some embodiments, a DFS server can allow the customer to complete an active search that exceeded a measuring metric but deny the customer from using the DFS system any further until additional payment authorized.

11.0. Data Intake and Fabric System Architecture

Figure 33:
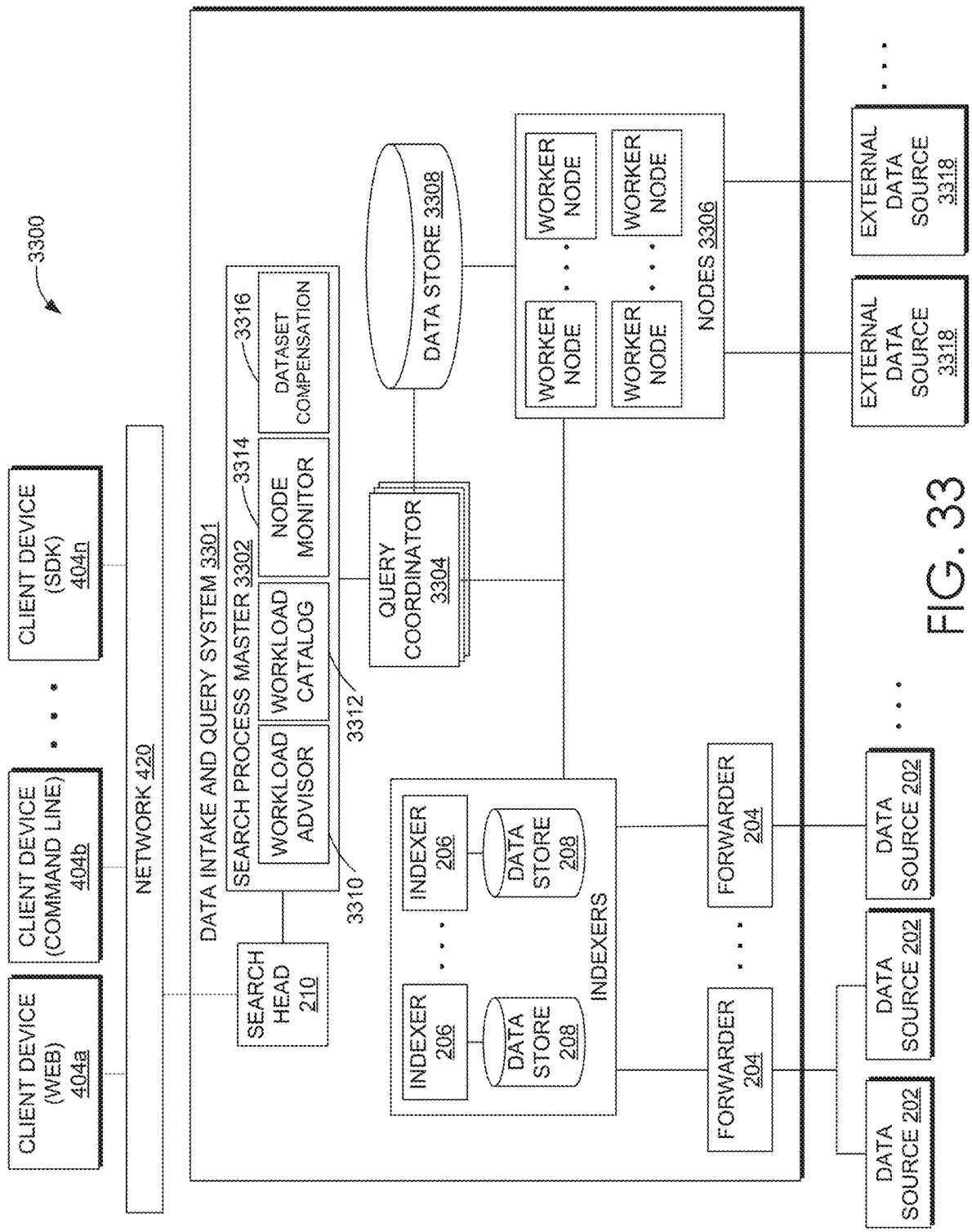
FIG. 33 is a system diagram illustrating an environment for ingesting and indexing data, and performing queries on one or more datasets from one or more dataset sources.

FIG. 33 is a system diagram illustrating an environment 3300 for ingesting and indexing data, and performing queries on one or more datasets from one or more dataset sources. In the illustrated embodiment, the environment 3300 includes data sources 201, client devices 404, described in greater detail above with reference to FIG. 4, and external data sources 3318 communicatively coupled to a data intake and query system 3301. The external data sources 3318 can be similar to the external data systems 12-1, 12-2 described above with reference to FIG. 1A or the external data sources described above with reference to FIG. 4

In the illustrated embodiment, the data intake and query system 3301 includes any combination of forwarders 204, indexers 206, data stores 208, and a search head 210, as discussed in greater detail above with reference to FIGS. 2-4. For example, the forwarders 204 can forward data from the data sources 202 to the indexers 206, the indexers can 206 ingest, parse, index, and store the data in the data stores 208, and the search head 210 can receive queries from, and provide the results of the queries to, client devices 404 on behalf of the system 3301.

In addition to forwarders 204, indexers 206, data stores 208, and the search head 210, the system 3301 further includes a search process master 3302 (in some embodiments also referred to as DFS master), one or more query coordinators 3304 (in some embodiments also referred to as search service providers), worker nodes 3306, and a query acceleration data store 3308. In some embodiments, a workload advisor 3310, workload catalog 3312, node monitor 3314, and dataset compensation module 3316 can be included in the search process master 3302. However, it will be understood that any one or any combination of the workload advisor 3310, workload catalog 3312, node monitor 3314, and dataset compensation module 3316 can be included elsewhere in the system 3301, such as in as a separate device or as part of a query coordinator 3304.

As will be described in greater detail below, the functionality of the search head 210 and the indexers 206 in the illustrated embodiment of FIG. 33 can differ in some respects from the functionality described previously with respect to other embodiments. For example, in the illustrated embodiment of FIG. 33, the search head 210 can perform some processing on the query and then communicate the query to the search process master 3302 and coordinator(s) 3304 for further processing and execution. For example, the search head 210 can authenticate the client device or user that sent the query, check the syntax and/or semantics of the query, or otherwise determine that the search request is valid. In some cases, a daemon running on the search head 210 can receive a query. In response, the search head 210 can spawn a search process to further handle the query, including communicating the query to the search process master 3302 or query coordinator 3304. Upon completion of the query, the search head 210 can receive the results of the query from the search process master 3302 or query coordinator 3304 and serve the results to the client device 404. In such embodiments, the search head 210 may not perform any additional processing on the results received from the search process master 3302 or query coordinator 3304. In some cases, upon receiving and communicating the results, the search head 210 can terminate the search process.

In addition, the indexers 206 in the illustrated embodiment of FIG. 33 can receive the relevant subqueries from the query coordinator 3304 rather than the search head 210, search the corresponding data stores 208 for relevant events, and provide their individual results of the search to the worker nodes 3306 instead of the search head 210 for further processing. As described previously, the indexers 206 can analyze events for a query in parallel. For example, each indexer 206 can search its corresponding data stores 208 in parallel and communicate its partial results to the worker nodes 3306.

The search head 210, search process master 3302, and query coordinator 3304 can be implemented using separate computer systems, processors, or virtual machines, or may alternatively comprise separate processes executing on one or more computer systems, processors, or virtual machines. In some embodiments, running the search head 210, search process master 3302, and/or query coordinator 3304 on the same machine can increase performance of the system 3301 by reducing communications over networks. In either case, the search process master 3302 and query coordinator 3304 can be communicatively coupled to the search head 210.

The search process master 3302 and query coordinator 3304 can be used to reduce the processing demands on the search head 210. Specifically, the search process master 3302 and coordinator 3304 can perform some of the preliminary query processing to reduce the amount of processing done by the search head 210 upon receipt of a query. In addition, the search process master 3302 and coordinator 3304 can perform some of the processing on the results of the query to reduce the amount of processing done by the search head 210 prior to communicating the results to a client device. For example, upon receipt of a query, the search head 210 can determine that the query can be processed by the search process master 3302. In turn, the search process master 3302 can identify a query coordinator 3304 that can process the query. In some cases, if there is not a query coordinator 3304 that can handle the incoming query, the search process master 3302 can spawn an additional query coordinator 3304 to handle the query.

The query coordinator(s) 3304 can coordinate the various tasks to execute queries assigned to them and return the results to the search head 210. For example, as will be described in greater detail below, the query coordinator 3304 can determine the amount of resources available for a query, allocate resources for the query, determine how the query is to be broken up between dataset sources, generate commands for the dataset sources to execute, determine what tasks are to be handled by the worker nodes 3306, spawn the worker nodes 3306 for the different tasks, instruct different worker nodes 3306 to perform the different tasks and where to route the results of each task, monitor the worker nodes 3306 during the query, control the flow of data between the worker nodes 3306, process the aggregate results from the worker nodes 3306, and send the finalized results to the search head 210 or to another dataset destination. In addition, the query coordinators 3304 can include providing data isolation across different searches based on role/access control, as well as fault tolerance (e.g., localized to a search head). For example, if a search operation fails, then its spawned query coordinator 3304 may fail but other query coordinators 3304 for other queries can continue to operate. In addition, queries that are to be isolated from one another can use different query coordinators 3304.

The worker nodes 3306 can perform the various tasks assigned to them by a query coordinator 3304. For example, the worker nodes 3306 can intake data from the various dataset sources, process the data according to the query, collect results from the processing, combine results from various operations, route the results to various destinations, etc. In certain cases, the worker nodes 3306 and indexers 206 can be implemented using separate computer systems, processors, or virtual machines, or may alternatively comprise separate processes executing on one or more computer systems, processors, or virtual machines.

The query acceleration data store 3308 can be used to store datasets for accelerated access. In some cases, the worker nodes 3306 can obtain data from the indexers 206, external data sources 3318, or other location (e.g., common storage, ingested data buffer, etc.) and store the data in the query acceleration data store 3308. In such embodiments, when a query is received that relates to the data stored in the query acceleration data store 3308, the worker nodes 3306 can access the data in the query acceleration data store 3308 and process the data according to the query. Furthermore, if the query also includes a request for datasets that are not in the query acceleration data store 3308, the worker nodes 3306 can begin working on the dataset obtained from the query acceleration data store 3308, while also obtaining the other dataset(s) from the other dataset source(s). In this way, a client device 414*a*-404*n* can rapidly receive a response to a provided query, while the worker nodes 3306 obtain datasets from the other dataset sources.

The query acceleration data store 3308 can be, for example, a distributed in-memory database system, storage subsystem, and so on, which can maintain (e.g., store) datasets in both low-latency memory (e.g., random access memory, such as volatile or non-volatile memory) and longer-latency memory (e.g., solid state storage, disk drives, and so on). To increase efficiency and response times, the accelerated data set 3308 can maintain particular datasets in the low-latency memory, and other datasets in the longer-latency memory. For example, the datasets can be stored in-memory (non-limiting examples: RAM or volatile memory) with disk spillover (non-limiting examples: hard disks, disk drive, non-volatile memory, etc.). In this way, the query acceleration data store 3308 can be used to serve interactive or iterative searches. In some cases, datasets which are determined to be frequently accessed by a user can be stored in the lower-latency memory. Similarly, datasets of less than a threshold size can be stored in the lower-latency memory.

As will be described below, a user can indicate in a query that particular datasets are to be stored in the query acceleration data store 3308. The query can then indicate operations to be performed on the particular datasets. For subsequent queries directed to the particular datasets (e.g., queries that indicate other operations), the worker nodes 3306 can obtain information directly from the query acceleration data store 3308. Additionally, since the query acceleration data store 3308 can be utilized to service requests from different clients 404*a*-404*n*, the query acceleration data store 3308 can implement access controls (e.g., an access control list) with respect to the stored datasets. In this way, the stored datasets can optionally be accessible only to users associated with requests for the datasets. Optionally, a user who provides a query can indicate that one or more other users are authorized to access particular requested datasets. In this way, the other users can utilize the stored datasets, thus reducing latency associated with their queries.

In certain embodiments, the worker nodes 3306 can store data from any dataset source, including data from a dataset source that has not been transformed by the nodes 3306, processed data (e.g., data that has been transformed by the nodes 3306), partial results, or aggregated results from a query in the query acceleration data store 3308. In such embodiments, the results stored in the query acceleration data store 3308 can be served at a later time to the search head 210, combined with additional results obtained from a later query, transformed or further processed by the worker nodes 3306, etc.

It will be understood that the system 3301 can include fewer or more components as desired. For example, in some embodiments, the system 3301 does not include a search head 210. In such embodiments, the search process master 3302 can receive query requests from clients 404 and return results of the query to the client devices 404. Further, it will be understood that in some embodiments, the functionality described herein for one component can be performed by another component. For example, although the workload advisor 3310 and dataset compensation module 3316 are described as being implemented in the search process master 3302, it will be understood that these components and their functionality can be implemented in the query coordinator 3304. Similarly, as will be described in greater detail below, in some embodiments, the nodes 3306 can be used to index data and store it in one or more data stores, such as the common storage or ingested data buffer, described in greater detail below.

11.1. Worker Nodes

Figure 34:
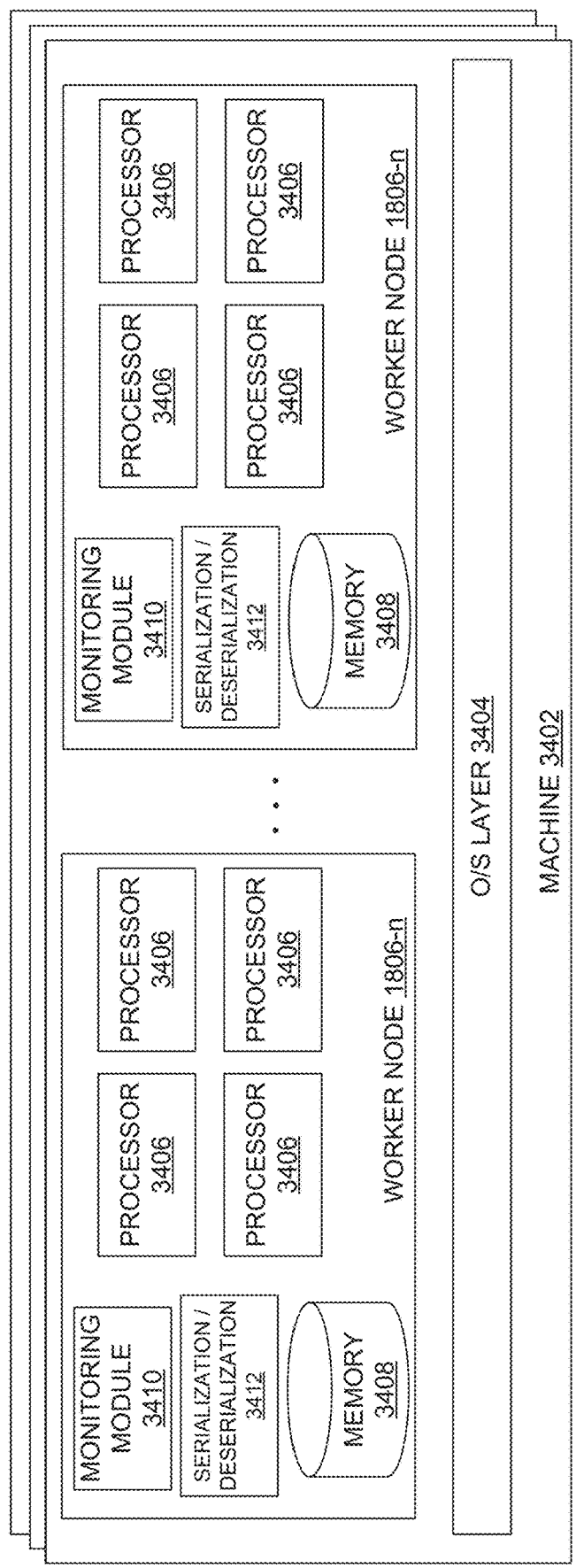
FIG. 34 is a block diagram illustrating an embodiment of multiple machines, each having multiple nodes.

FIG. 34 is a block diagram illustrating an embodiment of multiple machines 3402, each having multiple nodes 3306-1, 3306-*n* (individually and collectively referred to as node 3306 or nodes 3306) residing thereon. The worker nodes 3306 across the various machines 3402 can be communicatively coupled to each other, to the various components of the system 3301, such as the indexers 206, query coordinator 3304, search head 210, common storage, ingested data buffer, etc., and to the external data sources 3318.

The machines 3402 can be implemented using multi-core servers or computing systems and can include an operating system layer 3404 with which the nodes 3306 interact. For example, in some embodiments, each machine 3402 can include 32, 48, 64, or more processor cores, multiple terabytes of memory, etc.

In the illustrated embodiment, each node 3306 includes four processors 3406, memory 3408, a monitoring module 3410, and a serialization/deserialization module 3412. It will be understood that each node 3306 can include fewer or more components as desired. Furthermore, it will be understood that the nodes 3306 can include different components and resources from each other. For example node 3306-1 can include fewer or more processors 3406 or memory 3408 than the node 3306-*n*.

The processors 3406 and memory 3408 can be used by the nodes 3306 to perform the tasks assigned to it by the query coordinator 3304 and can correspond to a subset of the memory and processors of the machine 3402. The serialization/deserialization module 3412 can be used to serialize/deserialize data for communication between components of the system 3301, as will be described in greater detail below.

The monitoring module 3410 can be used to monitor the state and utilization rate of the node 3306 or processors 3406 and report the information to the search process master 3302 or query coordinator 3304. For example, the monitoring module 3410 can indicate the number of processors in use by the node 3306, the utilization rate of each processor, whether a processor is unavailable or not functioning, the amount of memory used by the processors 3406 or node 3306, etc.

In addition, each worker node 3306 can include one or more software components or modules ("modules") operable to carry out the functions of the system 3301 by communicating with the query coordinator 3304, the indexers 206, and the dataset sources. The modules can run on a programming interface of the worker nodes 3306. An example of such an interface is APACHE SPARK, which is an open source computing framework that can be used to execute the worker nodes 3306 with implicit parallelism and fault-tolerance.

In particular, SPARK includes an application programming interface (API) centered on a data structure called a resilient distributed dataset (RDD), which is a read-only multiset of data items distributed over a cluster of machines (e.g., the devices running the worker nodes 3306). The RDDs function as a working set for distributed programs that offer a form of distributed shared memory.

Based on instructions received from the query coordinator 3304, the worker nodes 3306 can collect and process data or partial search results of a distributed network of data storage systems, and provide aggregated partial search results or finalized search results to the query coordinator 3304 or other destination. Accordingly, the query coordinator 3304 can act as a manager of the worker nodes 3306, including their distributed data storage systems, to extract, collect, and store partial search results via their modules running on a computing framework such as SPARK. However, the embodiments disclosed herein are not limited to an implementation that uses SPARK. Instead, any open source or proprietary computing framework running on a computing device that facilitates iterative, interactive, and/or exploratory data analysis coordinated with other computing devices can be employed to run the modules 218 for the query coordinator 3304 to apply search queries to the distributed data systems.

As a non-limiting example, as part of processing a query, a node 3306 can receive instructions from a query coordinator 3304 to perform one or more tasks. For example, the node 3306 can be instructed to intake data from a particular dataset source, parse received data from a dataset source to identify relevant data in the dataset, collect partial results from the parsing, join results from multiple datasets, or communicate partial or completed results to a destination, etc. In some cases, the instructions to perform a task can come in the form of a DAG. In response, the node 3306 can determine what task it is to perform in the DAG, and execute it.

As part of performing the assigned task, the node 3306 can determine how many processors 3406 to allocate to the different tasks. In some embodiments the node can determine that all processors 3406 are to be used for a particular task or only a subset of the processors 3406. In certain embodiments, each processor 3406 of the node 3306 can be used as a partition to intake, process, or collect data according to a task. Upon completion of the task, the node 3306 can inform the query coordinator 3304 that the task has been completed.

When instructed to intake data, the processors 3406 of the node 3306 can be used to communicate with a dataset source (non-limiting examples: external data sources 3318, indexers 206, common storage, query acceleration data store 3308, ingested data buffer, etc.). Once the node 3306 is in communication with the dataset source it can intake the data from the dataset source. As described in greater detail below, in some embodiments, multiple partitions of a node (or different nodes) can be assigned to intake data from a particular source.

When instructed to parse or otherwise process data, the processors 3406 of the node 3306 can be used to review the data and identify portions of the data that are relevant to the query. For example, if a query includes a request for events with certain errors or error types, the processors 3406 of the node 3306 can parse the incoming data to identify different events, parse the different events to identify error fields or error keywords in the events, and determine the error type of the error. In some cases, this processing can be similar to the processing described in greater detail above with reference to the indexers 206 processing data to identify relevant results in the data stores 208.

When instructed to collect data, the processors 3406 of the node 3306 can be used to receive data from dataset sources or processing nodes. With continued reference to the error example, a collector partition, or processor 3406 can collect all of the errors of a certain type from one or more parsing partitions or processors 3406. For example, if there are seven possible types of errors coming from a particular dataset source, a collector partition could collect all type 1 errors (or events with a type 1 error), while another collector partition could collect all type 2 errors (or events with a type 2 error), etc.

When instructed to join results from multiple datasets, the processors 3406 of the node 3306 can be used to receive data corresponding to two different datasets and combine or further process them. For example, if data is being retrieved from an external data source and a data store 208 of the indexers 206, a join partition could be assigned to compare and collate data from the different data stores in order to aggregate the results.

When instructed to communicate results to a particular destination, the processors 3406 of the node 3306 can be used to prepare the data for communication to the destination and then communicate the data to the destination. For example, in communicating the data to a particular destination, the node 3306 can communicate with the particular destination to ensure the data will be received. Once communication with the destination has been established, the partition can begin sending the data to the destination. As described in greater detail below, in some embodiments, multiple partitions of a node (or different nodes) can be assigned to communicate data to a particular destination. Furthermore, the nodes 3306 can be instructed to transform the data so that the destination can properly understand and store the data. Furthermore, the nodes can communicate the data to multiple destinations. For example, one copy of the data may be communicated to the query coordinator 3304 and another copy can be communicated to the query acceleration data store 3308.

The system 3301 is scalable to accommodate any number of worker nodes 3306. As such, the system 3301 can scale to accommodate any number of distributed data systems upon which a search query can be applied and the search results can be returned to the search head and presented in a concise or comprehensive way for an analyst to obtain insights into bid data that is greater in scope and provides deeper insights compared to existing systems.

11.1.1. Serialization/Deserialization

In some cases, the serialization/deserialization module 3412 can generate and transmit serialized event groups. An event group can include the following information: number of events in the group, header information, event information, and changes to the cache or cache deltas. The serialization/deserialization module 3412 can identify the differences between the pieces of information using a type code or token. In certain cases, the type code can be in the form of a type byte. For example, prior to identifying header information, the serialization/deserialization module 3412 can include a header type code indicating that header information is to follow. Similarly, type codes can be used to identify event data or cache deltas.

The header information can indicate the number and order of fields in the events, as well as the name of each field. Similarly, the event information for each event can include the number of fields in the event, as well as the value for that field. The cache deltas can identify changes to make to the cache relied upon to serialize/deserialize the data.

As part of generating the group and serializing the data, the serialization/deserialization module 3412 can determine the number of events to group, determine the order and field names for the fields in the events of the group, parse the events, determine the number of fields for each event, identify and serialize serializable field values in the event fields, and identify cache deltas. In some cases, the serialization/deserialization module 3412 performs the various tasks in a single pass of the data, meaning that it performs the identification, parsing, and serializing during a single review of the data. In this manner, the serialization/deserialization module 3412 can operate on streaming data and avoid adding delay to the serialization/deserialization process.

In some embodiments, an event group includes an identifier indicating the number of events in the group followed by a header type code and a number of fields indicating the number of fields in the events. For each field designated by the header, the event group can include a type code indicating whether the field name is already stored in cache or a type code indicating that the field name is included. Depending on the type code, the event group can include an identifier or the field name. For example, if the type code indicates the field name is stored in cache (e.g., a cache code), an identifier can be included to enable a receiving component to lookup the field name using the cache. If the type code indicates the field name is not stored in cache (e.g., a data code), the name of the field name can be included.

Similar to the header information, for each event in the event group, the event group can include number of fields in the event. For each field of the event, the event group can include a type code indicating whether the field name is already stored in cache or a type code indicating that the field name is included.

As mentioned above, the event group can also include cache delta information. The cache delta information can include a cache delta type code indicating that the cache is to be changed, a number of new entries, and a number of dropped entries. For each new entry the cache delta information can include the data or string being cached, and an identifier for the data. For each entry being dropped, the cache delta information can include the identifier of the cache entry to be dropped.

As a non-limiting example, consider the following portions of events:

ronnie.sv.splunk.com, access_combined, SALE, World of Cheese, 14.95 ronnie.sv.splunk.com, access_combined, NO SALE, World of Cheese, 16.75 ronnie.sv.splunk.com, access_combined, SALE, World of Cheese ronnie.sv.splunk.com, access_combined, SALE, Fondue Warrior, 20.95

In serializing the above-referenced events, the serialization/deserialization module 3412 can determine that the field names for the events are source, sourcetype, sale_type, company name, and price and that this information is not in cache. The serialization/deserialization module 3412 can then generate the following event group:

| | 4 (number of events) | |
|---|---|---|
| Header_Code | 5 (number of fields) | Data_Code "source" |
| | | Data_Code "sourcetype" |
| | | Data_Code "sale_type" |
| | | Data_Code "company name" |
| | | Data_Code "price" |
| Cache_Delta_Code | 5 (entries to add) | "source" x15 |
| | | "sourcetype" x16 |
| | | "sale_type" x17 |
| | | "company name" x18 |
| | | "price" x19 |
| | 0 (entries to drop) | |
| Event_Code | 5 (number of fields in event) | Data_Code "ronnie.sv.splunk.com" |
| | | Data_Code "access_combined" |
| | | Data_Code "SALE" |
| | | Data_Code "World of Cheese" |
| | | Data_Code "14.95" |
| Cache_Delta_Code | 5 (number of new entries) | "ronnie.sv.splunk.com" x21 |
| | | "access_combined" x22 |
| | | "SALE" x23 |
| | | "World of Cheese" x24 |
| | | "14.95" x25 |
| | 0 (entries to drop) | |
| Event_Code | 5 (number of fields in event) | Cache_Code x21 |
| | | Cache_Code x22 |
| | | Data_Code "NO SALE" |
| | | Cache_Code x24 |
| | | Data_Code "16.75" |
| Cache_Delta_Code | 2 (entries to add) | "NO SALE" x26 |
| | | "16.75" x27 |
| | 0 (entries to drop) | |
| Event_Code | 4 (number of fields in event) | Cache_Code x21 |
| | | Cache_Code x22 |
| | | Cache_Code x23 |
| | | Cache_Code x24 |
| Event_Code | 5 (number of fields in event) | Cache_Code x21 |
| | | Cache_Code x22 |
| | | Cache_Code x23 |
| | | Data_Code "World of Cheese" |
| | | Data_Code "20.95" |
| Cache_Delta_Code | 2 (number of new entries) | "World of Cheese" |
| | | "20.95" |
| | 1 (entry to drop) | x25 |

By generating the group, the serialization/deserialization module 3412 can reduce the amount of data communicated for each group. For example, instead of transmitting the string "ronnie.sv.splunk.com" each time, the serialization/deserialization module 3412 serializes it and then communicates the cache ID thereafter.

Entries can be added or dropped using a variety of techniques. In some cases, every new field value is cached. In certain cases, a field value is cached after it has been identified a threshold number of times. Similarly, an entry can be dropped after a threshold number of events or event groups have been processed without the particular value being identified. As a non-limiting example, the serialization/deserialization module 3412 can track X values at a time in a cache C and track up to Y values at a time that are not cached and how many time those values have been identified in a candidate set D. When a value is received, if it is in the cache C, then the identifier can be returned. If the value is not in the cache C, then it can be added to D. If Y has been reached in D, then the least recently used value can be dropped. If the count of the value in D satisfies a threshold T, then it can be moved to the cache C and receive an identifier. If the size of C is more than X, then the least recently used value in C can be dropped.

In some embodiments, the cache is built as the data is processed, and changes are transmitted as they occur. For example, the receiver can start with an empty cache, and apply each delta as it comes along. As mentioned above, each delta can have two sections: new entries, and dropped entries. In certain embodiments, the receiver (or deserializer) does not drop cache entries until told to do so, otherwise, it may not be able interpret identifiers received from the serializer. In such embodiments, the serializer performs cache maintenance by informing the deserializer when to drop entries. Upon receipt of such a command, the deserializer can remove the identified entries.

11.2. Search Process Master

As mentioned above, the search process master 3302 can perform various functions to reduce the workload of the search head 210. For example, the search process master 3302 can parse an incoming query and allocate the query to a particular query coordinator 3304 for execution or spawn an additional query coordinator 3304 to execute the query. In addition, the search process master 3302 can track and store information regarding the system 3301, queries, external data stores, etc., to aid the query coordinator 3304 in processing and executing a particular query. In some embodiments, the search process master 3302.

In some cases, the search process master 3302 can determine whether a query coordinator 3304 should be spawned based on user information. For example, for data protection or isolation, the search process master 3302 can spawn query coordinators 3304 for different users. In addition, the search process master 3302 can spawn query coordinators 3304 if it determines that a query coordinator 3304 is over utilized.

In some cases, to accomplish these various tasks the search process master 3302 can include a workload advisor 3310, workload catalog 3312, node monitor 3314, and dataset compensation module 3316. Although illustrated as being a part of the search process master 3302, it will be understood that any one or any combination of these components can be implemented separately or included in one or more query coordinators 3304. Furthermore, although illustrated as individual components, it will be understood that any one or any combination of the workload advisor 3310, workload catalog 3312, node monitor 3314, and dataset compensation module 3316 can be implemented by the same machine, processor, or computing device.

As a brief introduction, the workload advisor 3310 can be used to provide resource allocation recommendations to a query coordinator 3304 for processing queries, the workload catalog 3312 can store data related to previous queries, the node monitor 3314 can receive information from the worker nodes 3306 regarding a current status and/or utilization rate of the nodes 3306, and the dataset compensation module 3316 can be used by the query coordinator 3304 to enhance interactions with external data sources.

11.2.1 Workload Catalog

The workload catalog 3312 can store relevant information to aid the workload advisor 3310 in providing a resource allocation recommendation to a query coordinator 3304. As queries are received and processed by the system 3301, the workload catalog 3312 can store relevant information about the queries to improve the workload advisor's 3310 ability to recommend the appropriate amount of resources for each query. For example, the system 3301 can track any one or any combination of the following data points about a query: which dataset sources were accessed, what was accessed in each dataset source (particular tables, buckets, etc.), the amount of data retrieved from the dataset sources (individually and collectively), the time taken to obtain the data from the dataset sources, the number of nodes 3306 used to obtain the data from each dataset source, the utilization rate of the nodes 3306 while obtaining the data from the dataset source, the number of transformations or phases (processing, collecting, reducing, joining, branching, etc.) performed on the data obtained from the dataset sources, the time to complete each transformation, the number of nodes 3306 assigned to each phase, the utilization rate of each node 3306 assigned to the particular phase, the processing performed by the query coordinator 3304 on results (individual or aggregatee), time to store or deliver results to a particular destination, resources used to store/deliver results, total time to complete query, time of day of query request, etc. Furthermore, the workload catalog can include identifying information corresponding to the datasets with which the system interacts (e.g., indexers, common storage, ingested data buffer, external data sources, query acceleration data store, etc.). This information can include, but is not limited to, relationships between datasets, size of dataset, rate of growth of dataset, type of data, selectivity of dataset, provider of dataset, indicator for private information (e.g., personal health information, etc.), trustworthiness of a dataset, dataset preferences, etc.

The workload catalog 3312 can collect the data from the various components of the system 3301, such as the query coordinator 3304, worker nodes 3306, indexers 206, etc. For example, for each task performed by each node 3306, the node 3306 can report relevant timing and resource utilization information to the query coordinator 3304 or directly to the workload catalog 3312. Similarly, the query coordinator 3304 can report relevant timing, usage, and data information for each phase of a search, each transformation of data, or for a total query.

Using the information collected in the workload catalog 3312, the workload advisor 3310 can estimate the compute cost to perform a particular data transformation or query, or to access a particular dataset. Further, the workload advisor can determine the amount of resources (nodes, memory, processors, etc.) to recommend for a query in order to provide the results within a particular amount of time.

11.2.2 Node Monitor

The node monitor 3314 can also store relevant information to aid the workload advisor 3310 in providing a resource allocation recommendation. For example, the node monitor 3314 can track and store information regarding any one or any combination of: total number of processors or nodes in the system 3301, number of processors or nodes that are not available or not functioning, number of available processors or nodes, utilization rate of the processors or nodes, number of worker nodes, current tasks being completed by the worker nodes 3306 or processors, estimated time to complete a task by the nodes 3306 or processors, amount of available memory, total memory in the system 3301, tasks awaiting execution by the nodes 3306 or processors, etc.

The node monitor 3314 can collect the relevant information by communicating with the monitoring module 3410 of each node 3306 of the system 3301. As described above, the monitoring modules 3410 of each node 3306 can report relevant information about the node state and utilization rate. Using the information from the node monitor 3314, the workload advisor 3310 can ascertain the general state of any particular processor, node, or the system 3301, and determine the number of nodes 3306 or processors 3306 available for a particular task or query.

11.2.3 Dataset Compensation

As discussed above, the external data sources 3318 with which the system 3301 can interact vary significantly. For example, some external data source may have processing capabilities that can be used to perform some processing on the data that resides there prior to communicating the data to the nodes 3306. In addition, the external data sources 3318 may support parallel reads from multiple partitions. Conversely, other external data sources 3318 may not be able to perform much, if any, processing on the data contained therein and/or may only be able to provide serial reads from a single partition. Additionally, each external data source 3318 may have particular requirements for interacting with it, such as a particular API, throttling requirements, etc. Further, the type and amount of data stored in each external data source 3318 can vary significantly. As such, the system's 3301 interaction with the different external data sources 3318 can vary significantly.

To aid the system 3301 in interacting with the different external data sources 3318, the dataset compensation model 3316 can include relevant information related to each external data source 3318 with which the system 3301 can interact. For example, the dataset compensation model 3316 can include any one or any combination of: the amount of data stored in an external data source 3318, the type of data stored in an external data source, query commands supported by an external data source (e.g., aggregation, filtering ordering), query translator to translate a query into tasks supported by an external data source, the file system type and hierarchy of the external data source 3318, number of partitions supported by an external data source 3318, endpoint locations (e.g., location of processing nodes or processors), throttling requirements (e.g., number and rate at which requests can be sent to the external data source), etc.

The information about each external data source 3318 can be collected in a variety of ways. In some cases, some of the information about the external data source 3318 can be received when a customer sets up the external data source 3318 for use with the system 3301. For example, a customer can indicate the type of external data source 3318 e.g., MySQL, PostgreSQL, and Oracle databases; NoSQL data stores like Cassandra, Mongo DB, cloud storage like Amazon S3 HDFS, etc. Based on this information, the system 3301 can determine certain characteristics about the external data store 3318, such as whether it supports multiple partitions.

In addition, as discussed herein, different dataset sources have different capabilities. For example, not only can different datasets sources support a different number of partitions, but the dataset sources can support different functions. For example, some dataset sources may be capable of data aggregation, filtering, or ordering, etc., while others may not be. The dataset compensation module 3316 can store the capabilities of the different dataset sources to aid in providing a seamless experience to users.

In certain cases, the system 3301 can collect relevant information about an external data source by communicating with it. For example, the query coordinator 3304 or a worker node 3306 can interact with the external data source 3318 to determine the number of partitions available for accessing data. In some cases, the number of available partitions may change as computing resources on the external data source 3318 become available or unavailable, etc. In addition, when the system 3301 accesses the external data source 3318 as part of a query it can track relevant information, such as the tables or amount of data accessed, tasks that the external data source was able to perform, etc. Similarly, the system 3301 can interact with an external data source 3318 to identify the endpoint that will handle any subqueries and its location. The endpoint and endpoint location may change depending on the subquery that is to be run on the external data source. Accordingly, in some embodiments, the system 3301 can request endpoint information with each query that is to access the particular external data source.

Using the information about the external data sources 3318, a query coordinator 3304 can determine how to interact with it and how to process data obtained from the external data source 3318. For example, if an external data source 3318 supports parallel reads, the query coordinator 3304 can allocate multiple partitions to read the data from the external data source 3318 in parallel. In some embodiments, the query coordinator 3304 can allocate sufficient partitions or processors 3406 to establish a 1:1 relationship with the available partitions at the external data source 3318. Similarly, if the external data source 3318 can perform some processing of the data, the query coordinator 3304 can use the information from the dataset compensation module 3316 to translate the query into commands understood by the external data source 3318 and push some processing to the external data source 3318, thereby reducing the amount of system 3301 resources (e.g., nodes 3306) used to process the query.

Furthermore, in some cases, using the dataset compensation module 3316, the query coordinator can determine the amount of data in the different external data sources that will be accessed by a particular query. Using that information, the query coordinator 3304 can intelligently interact with the external data sources 3318. For example, if the query coordinator 3304 determines that data with similar characteristics in two external data sources are to be accessed and the data from each will eventually be combined, the query coordinator 3304 can first interact with or query the external data source 3318 that includes less data and then using information gleaned from that data prepare a more narrowly tailored query for the external data source 3318 with more data.

As a specific example, suppose a user wants to identify the source of a particular error using information from an HDFS data source and an Oracle data source, but does not know what the error is or what generated it. To do so, the user enters a query that includes a request to identify errors generated within a particular timeframe and stored in an HDFS data source and an Oracle data source and then correlate the errors based on the error source. Based on the query, the query coordinator 3304 determines that a union operation is to be performed on the data from the HDFS data source and the Oracle data source based on the source of the errors.

Additionally, suppose that the dataset compensation module 3316 has identified the HDFS data source as being relatively small and identified the Oracle data source as being significantly larger than the HDFS data source. Accordingly, based on the information in the dataset compensation module 3316, the query coordinator 3304 can instruct the nodes 3306 to first intake and process the data from the HDFS data source. Suppose that by doing so, the nodes 3306 determine that the HDFS data source only includes fifty types of errors in the specified timeframe from ten sources. Accordingly, using that information, the query coordinator 3304 can instruct the nodes 3306 to limit the intake of data from the Oracle data store based on the error type and/or the source based on the error types and sources identified by first analyzing the HDFS data source.

As such, the query coordinator 3304 can reduce the amount of data requested by the Oracle data store and the amount of processing needed to obtain the relevant result. For example, if the Oracle data store included two hundred error types from one hundred sources, the query coordinator 3304 avoided having to intake and process the data from all one hundred sources. Instead only the data from sources that matched the ten sources from the HDFS data source were requested and processed by the nodes 3306.

11.3. Query Coordinator

The query coordinator(s) 3304 can act as the primary coordinator or controller for queries that are assigned to it by the search head 210 or search process master 3302. As such, the query coordinator can process a query, identify the resources to be used to execute the query, control and monitor the nodes to execute the query, process aggregate results of the query, and provide finalized results to the search head 210 or search process master 3302 for delivery to a client device 404.

11.3.1. Query Processing

Upon receipt of a query, the query coordinator 3304 can analyze the query. In some cases analyzing the query can include verifying that the query is semantically correct or performing other checks on the query to determine whether it is executable by the system. In addition, the query coordinator 3304 can analyze the query to identify the dataset sources that are to be accessed and to define an executable search process. For example, the query coordinator 3304 can determine whether data from the indexers 206, external data sources 3318, query acceleration data store 3308, or other dataset sources (e.g., common storage, ingested data buffers, etc.) are to be accessed to obtain the relevant datasets.

As part of defining the executable search process, the query coordinator 3304 can identify the different entities that can perform some processing on the datasets. For example, the query coordinator 3304 can determine what portion(s) of the query can be delegated to the indexers 206, nodes 3306, and external data sources 3318, and what portions of the query can be executed by the query coordinator 3304, search process master 3302, or search head 210. For tasks that can be completed by the indexers 206, the query coordinator 3304 can generate task instructions for the indexers 206 to complete, as well as instructions to route all results from the indexers 206 to the nodes 3306. For tasks that can be completed by the external data sources 3318, the query coordinator 3304 can use the dataset compensation module 3316 to generate task instructions for the external data sources 3318 and to determine how to set up the nodes 3306 to receive data from the external data sources 3318.

Figure 35:
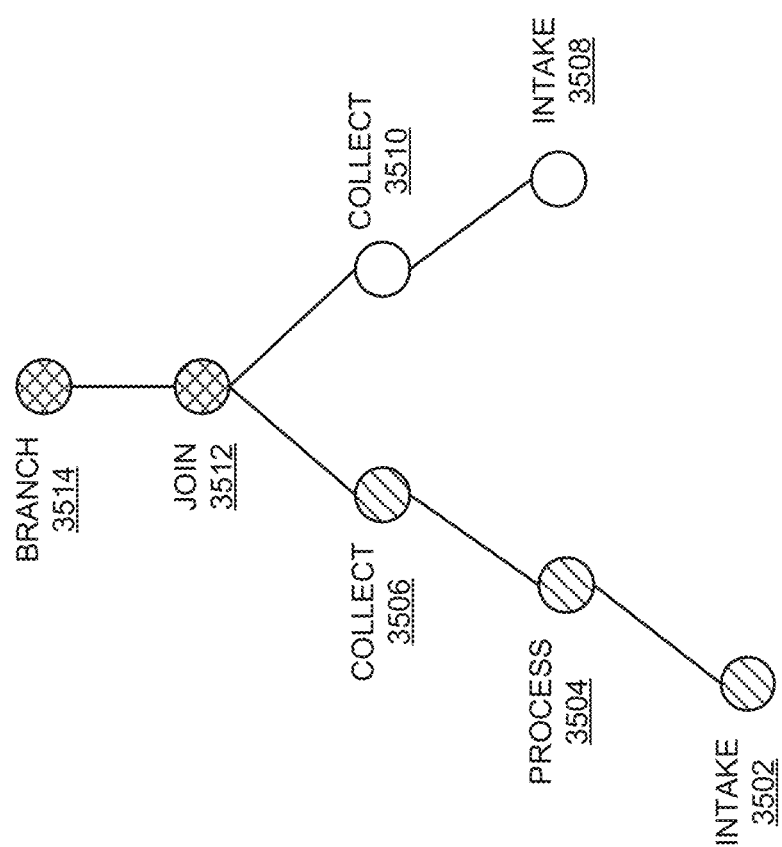
FIG. 35 is a diagram illustrating an embodiment of a DAG.

In addition, as part of defining the executable search process, the query coordinator 3304 can generate a logical directed acyclic graph (DAG) based on the query. FIG. 35 is a diagram illustrating an embodiment of a DAG 2000 generated as part of a search process. In the illustrated embodiment, the DAG 2000 includes seven vertices and six edges, with each edge directed from one vertex to another, such that by starting at any particular vertex and following a consistently-directed sequence of edges the DAG 2000 will not return to the same vertex.

Here, the DAG 2000 can correspond to a topological ordering of search phases, or layers, performed by the nodes 3306. As such, a sequence of the vertices can represent a sequence of search phases such that each edge is directed from earlier to later in the sequence of search phases. For example, the DAG 2000 may be defined based on a search string for each phase or metadata associated with a search string. The metadata may be indicative of an ordering of the search phases such as, for example, whether results of any search string depend on results of another search string such that the later search string must follow the former search string sequentially in the DAG 2000.

In the illustrated embodiment of FIG. 35, the DAG 2000 can correspond to a query that identifies data from two dataset sources that are to be combined and then communicated to different locations. Accordingly, the DAG 2000 includes intake vertices 3502, 3508, a process vertex 3504, collect vertices 3506, 3510, a join vertex 3512, and a branch vertex 3514.

Each vertex 3502, 3504, 3506, 3508, 3510, 3512, 3514 can correspond to a search phase performed by one or more partitions or processors 3406 of one or more nodes 3306 on a particular set of data. For example, the intake, process, and collect vertices 3502, 3504, 3506 can correspond to data search phases, or transformations, on data received from a first dataset source. More specifically, the intake phase or vertex 3502 can correspond to one or more partitions that receive data from the first dataset source, the process phase 3504 can correspond to one or more partitions that process the data received by the partitions at the intake phase 3502, and the collect phase 3506 can correspond to one or more partitions that collect the results of the processing by the partitions in the process phase 3504.

Similarly, the intake and collect vertices 3508, 3510 can correspond to data search phases performed by one or more partitions or processors 3406 on data received from a second dataset source. For example, the intake phase 3508 can correspond to one or more partitions that receive data from the second dataset source and the collect phase 3510 can correspond to one or more partitions that collect the results from the partitions in the intake phase 3508.

The join and branch phases 3512, 3514 can correspond to data search phases performed by one or more partitions or processors 3406 on data received from the different branches of the DAG 2000. For example, the join phase 3512 can correspond to one or more partitions that combine the data received from the partitions in the collect phases 3506, 3510. The branch phase 3514 can correspond to one or more partitions that communicate results of the join phase 3512 to one or more destinations. For example, the partitions in the branch phase 3514 can communicate results of the query to the query coordinator 3304, an external data source 3318, accelerated data source 3308, ingested data buffer, etc.

It will be understood that the number, order, and types of search phases in the DAG 2000 can be determined based on the query. As a non-limiting example, consider a query that indicates data is to be obtained from common storage and an Oracle database, collated, and the results sent to the query coordinator 3304 and an HDFS data store. In this example, in response to determining that the common storage do not provide processing capabilities, the query coordinator 3304 can generate vertices 3502, 3504, 3506 indicating that an intake phase 3502, process phase 3504, and collect phase 3506 will be used to process the data from the common storage sufficiently to be combined with data from the Oracle database. Similarly, based on a determination that the Oracle database can perform some processing capabilities, the query coordinator can generate vertices 3508, 3510 indicating that an intake phase 3508 and collect phase 3510 will be used to sufficiently process the data from the Oracle database for combination with the data from the common storage.

The query coordinator 3304 can further generate the join phase 3512 based on the query indicating that the data from the Oracle database and common storage is to be collated or otherwise combined (e.g., joined, unioned, etc.). In addition, based on the query indicating that the results of the combination are to be communicated to the query coordinator 3304 and the HDFS data store, the query coordinator 3304 can generate the branch phase 3514. As mentioned above, in each phase, the query coordinator 3304 can allocate one or more partitions to perform the particular search phase.

It will be understood that the DAG 2000 is a non-limiting example of the search phases that can be included as part of a search process. In some cases, depending on the query, the DAG 2000 can include fewer or more phases of any type. For example, the DAG 2000 can include fewer or more intake phases depending on the number of dataset sources. Additionally, depending on the particular processing requirements of a query, the DAG 2000 can include multiple processing, collect, join, union, stats, or branch phases, in any order.

In addition to determining the number and types of search phases for a search process, the query coordinator 3304 can calculate the relative cost of each phase of the search process, determine the amount of resources to allocate for each phase of the search process, generate tasks and instructions for particular nodes to be assigned to a particular search process, generate instructions for dataset sources, generate tasks for itself and/or the search head 210, etc.

To calculate the relative cost of each phase of the search process and determine the amount of resources to allocate for each phase of the search process, the query coordinator 3304 can communicate with the workload advisor 3310, workload catalog 3312, and/or the node monitor 3314. As described previously, the workload advisor 3310 can use the data collected in the workload catalog 3312 to determine the cost of a query or an individual transformation or search phase of a search process and to provide a resource allocation recommendation. Furthermore, the workload advisor 3310 can use the data from the node monitor module 3314 to determine the available resources in the system 3301. Using this information, the query coordinator 3304 can determine the cost for each search phase, the amount of resources available for allocation, and the amount of resources to allocate for each search phase.

In determining the amount of resources to allocate for each search phase, the query coordinator 3304 can also generate the tasks and instructions for each node 3306. The instructions can include computer executable instructions that when executed by the node 3306 cause the node 3306 to perform the task assigned to it by the query coordinator 3304. For example, for nodes 3306 that are to be assigned to an intake phase 3502, 3508, the query coordinator 3304 can generate instructions on how to access a particular dataset source, what instructions are to be sent to the dataset source, what to do with the data received from the dataset source, where do send the received data, how to perform any load balancing or other tasks assigned to it, etc. For nodes 3306 that are to process data in the process phase 3504, the query coordinator 3304 can generate instructions indicating how to parse the received data, relevant fields or keywords that are to be identified in the data, what to do with the identified field and keywords, where to send the results of the processing, etc. Similarly, for nodes 3306 in the collect phases 3506, 3510, join phase 3512, or branch phase 3514, the query coordinator 3304 can generate task instructions so that the nodes 3306 are able to perform the task assigned to that particular phase. The task instructions can tell the nodes 3306 what data they are to process, how they are to process the data, where they are to route the results of the processing, either between each other or to another destination. In some cases, the query coordinator 3304 can generate the tasks and instructions for all partitions and send the instructions to all of the allocated partitions. Between them, the partitions can determine or assign which partition will execute the different instructions and tasks. The instructions sent to the partitions can include additional parameters, such as a preference to use partitions on the same machine for subsequent tasks. Such instructions can help reduce the amount of data communicated over the network, etc.

In some embodiments, to generate instructions for the dataset sources, the query coordinator 3304 can use the dataset compensation module 3316. As described previously, the dataset compensation module 3316 can include relevant data about external data sources including, inter alia, processing abilities of the external dataset sources, number of partitions of the external dataset sources, instruction translators, etc. Using this information, the query coordinator 3304 can determine what processing to assign to the external data sources, and generate instructions that will be understood by the external data sources. In addition, the query coordinator 3304 can have access to similar information about other dataset sources and/or communicate with the dataset sources to determine their processing capabilities and how to interact with them (non-limiting examples: number of partitions to use, processing that can be pushed to the dataset source, etc.). Similarly, the query coordinator 3304 can determine how to interact with the dataset destinations so that the datasets can be properly sent to the correct location in a manner that the destination can store them correctly.

In some cases, the query coordinator 3304 can interact with one partition of the external dataset source using multiple partitions. For example, the query coordinator 3304 can allocate multiple partitions to interact with a single partition of the external dataset source. The query coordinator 3304 can break up a query or a subquery into multiple parts. Each part can be assigned to a different partition, which can communicate the subqueries to the partition of the external dataset source. Thus, unbeknownst to the external dataset source, it can concurrently process data from a single query.

Furthermore, the query coordinator 3304 can determine the order for conducting the search process. As mentioned above, in some embodiments, the query coordinator 3304 can determine that processing data from one dataset source could speed up the search process as a whole (non-limiting example: using data from one dataset source to generate a more targeted search of another dataset source). Accordingly, the query coordinator 3304 can determine that one or more search phases are to be completed first and then based on information obtained from the search phase, additional search phases are to be initiated. Similarly, other optimizations can be determined by the query coordinator 3304. Such optimizations can include, but are not limited to, pushing processing to the edges (e.g., to external data sources, etc.), identifying fields in a query that are key to the query and reducing processing based on the identified field (e.g., if a relevant field is identified in a final processing step, use the field to narrow the set of data that is searched for earlier in the search process), allocating the query to nodes that are physically close to each other or on the same machine, etc.

11.3.2. Query Execution and Node Control

Once the query is processed and the search scheme determined, the query coordinator 3304 can initiate the query execution. In some cases, in initiating the query, the query coordinator 3304 can communicate the generated task instructions to the various locations that will process the data. For example, the query coordinator 3304 can communicate task instructions to the indexers 206, based on a determination that the indexers 206 are to perform some amount of processing on the dataset. Similarly, the query coordinator 3304 can communicate task instructions to the nodes 3306, external data sources 3318, query acceleration data store 3308, common storage, and/or ingested data buffer, etc.

In some embodiments, rather than communicating with the various dataset sources, the query coordinator 3304 can generate task instructions for the nodes 3306 to interact with the dataset sources such that the dataset sources receive any task instructions from the nodes 3306 as opposed to the query coordinator 3304. For example, rather than communicating the task instructions directly to a dataset source, the query coordinator 3304 can assign one or more nodes 3306 to communicate task instructions to the external data sources 3318, indexers 206, or query acceleration data store 3308. In certain embodiments, the query coordinator 3304 can communicate the same search scheme or task instructions to the nodes 3306 or partitions of the nodes 3306 that have been allocated for the query. The allocated nodes 3306 or partitions of the nodes 3306 can then assign different groups to perform different portions of the search scheme.

Upon receipt of the task instructions, the dataset sources and nodes 3306 can begin operating in parallel. For example, if task instructions are sent to the indexers 206 and to the nodes 3306, both can begin executing the instructions in parallel. In executing the task instructions, the nodes 3306 can organize their processors 3406 or partitions according to task instructions. For example, some of the nodes 3306 can allocate one or more partitions or processors 3406 as part of an intake phase, another partition as part of a processing phase, etc. In some cases, all partitions of a node 3306 can be allocated to the same task or to different tasks. In certain embodiments, it can be beneficial to allocate partitions from the same node 3306 to different tasks so that data routed between the partitions to reduce network traffic between nodes 3306 or machines 3402.

Figure 36:
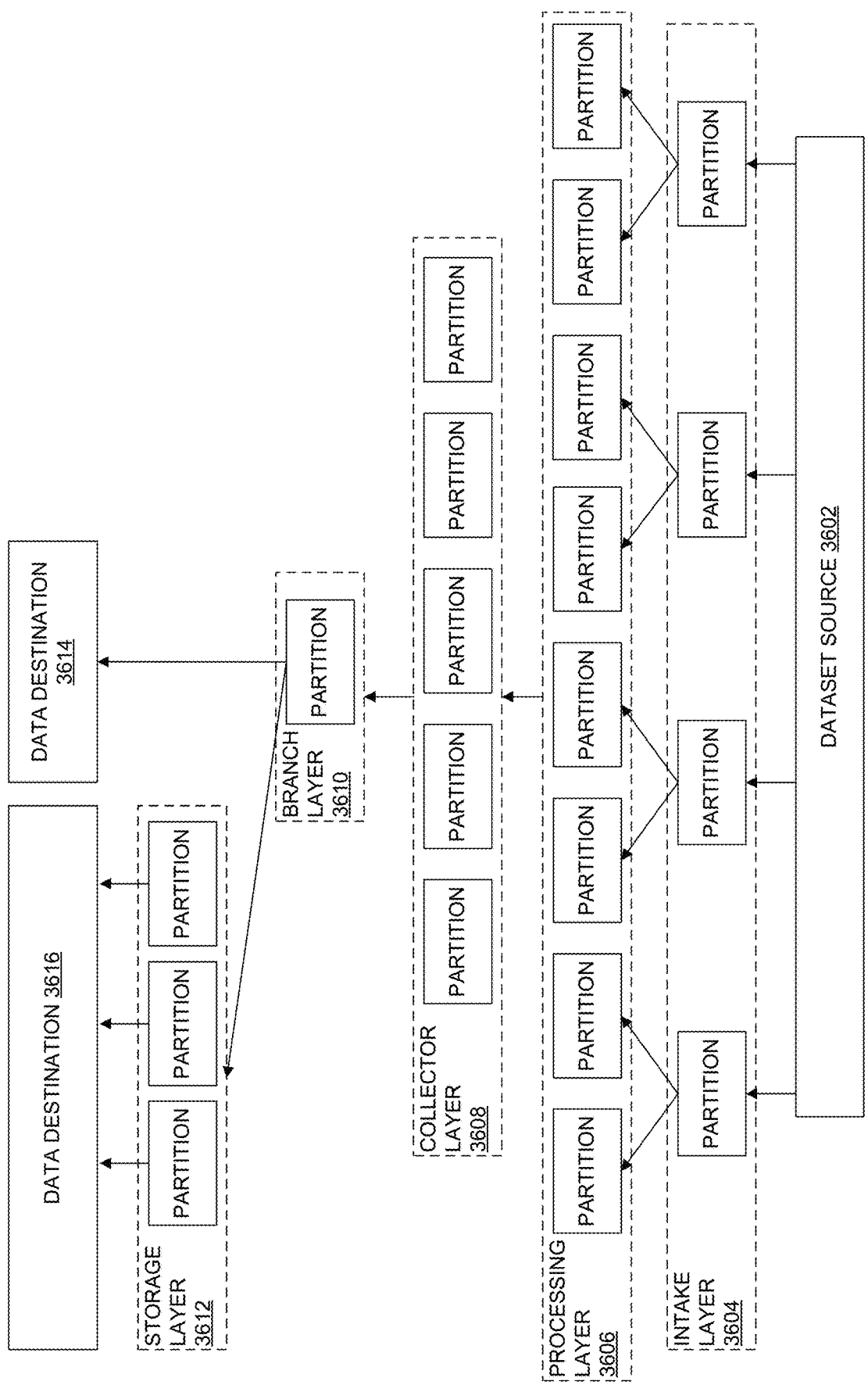
FIG. 36 is a block diagram illustrating an embodiment of partitions implementing various search phases of a DAG.

FIG. 36 is a block diagram illustrating an embodiment of layers of partitions implementing various search phases of a query. In some cases, the layers can correspond to search phases in a DAG, such as the DAG 2000 described in greater detail above. In the illustrated embodiment of FIG. 36, based on task instructions received from the query coordinator 3304, the nodes 3306 have arranged various partitions to perform different search phases on data coming from a dataset source 3602. As described previously, the dataset source 3602 can correspond to indexers 206, external data sources 3318, the query acceleration data store 3308, common storage, an ingested data buffer, or other source of data from which the nodes 3306 can receive data.

As referenced in FIG. 35, the partitions in each layer can interact with the data based on task instructions received by the query coordinator 3304. In the illustrated embodiment of FIG. 36, the partitions in the intake layer 3604 can receive the data from the dataset source 3602 and communicate the received data to the partitions in the processing layer 3606 in a load-balanced fashion. The partitions in the processing layer 3606 can process the data based on the task instructions, which were generated based on the query, and provide the results of their processing to the partitions in the collector layer 3608. Similarly, upon completing their assigned task, the partitions in the collector layer 3608 can communicate the results of their processing to the branch layer 3610. In the illustrated embodiment of FIG. 36, the branch layer 3610 communicates the results received from the partitions in the collector layer 3608 to a first dataset destination 3614 and to partitions in a storage layer 3612 for storage in a second dataset destination 3616. It will be understood that fewer or more layers can be included as desired, and can be based on the content of the particular query being executed. Furthermore, it will be understood that the layers can correspond to different map-reduce procedures or commands. For example, as described herein, in the illustrated embodiments, the processing layer 3606 can correspond to a map procedure and the collector layer 3608 can correspond to a reduce procedure. However, as described herein, it will be understand that various layers can correspond to map or reduce procedures.

In the illustrated embodiment, four partitions have been allocated to the intake layer 3604, eight partitions have been allocated to the processing layer 3606, five partitions have been allocated to the collector layer 3608, one partition has been allocated to the branch layer 3610, and three partitions have been allocated to the storage layer 3612. However, it will be understood that fewer or more partitions can be assigned to any layer as desired and fewer or additional layers can be included. For example, based on a query that indicates multiple dataset sources are to be accessed, the query coordinator 3304 can allocate separate intake, processing, and collector layers 3604, 3606, 3608 for each dataset source 3602. Furthermore, based on the query commands, the query coordinator can allocate additional layers, such as a join layer to combine data received from multiple dataset sources, etc.

In determining the number of partitions for each search phase or layer, the query coordinator 3304 can use the workload advisor 3310 and/or dataset compensation module 3316. For example, the workload advisor 3310 can use historical data about executing individual search phases in queries to recommend an allocation scheme that provides sufficient resources to process the query in a reasonable amount of time.

In some cases, the query coordinator 3304 can allocate partitions for the intake layer 3604 and storage layer 3612 based on information about the number of partitions available for reading from the dataset source 3602 and writing data to the dataset destination 3616, respectively. The query coordinator 3304 can obtain the information about the dataset source 3602 or dataset destination 3616 from a number of locations, including, but not limited to, the workload catalog 3312, the dataset compensation module 3316, or from the dataset source 3602 or dataset destination 3616 itself. The information can inform the query coordinator 3304 as to the number of partitions available for reading from the dataset source 3602 and writing to the dataset destination 3616.

In some cases, the query coordinator 3304 can allocate partitions in the intake layer 3604 or the storage layer 3612 to have a one-to-one, one-to-many, or many-to-one correspondence with partitions in the dataset source 3602 or dataset destination 3616, respectively. The correspondence between the partitions in the intake or storage layer 3604, 3612 and the partitions in the dataset source or destination 3602, 3616, respectively, can be based on a threshold number of partitions, the type of the dataset source/destination, etc.

In certain embodiments, if the query coordinator 3304 determines that the dataset source 3602 (or dataset destination 3616) has a number of partitions that satisfies a threshold number of partitions or determines that the number of partitions of the dataset source 3602 (or dataset destination 3616) can be matched without overextending the nodes 3306, the query coordinator 3304 can allocate partitions in the intake layer 3604 (or storage layer 3612) to have a one-to-one correspondence to partitions in the dataset source 3602 (or dataset destination 3616). The number of partitions that satisfy the threshold number of partitions can be determined based on the number of nodes 3306 or processors 3406 in the system 3301, the number of available nodes 3306 in the system 3301, scheduled usage of nodes 3306, etc. Accordingly, the threshold number of partitions can be dynamic depending on the status of the processors 3406, nodes 3306, or the system 3301. For example, if a large number of nodes 3306 are available, the threshold number of nodes can be larger, whereas, if only a relatively small number of nodes 3306 are available, the threshold number can be smaller. Similarly, if the workload advisor 33010 expects a large number of queries in the near term it can allocate fewer partitions to an individual query. Alternatively, if the workload advisor 33010 does not expect many queries in the near term it can allocate a greater number of partitions to an individual query.

In some cases, the query coordinator 3304 can determine whether to match the number of partitions in the dataset source 3602 or dataset destination 3616 with corresponding partitions in the intake layer 3604 or storage layer 3612, respectively, based on the type of the dataset source 3602 or dataset destination 3616. For example, the query coordinator 3304 can determine there should be a one-to-one correspondence of intake layer 3604 partitions to dataset source 3602 partitions (or storage layer 3612 partitions to dataset destination 3616 partitions) when the dataset source 3602 (or dataset destination 3616) is an external data source or ingested data buffer and that there should be a one-to-multiple correspondence when the dataset source 3602 (or dataset destination 3616) is indexers 206, common storage, query acceleration data store 3308, etc.

As a non-limiting example, if the dataset source 3602 is an external data source or ingested data buffer with four partitions and the query coordinator 3304 determines that it can support a one-to-one correspondence, the query coordinator 3304 can allocate four partitions to the intake layer 3604, as illustrated in FIG. 36. Similarly, if the dataset destination 3616 is an external data source or ingested data buffer with three partitions and the query coordinator 3304 determines that it can support a one-to-one correspondence, the query coordinator 3304 can allocate three partitions to the storage layer 3612, as illustrated in FIG. 36. As another non-limiting example, if the dataset source 3602 (or dataset destination 3616) is indexers 206, common storage, or query acceleration data stores 3308 with hundreds of potential partitions, and/or the query coordinator 3304 determines that it cannot support a one-to-one correspondence, it can allocate the four partitions to the intake layer 3604 (or the three partitions to the storage layer 3612), as illustrated in FIG. 36.

In addition, during intake of the data from the dataset source 3602, the query coordinator 3304 can dynamically adjust the number of partitions in the intake layer 3604. For example, if an additional partition of the dataset source 3602 becomes available or one of the partitions becomes unavailable, the query coordinator 3304 can dynamically increase or decrease the number of partitions in the intake layer 3604. Similarly, if the query coordinator 3304 determines that the intake layer 3604 is taking too much time and additional resources are available, it can dynamically increase the number of partitions in the intake layer 3604. In addition, if the query coordinator 3304 determines that additional resources are available or become unavailable, it can dynamically increase or decrease the number of partitions in the intake layer 3604. Similarly, the query coordinator can dynamically adjust the number of partitions in the storage layer 3612.

Similar to the intake layer 3604 and storage layer 3612, the query coordinator 3304 can allocate partitions to the different search layers 3606, 3608, 3610 based on information about the query and information in the workload catalog 3312. For example, the query may include requests to process the data in a way that is resource intensive. As such, the query coordinator 3304 can allocate a larger number of partitions to the processing layer 3606 or use multiple processing layers 3606 to process the data. In some cases, more partitions can be allocated to the search layers for queries of larger datasets.

In addition, during execution of the query, the query coordinator 3304 can monitor the partitions in the search layers 3606, 3608, 3610 and dynamically adjust the number of partitions in each depending on the status of the individual partitions, the status of the nodes 3306, the status of the query, etc. In some cases, the query coordinator 3304 can determine that a significant number of results are being sent to a particular partition in the collector layer 3608. As such, the query coordinator 3304 can allocate an additional partition to the collector layer and/or instruct the partitions in the processing layer 3606 to distribute the results in a different manner to reduce the load on the particular partition in the collector layer. In certain cases, the query coordinator 3304 can determine that a partition in the processing layer 3606 is not functioning or that there is significantly more data coming from the dataset source 3602 than was anticipated. Accordingly, the query coordinator 3304 can allocate an additional partition 3606 to the processing layer. Conversely, if the query coordinator 3304 determines that some of the partitions are underutilized, then it can deallocate it from a particular layer and make it available for other queries, or assign it to a different layer, etc. Accordingly, the query coordinator 3304 can dynamically allocate and deallocate resources to intake and process the data from the dataset source 3602 in a time-efficient and performant manner.

As a non-limiting example, consider a query that includes a request to count the number of different types of errors in data stored in an external data source within a timeframe and to return the results to the user and store the results in the query acceleration data store 3308. Based on the query, the query coordinator 3304 can generate a DAG that includes the intake layer 3604, processing layer 3606, collector layer 3608, branch layer 3610, and storage layer 3612. Additionally, based on a determination that the external data source supports four partitions, the query coordinator 3304 allocates four partitions to the intake layer 3604. In addition, based on the expected amount of data to be processed, the query coordinator 3304 allocates eight partitions to the processing layer 3606, and five partitions to the collector layer 3608. Further, based on resource availability and the determination that the dataset destination is the query acceleration data store 3308, which can support more than a threshold number of partitions, the query coordinator 3304 allocates three partitions to the storage layer 3612. The task instructions for each partition of each search layer can be sent to the nodes 3306, which assign processors 3406 to the various tasks and partitions.

During execution, the partitions in the intake layer 3604 communicate with the dataset source 3602 to receive the relevant data from the partitions of the dataset source 3602. The data is then communicated to the partitions in the processing layer 3606. In the illustrated embodiment, each partition of the intake layer 3604 communicates data in a load-balanced fashion to two partitions in the processing layer 3606. The partitions in the processing layer 3606 can parse the incoming data to identify events that include an error and identify the type of error.

The partitions in the processing layer 3606 can determine the results to the partitions in the collector layer 3608. For example, each partition in the processing layer 3606 can apply a modulo five to the error type in order to attempt to equally separate the results between the five partitions in the collector layer 3608. As such, for each error type, a partition in the collector layer 3608 can include the total count of errors for that type. Depending on the query, in some cases, the partitions in the collector layer 3608 can also include the event that included the particular error type.

The partitions in the collector layer 3608 can send the results to the partition in the branch layer 3610. The partition in the branch layer 3610 can communicate the results to the query coordinator 3304, which can communicate the results to the search head or client device. In addition, the branch layer 3610 can communicate the results to the partitions in the storage layer 3612, which communicate the results in parallel to the query acceleration data store 3308.

Throughout the execution of the query, the query coordinator 3304 can monitor the partitions in the intake layer 3604, processing layer 3606, collector layer 3608, branch layer 3610, and storage layer 3612. If one partition becomes unavailable or becomes overloaded, the query coordinator 3304 can allocate additional resources. Similarly, if a partitions is not being utilized, the query coordinator 3304 can deallocated it from a layer. For example, if a partition on the external data source becomes unavailable, a corresponding partition in the intake layer 3604 may no longer receive any data. As such, the query coordinator 3304 can deallocate that partition from the intake layer 3604. In some embodiments, any change in state of a partition can be reported to the node monitor module 3314, which can be used by the query coordinator to allocate resources.

11.3.3. Result Processing

Once the nodes 3306 have completed processing the query or particular results of the query, they can communicate the results to the query coordinator 3304. The query coordinator 3304 can perform any final processing. For example, in some cases, the query coordinator 3304 can collate the data from the nodes 3306. The query coordinator 3304 can also send the results to the search head 210 or to a dataset destination. For example, based on a command (non-limiting example "into"), the query coordinator 210 can store results in the query acceleration data store 3308, an external data source 3318, an ingested data buffer, etc. In addition, the query coordinator 3304 can communicate to the search process master 3302 that the query has been completed. In the event all queries assigned to the query coordinator 3304 have been completed, the query coordinator can shut down or enter a hibernation state and await additional queries assigned to it by the search process master 3302.

11.4. Query Acceleration Data Store

As described herein, a query can indicate that information is to be stored (e.g., stored in non-volatile or volatile memory) in the query acceleration data store 3308.

As described above, the query acceleration data store 3308 can store information (e.g., datasets) sourced from other dataset sources, such as, external data sources 3318, indexers 206, ingested data buffers, indexers, and so on. For example, when providing a query, a user can indicate that particular information is to be stored in the query acceleration data source 3308 (e.g., cached). The information can include the results of the query, partial results of the query, data (processed or unprocessed) received from another dataset source via the nodes 3306, etc. Subsequently, the data intake and query system 3301 can cause queries directed to the particular information to utilize the query acceleration data store 3308. In this way, the stored information can be rapidly accessed and utilized.

As an example, the query can indicate that information is to be obtained from the external data sources 3318. Since the external data sources 3318 may have potentially high latency, response times to particular queries, the query can be constrained according to characteristics of the external data sources 3318. For example, particular external data sources 3318 may be limited in their processing speed, network bandwidth, and so on, such that the worker nodes 3306 are required to wait longer for information. As described herein, the query can therefore specify that particular information from the external data sources 3318 (or other dataset sources) be stored in the query acceleration data store 3308. Subsequent queries that utilize this particular information can then be executed more quickly. For example, in subsequent queries the worker nodes 3306 can obtain the particular information from the query acceleration data store 3308 rather than from the external data source 3318.

An example query can be of a particular form, such as:
Query=<from [dataset source]>|<[logic]>|[accelerated directive]

In the above example, the query indicates that information is to be obtained from a dataset source, such as an external data source 3318. Optionally, the query can indicate particular tables, documents, records, structured or unstructured information, and so on. As described above, the data intake and query system 3301 can process the query and determine that the external data source is being referenced. The next element of the query (e.g., a request parameter) includes logic to be applied to the data from the external data source, for example the logic can be implemented as structured query language (SQL), search processing language (SPL), and so on. As described above, the worker nodes 3306 can obtain the requested data, and apply the logic to obtain information to be provided in response to the query.

In the above example query, an accelerated directive is included. For example, the accelerated directive can be a particular term (e.g., "into query acceleration data store"), symbol, and so on, included in the query. The accelerated directive can optionally be manually included in the query (e.g., a user can type the directive), or automatically. As an example of automatically including the directive, a user can indicate in a user interface associated with entering queries that information is to be stored in the query acceleration data store 3308. As another example, the user's client device or query coordinator 3304 can determine that information is to be stored in the data store 3308. For example, the query can be analyzed by the client device or query coordinator 3304, and based on a quantity of information being requested, the client device or query coordinator 3304 can automatically include the accelerated directive (e.g., if greater than a threshold quantity is being requested, the directive can be included). Optionally, the data intake and query system 3301 can automatically store the requested information in the query acceleration data store 3308 without an accelerated directive in a received query. For example, the query system 3301 can automatically store data in the query acceleration data store 3308 based on a user ID (e.g., always store results for a particular user or based on recent use by the user), time of day (e.g., store results for queries made at the beginning or end of a work day, etc.), dataset source identity (e.g., store data from dataset source identified has having a slower response time, etc.), network topology (e.g., store data from sources on a particular network given the network bandwidth, etc.) etc. Although the above example shows the accelerated directive at the end of the query, it will be understood that it can be placed at any part of it. In some cases, the result of the command preceding the accelerated directive corresponds to the data stored in the query acceleration data store 3308.

Upon receipt of the query, the data intake and query system 3301 (e.g., the query coordinator 3304) can cause the requested information from the dataset source to be stored in the query acceleration data store 3308. Optionally, the query acceleration data store 3308 can receive the processed result associated with the query (e.g., from the worker nodes 3306). The query acceleration data store 3308 can then provide the processed result to the query coordinator 3304 to be relayed to the requesting client. However, to increase response times, the worker nodes 3306 can provide processed information to the query acceleration data store 3308, and also to the query coordinator 3304. In this way, the query acceleration data store 3308 can store (e.g., in low latency memory, or longer latency memory such as solid state storage or disk storage) the received processed information, while the query coordinator 3304 can relay the received processed information to the requesting client.

The processed result may be stored by the query acceleration data store 3308 in association with an identifier, such that the information can be easily referenced. For example, the query acceleration data store 3308 can generate a unique identifier upon receipt of information for storage by the worker nodes 3306. For subsequent queries, the query coordinator 3304 can receive the identifier, such that the query coordinator 3304 can replace the initial portion with the unique identifier.

In some embodiments, the query coordinator 3304 can generate the unique identifier. For example, the query coordinator can receive information from the query acceleration data store 3308 indicating that it stored information. The query coordinator 3304 can maintain a mapping between generated unique identifiers and datasets, partitions, and so on, that are associated with information stored by the query acceleration data store 3308. The query coordinator 3304 may optionally provide a unique identifier to the requesting client, such that a user of the requesting client can re-use the unique identifier. For example, the user's client can present a list of all such identifiers along with respective queries that are associated with the identifier. The user can select an identifier, and generate a new query that is based on an associated query.

In addition to storing the data or the results or partial results of the query, the query acceleration data store can store additional information regarding the results. For example, the query acceleration data store can store information about the size of the dataset, the query that resulted in the dataset, the dataset source of the dataset, the time of the query that resulted in the dataset, the time range of data that was processed to produce the dataset, etc. This information can be used by the system 3301 to prompt a user as to what data is stored and can be used in the query acceleration data store, determine whether portions of an incoming query correspond to datasets in the accelerate data store, etc. This information can also be stored in the workload catalog 3312, or otherwise made available to the query coordinator 3304.

Subsequently, for received queries that reference the processed information, the query coordinator 3304 can cause the worker nodes 3306 to obtain the information from the query acceleration data store 3308.

For example, a subsequent query can be

Query=<from [dataset source]>|<[logic]>|<subsequent_logic>

In the above query, the query coordinator 3304 can determine that some portion of the data referenced in the query corresponds to data that is stored in the query acceleration data store 3308 (previously stored data) or was previously processed according to a prior query (e.g., the query represented above) and the results of the processing stored in the query acceleration data store 3308. For example, the query coordinator 3304 can compare the query to prior queries, and any portion of data that was referenced in a prior query. The query coordinator 3304 can then instruct the worker nodes 3306 to obtain the previously stored data or the results of processing the data from the query acceleration data store 3308. In some cases, the subsequent query can include an explicit command to obtain the data or results from the query acceleration data store 3308.

Obtaining the previously stored data or results of processing the data provides multiple technical advantages. For example, the worker nodes 3306 can avoid having to reprocess the data, and instead can utilize the prior processed result. Additionally, the worker nodes 3306 can more rapidly obtain information from the query acceleration data store 3308 than, for example, the external data sources 3318. As an example, the worker nodes 3306 may be in communication with the query acceleration data store 3308 via a direct connection (e.g., virtual networks, local area networks, wide area networks). In contrast, the worker nodes 3306 may be in communication with the external data sources 3318 via a global network (e.g., the internet).

As a non-limiting example, in some cases, a first query can indicate that data from a dataset source is to be stored in the query acceleration data store 3308 with minimal processing by the nodes 3306 or without transforming the data from the dataset source. A subsequent query can indicate that the data stored in the query acceleration data store 3308 is to be processed or transformed, or combined with other data or results to obtain a result. In certain cases, the first query can indicate that data from the dataset source is to be transformed and the results stored in the query acceleration data store 3308. The subsequent query can indicate that the results stored in the query acceleration data store 3308 are to be further processed, combined with data or results from another dataset source, or provided to a client device.

Furthermore, in certain embodiments, the worker nodes 3306 can perform any additional processing on the results obtained from the query acceleration data store 3308, while concurrently obtaining data from another dataset source and processing it to obtain additional results. In some cases, the results stored in the query acceleration data store 3308 can be communicated to a client device while the nodes concurrently obtain data from another dataset source and process it to obtain additional results. By obtaining, processing, and displaying the results of the previously processed data while concurrently obtaining additional data to be processed, processing the additional data, and communicating the results of processing the additional data, the system 3301 can provide a more effective responsiveness to a user and decrease the response time of a query.

For the subsequent query identified above, the 'subsequent_logic' can be applied by the worker nodes 3306 based on the processed result stored by the query acceleration data store 3308. The result of the subsequent query can then be provided to the query coordinator 3304 to be relayed to the requesting client.

The query acceleration data store 3308, as described herein, can maintain information in low-latency memory (e.g., random access memory) or longer-latency memory. That is, the query acceleration data store 3308 can cause particular information to spill to disk when needed, ensuring that the data store 3308 can service large amounts of queries. Since, in some implementations, the low-latency memory can be less than the longer-latency memory, the query acceleration data store 3308 can determine which datasets are to be stored in the low-latency memory. In some embodiments, to provide this functionality, the query acceleration data store 3308 can be implemented as a distributed in-memory data store with spillover to disk capabilities. For example, the data in the query acceleration data store 3308 can be stored in low-latency volatile memory, and in the event, the capacity of the low-latency volatile memory is reached, the data can be stored to disk.

In some embodiments, the query acceleration data store 3308 can utilize one or more storage policies to swap datasets between low-latency memory and longer-latency memory. Additionally, the query acceleration data store 3308 can flush particular datasets after determining that the datasets are no longer needed (e.g., the user can indicate that the datasets can be flushed, or a threshold amount of time can pass).

As an example of a storage policy, the query acceleration data store 3308 can store a portion of a dataset in low-latency memory while storing a remaining portion in longer-latency memory. In this way, the query acceleration data store 3308 can have faster access to at least a portion each user's dataset. If a subsequent query is received by the data intake and query system 3301 that references a stored dataset, the query acceleration data store 3308 can access the portion of the stored dataset that is in low-latency memory. Since this access is, in general, with low-latency, the query acceleration data store 3308 can quickly provide this information to the worker nodes 3306 for processing. At a same, or similar, time, the query acceleration data store 3308 can access the longer-latency memory and obtain a remaining portion of the stored dataset. The worker nodes 3306 can then receive this remaining portion for processing. Therefore, the worker nodes 3306 can quickly respond to a request, based on the initially received portion from the low-latency memory. In this way, the user can receive search results in a manner that appears to be in 'real-time', that is, the search results can be provided in a less than a threshold amount of time (e.g., 1 second, 5 seconds, 10 seconds). Subsequent search results can then be provided upon the worker nodes 3306 processing the portion from the longer-latency memory.

The above-described storage policy may be based on a size of the dataset(s). For example, an example dataset may be less than a threshold, and the query acceleration data store 3308 may store the entirety of the dataset in low-latency memory. For an example dataset greater than the threshold, the data store 3308 may store a portion in low-latency memory. As the size of the dataset increases, the query acceleration data store 3308 can store an increasingly lesser sized portion in low-latency memory. In this way, the data store 3308 can ensure that large data sets do not consume the low-latency memory.

While the queries described above indicate, a first query that includes an accelerated directive, and a second query that includes the first query (e.g., as an initial portion), optionally the data intake and query system 3301 can receive a first query that is a combination of the first query and second query described above. For example, an example initial query can be Query=<from [dataset source]>|<[logic]>|[accelerated directive]|<subsequent_logic>

The above example query indicates that the data intake and query system 3301 is to obtain information from an example dataset source (e.g., external data source 3318), process the information, and cause the query acceleration data store 3308 to store the processed information. In addition, subsequent logic is to be applied to the processed information, and the result provided to the requesting client 404a-404n.

FIG. 36 illustrates a branch layer 3610, which for the example query described above, can be utilized to provide information both to the query acceleration data store 3308 and the data destination 3614 (e.g., the requesting client). For example, subsequent to the worker nodes 3306 obtaining processed information (e.g., based on the dataset source and logic), the worker nodes 3306 can provide the processed information for storage in the query acceleration data store 3308 while continuing to process the query (e.g., apply the subsequent logic). That is, the worker nodes 3306 can bifurcate the data (e.g., at branch layer 3610), such that the query acceleration data store 3308 can store partial results while the worker nodes 3306 service the query and provide the completed results to the query coordinator 3304. Optionally, another query may be received that references the partial results in the data store 3308, and one or more worker nodes 3306 may access the data store 3308 to service the other query. For example, the other query may be processed at a same time as the above-described example initial query.

Received queries can further indicate multiple datasets stored by the query acceleration data store 3308. For example, a first query can indicate that first information is to be obtained (e.g., from external data source 3318, indexers 206, common storage, and so on) and stored in the query acceleration data store 3308 as a first dataset. Additionally, a second query can indicate that second information is to be obtained and stored in the data store 3308 as a second dataset. Subsequent queries can then reference the stored first dataset and second dataset, such that logic can be applied to both the first and second dataset via rapid access to the query acceleration data store 3308.

Furthermore, queries can reference datasets stored by the query acceleration data store 3308, and also datasets to be obtained from another dataset source (e.g., from external data source 3318, indexers 206, ingested data buffer, and so on). For particular queries, the data intake and query system 3301 may be able to provide results (e.g., search results) from the query acceleration data store 3308 while datasets is being obtained from another dataset source. Similarly, the system 3301 may be able to provide results from the data store 3308 while data obtained from another dataset source is being processed.

As an example, a first query can cause a dataset to be stored in the query acceleration data store 3308, with the dataset being from an external data source 3318 and representing records from a prior time period (e.g., one hour). Subsequently, a second query can reference the stored dataset and further cause newer records to be obtained from the external data source (e.g., a subsequent hour). For this second query, particular logic indicated in the second query can enable the data intake and query system 3301 to provide results to a requesting client based on the stored dataset in the query acceleration data store 3308. As an example, the second query can indicate that the system 3301 is to search for a particular name. The worker nodes 3306 can obtain stored information from the query acceleration data store 3308, and identify instances of the particular name.

This access to the query acceleration data store 3308, as described above, can be low-latency. For example, the query acceleration data store 3308 may have a portion of the stored information in low-latency memory, such as RAM or volatile memory, and the worker nodes 3306 can quickly obtain the information and identify instances of the particular name. These identified instances can then be relayed to the requesting client. Similarly, the query acceleration data store 3308 may have a different portion of the stored information in longer-latency memory, and can similarly identify instances of the particular name to be provided to the requesting client.

The above-described worker node 3306 interactions with the query acceleration data store 3308 can occur while information is being obtained, or processed, from the external data source 3318 referenced by the second query. In this way, the requesting client can view search results, for example search results based on the dataset stored by the query acceleration data store 3308, while subsequent search results are being determined (e.g., search results based on information from a different dataset source). Furthermore, and as described above, the dataset being obtained from the other dataset source can be provided to the query acceleration data store 3308 for storage, for example, provided while the worker nodes 3306 apply logic to determine results from the obtained dataset.

To increase security of the datasets stored by the query acceleration data store, access controls can be implemented. For example, each dataset can be associated with an access control list, and the query coordinator 3304 can provide an identification of a requesting user to the worker nodes 3306 and/or query acceleration data store 3308. For example, the identification can be an authorization or authentication token associated with the user. The query acceleration data store 3308 can then ensure that only authorized users are allowed access to stored datasets. For example, a user who causes a dataset to be stored in the query acceleration data store 3308 (e.g., based on a provided query) can be indicated as being authorized (e.g., in an access control list associated with the dataset). Optionally, the user can indicate one or more other users as having access. Optionally, the data intake and query system 108 can utilize role-based access controls to allow any user associated with a particular role to access particular datasets. In this way, the stored information can be secure while enabling the query acceleration data store 3308 to service multitudes of users.

12.0. Query Data Flow

Figure 37:
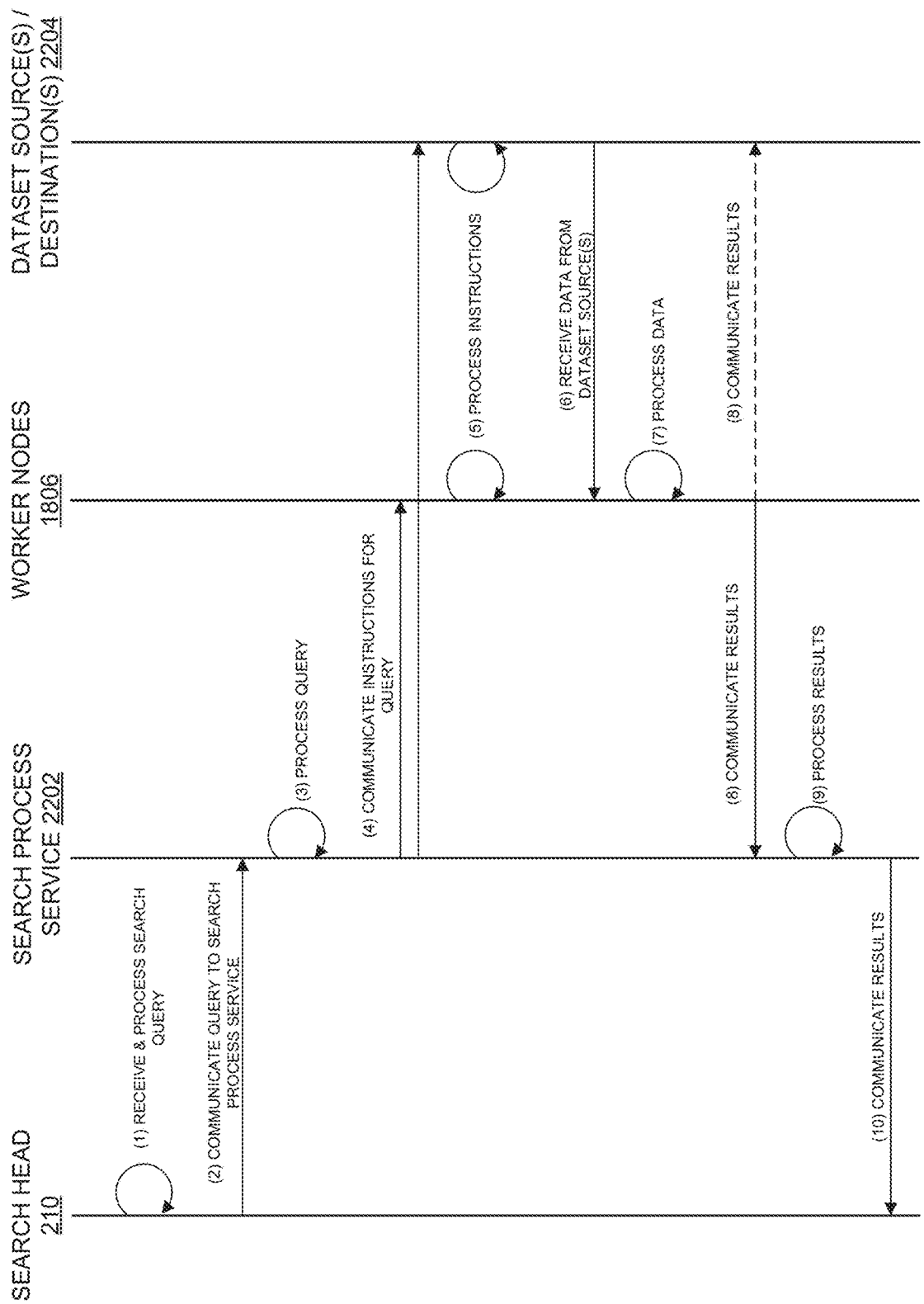
FIG. 37 is a data flow diagram illustrating an embodiment of communications between various components within the environment to process and execute a query.

FIG. 37 is a data flow diagram illustrating an embodiment of communications between various components within the environment 3300 to process and execute a query. At (1), the search head 210 receives and processes a query. At (2), the search head 210 communicates the query to the search process service 2202, which can refer to the search process master 3302 and/or query coordinator 3304.

At (3) the search process service processes the query. As described in greater detail above, as part of processing the query, the query coordinator 3304 can identify the dataset sources (e.g., external data sources 3318, indexers 206, query acceleration data store 3308, common storage, ingested data buffer, etc.) to be accessed, generate instructions for the dataset sources based on their processing capabilities or communication protocols, determine the size of the query, determine the amount of resources to allocate for the query, generate instructions for the nodes 3306 to execute the query, and generate tasks for itself to process results from the nodes 3306.

At (4), the query coordinator 3304 communicates the task instructions for the query to the worker nodes 3306 and/or the dataset sources 2202. As described above, in some embodiments, the query coordinator 3304 can communicate task instructions to the dataset sources 2202. In certain embodiments, the nodes 3306 communicate task instructions to the dataset sources 2202.

At (5), the nodes 3306 and/or dataset sources 2202 process the received instructions. As described in greater detail above, the instructions for the dataset sources 2202 can include instructions for performing certain transformations on the data prior to communicating the data to the nodes 3306, etc. As described in greater detail above, the instructions for the nodes 3306 can include instructions on how to access the relevant data, the number of search phases or layers to be generated, the number of partitions to be allocated for each search phase or layer, the tasks for the partitions in the different layer, data routing information to route data between the nodes 3306 and to the search process service 2202, etc. As such, based on the received instructions, the nodes 3306 can assign partitions to different layer and begin executing the task instructions.

At (6), the nodes 3306 receive the data from the dataset source(s). As described in greater detail above, the nodes 3306 can receive the data from one or more dataset sources 2202 in parallel. In addition, the nodes 3306 can receive the data from a dataset source using one or more partitions. The data received from the dataset sources 2202 can be semi-processed data based on the processing capabilities of the dataset source 2204 or it can be unprocessed data from the dataset source 2204.

At (7), the nodes 3306 process the data based on the task instructions received from the query coordinator 3304. As described in greater detail above, the nodes can process the data using one or more layers, each having one or more partitions assigned thereto. Although not illustrated in FIG. 37, it will be understood that the search process service 2202 can monitor the nodes 3306 and dynamically allocate resources based on the monitoring.

At (8), the nodes 3306 communicate the results of the processing to the query coordinator 3304 and/or to a dataset destination 2204. In some cases the dataset destination 2204 can be the same as the dataset source. For example, the nodes 3306 can obtain data from the ingested data buffer and then return the results of the processing to a different section of the ingested data buffer, or obtain data from the query acceleration data store 3308 or an external data source 3318 and then return the results of the processing to the query acceleration data store 3308 or external data source 3318, respectively. However, in certain embodiments, the dataset destination 2204 can be different from the dataset source 2204. For example, the nodes 3306 can obtain data from the ingested data buffer and then return the results of the processing to the query acceleration data store 3308 or an external data source 3318.

At (9), the search process service 2202 can perform additional processing, and at (10) the results can be communicated to the search head 210 for communication to the client device. In some cases, prior to communicating the results to the client device, the search head 210 can perform additional processing on the results.

It will be understood that the query data flow can include fewer or more steps. For example, in some cases, the search process service 2202 does not perform any further processing on the results and can simply forward the results to the search head 210. In certain embodiments, nodes 3306 receive data from multiple dataset sources 2204, etc.

13.0. Query Coordinator Flow

Figure 38:
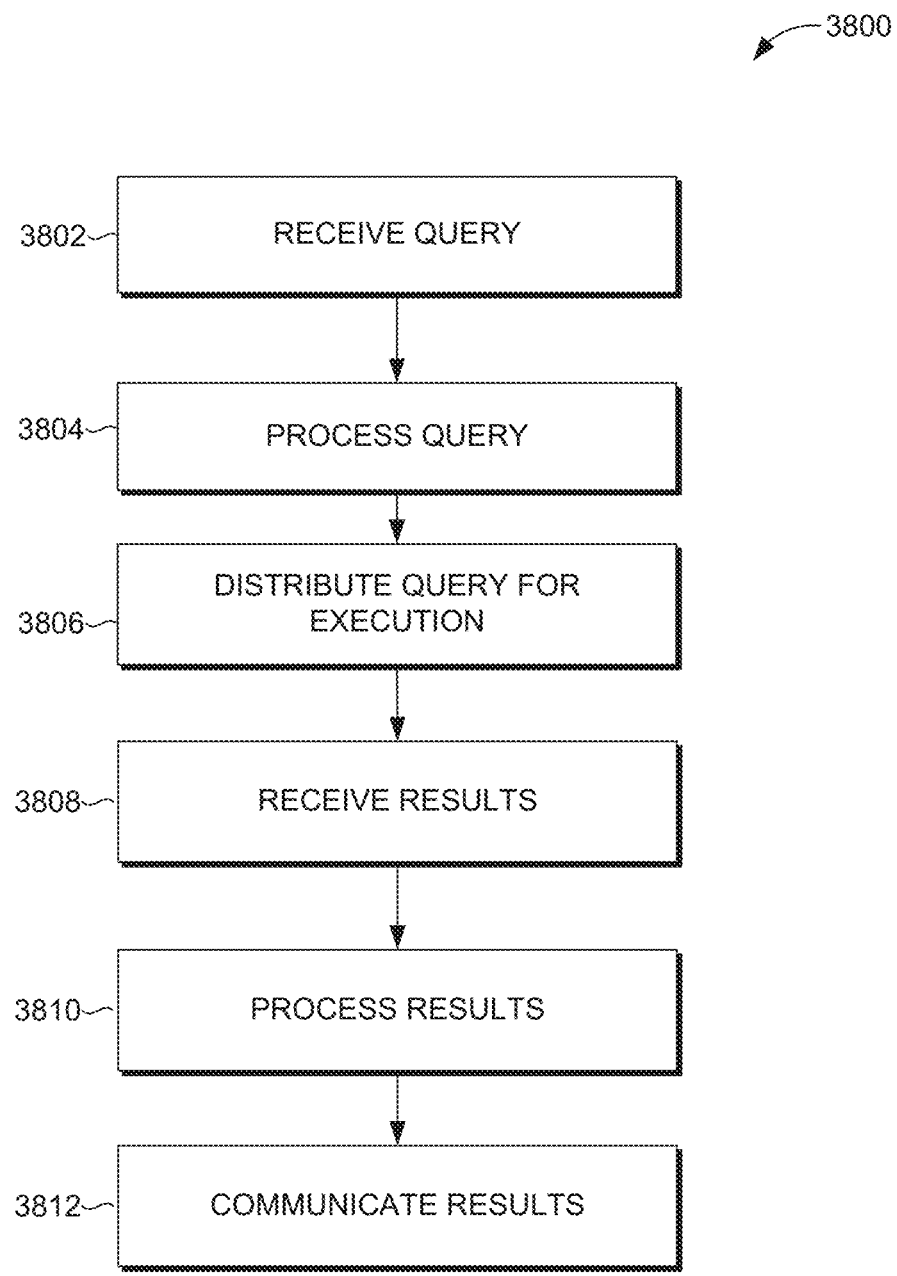
FIG. 38 is a flow diagram illustrative of an embodiment of a routine to provide query results.

FIG. 38 is a flow diagram illustrative of an embodiment of a routine 3800 implemented by the query coordinator 3304 to provide query results. Although described as being implemented by the query coordinator 3304, one skilled in the relevant art will appreciate that the elements outlined for routine 3800 can be implemented by one or more computing devices/components that are associated with the system 3301, such as the search head 210, search process master 3301, indexer 206, and/or worker nodes 3306. Thus, the following illustrative embodiment should not be construed as limiting.

At block 3802, the query coordinator 3304 receives a query. As described in greater detail above, the query coordinator 3304 can receive the query from the search head 210, search process master 3302, etc. In some cases, the query coordinator 3304 can receive the query from a client 404. The query can be in a query language as described in greater detail above. In some cases, the query received by the query coordinator 3304 can correspond to a query received and reviewed by the search head 210. For example, the search head 210 can determine whether the query was submitted by an authenticated user and/or review the query to determine that it is in a proper format for the data intake and query system 3301, has correct semantics and syntax, etc. In some cases, the search head 210 can run a daemon to receive search queries, and in some cases, spawn a search process, to communicate the received query to and receive the results from the query coordinator 3304 or search process master 3302.

At block 3804, the query coordinator 3304 processes the query. As described in greater detail above and as will be described in greater detail in FIG. 39, processing the query can include any one or any combination of: identifying relevant dataset sources and destinations for the query, obtaining information about the dataset sources and destinations, determining processing tasks to execute the query, determining available resources for the query, and/or generating a query processing scheme to execute the query based on the information. In some embodiments, as part of generating a query processing scheme, the query coordinator 3304 allocates multiple layers or search phases of partitions to execute the query. Each level of partitions can be given a different task in order to execute the query. For example, as described in greater detail above with reference to FIGS. 20 and 21, one level can be given the task of interacting with the dataset source and receiving data from the dataset source, another level can be tasked with processing the data received from the dataset source, a third level can be tasked with collecting results of processing the data, and additional levels can be tasked with communicating results to different destinations, storing the results in one or more dataset destinations, etc. The query coordinator 3304 can allocate as many or as few levels of partitions to execute the query.

At block 3806, the query coordinator 3304 distributes the query for execution. Distributing the query for execution can include any one or any combination of: communicating the query processing scheme to the nodes 3306, monitoring the nodes 3306 during the processing of the query, or allocating/deallocating resources based on the status of the nodes and the query, and so forth, described in greater herein.

At block 3808, the query coordinator 3304 receives the results. In some embodiments, the query coordinator 3304 receives the results from the nodes 3306. For example, upon completing the query processing scheme, or as a part of it, the nodes 3306 can communicate the results of the query to the query coordinator 3304. In certain cases, the query coordinator 3304 receives the results from the query acceleration data store, or indexers 206, etc. In some cases, the query coordinator 3304 receives the results from one or more components of the data intake and query system 3301 depending on the dataset sources used in the query.

At block 3810, the query coordinator 3304 processes the results. As described in greater detail above, in some cases, the results of a query cannot be finalized by the nodes 3306. For example, in some cases, all of the data must be gathered before the results can be determined. As a non-limiting example, for some cursored searches, the query coordinator 3304, a result cannot be determined until all relevant data has been collected by the worker nodes. In such cases, the query coordinator 3304 can receive the results from the worker nodes 3306, and then collate the results.

At block 3812, the query coordinator 3304 communicates the results. In some embodiments, the query coordinator 3304 communicates the results to the search head 210, such as a search process generated by the search to handle the query. In certain cases, the query coordinator 3304 communicates the results to the search process master 3302 or client device 404, etc.

It will be understood that fewer, more, or different blocks can be used as part of the routine 3800. In some cases, one or more blocks can be omitted. For example, in certain embodiments, the results received from nodes 3306 can be in a form that does not require any additional processing by the query coordinator 3304. In such embodiments, the query coordinator 3304 can communicate the results without additional processing. As another example, the routine 3800 can include monitoring nodes during execution of the query or query processing scheme, allocating or deallocating resources during the execution of the query, etc. Similarly, routine 3800 can include reporting completion of the query to a component, such as the search process master 3302, etc.

Furthermore, it will be understood that the various blocks described herein with reference to FIG. 38 can be implemented in a variety of orders. In some cases, the query coordinator 3304 can implement some blocks concurrently or change the order as desired. For example, the query coordinator 3304 can receive (3808), process (3810), and/or communicate results (3812) concurrently or in any order, as desired.

14.0. Query Processing Flow

Figure 39:
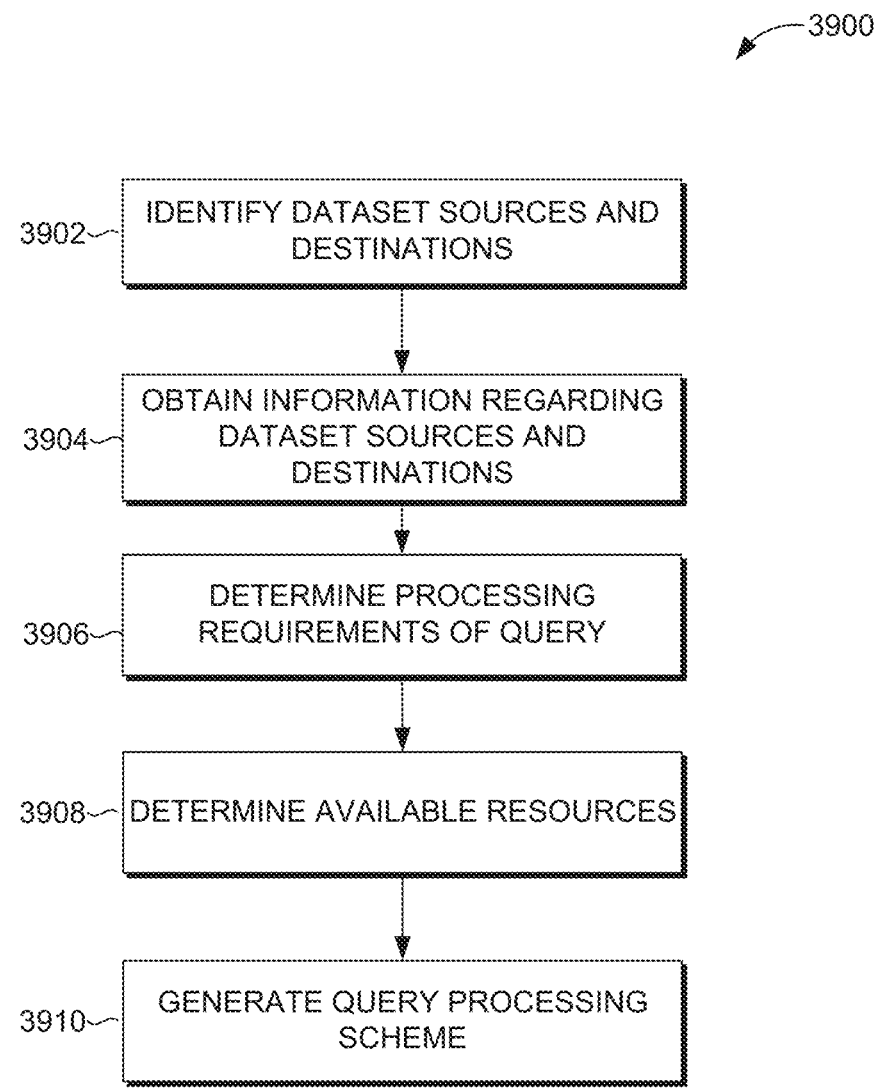
FIG. 39 is a flow diagram illustrative of an embodiment of a routine to process a query.

FIG. 39 is a flow diagram illustrative of an embodiment of a routine 3900 implemented by the query coordinator 3304 to process a query. Although described as being implemented by the query coordinator 3304, one skilled in the relevant art will appreciate that the elements outlined for routine 3900 can be implemented by one or more computing devices/components that are associated with the system 3301, such as the search head 210, search process master 3301, indexer 206, and/or worker nodes 3306. Thus, the following illustrative embodiment should not be construed as limiting.

At block 3902, the query coordinator 3304 identifies dataset sources and/or destinations for the query. In some cases, the query explicitly identifies the dataset sources and destinations that are to be used in the query. For example, the query can include a command indicating that data is to be retrieved from the query acceleration data store 3308, ingested data buffer, common storage, indexers, or an external data source. In certain cases, the query coordinator 3304 parses the query to identify the dataset sources and destinations that are to be used in the query. For example, the query may identify the name (or other identifier) of the location (e.g., my_index) of the relevant data and the query coordinator 3304 can use the name or identifier to determine whether that particular location is associated with the query acceleration data store 3308, ingested data buffer, common storage, indexers 206, or an external data source 3318.

In some cases, the query coordinator identifies the dataset source based on timing requirements of the search. For example, in some cases, queries for data that satisfy a timing threshold or are within a time period are handled by indexers or correspond to data in an ingested data buffer, as described herein. In some embodiments, data that does not satisfy the timing threshold or is outside of the time period are stored in common storage, query acceleration data stores, external data sources, or by indexers. For example, as described in greater detail herein, in some cases, the indexers fill hot buckets with incoming data. Once a hot bucket is filled, it is stored. In some embodiments hot buckets are searchable and in other embodiments hot buckets are not. Accordingly, in embodiments where hot buckets are searchable, a query that reflects a time period that includes hot buckets can indicate that the dataset source is the indexers, or hot buckets being processed by the indexers. Similarly, in embodiments where warm buckets are stored by the indexers, a query that reflects a time period that includes warm buckets can indicate that the dataset source is the indexers.

In certain embodiments, a query for data that satisfies the timing threshold or is within the time period can indicate that the ingested data buffer is the dataset source. Further, in embodiments, where warm buckets are stored in a common storage, a query for data that does not satisfy the timing threshold or is outside of the time period can indicate that the common storage is the dataset source. In some embodiments, the time period can be reflective of the time it takes for data to be processed by the data intake and query system 3301 and stored in a warm bucket. Thus, a query for data within the time period can indicate that the data has not yet been indexed and stored by the indexers 206 or that the data resides in hot buckets that are still being processed by the indexers 206.

In some embodiments, the query coordinator 3304 identifies the dataset source based on the architecture of the system 3301. As described herein, in some architectures, real-time searches or searches for data that satisfy the timing threshold are handled by indexers. In other architectures, these same types of searches are handled by the nodes 3306 in combination with the ingested data buffer. Similarly, in certain architectures, historical searches, or searches for data that do not satisfy the timing threshold are handled by the indexers. In other architectures, these same types of searches are handled by the nodes 3306 in combination with the common storage.

At block 3904 the query coordinator 3304 obtains relevant information about the dataset sources/destinations. The query coordinator 3304 can obtain the relevant information from a variety of sources, such as the workload advisor 3310, workload catalog 3312, dataset compensation module 3316, the dataset sources/destinations themselves, etc. For example, if the dataset source/destination is an external data source, the query coordinator 3304 can obtain relevant information about the external dataset source 3318 from the dataset compensation module or by communicating with the external data source 3318. Similarly, if the dataset source/destination is an indexer 206, common storage, query acceleration data store 3308, ingested data buffer, etc., the query coordinator can obtain relevant information by communicating with the dataset source/destination and/or the workload advisor 3310 or workload catalog 3312.

The relevant information can include, but is not limited to, information to enable the query coordinator 3304 to generate a search scheme with sufficient information to interact with and obtain data from a dataset source or send data to a dataset destination. For example, the relevant information can include information related to the number of partitions supported by the dataset source/destination, location of compute nodes at the dataset source/destination, computing functionality of the dataset source/destination, commands supported by the dataset source/destination, physical location of the dataset source/destination, network speed and reliability in communicating with the dataset source/destination, amount of information stored by the dataset source/destination, computer language or protocols for communicating with the dataset source/destination, summaries or indexes of data stored by the dataset source/destination, data format of data stored by the dataset source/destination, etc.

At block 3906, the query coordinator 3304 determines processing requirement for the query. In some cases, to determine the processing requirements, the query coordinator 3304 parses the query. As described previously, the workload catalog 3312 can store information regarding the various transformations or commands that can be executed on data and the amount of processing to perform the transformation or command. In some cases, this information can be based on historical information from previous queries executed by the system 3301. For example, the query coordinator 3304 can determine that a "join" command will have significant computational requirements, whereas a "count by" command may not. Using the information about the transformations included in the query, the query coordinator can determine the processing requirements of individual transformations on the data, as well as the processing requirements of the query.

At block 3908, the query coordinator 3304 determines available resources. As described in greater detail above, the nodes 3306 can include monitoring modules that monitor the performance and utilization of its processors. In some cases, a monitoring module can be assigned for each processor on a node. The information about the utilization rate and other scheduling information can be used by the query coordinator 3304 to determine the amount of resources available for the query.

At block 3910, the query coordinator 3304 generates a query processing scheme. In some cases, the query coordinator 3304 can use the information regarding the dataset sources/destinations, the processing requirements of the query and/or the available resources to generate the query processing scheme. As part of generating the query processing scheme, the query coordinator 3304 can generate instructions to be executed by the dataset sources/destinations, allocate partitions/processors for the query, generate instructions for the partitions/nodes, generate instructions for itself, generate a DAG, etc.

As described in greater detail above, in some embodiments, to generate instructions for the dataset sources/destinations, the query coordinator 3304 can use the information from the dataset compensation module 3316. This information can be used by the query coordinator 3304 to determine what processing can be done by an external data source, how to translate the commands or subqueries for execution to the external dataset source, the number of partitions that can be used to read data from the external dataset source, etc. Similarly, the query coordinator 3304 can generate instructions for other dataset sources, such as the indexers, query acceleration data store, common storage, etc. For example, the query coordinator 3304 can generate instructions for the ingested data buffer to retain data until it receives an acknowledgment from the query coordinator that the data from the ingested data buffer has been received and processed.

In addition, as described in greater detail above, to generate instructions for the processors/partitions, the query coordinator 3304 can determine how to break up the processing requirements of the query into discrete or individual tasks, determine the number of partitions/processors to execute the task, etc. In some cases, the determine how to break up the processing requirements of the query into discrete or individual tasks, the query coordinator 3304 can parse the query to its different portions of the query and then determine the tasks to use to execute the different portions.

The query coordinator 3304 can then use this information to generate specific instructions for the nodes that enable the nodes to execute the individual tasks, route the results of each task to the next location, and route the results of the query to the proper destination. The instructions for the nodes can further include instructions for interacting with the dataset sources/destinations. In some cases, instructions for the dataset sources can be embedded in the instructions for the nodes so that the nodes can communicate the instructions to the dataset sources/destinations. Accordingly, the instructions generated by the query coordinator 3304 for the nodes can include all of the information in order to enable the nodes to handle the various tasks of the query and provide the query coordinator with the appropriate data so that the query coordinator 3304 can finalize the results and communicate them to the search head 210.

In some cases, the query coordinator 3304 can use network topology information of the machines that will be executing the query to generate the instructions for the nodes. For example, the query coordinator 3304 can use the physical location of the processors that will execute the query to generate the instructions. As one example, the query coordinator 3304 can indicate that it is preferred that the processors assigned to execute the query be located on the same machine or close to each other.

In some embodiments, the instructions for the nodes can be generated in the form of a DAG, as described in greater detail above. The DAG can include the instructions for the nodes to carry out the processing tasks included in the DAG. In some cases, the DAG can include additional information, such as instructions on how to select partitions for the different tasks. For example, the DAG can indicate that it is preferable that a partition that will be receiving data from another partition be on the same machine, or nearby machine, in order to reduce network traffic.

In addition to generating instructions for the dataset sources/destinations and the nodes, the query coordinator 3304 can generate instructions for itself. In some cases, the instructions generated for itself can depend on the query that is being processed, the capabilities of the nodes 3306, and the results expected from the nodes. For example, in some cases, the type of query requested may require the query coordinator 3304 to perform more or less processing. For example, a cursored search may require more processing by the query coordinator 3304 than a batch search. Accordingly, the query coordinator 3304 can generate tasks or instructions for itself based on the query requested.

In addition, if the nodes 3306 are unable to perform certain tasks on the data, then the query coordinator 3304 can assign those tasks to itself and generate instructions for itself based on those tasks. Similarly, based on the form of the data that the query coordinator 3304 is expected to receive, it can generate instructions for itself in order to finalize the results for reporting.

It will be understood that fewer, more, or different blocks can be used as part of the routine 3900. In some cases, one or more blocks can be omitted. Furthermore, it will be understood that the various blocks described herein with reference to FIG. 39 can be implemented in a variety of orders. In some cases, the query coordinator 3304 can implement some blocks concurrently or change the order as desired. For example, the query coordinator 3304 can obtain information about the dataset sources/destinations (3904), determine processing requirements (3906), and determine available resources (3908) concurrently or in any order, as desired.

15.0. Workload Monitoring and Advising Flow

Figure 40:
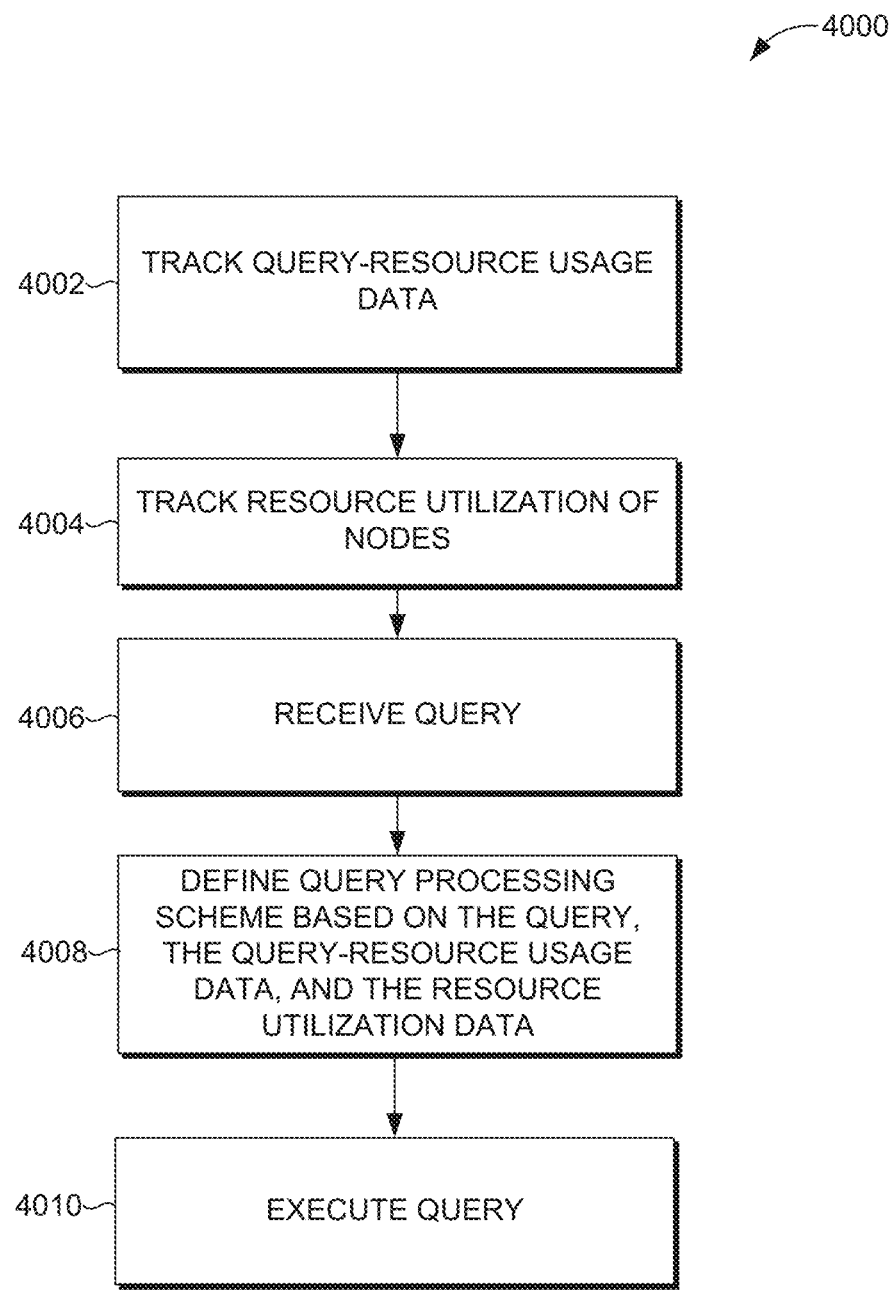
FIG. 40 is a flow diagram illustrative of an embodiment of a routine to generate a query processing scheme.

FIG. 40 is a flow diagram illustrative of an embodiment of a routine 4000 implemented by the system 3301 to generate a query processing scheme. One skilled in the relevant art will appreciate that the elements outlined for routine 4000 can be implemented by one or more computing devices/components that are associated with the system 3301, such as the search head 210, search process master 3301, query coordinator 3304, indexer 206, and/or worker nodes 3306. Thus, the following illustrative embodiment should not be construed as limiting.

At block 4002, the system 3301 tracks query-resource usage data. As described in greater detail above, the system 3301 can track detailed information related to queries that are executed by the system 3301, which in some embodiments can be stored in the workload catalog 3312, or otherwise stored to be accessible to the system 3301. For example, the system can track data indicating the resources used to execute the queries or timing information indicating the amount of time a query took to execute. Furthermore, the system can track information on a per transformation level, indicating the resources used to perform a particular task or transformation on a set of data, the amount of data involved, the time it took to perform the transformation, etc. In some embodiments, this information and other information related to previous queries, datasets, and system components can be stored in the workload catalog 3312.

At block 4004, the system 3301 tracks resource utilization data. As described in greater detail above, the system 3301 can track detailed information related to utilization rates of system resources, which in some cases can be stored in the node monitoring module 3314. In some embodiments, the nodes 3306 can include monitoring modules 3410, which can monitor the utilization rates of processors, I/O, memory, and other components of the nodes 3306. The information from the nodes 3306 of the system 3301 can be communicated to the node monitoring module 3314 for storage. In some cases, each node 3306 can include at least one monitoring module 3410. In certain embodiments, each node 3306 can include at least one monitoring module for each processor 3406 of the node 3306.

At block 4006, the system 3301 receives a query, as described in greater detail above. At block 4008, the system 3301 defines a query processing scheme, as described in greater detail above. In some cases the system 3301 can use the query-resource usage data and/or the resource utilization data to define the query processing scheme.

In some embodiments, the system 3301 can use the query-resource usage data to determine the amount of time the query will take to complete compared to the amount of resources assigned to process the query. The system can use this information to determine an amount of resources to allocate based on query. For example, the system can compare the datasets used for the received query with datasets used for previous queries, the types of transformations required by the received query compared to previous queries. Based on the comparison, the system 3301 can determine the effect of the amount of resources assigned to the query compared to the time to execute the query.

In certain embodiments, the system 3301 can further use the resource utilization data to define the query processing scheme. For example, the system 3301 can determine the amount of resources that are currently available for use to execute the query. Based on the amount of currently available resources, the system 3301 can determine how many resources should be allocated to the query. As an example, assume that based on the query-resource usage data, the system 3301 determines that thirty processors are preferred to process a query and that fewer than twenty processors would result in an undue delay. Based on the system 3301 determining that thirty processors are available, the system 3301 can allocate all thirty processors or at least twenty for the query.

In some cases, the system 3301 can track usage over time to predict surges in queries or determine whether additional queries are expected in the near term. For example, the system 3301 may determine that there is a surge in queries around 9:00 AM when most users begin work. With continued reference to the example above, if the query is received at 8:55 AM and the thirty processors are available, the system 3301 may determine to allocate twenty processors rather than the preferred thirty because a large number of queries are expected at 9:00 AM.

At block 4010, the system executes the query. In some cases, as described in greater detail above, to execute the query, the system communicates a query processing scheme to the nodes 3306. In turn the nodes obtain relevant data from the datasets, process the data, and return results to the query coordinator. The query coordinator performs any additional processing based on the query processing scheme and communicates the results to the search head 210 for display on the client device 404.

It will be understood that fewer, more, or different blocks can be used as part of the routine 4000. For example, in some embodiments, the routine 4000 can further include, monitoring nodes during query execution, allocating/deallocating resources based on the query, Furthermore, it will be understood that the various blocks described herein with reference to FIG. 40 can be implemented in a variety of orders. In some cases, the system 3301 can implement some blocks concurrently or change the order as desired. For example, the system 3301 can track query-resource usage data (4002), track resource utilization of nodes (4004), and receive a query (4006) concurrently or in any order, as desired. Similarly, the system 3301 can track resource utilization of nodes (4004) while executing the query (4010), etc.

16.0. Multiple Dataset Sources Flow

Figure 41:
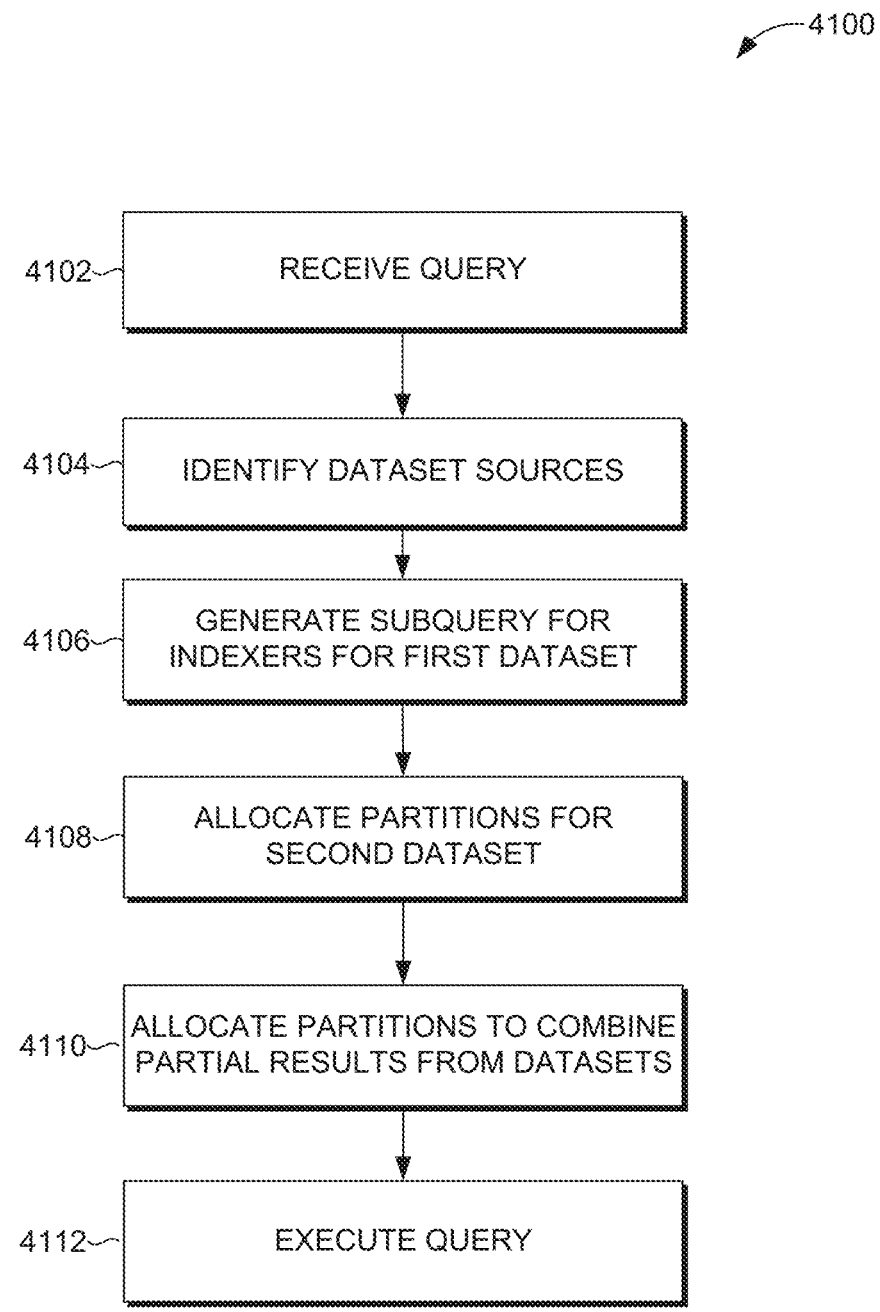
FIG. 41 is a flow diagram illustrative of an embodiment of a routine to execute a query on data from multiple dataset sources.

FIG. 41 is a flow diagram illustrative of an embodiment of a routine 4100 implemented by the query coordinator 3304 to execute a query on data from multiple dataset sources. Although described as being implemented by the query coordinator 3304, one skilled in the relevant art will appreciate that the elements outlined for routine 4100 can be implemented by one or more computing devices/components that are associated with the system 3301, such as the search head 210, search process master 3301, indexer 206, and/or worker nodes 3306. Thus, the following illustrative embodiment should not be construed as limiting.

At block 4102, the query coordinator 3304 receives a query, as described in greater detail above with reference to block 3802 of FIG. 38. At block 4104, the query coordinator identifies the dataset sources, including the indexers 206 as one dataset source, as described in greater detail above with reference to block 3902 of FIG. 39. The query coordinator 3304 can also identify a second dataset source, such as an external data source, a common storage, an ingested data buffer, query acceleration data store, etc.

At block 4106, the query coordinator 3304 generates a subquery for the indexers. As described herein, the subquery can be generated based on the processing capabilities of the indexers. The subquery can indicate to the indexers that data to be processed by the indexers and the manner of processing the data by the indexers. Further, the subquery can instruct the indexers to provide the results (or partial results) of the subquery to the nodes 3306 for further processing. Accordingly, using the subquery, the indexers can identify the data to process, process the data, and communicate the results to the nodes 3306. The subquery can be in any query language, as described herein.

At block 4108, the query coordinator 3304 allocates partitions for a second dataset. The partition allocation can be based on the information about the dataset and/or the query requirements, as described in greater detail in blocks 3906, 3908, and 3910 of FIG. 39. At block 4110, the query coordinator 3304 allocates partitions to combine the results (or partial results) from the two datasets. Similar to block 4108, the query coordinator 3304 can allocate partitions to combine the partial results from the different datasets based on the query requirements. For example, the query can include a command indicating that the results from different dataset sources are to be combined in some way.

At block 4112, the query coordinator 3304 executes the query as described in greater detail above with reference to block 4010 of FIG. 40. In executing the query, the query coordinator 3304 can communicate the subquery to the indexers 206 or embed the subquery into the instructions to the nodes 3306 such that the nodes 3306 communicate the subquery to the indexers 206.

It will be understood that fewer, more, or different blocks can be used as part of the routine 4100. For example, in some embodiments, the routine 4100 can further include, monitoring nodes during query execution, allocating/deallocating resources based on the query, etc. As another example, in certain embodiments, the identification of the dataset sources, generation of a subquery and allocation of partitions can form part of a processing query block, similar to the process query block 3804 of FIG. 38. In some cases, the routine 4100 can include allocating partitions to receive and process the partial results from the indexers prior to combining the partial results from the different datasets. In certain embodiments, the system 3301 can dynamically allocate partitions based on the number of indexers from which the nodes 3306 will receive data. Furthermore, although described as interacting with indexers 206, it will be understood that the system 3301 can process and execute query on any two or more dataset sources, and that the system 3301 can generate subqueries or instructions for the dataset sources or allocate partitions for the dataset sources based on information about the dataset sources. as described in greater detail herein.

Furthermore, it will be understood that the various blocks described herein with reference to FIG. 41 can be implemented in a variety of orders. In some cases, the system 3301 can implement some blocks concurrently or change the order as desired. For example, the system 3301 can generate a subquery for the indexers (4106), allocate partitions for the second dataset (4108), and allocate partitions to combine partial results from the indexers and second dataset (4110) concurrently, or in any order, as desired.

17.0. External Data Source Flow

Figure 42:
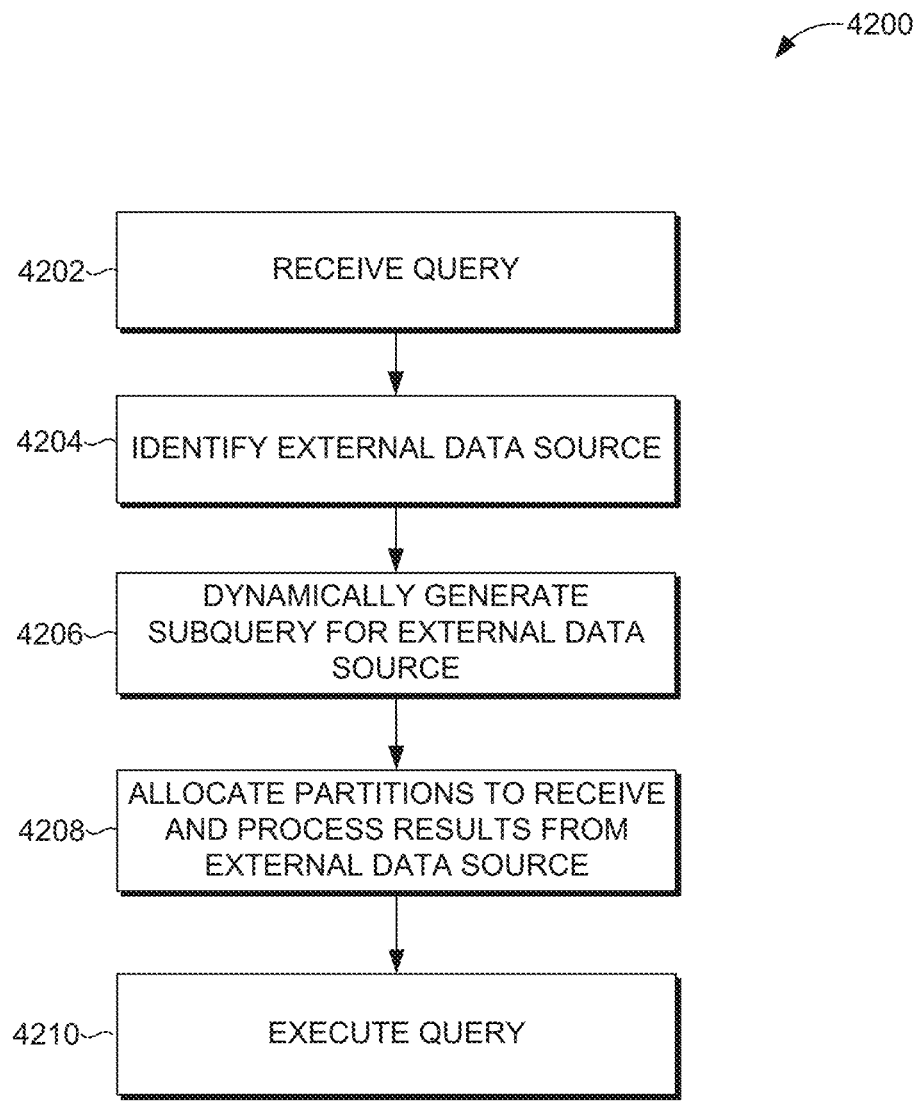
FIG. 42 is a flow diagram illustrative of an embodiment of a routine to execute a query on data from an external data source.

FIG. 42 is a flow diagram illustrative of an embodiment of a routine 4200 implemented by the query coordinator 3304 to execute a query on data from an external data source. Although described as being implemented by the query coordinator 3304, one skilled in the relevant art will appreciate that the elements outlined for routine 4200 can be implemented by one or more computing devices/components that are associated with the system 3301, such as the search head 210, search process master 3301, indexer 206, and/or worker nodes 3306. Thus, the following illustrative embodiment should not be construed as limiting.

At block 4202, the query coordinator 3304 receives a query, as described in greater detail above with reference to block 3802 of FIG. 38. At block 4204, the query coordinator identifies the external data sources, as described in greater detail above with reference to block 3902 of FIG. 39.

At block 4206, the query coordinator 3304 dynamically generates a subquery for the external data source. As described herein, the query coordinator 3304 can generate the subquery for the external data source based on information obtained about the external data source as described herein with reference to, inter alia, blocks 3904 and 3910 of FIG. 39. The information can indicate the type of external data source, APIs and languages to use to interface with the external data source, the type and amount of data stored in the external data source. In addition, the information can indicate whether the external data source multiple partitions, and if so, how many. Further, the information can indicate the location of the processors of the external data source with which the nodes 3306 will interact. The information can also indicate the processing capabilities of the external data source, such as what commands or transformations the external data source can perform on the data stored therein.

Using the information about the external data source, the query coordinator 3304 can generate a subquery. In certain embodiments, the query coordinator 3304 generates a subquery that tasks the external data source with merely returning the data, performing some processing of the data, or processing the data as much as it can based on its capabilities. By pushing some processing of the data to the external data source, the query coordinator 3304 can reduce the processing load on the system 3301.

At block 4208, the query coordinator 3304 allocates partitions to receive and process results from the external data source. As described herein, the query coordinator 3304 can allocate partitions based on the query requirements and the data received from the external data source. For example, if the external data source can perform some processing on the data, then the query coordinator 3304 can allocate partitions to receive the results of the processing. If the subquery indicated that the external data source was to return results without processing them, then the query coordinator 3304 can allocate partitions to receive the unprocessed results from the external data source, and process them according to the query.

In addition, the query coordinator 3304 can allocate partitions based on the number of partitions supported by the external data source. For example, if the external data source supports four partitions for reading data, then the query coordinator 3304 can allocate four partitions to read from each of the partitions supported by the external data source. However, it will be understood that the query coordinator 3304 can allocate fewer or more partitions as desired. Further, the number of partitions allocated can be based on the resources available on the system 3301.

In some cases, the query coordinator 3304 can allocate more partitions than is supported by the external data source and/or submit multiple subqueries to the external data source. For example, if the external data source only supports a single partition, the query coordinator 3304 can allocate multiple partitions to send different subqueries to the external data source and receive the results back. In this way, the query coordinator 3304 can increase the number of parallel reads from the external data source. As a non-limiting example, suppose an external data source only supports one partition and the query indicates that a data based on an age range of 20-49 is to be obtained from the external data source. The query coordinator can break up the age range into four sets (20-29, 30-39, 40-49) and send (or have nodes send) a subquery for each set to the external data source. The external data source can process the requests concurrently and return results, and may not know that the requests are coming from the same system 3301. In this way, the system 3301 can receive results in parallel from an external data source that supports a single partition. The query coordinator 3304 can similarly send multiple subqueries to one partition of a multi-partition-supporting external data source to increase the parallel reads from the external data source.

At block 4210, the query coordinator 3304 executes the query as described in greater detail above with reference to block 4110 of FIG. 41. It will be understood that fewer, more, or different blocks can be used as part of the routine

4200. For example, in some embodiments, the routine 4200 can further include, monitoring nodes during query execution, allocating/deallocating resources based on the query, etc. As another example, in certain embodiments, the identification of the external data source, generation of a subquery and allocation of partitions can form part of a processing query block, similar to the process query block 3804 of FIG. 38.

Furthermore, it will be understood that the various blocks described herein with reference to FIG. 42 can be implemented in a variety of orders. In some cases, the system 3301 can implement some blocks concurrently or change the order as desired. For example, the system 3301 can generate a subquery for the external data source (4206) and allocate partitions concurrently (4208) or in any order, as desired.

18.0. Dataset Destination Flow

Figure 43:
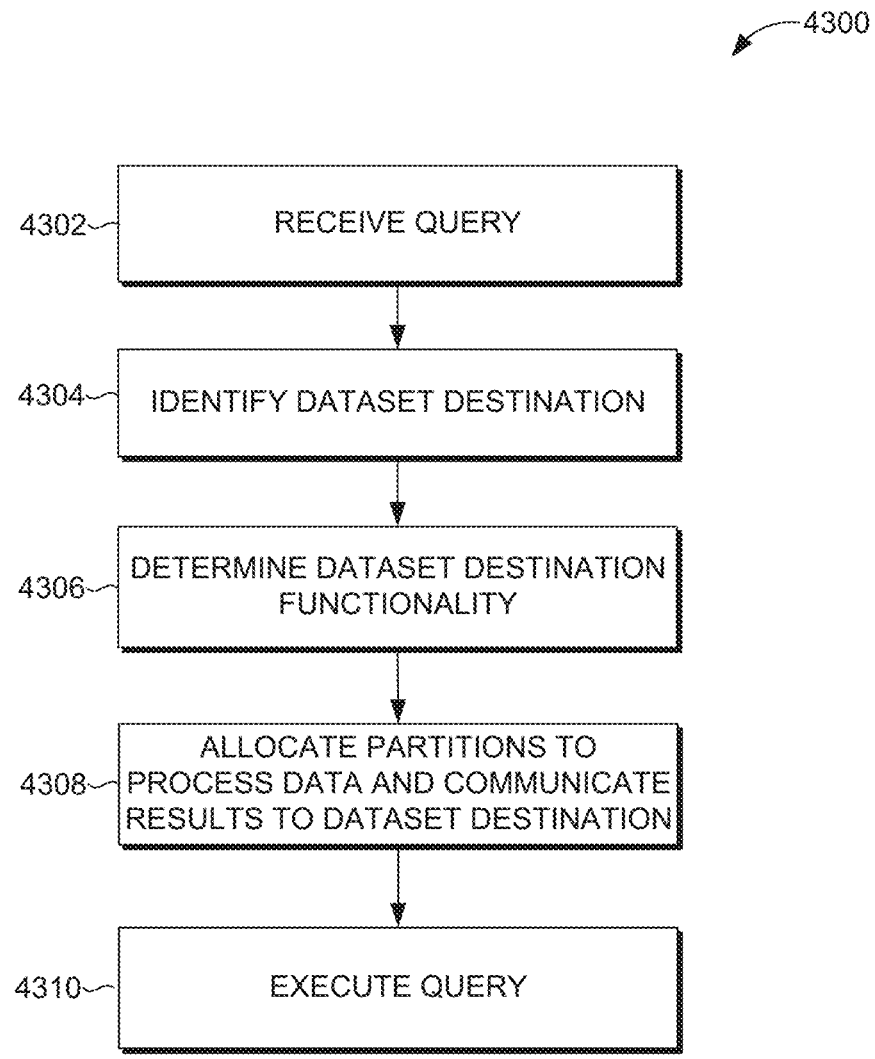
FIG. 43 is a flow diagram illustrative of an embodiment of a routine to execute a query based on a dataset destination.

FIG. 43 is a flow diagram illustrative of an embodiment of a routine 4300 implemented by the query coordinator 3304 to execute a query based on a dataset destination. Although described as being implemented by the query coordinator 3304, one skilled in the relevant art will appreciate that the elements outlined for routine 4300 can be implemented by one or more computing devices/components that are associated with the system 3301, such as the search head 210, search process master 3301, indexer 206, and/or worker nodes 3306. Thus, the following illustrative embodiment should not be construed as limiting.

At block 4302, the query coordinator 3304 receives a query, as described in greater detail above with reference to block 3802 of FIG. 38. At block 4304, the query coordinator identifies the dataset destination, as described in greater detail above with reference to block 3902 of FIG. 39. In some embodiments, the dataset destination can refer to the location where query results or partial query results are to be stored by the system 3301. For example, the nodes 3306 can process data from any dataset source and then store the data in a dataset destination, as well as provide the results to a client device 404. In some cases, the dataset destination can be the same as the dataset source. For example, data can be read from the ingested data buffer, processed, and then stored back in the ingested data buffer. However, in certain cases, the dataset destination and dataset source are different. For example, in some embodiments, data is read from the common storage, processed by the nodes, and the results stored in the query acceleration data store 3308, an external data source 3318, an ingested data buffer, etc.

At block 4306, the query coordinator 3304 determines the functionality of the dataset destination. As described herein with reference to inter alia block 3904 of FIG. 39, each dataset destination, like dataset sources, can have different functionality and capabilities. This functionality can correspond to how to communicate with the dataset destination (e.g., the number of partitions supported by the dataset destination, the APIs, language, or communication protocols of the dataset destination), processing supported by the dataset destination (e.g., commands supported by the dataset destination), etc.

At block 4308, the query coordinator 3304 allocates partitions to process and communicate results to the dataset destination. Similar to allocating partitions to receive data from a dataset source, the query coordinator 3304 can allocate partitions to process and communicate data to a dataset destination. For example, the query coordinator 3304 can allocate partitions based on the partitions supported by the dataset destination, the processing capabilities of the dataset destination, etc. As part of allocating partitions, the query coordinator 3304 can instruct the partitions on how to communicate the data to the dataset destination, include translated commands for the dataset destination, etc.

At block 4310, the query coordinator 3304 executes the query as described in greater detail above with reference to block 4110 of FIG. 41. It will be understood that fewer, more, or different blocks can be used as part of the routine 4300. For example, in some embodiments, the routine 4300 can further include, monitoring nodes during query execution, allocating/deallocating resources based on the query, etc. As another example, in certain embodiments, the identification of the dataset destination, determination of dataset destination functionality, allocation of partitions can form part of a processing query block, similar to the process query block 3804 of FIG. 38.

Furthermore, it will be understood that the various blocks described herein with reference to FIG. 43 can be implemented in a variety of orders. In some cases, the system 3301 can implement some blocks concurrently or change the order as desired. For example, the system 3301 can determine dataset destination functionality (4306) and allocate partitions (4308) concurrently or in any order, as desired.

19.0. Serialization and Deserialization Flow

Figure 44:
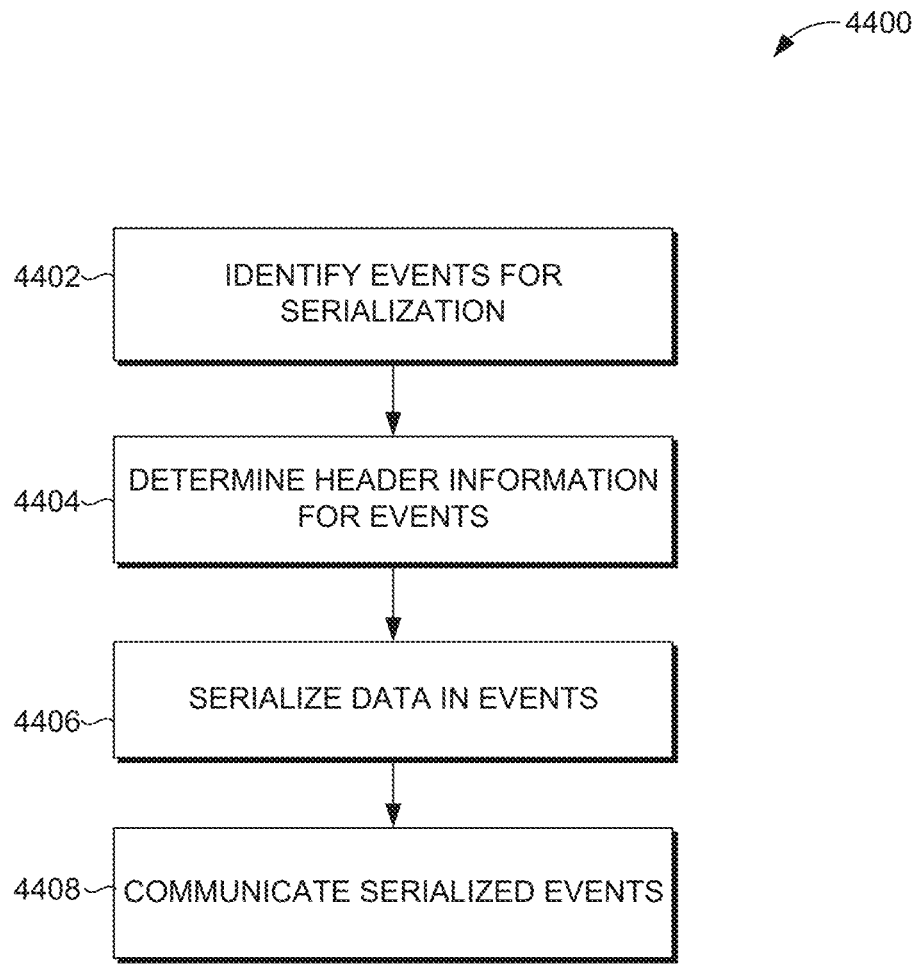
FIG. 44 is a flow diagram illustrative of an embodiment of a routine to serialize data for communication.

FIG. 44 is a flow diagram illustrative of an embodiment of a routine 4400 implemented by a serialization module, of a component of the data intake and query system 3301 to serialize data for communication to a destination, similar to the serialization/deserialization module 3412 of FIG. 34. The destination can be another component of the data intake and query system 3301 or external to the data intake and query system 3301. Although described as being implemented by serialization module, one skilled in the relevant art will appreciate that the elements outlined for routine 4300 can be implemented by one or more computing devices/components that are associated with the system 3301, such as the search head 210, search process master 3301, indexer 206, and/or worker nodes 3306. Thus, the following illustrative embodiment should not be construed as limiting.

At block 4402, the serialization module identifies events for serialization. In some cases, as part of identifying the events for serialization, the serialization module groups the events. In some embodiments, the serialization module identifies the events for serialization based on a common source or sourcetype of the events, or other shared attribute, or based on a destination for the events. In certain embodiments, the serialization module identifies events for serialization based on timing information. For example, the serialization module can serialize events received within a certain time period, such as one second, ten second, one minute, etc.

At block 4404, the serialization module determines header information for the events. The header information can include the number of events in a group, the field names for the events in the group, etc. In some cases, the field names in the header can include all field names across all events. For example, if some events have different field names, both can be included in the header information. In some cases, the header information can also include mapping information for mapping field names to field positions (e.g., where a particular field name is located within an event, etc.). In some embodiments, as part of determining the header information for the events, the serialization module can serialize the header information. For example, if some field names are repetitive or have been identified before in previous groups, they can be replaced with an identifier indicating a cache entry that has that field name. The identifier can be used by the receiving component to deserialize the data. Furthermore, the serialization module can update the cache based on the header information. For example, if some of the header information had not been seen before, the serialization module can update the cache so that an identifier can be used in place of the header information in the future.

At block 4406, the serialization module serializes the events. As part of serializing the events, the serialization module can identify field values in the events and determine whether the field values in each event are stored in cache. The field values that are stored in cache can be replaced with cache identifiers. In addition, the serialization module can identify data other data for removal. For example, in some embodiments, certain delimiters, such as ',' or '\n' can be removed from the events.

Further, as part of serializing the events, the serialization module can update the cache or generate update cache commands for the receiver. Updating the cache can include adding entries for data encountered in the events or removing entries that have not been used recently. The cache can be updated with each event or each group and can be performed prior to, after, or concurrently with an event. For example, upon receiving a group of events, the receiver can update the cache and then process the events, update the cache while processing the events, or update the cache after the events are processed. In some cases, the receiver updates the cache following each event. In some cases, new entries are added to the cache prior to processing the events and entries are removed from the cache after processing the events in a group.

At 4408, the serialization module communicates the serialized events to the destination. In some cases, the serialization module communicates the events in a streaming fashion. In such embodiments, the serialization module communicates the events once the serialization process for that event is completed. In certain embodiments, the serialization module communicates the events as a group. In such embodiments, the serialization module waits until the group of events is serialized before transmitting the events as a group.

As part of generating the group and serializing the data, the serialization/deserialization module 3412 can determine the number of events to group, determine the order and field names for the fields in the events of the group, parse the events, determine the number of fields for each event, identify and serialize serializable field values in the event fields, and identify cache deltas. In some cases, the serialization/deserialization module 3412 performs the various tasks in a single pass of the data, meaning that it performs the identification, parsing, and serializing during a single review of the data. In this manner, the serialization/deserialization module 3412 can operate on streaming data and avoid adding delay to the serialization/deserialization process.

It will be understood that fewer, more, or different blocks can be used as part of the routine 4400. For example, in some embodiments, the routine 4400 can further include, building and updating the cache at the receiver, etc. Furthermore, it will be understood that the various blocks described herein with reference to FIG. 44 can be implemented in a variety of orders. In some cases, the serialization module can implement some blocks concurrently or change the order as desired. For example, the serialization module can determine header information (4404) and serialize the events (4406) concurrently or in any order, as desired. Furthermore, although not explicitly described herein, it will be understood that the data can be deserialized in a similar manner. That is, the receiver can determine the number of events in the group and the fields based on the header information and deserialize each event using the cache and data in the serialized group.

20.0. Accelerated Query Results Flow

Figure 45:
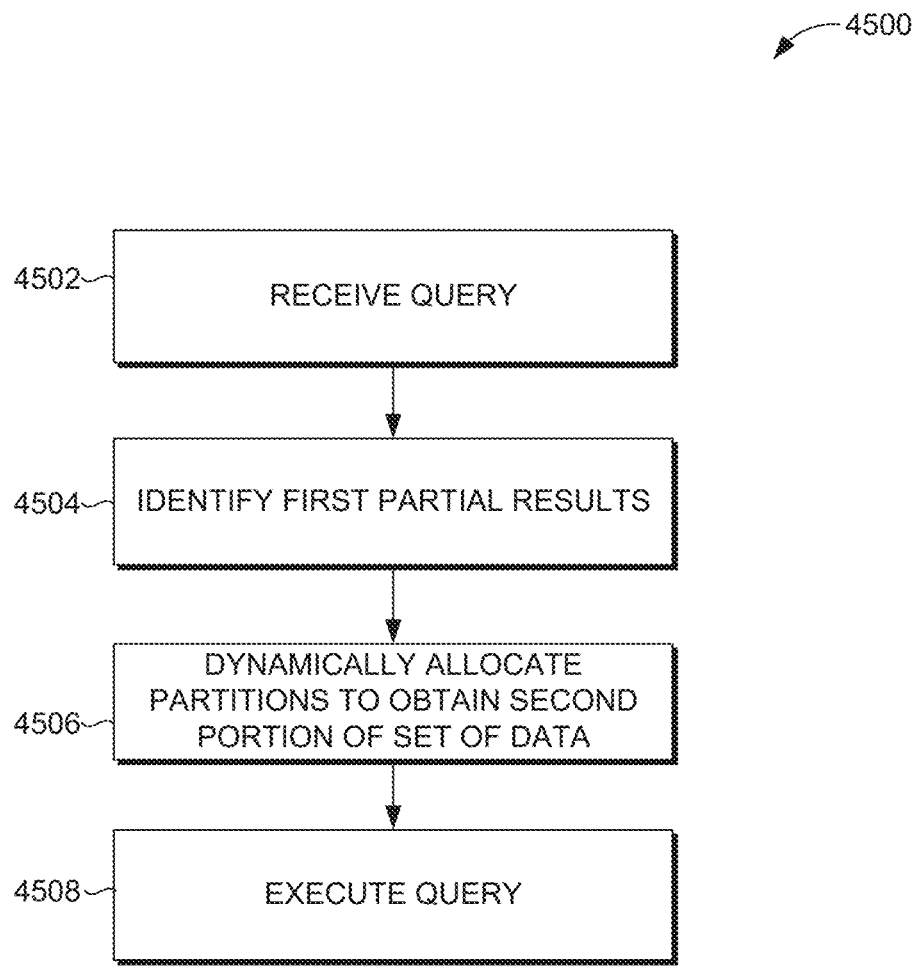
FIG. 45 is a flow diagram illustrative of an embodiment of a routine to execute a query using a query acceleration data store.

FIG. 45 is a flow diagram illustrative of an embodiment of a routine 4500 implemented by the query coordinator 3304 to execute a query utilizing a data store (e.g., query acceleration data store 3308). Although described as being implemented by the query coordinator 3304, one skilled in the relevant art will appreciate that the elements outlined for routine 4500 can be implemented by one or more computing devices/components that are associated with the system 3301, such as the search head 210, search process master 3301, indexer 206, and/or worker nodes 3306. Thus, the following illustrative embodiment should not be construed as limiting.

At block 4502, the query coordinator 3304 receives a query, as described in greater detail above with reference to block 3802 of FIG. 38. In the example of FIG. 45, the query can reference a particular dataset stored by the query acceleration data store 3308, and reference information which is to be obtained from another dataset source (e.g., external data source 3318, ingested data buffer, common storage, indexers 206, etc.).

At block 4504, first partial results are identified. As described above, a query can indicate datasets, including a particular dataset that is stored in the query acceleration data store 3308. The query acceleration data store 3308 can store datasets that are indicated (e.g., by users, for example based on the users including a particular command) as benefiting from storage in the query acceleration data store 3308 (e.g., benefiting from caching). In addition, the datasets stored in the query acceleration data store 3308 can correspond to results or partial results of queries previously processed by the system 3301. The query coordinator 3304 can determine that the received query references one or more datasets stored by the query acceleration data store. For example, the query may specify a dataset is stored in the query acceleration data store 3308 and/or provide a unique identifier associated with a stored dataset, and the system 3301 (e.g., the query coordinator 3304) may relay this unique identifier to the worker nodes 3306 to obtain the referenced dataset(s). In certain cases, the system 3301 can prompt the user with identifiers of datasets stored in the query acceleration data store 3308.

In some cases, the query coordinator 3304 can intelligently determine that a portion of the data identified for processing in the query corresponds to data that was previously processed. For example, the query coordinator 3304 can compare the query with previous queries. The comparison can be made against all queries received by the system or queries received by the system from a particular user or group of users. As yet another example, suppose a query indicates that the last sixty minutes of data from a particular dataset source is to be processed. The query coordinator 3304 can compare the query with previous queries from the user and determine that a similar query was received thirty minutes previously indicating that the prior thirty minutes of data from the dataset source was to be processed and the results of the query stored in the query acceleration data store 3308. Based on that information, the query coordinator 3304 can determine that the first thirty minutes of the sixty minutes' worth of data has already been processed and the results are accessible in the query acceleration data store 3308.

As described above, worker nodes 3306 can utilize the particular dataset obtained from the data store to determine results. Since the query acceleration data store 3308 stores the particular dataset, first partial results can be rapidly identified by the worker nodes 3306, and the query coordinator 3304 can provide the first partial results to a requesting client. For example, the first partial results may be minimally processed data that was previously obtained from another dataset source (e.g., an external data source 3318, indexers 3306, ingested data buffer) and stored in the query acceleration data store 3308 with little or no processing by the worker nodes 3306. For example, the worker nodes 3306 may have imported the data from an external data source 3318 and stored the received data as-is in the query acceleration data store 3308. The imported results can correspond to raw machine data or processed data.

Additionally, the first partial results can correspond to results or partial results of a previous query that were obtained after data received by a dataset source was processed the worker nodes 3306. For example, the worker nodes 3306 may have imported the data from an external data source 3318, ingested data buffer, indexers 3306, or even data stored in the query acceleration data store 3308, performed one or more transformations on the data, (e.g., extracted relevant portions, combined the data with results from other dataset sources, etc.), and then stored the results of the processing in the query acceleration data store 3308.

At block 4506, the query coordinator 3304 dynamically allocates partitions. The partitions can be allocated to receive and process data from a dataset source referenced in the received query (second portion of the set of data), combine results of processing the data from the dataset source (second partial results) with the first partial results, process the combined results, and communicate the results to a destination, such as the query coordinator 3304, search head 210, client device 404, or a dataset destination. As described in block 4504, the query can indicate a particular dataset stored in the query acceleration data store 3308. Additionally, the query can further indicate that data is to be obtained from another dataset source, processed, and the second partial results combined with the first partial results. The query coordinator 3304 can allocate partitions based on the query requirements and the data received from the dataset source as described herein. In some cases, the query does not indicate that the first partial results are stored in the query acceleration data store 3308. In such embodiments, the query can identify a dataset source for obtaining data and the query coordinator 3304 can analyze the query to determine that a first portion of the data requested corresponds to the first partial results stored in the query acceleration data store 3308.

In some embodiments, the dynamic allocation of partitions can include allocating partitions to receive and process the first partial results from the query acceleration data store 3308. In addition, in some cases, the query coordinator 3304 can allocate one or more partitions to store the second partial results or combined results in the accelerate data store 3308 for later use, similar to the first partial results.

At block 4508, the query coordinator 3304 executes the query as described in greater detail above with reference to block 4110 of FIG. 41. It will be understood that fewer, more, or different blocks can be used as part of the routine 4500. For example, in some embodiments, the routine 4500 can further include, monitoring nodes during query execution, allocating/deallocating resources based on the query, etc. As another example, in certain embodiments, identification of the first partial results and allocation of partitions can form part of a processing query block, similar to the process query block 3804 of FIG. 38. Further, the first partial results can be communicated to the client as-is or further processed by the worker nodes 3306 (e.g., logic can be applied to the first partial results), and then provided to the requesting client.

Furthermore, it will be understood that the various blocks described herein with reference to FIG. 45 can be implemented in a variety of orders. In some cases, the system 3301 can implement some blocks concurrently or change the order as desired. For example, the query coordinator 3304 can identify the first partial results (4504) and allocate partitions (4506) concurrently or in any order, as desired. During execution, the nodes can concurrently obtain the first partial results from the query acceleration data store 3308 and obtain and process other data from another dataset source, or concurrently provide the first partial results to the query coordinator 3304 or client device 404 and obtain and process other data from another dataset source, etc.

21.0. Common Storage Architecture

As discussed above, indexers 206 may in some embodiments operate both to ingest information into a data intake and query system 3301, and to search that information in response to queries from client devices 404. The use of an indexer 206 to both ingest and search information may be beneficial, for example, because indexers 206 may have ready access to information that they have ingested, and thus be enabled to quickly access that information for searching purposes. However, use of an indexer 206 to both ingest and search information may not be desirable in all instances. As an illustrative example, consider an instance in which information within the system 3301 is organized into buckets, and each indexer 206 is responsible for maintaining buckets within a data store 208 corresponding to the indexer 206. Illustratively, a set of 10 indexers 206 may maintain 100 buckets, distributed evenly across ten data stores 208 (each of which is managed by a corresponding indexer 206). Information may be distributed throughout the buckets according to a load-balancing mechanism used to distribute information to the indexers 206 during data ingestion. In an idealized scenario, information responsive to a query would be spread across the 100 buckets, such that each indexer 206 may search their corresponding 10 buckets in parallel, and provide search results to a search head 360. However, it is expected that this idealized scenario may not always occur, and that there will be at least some instances in which information responsive to a query is unevenly distributed across data stores 208. As an extreme example, consider a query in which responsive information exists within 10 buckets, all of which are included in a single data store 208 associated with a single indexer 206. In such an instance, a bottleneck may be created at the single indexer 206, and the effects of parallelized searching across the indexers 206 may be minimal. To increase the speed of operation of search queries in such cases, it may therefore be desirable to configure the data intake and query system 3301 such that parallelized searching of buckets may occur independently of the operation of indexers 206.

Another potential disadvantage in utilizing an indexer 206 to both ingest and search data is that computing resources of the indexers 206 may be split among those two tasks. Thus, ingestion speed may decrease as resources are used to search data, or vice versa. It may further be desirable to separate ingestion and search functionality, such that computing resources available to either task may be scaled or distributed independently.

Figure 46:
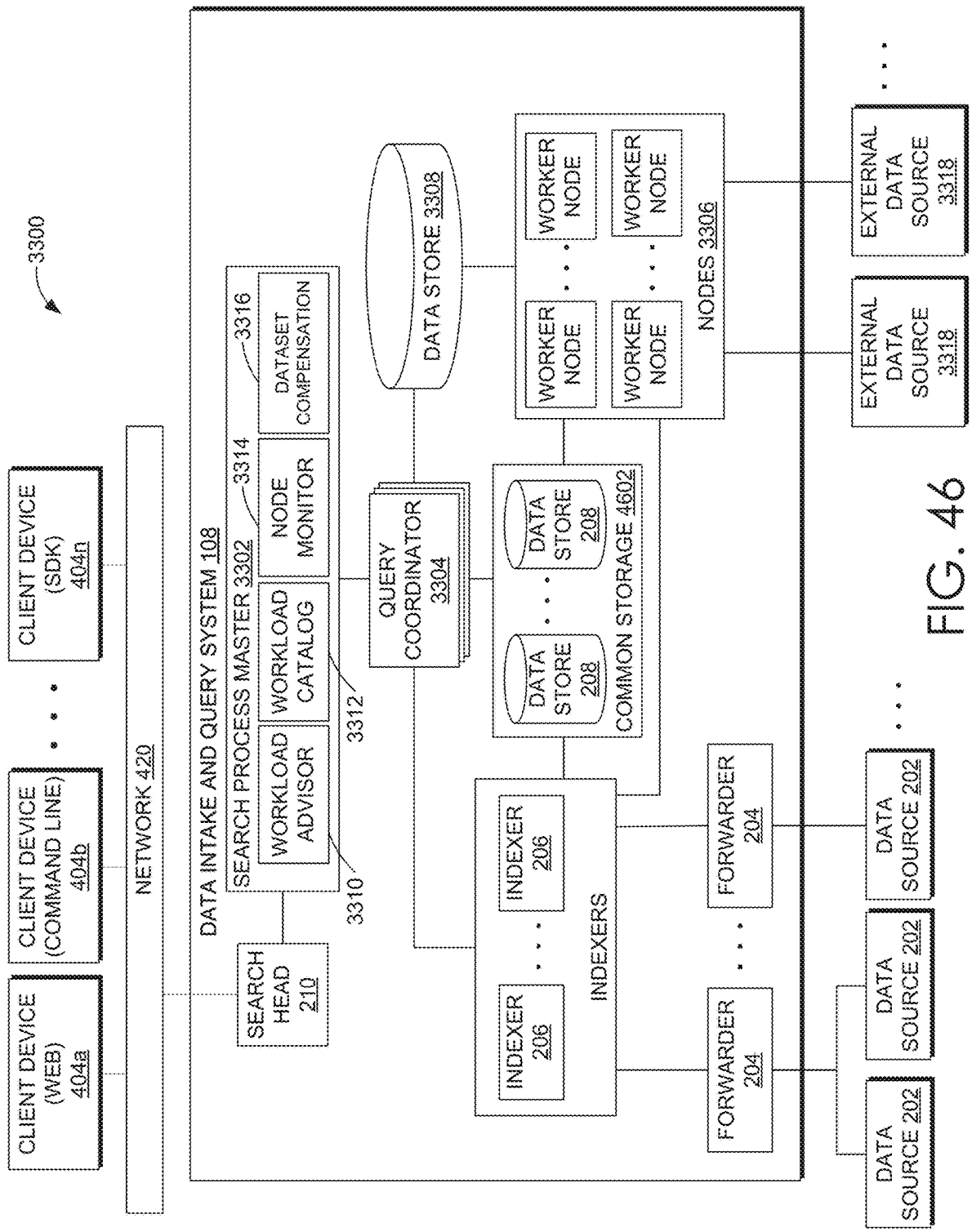
FIG. 46 is a system diagram illustrating an environment for ingesting and indexing data, and performing queries on one or more datasets from one or more dataset sources including common storage.

One example of a configuration of the data intake and query system 3301 that enables parallelized searching of buckets independently of the operation of indexers 206 is shown in FIG. 46. The embodiment of system 3301 that is shown in FIG. 46 substantially corresponds to embodiment of the system 3301 as shown in FIG. 33, and thus corresponding elements of the system 3301 will not be re-described. However, unlike the embodiment as shown in FIG. 33, where individual indexers 206 are assigned to maintain individual data stores 208, the embodiment of FIG. 46 includes a common storage 4602. Common storage 4602 may correspond to any data storage system accessible to each of the indexers 206. For example, common storage 4602 may correspond to a storage area network (SAN), network attached storage (NAS), other network-accessible storage system (e.g., a ho33sted storage system, which may also be referred to as "cloud" storage), or combination thereof. The common storage 4602 may include, for example, hard disk drives (HDDs), solid state storage devices (SSDs), or other substantially persistent or non-transitory media. Data stores 208 within common storage 4602 may correspond to physical data storage devices (e.g., an individual HDD) or a logical storage device, such as a grouping of physical data storage devices or a virtualized storage device hosted by an underlying physical storage device. In one embodiment, common storage 4602 may be multi-tiered, with each tier providing more rapid access to information stored in that tier. For example, a first tier of the common storage 4602 may be physically co-located with indexers 206 and provide rapid access to information of the first tier, while a second tier may be located in a different physical location (e.g., in a hosted or "cloud" computing environment) and provide less rapid access to information of the second tier. Distribution of data between tiers may be controlled by any number of algorithms or mechanisms. In one embodiment, a first tier may include data generated or including timestamps within a threshold period of time (e.g., the past seven days), while a second tier or subsequent tiers includes data older than that time period. In another embodiment, a first tier may include a threshold amount (e.g., n terabytes) or recently accessed data, while a second tier stores the remaining less recently accessed data. In one embodiment, data within the data stores 208 is grouped into buckets, each of which is commonly accessible to the indexers 206. The size of each bucket may be selected according to the computational resources of the common storage 4602 or the data intake and query system 3301 overall. For example, the size of each bucket may be selected to enable an individual bucket to be relatively quickly transmitted via a network, without introducing excessive additional data storage requirements due to metadata or other overhead associated with an individual bucket. In one embodiment, each bucket is 750 megabytes in size.

The indexers 206 may operate to communicate with common storage 4602 and to generate buckets during ingestion of data. Data ingestion may be similar to operations described above. For example, information may be provided to the indexers 206 by forwarders 204, after which the information is processed and stored into buckets. However, unlike some embodiments described above, the buckets may be stored in common storage 4602, rather than in a data store 208 maintained by an individual indexer 206. Thus, the common storage 4602 can render information of the data intake and query system 3301 commonly accessible to elements of that system 3301. As will be described below, such common storage 4602 can beneficial enable parallelized searching of buckets to occur independently of the operation of indexers 206.

As noted above, it may be beneficial in some instances to separate within the data intake and query system 3301 functionalities of ingesting data and searching for data. As such, in the illustrative configuration of FIG. 46, worker nodes 3306 may be enabled to search for data stored within common storage 4602. The nodes 3306 may therefore be communicatively attached (e.g., via a communication network) with the common storage 4602, and be enabled to access buckets within the common storage 4602. The nodes 3306 may search for data within buckets in a manner similar to how searching may occur at the indexers 206, as discussed in more detail above. However, because nodes 3306 in some instances are not statically assigned to individual data stores 208 (and thus to buckets within such a data store 208), the buckets searched by an individual node 3306 may be selected dynamically, to increase the parallelization with which the buckets can be searched. For example, using the example provided above, consider again an instance where information is stored within 100 buckets, and a query is received at the data intake and query system 3301 for information within 10 such buckets. Unlike the example above (in which only indexers 206 already associated with those 10 buckets could be used to conduct a search), the 10 buckets holding relevant information may be dynamically distributed across worker nodes 3306. Thus, if 10 worker nodes 3306 are available to process a query, each worker node 3306 may be assigned to retrieve and search within 1 bucket, greatly increasing parallelization when compared to the low-parallelization scenario discussed above (e.g., where a single indexer 206 is required to search all 10 buckets). Moreover, because searching occurs at the worker nodes 3306 rather than at indexers 206, computing resources can be allocated independently to searching operations. For example, worker nodes 3306 may be executed by a separate processor or computing device than indexers 206, enabling computing resources available to worker nodes 3306 to scale independently of resources available to indexers 206.

Operation of the data intake and query system 3301 to utilize worker nodes 3306 to search for information within common storage 4602 will now be described. As discussed above, a query can be received at the search head 360, processed at the search process master 3302, and passed to a query coordinator 3304 for execution. The query coordinator 3304 may generate a DAG corresponding to the query, in order to determine sequences of search phases within the query. The query coordinator 3304 may further determine based on the query whether each branch of the DAG requires searching of data within the common storage 4602 (e.g., as opposed to data within external storage, such as remote systems 414 and 416).

It will be assumed for the purposes of described that at least one branch of the DAG requires searching of data within the common storage 4602, and as such, description will be provided for execution of such a branch. While interactions are described for executing a single branch of a DAG, these interactions may be repeated (potentially concurrently or in parallel) for each branch of a DAG that requires searching of data within the common storage 4602. As discussed above with reference to FIG. 36, executing a search representing a branch of a DAG can include a number of phases, such as an intake phase 3604, processing phase 3606, and collector phase 3608. It is therefore illustrative to discuss execution of a branch of a DAG that requires searching of the common storage 4602 with reference to such phases. As also discussed above, each phase may be carried out by a number of partitions, each of which may correspond to a worker node 3306 (e.g., a specific worker node 3306, processor within the worker node 3306, execution environment within a worker node 3306, such as a virtualized computing device or software-based container, etc.).

When a branch requires searching within common storage 4602, the query coordinator 3304 can select a partition (e.g., a processor within a worker node 3306) at random or according to a load-balancing algorithm to gather metadata regarding the information within the common storage 4602, for use in dynamically assigning partitions (each implemented by a worker node 3306) to implement an intake phase 3604. Metadata is discussed in more detail above, but may include, for example, data identifying a host, a source, and a source type related to a bucket of data. Metadata may further indicate a range of timestamps of information within a bucket. The metadata can then be compared against a query to determine a subset of buckets within the common storage 4602 that may contain information relevant to a query. For example, where a query specifies a desired time range, host, source, source type, or combination thereof, only buckets in the common storage 4602 that satisfy those specified parameters may be considered relevant to the query. In one embodiment, the subset of buckets is determined by the assigned partition, and returned to the query coordinator 3304. In another embodiment, the metadata retrieved by a partition is returned to the query coordinator 3304 and used by the query coordinator 3304 to determine the subset of buckets.

Thereafter, the query coordinator 3304 can dynamically assign partitions to intake individual buckets within the determined subset of buckets. In one embodiment, the query coordinator 3304 attempts to maximize parallelization of the intake phase 3604, by attempting to intake the subset of buckets with a number of partitions equal to the number of buckets in the subset (e.g., resulting in a one-to-one mapping of buckets in the subset to partitions). However, such parallelization may not be feasible or desirable, for example, where the total number of partitions is less than the number of buckets within the determined subset, where some partitions are processing other queries, or where some partitions should be left in reserve to process other queries. Accordingly, the query coordinator 3304 may interact with the workload advisor 3310 to determine a number of partitions that are to be utilized to conduct the intake phase 3604 of the query. Illustratively, the query coordinator 3304 may initially request a one-to-one correspondence between buckets and partitions, and the workload advisor 3310 may reduce the number of partitions used for the intake phase 3604 of the query, resulting in a 2-to-1, 3-to-1, or n-to-1 correspondence between buckets and partitions. Operation of the workload advisor 3310 is described in more detail above.

The query coordinator 3304 can then assign the partitions (e.g., those partitions identified by interaction with the workload advisor 3310) to intake the buckets previously identified as potentially containing relevant information (e.g., based on metadata of the buckets). In one embodiment, the query coordinator 3304 may assign all buckets as a single operation. For example, where 10 buckets are to be searched by 5 partitions, the query coordinator 3304 may assign 2 buckets to a first partitions, two buckets to a second partitions, etc. In another embodiment, the query coordinator 3304 may buckets iteratively. For example, where 10 buckets are to be searched by 5 partitions, the query coordinator 3304 may initially assign five buckets (e.g., one buckets to each partition), and assign additional buckets to each partition as the respective partitions complete intake of previously assigned buckets.

In some instances, buckets may be assigned to partitions randomly, or in a simple sequence (e.g., a first partitions is assigned a first bucket, a second partitions is assigned a second bucket, etc.). In other instances, the query coordinator 3304 may assign buckets to partitions based on buckets previously assigned to a partitions, in a prior or current search. Illustratively, in some embodiments each worker node 3306 may be associated with a local cache of information (e.g., in memory of the partitions, such as random access memory ["RAM"] or disk-based cache). Each worker node 3306 may store copies of one or more buckets from the common storage 4602 within the local cache, such that the buckets may be more rapidly searched by partitions implemented on the worker node 3306. The query coordinator 3304 may maintain or retrieve from worker nodes 3306 information identifying, for each relevant node 3306, what buckets are copied within local cache of the respective nodes 3306. Where a partition assigned to execute a search is implemented by a worker node 3306 that has within its local cache a copy of a bucket determined to be potentially relevant to the search, that partition may be preferentially assigned to search that locally-cached bucket. In some instances, local cache information can further be used to determine the partitions to be used to conduct a search. For example, partitions corresponding to worker nodes 3306 that have locally-cached copies of buckets potentially relevant to a search may be preferentially selected by the query coordinator 3304 or workload advisor 3310 to execute the intake phase 3604 of a search. In some instances, the query coordinator 3304 or other component of the system 3301 (e.g., the search process master 3302) may instruct worker nodes 3306 to retrieve and locally cache copies of various buckets from the common storage 4602, independently of processing queries. In one embodiment, the system 3301 is configured such that each bucket from the common storage 4602 is locally cached on at least one worker node 3306. In another embodiment, the system 3301 is configured such that at least one bucket from the common storage 4602 is locally cached on at least two worker nodes 3306. Caching a bucket on at least two worker nodes 3306 may be beneficial, for example, in instances where different queries both require searching the bucket (e.g., because the at least two worker nodes 3006 may process their respective local copies in parallel). In still other embodiments, the system 3301 is configured such that all buckets from the common storage 4602 are locally cached on at least a given number n of worker nodes 3306, wherein n is defined by a replication factor on the system 3301. For example, a replication factor of 5 may be established to ensure that 5 searches of buckets can be executed concurrently by 5 different worker nodes 3306, each of which has locally cached a copy of a given bucket potentially relevant to the searches.

In some embodiments, buckets may further be assigned to partitions to assist with time ordering of search results. For example, where a search requests time ordering of results, the query coordinator 3304 may attempt to assign buckets with overlapping time ranges to the same partition, such that information within the buckets can be sorted at the partition. Where the buckets assigned to different partitions are non-overlapping in time, the query coordinator 3304 may sort information from different partitions according to an absolute ordering of the buckets processed by the different partitions. That is, if all timestamps in all buckets processed by a first worker node 3306 occur prior to all timestamps in all buckets processed by a second worker node 3306, query coordinator 3304 can quickly determine (e.g., without referencing timestamps of information) that all information identified by the first worker node 3306 in response to a search occurs in time prior to information identified by the second worker node 3306 in response to the search. Thus, assigning buckets with overlapping time ranges to the same partition can reduce computing resources needed to time-order results.

In still more embodiments, partitions may be assigned based on overlaps of computing resources of the partitions. For example, where a partition is required to retrieve a bucket from common storage 4602 (e.g., where a local cached copy of the bucket does not exist on the worker node 3306 implementing the partition), such retrieval may use a relatively high amount of network bandwidth or disk read/write bandwidth on the worker node 3306 implementing the partition. Thus, assigning a second partition of the same worker node 3306 might be expected to strain or exceed the network or disk read/write bandwidth of the worker node 3306. For this reason, it may be preferential to assign buckets to partitions such that two partitions within a common worker node 3306 are not both required to retrieve buckets from the common storage 4602. Illustratively, it may be preferential to evenly assign all buckets containing potentially relevant information among the different worker nodes 3306 used to implement the intake phase 3604. For similar reasons, where a given worker node 3306 has within its local cache two buckets that potentially include relevant information, it may be preferential to assign both such buckets to different partitions implemented by the same worker node 3306, such that both buckets can be search in parallel on the worker node 3306 by the respective partitions. In some instances, commonality of computing resources between partitions can further be used to determine the partitions to be used to conduct an intake phase 3604. For example, the query coordinator 3304 may preferentially select partitions that are implemented by different worker nodes 3306 (e.g., in order to maximize network or disk read/write bandwidth) to implement an intake phase 3604. However, where a worker node 3306 has locally cached multiple buckets with information potentially relevant to the search, the query coordinator 3304 may preferentially multiple partitions on that worker node 3306 (e.g., up to a number of partitions equal to the number of potentially-relevant buckets stored at the worker node 3306).

The above mechanisms for assigning buckets to partitions may be combined based on priorities of each potential outcome. For example, the query coordinator 3304 may give an initial priority to distributing assigned partitions across a maximum number of different worker nodes 3306, but a higher priority to assigning partitions to process buckets with overlapping timestamps. The query coordinator 3304 may give yet a higher priority to assigning partitions to process buckets that have been locally cached. The query coordinator 3304 may still further give higher priority to ensuring that each partition is searching at least one bucket for information responsive to a query at any given time. Thus, the query coordinator 3304 can dynamically alter the assignment of buckets to partitions to increase the parallelization of a search, and to increase the speed and efficiency with which the search is executed.

When searching for information within the common storage 4602, the intake phase 3604 may be carried out according to bucket-to-partition mapping discussed above, as determined by the query coordinator 3304. Specifically, after assigning at least one bucket to each partition to be used during the intake phase 3604, each partition may begin to retrieve its assigned bucket. Retrieval may include, for example, downloading the bucket from the common storage 4602, or locating a copy of the bucket in a local cache of a worker node 3306 implementing the partition. Thereafter, each partition may conduct an initial search of the bucket for information responsive to a query. The initial search may include processing that is expected to be disk or network intensive, rather than processing (e.g., CPU) intensive. For example, the initial search may include accessing the bucket, which may include decompressing the bucket from a compressed format, and accessing an index file stored within the bucket. The initial search may further include referencing the index or other information (e.g., metadata within the bucket) to locate one or more portions (e.g., records or individual files) of the bucket that potentially contain information relevant to the search.

Thereafter, the search proceeds to the processing phase 3606, where the portions of buckets identified during the intake phase 3604 are searched to locate information responsive to the search. Illustratively, the searching that occurs during the processing phase 3606 may be predicted to be more processor (e.g., CPU) intensive than that which occurred during the intake phase 3604. As such, the number of partitions used to conduct the processing phase 3606 may vary from that of the intake phase 3604. For example, during or after the conclusion of the intake phase 3604, each partition implementing that phase 3604 may communicate to the query coordinator 3304 information regarding the portions identified as potentially containing information relevant to the query (e.g., the number, size, or formatting of portions, etc.). The query coordinator 3304 may thereafter determine from that information (e.g., based on interactions with the workload advisor 3310) the partitions to be used to conduct the processing phase 3606. In other embodiments, the query coordinator 3304 may select partitions to be used to conduct the processing phase 3606 prior to implementation of the intake phase 3604 (e.g., contemporaneously with selecting partitions to conduct the intake phase 3604). The partitions selected for conducting the processing phase 3606 may include one or more partitions that previously conducted the intake phase 3604. However, because the processing phase 3606 may be expected to be more resource intensive than the intake phase 3604 (e.g., with respect to use of processing cycles), the number of partitions selected for conducting the processing phase 3606 may exceed the number of partitions that previously conducted the intake phase 3604. To minimize network communications, the additional partitions selected to conduct the processing phase 3606 may be preferentially selected to be collocated on a worker node 3306 with a partition that previously conducted the intake phase 3604, such that portions of buckets to be processed by the additional partitions can be received from a partition on that worker node 3306, rather than being transmitted across a network.

At the processing phase 3606, the partitions may parse the portions of buckets located during the intake phase 3604 in order to identify information relative to a search. For example, the may parse the portions of buckets (e.g., individual files or records) to identify specific lines or segments that contain values specified within the search, such as one or more error types desired to be located during the search.

Where the search is conducted according to map-reduce techniques, the processing phase 3606 can correspond to implementing a map function. Where the search requires that results be time-ordered, the processing phase 3606 may further include sorting results at each partition into a time-ordering.

The remainder of the search may be executed in phases according to the DAG determined by the query coordinator 3304. For example, where the branch of the DAG currently being processed includes a collection node, the search may proceed to a collector phase 3608. The collector phase 3608 may be executed by one or more partitions selected by the query coordinator 3304 (e.g., based on the information identified during the processing phase 3606), and operate to aggregate information identified during the processing phase 3606 (e.g., according to a reduce function). Where the processing phase 3606 represents a top-node of a branch of the DAG being executed, the information located by each partition during the processing phase 3606 may be transmitted to the query coordinator 3304, where any additional nodes of the DAG are completed, and search results are transmitted to a data destination 3616. These additional phases may be implemented in a similar manner as described above, and they are therefore not discussed in detail with respect to searches against a common storage 4602.

As will be appreciated in view of the above description, the use of a common storage 4602 can provide many advantages within the data intake and query system 3301. Specifically, use of a common storage 4602 can enable the system 3301 to decouple functionality of data ingestion, as implemented by indexers 206, with functionality of searching, as implemented by partitions of worker nodes 3306. Moreover, because buckets containing data are accessible by each worker node 3306, a query coordinator 3304 can dynamically allocate partitions to buckets at the time of a search in order to maximize parallelization. Thus, use of a common storage 4602 can substantially improve the speed and efficiency of operation of the system 3301.

22.0. Common Storage Flow

Figure 47:
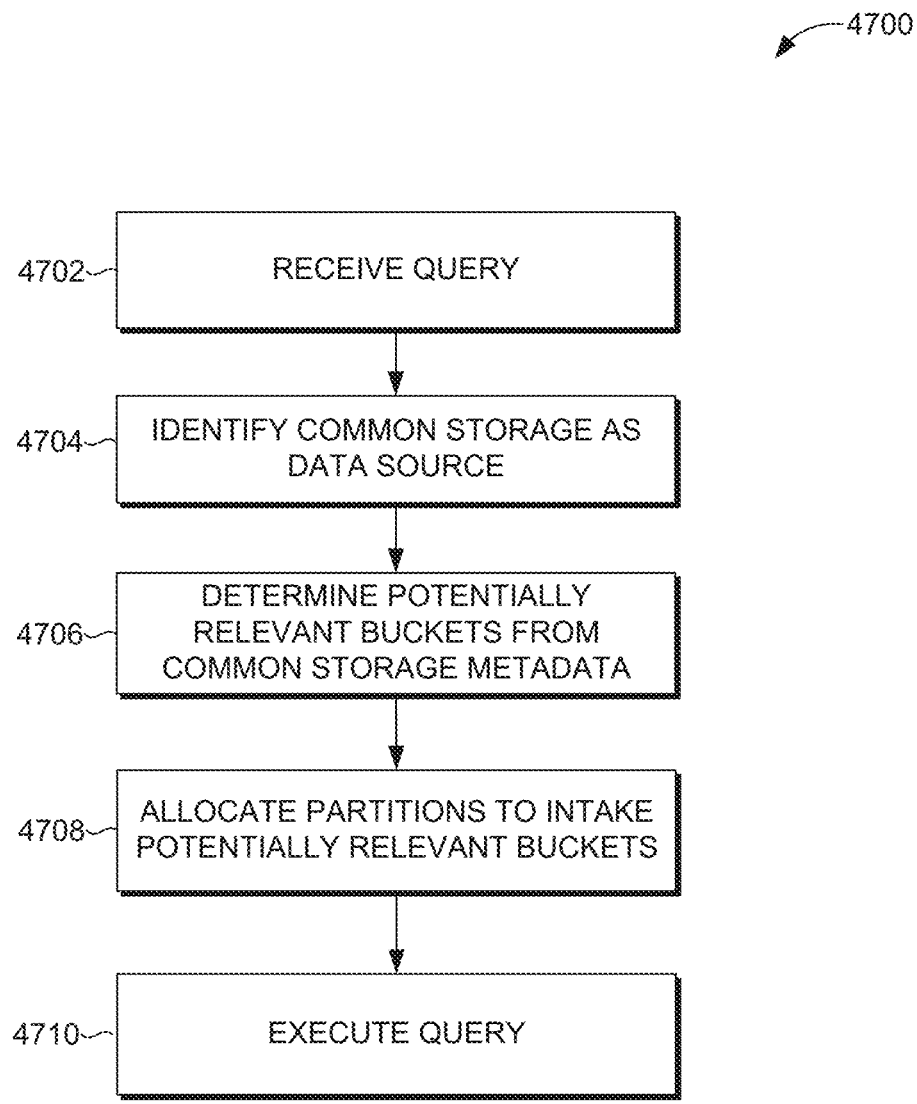
FIG. 47 is a flow diagram illustrative of an embodiment of a routine to execute a query using common storage.

FIG. 47 is a flow diagram illustrative of an embodiment of a routine 4700 implemented by the query coordinator 3304 to execute a query on data within common storage 4602. Although described as being implemented by the query coordinator 3304, one skilled in the relevant art will appreciate that the elements outlined for routine 4700 can be implemented by one or more computing devices/components that are associated with the system 3301, such as the search head 360, search process master 3301, indexer 206, and/or worker nodes 3306. Thus, the following illustrative embodiment should not be construed as limiting.

At block 4702, the query coordinator 3304 receives a query, as described in greater detail above with reference to block 3802 of FIG. 38. At block 4704, the query coordinator identifies the common storage 4602 as a data source for the query (e.g., based on parameters of the query, based on timing requirements as described in greater detail above with reference to block 3902 of FIG. 39, etc.).

At block 4706, the query coordinator 3304 determines one or more buckets within the common storage 4602 that may contain potentially relevant information for the query. As noted above, the one or more buckets may be identified based on metadata of the buckets within common storage 4602, including time ranges, sources, source types, or hosts related to information stored within each bucket. In one embodiment, the query coordinator 3304 may utilize a partition of a worker node 3306 to retrieve current metadata of buckets within the common storage 4602, and the query coordinator 3304 may utilize this information to determine potentially relevant buckets. In another embodiment, the query coordinator 3304 may direct a partition to retrieve current metadata of buckets within the common storage 4602 and to utilize this information to determine potentially relevant buckets, after which the partition may notify the query coordinator 3304 of the potentially relevant buckets.

At block 4708, the query coordinator 3304 allocates partitions to intake the potentially relevant buckets during an intake phase 3604. As described above, the query coordinator 3304 can allocate partitions based on a number of factors, including a number of potentially relevant buckets, a number of partitions available to intake the buckets, a number of potentially relevant buckets that exist as cached copies within local storage of a worker node 3306, or a distribution of partitions across different worker nodes 3306 (e.g., to maximize an availability of network or disk read/write bandwidth). In some embodiments, the query coordinator 3304 may interact with the workload advisor 3310 to allocate partitions to intake potentially relevant buckets. In general, partitions may be allocated to intake potentially relevant buckets in a manner that maximizes either or both of use of locally-cached copies of buckets on worker nodes 3306 and parallelization of retrieval of buckets from common storage 4602.

At block 4710, the query coordinator 3304 executes the query as described in greater detail above with reference to FIGS. 36 and 46. It will be understood that fewer, more, or different blocks can be used as part of the routine 4700. For example, in some embodiments, the routine 4700 can further include allocating partitions to conduct subsequent phases of a query, such as a processing phase 3606 or collection phase 3608. As another example, in certain embodiments, the identification of the common storage 4602, determination of potentially relevant buckets, and allocation of partitions to perform an intake phase 3604 can form part of a processing query block, similar to the process query block 3804 of FIG. 38.

Furthermore, it will be understood that the various blocks described herein with reference to FIG. 47 can be implemented in a variety of orders. In some cases, the system 3301 can implement some blocks concurrently or change the order as desired. For example, the system 3301 can in some instances allocate partitions to intake potentially relevant buckets iteratively, during execution of a query (e.g., by allocating partitions to a first portion of potentially relevant buckets, and allocating partitions to additional buckets from the potentially relevant buckets as the partitions complete intake of buckets from the first portion).

The above interactions generally discuss information that is stored within common storage 4602. However, because the information in common storage 4602 is generated by indexers 206, searching of common storage 4602 may be undesirable in instances in which search results are desired immediately. Specifically, where information from a data source 202 is required to pass through a forwarder 204, be processed at an indexer 206, and stored in common storage 4602 before searching of that information can be conducted by a worker node 3306, a significant delay (e.g., 2-4 minutes) may occur between generation of the information at the data source 202 and searching of the information by a worker node 3306. Thus, in the architecture of FIG. 46, the indexers 206 may be configured to enable searching of information received at an indexer 206 (prior to processing of that information and storage in the common storage 4602), in a manner similar to that described above with reference to FIG. 39. However, utilization of the indexers 206 to conduct searching of not-yet-indexed information may incur some of the disadvantages described above, such as the commingling of computing resources used to ingest information with resources used to search information. It may therefore be desirable to provide an architecture that enables worker nodes 3306, rather than indexers 206, to search not-yet-indexed information, without inhibiting operation of the indexers 206.

23.0. Ingested Data Buffer Architecture

Figure 48:
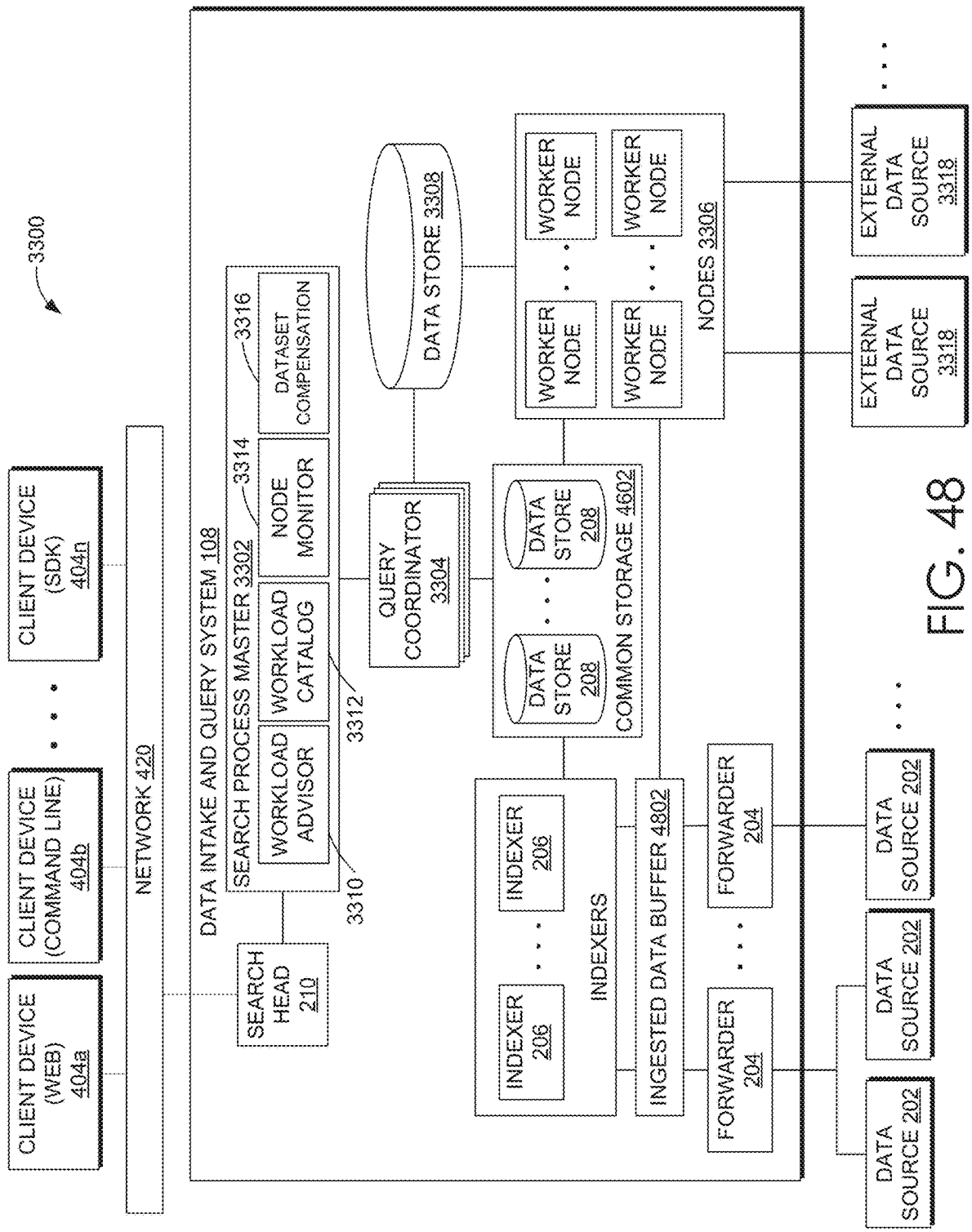
FIG. 48 is a system diagram illustrating an environment for ingesting and indexing data, and performing queries on one or more datasets from one or more dataset sources including an ingested data buffer.

One embodiment of the system 3301 that enables worker nodes 3306 to search not-yet-indexed information is shown in FIG. 48. Searching of not-yet-indexed information (e.g., prior to processing of the information by an indexer 206) may be beneficial, for example, where information is desired on a continuous or streaming basis. For example, a client device 404a may desire to establish a long-running (e.g., until manually halted) search of data received at the data intake and query system 3301, such that the client is quickly notified on occurrence of specific types of information within the data, such as errors within machine records. Thus, it may be desirable to conduct the search against the data as it enters intake and query system 3301, rather than waiting for the data to be processed by the indexers 206 and saved into a data store 208.

The embodiment of FIG. 48 is similar to that of FIG. 46, and corresponding elements will not be re-described. However, unlike the embodiment of FIG. 46, the embodiment of FIG. 30 includes an ingested data buffer 4802. The ingested data buffer 4802 of FIG. 30 operates to receive information obtained by the forwarders 204 from the data sources 202, and make such information available for searching to both indexers 206 and worker nodes 3306. As such, the ingested data buffer 4802 may represent a computing device or computing system in communication with both the indexers 206 and the worker nodes 3306 via a communication network.

In one embodiment, the ingested data buffer 4802 operates according to a publish-subscribe ("pub-sub") messaging model. For example, each data source 202 may be represented as one or more "topics" within a pub-sub model, and new information at the data source may be represented as a "message" within the pub-sub model. Elements of the system 3301, including indexers 206 and worker nodes 3306 (or partitions within worker nodes 3306) may subscribe to a topic representing desired information (e.g., information of a particular data source 202) to receive messages within the topic. Thus, an element subscribed to a relevant topic will be notified of new data categorized under the topic within the ingested data buffer 4802. A variety of implementations of the pub-sub messaging model are known in the art, and may be usable within the ingested data buffer 4802. As will be appreciated based on the description below, use of a pub-sub messaging model can provide many benefits to the system 3301, including the ability to search data quickly after the data is received at the ingested data buffer 4802 (relative to waiting of the data to be processed by an indexer 206) while maintaining or increasing data resiliency.

In embodiments that utilize an ingested data buffer 4802, operation of the indexer 206 may be modified to receive information from the buffer 4802. Specifically, each indexer 206 may be configured to subscribe to one or more topics on the ingested data buffer 4802 and to thereafter process the information in a manner similarly to as described above with respect to other embodiments of the system. After data representing a message has been processed by an indexer 206, the indexer 206 can send an acknowledgement of the message to the ingested data buffer 4802. In accordance with the pub-sub messaging model, the ingested data buffer 4802 can delete a message once acknowledgements have been received from all subscribers (which may include, for example, a single indexer 206 configured to process the message). Thereafter, operation of the system 3301 to store the information processed by the indexer 206 and enable searching of such information is similar to embodiments described above (e.g., with reference to FIGS. 33 and 46, etc.).

As discussed above, the ingested data buffer 4802 is also in communication with the worker nodes 3306. As such, the data intake and query system 3301 can be configured to utilize the worker nodes 3306 to search data from the ingested data buffer 4802 directly, rather than waiting for the data to be processed by the indexers 206. As discussed above, a query can be received at the search head 360, processed at the search process master 3302, and passed to a query coordinator 3304 for execution. The query coordinator 3304 may generate a DAG corresponding to the query, in order to determine sequences of search phases within the query. The query coordinator 3304 may further determine based on the query whether any branch of the DAG requires searching of data within the ingested data buffer 4802. For example, the query coordinator 3304 may determine that at least one branch of the query requires searching of data within the ingested data buffer 4802 by identifying, within the query, a topic of the ingested data buffer 4802 for searching. It will be assumed for the purposes of described that at least one branch of the DAG requires searching of data within the ingested data buffer 4802, and as such, description will be provided for execution of such a branch. While interactions are described for executing a single branch of a DAG, these interactions may be repeated (potentially concurrently or in parallel) for each branch of a DAG that requires searching of data within the ingested data buffer 4802. As discussed above with reference to FIG. 36, executing a search representing a branch of a DAG can include a number of phases, such as an intake phase 3604, processing phase 3606, and collector phase 3608. It is therefore illustrative to discuss execution of a branch of a DAG that requires searching of the common storage 4602 with reference to such phases. As also discussed above, each phase may be carried out by a number of partitions, each of which may correspond to a worker node 3306 (e.g., a specific worker node 3306, processor within the worker node 3306, execution environment within a worker node 3306, etc.). Particularly in the case of streaming or continuous searching, different instances of the phases may be carried out at least partly concurrently. For example, the processing phase 3606 may occur with respect to a first set of information while the intake phase 3604 occurs with respect to a second set of information, etc. Thus, while the phases will be discussed in sequence below, it should be appreciated that this sequence can occur multiple times with respect to a single query (e.g., as new data enters the system 3301), and each sequence may occur at least partially concurrently with one or more other sequences. Moreover, because the ingested data buffer 4802 can be configured to make messages available to any number of subscribers, the sequence discussed below may occur with respect to multiple different searches, potentially concurrently. Thus, the architecture of FIG. 48 provides a highly scalable, highly resilient, high availability architecture for searching information received at the system 3301.

When a branch requires searching within ingested data buffer 4802, the query coordinator 3304 can select a partition (e.g., a processor within a worker node 3306) at random or according to a load-balancing algorithm to gather metadata regarding the topic specified within the query from the ingested data buffer 4802. Metadata regarding a topic may include, for example, a number of message queues within the ingested data buffer 4802 corresponding to the topic. Each message queue can represent a collection of messages published to the topic, which may be time-ordered (e.g., according to a time that the message was received at the ingested data buffer 4802). In some instances, the ingested data buffer 4802 may implement a single message queue for a topic. In other instances, the ingested data buffer 4802 may implement multiple message queues (e.g., across multiple computing devices) to aid in load-balancing operation of the ingested data buffer 4802 with respect to the topic. The selected partition can determine the number of message queues maintained at the ingested data buffer 4802 for a topic, and return this information to the query coordinator.

Thereafter, the query coordinator 3304 can dynamically assign partitions to conduct an intake phase 3604, by retrieving individual message queues of the topic within the ingested data buffer 4802. In one embodiment, the query coordinator 3304 attempts to maximize parallelization of the intake phase 3604, by attempting to retrieve messages from the message queues with a number of partitions equal to the number of message queues for the topic maintained at the ingested data buffer 4802 (e.g., resulting in a one-to-one mapping of message queues in the topic to partitions). However, such parallelization may not be feasible or desirable, for example, where the total number of partitions is less than the number of message queues, where some partitions are processing other queries, or where some partitions should be left in reserve to process other queries. Accordingly, the query coordinator 3304 may interact with the workload advisor 3310 to determine a number of partitions that are to be utilized to intake messages from the message queues during the intake phase 3604. Illustratively, the query coordinator 3304 may initially request a one-to-one correspondence between message queues and partitions, and the workload advisor 3310 may reduce the number of partitions used to read the message queues, resulting in a 2-to-1, 3-to-1, or n-to-1 correspondence between message queues and partitions. Operation of the workload advisor 3310 is described in more detail above. When a greater than 1-to-1 correspondence exists between queues and partitions (e.g., 2-to-1, 3-to-1, etc.), the message queues may be evenly assigned among different worker nodes 3306 used to implement the intake phase 3604, to maximize network or read/write bandwidth available to partitions conducting the intake phase 3604.

During the intake phase 3604, each partition used during the intake phase 3604 can subscribe to those message queues assigned to the partition. Illustratively, where partitions are assigned in a 1-to-1 correspondence with message queues for a topic in the ingested data buffer 4802, each partition may subscribe to one corresponding message queue. Thereafter, in accordance with the pub-sub messaging model, the partition can receive from the ingested data buffer 4802 messages publishes within those respective message queues. However, to ensure message resiliency, a partition may decline to acknowledge the messages until such messages have been fully searched, and results of the search have been provided to a data destination (as will be described in more detail below).

In some embodiments, a partition may, during the intake phase 3604 act as an aggregator of messages published to a respective message queue of the ingested data buffer 4802, to define a collection of data to be processed during an instance of the processing phase 3606. For example, the partition may collect messages corresponding to a given time-window (such as a 30 second time window, 1 minute time window, etc.), and bundle the messages together for further processing during a processing phase 3606 of the search. In one instance, the time window may be set to a duration lower than a typical delay needed for an indexer 206 to process information from the ingested data buffer 4802 and place the processed information into a data store 208 (as, if a time-window greater than this delay were used, a search could instead be conducted against the data stores 208). The time window may further be set based on an expected variance between timestamps in received information and the time at which the information is received at the ingested data buffer 4802. For example, it is possible the information arrives at the ingested data buffer 4802 in an out-of-order manner (e.g., such that information with a later timestamp is received prior to information with an earlier timestamp). If the actual delay in receiving out-of-order information (e.g., the delay between when information is actually received and when it should have been received to maintain proper time-ordering) exceeds the time window, it is possible that the delayed information will be processed during a later instance of the processing phase 3606 (e.g., with a subsequent bundle of messages), and as such, results derived from the delayed information may be delivered out-of-order to a data destination. Thus, a longer time-window can assist in maintaining order of search results. In some instances, the ingested data buffer 4802 may guarantee time ordering of results within each message queue (though potentially not across message queues), and thus, modification of a time window in order to maintain ordering of results may not be required. In still more embodiments, the time-window may further be set based on computing resources available at the worker nodes 3306. For example, a longer time window may reduce computing resources used by a partition, by enabling a larger collection of messages to be processed at a single instance of the processing phase 3606. However, the longer time window may also delay how quickly an initial set of results are delivered to a data destination. Thus, the specific time-window may vary across embodiments of the present disclosure.

While embodiments are described herein with reference to a collection of messages defined according to a time-window, other embodiments of the present disclosure may utilize additional or alternative collection techniques. For example, a partition may be configured to include no more than a threshold number of messages or a threshold amount of data in a collection, regardless of a time-window for collection. As another example, a partition may be configured during the intake phase 3604 not to aggregate messages, but rather to pass each message to a processing phase 3606 immediately or substantially immediately. Thus, embodiments related to time-windowing of messages are illustrative in nature.

In some embodiments, the partitions, during the intake phase 3604 may further conduct coarse filtering on the messages received during a given time-window, in order to identify any messages not relevant to a given query. Illustratively, the coarse filtering may include comparison of metadata regarding the message (e.g., a source, source type, or host related to the message), in order to determine whether the metadata indicates that the message is irrelevant to the query. If so, such a message may be removed from the collection prior to the search process proceeding to the processing phase 3606. In one embodiment, the coarse filtering does not include searching for or processing the actual content of a message, as such processing may be predicted to be relatively computing resource intensive.

After generating a collection of messages from a respective message queue, the search can proceed to the processing phase 3606, where one or more partitions are utilize to search the messages for information relevant to the search query. Illustratively, the searching that occurs during the processing phase 3606 may be predicted to be more processor (e.g., CPU) intensive than that which occurred during the intake phase 3604. As such, the number of partitions used to conduct the processing phase 3606 may vary from that of the intake phase 3604. For example, during or after the conclusion of the intake phase 3604, each partition implementing that phase 3604 may communicate to the query coordinator 3304 information regarding the collections of messages received during a given time-window (e.g., the number, size, or formatting of messages, etc.). The query coordinator 3304 may thereafter determine from that information (e.g., based on interactions with the workload advisor 3310) the partitions to be used to conduct the processing phase 3606. In other embodiments, the query coordinator 3304 may select partitions to be used to conduct the processing phase 3606 prior to implementation of the intake phase 3604 (e.g., contemporaneously with selecting partitions to conduct the intake phase 3604). The partitions selected for conducting the processing phase 3606 may include one or more partitions that previously conducted the intake phase 3604. However, because the processing phase 3606 may be expected to be more resource intensive than the intake phase 3604 (e.g., with respect to use of processing cycles), the number of partitions selected for conducting the processing phase 3606 may exceed the number of partitions that previously conducted the intake phase 3604. To minimize network communications, the additional partitions selected to conduct the processing phase 3606 may be preferentially selected to be collocated on a worker node 3306 with a partition that previously conducted the intake phase 3604, such that portions of buckets to be processed by the additional partitions can be received from a partition on that worker node 3306, rather than being transmitted across a network.

At the processing phase 3606, the partitions may parse the collections of messages generated during the intake phase 3604 in order to identify information relative to a search. For example, the may parse individual messages to identify specific lines or segments that contain values specified within the search, such as one or more error types desired to be located during the search. Where the search is conducted according to map-reduce techniques, the processing phase 3606 can correspond to implementing a map function. Where the search requires that results be time-ordered, the processing phase 3606 may further include sorting results at each partition into a time-ordering.

The remainder of the search may be executed in phases according to the DAG determined by the query coordinator 3304. For example, where the branch of the DAG currently being processed includes a collection node, the search may proceed to a collector phase 23301. The collector phase 3608 may be executed by one or more partitions selected by the query coordinator 3304 (e.g., based on the information identified during the processing phase 3606), and operate to aggregate information identified during the processing phase 3606 (e.g., according to a reduce function). Where the processing phase 3606 represents a top-node of a branch of the DAG being executed, the information located by each partition during the processing phase 3606 may be transmitted to the query coordinator 3304, where any additional nodes of the DAG are completed, and search results are transmitted to a data destination 3616. These additional phases may be implemented in a similar manner as described above, and they are therefore not discussed in detail with respect to searches against a common storage 4602.

Subsequent to these phases, a set of search results corresponding to each collection of messages (e.g., as received during a time-window) may be transmitted to a data destination. On transmission of such information (and potentially verification of arrival of such information at the data destination), the search head 360 may cause an acknowledgement of each message within the collection to be transmitted to the ingested data buffer 4802. For example, the search head 360 may notify the query coordinator 3304 that search results for a particular set of information (e.g., information corresponding to a range of timestamps representing a given time window) have been transmitted to a data destination. The query coordinator 3304 can thereafter notify partitions used to ingest messages making up the set of information that the search results have been transmitted. The partitions can then acknowledge to the ingested data buffer 300 receipt of the messages. In accordance with the pub-sub messaging model, the ingested data buffer 4802 may then delete the messages after acknowledgement by subscribing parties. By delaying acknowledgement of messages until after search results based on such messages are transmitted to (or acknowledged by) a data destination, resiliency of such search results can be improved or potentially guaranteed. For example, in the instance that an error occurs between receiving a message from the ingested data buffer 4802 and search results based on that message being passed to a data destination (e.g., a worker node 3306 fails, causing a copy of the message maintained at the worker node 3306 to be lost), the query coordinator 3304 can detect the failure (e.g., based on heartbeat information from a worker node 3306), and cause the worker node 3306 to be restarted, or a new worker node 3306 to replace the failed worker node 3306. Because the message has not yet been acknowledged to the ingested data buffer 4802, the message is expected to still exist within a message queue of the ingested data buffer 4802, and thus, the restarted or new worker node 3306 can retrieve and process the message as described below. Thus, by delaying acknowledgement of a message, failures of worker nodes 3306 during the process described above can be expected not to result in data loss within the data intake and query system 3301.

In some embodiments, the ingested data buffer 4802 and search functionalities described above may be used to make "enhanced" or annotated data available for searching in a streaming or continuous manner. For example, search results may in some instances be represented by codes or other machine-readable information, rather than in an easy-to-comprehend format (e.g., as error codes, rather than textual descriptions of what such a code represents). Thus, the embodiment of FIG. 48 may enable a client to define a long-running search that locates codes within messages of the ingested data buffer 4802 (e.g., via regular expression or other pattern matching criteria), correlates the codes to a corresponding textual description (e.g., via a mapping stored in common storage 4602), annotates or modifies the messages to include relevant textual descriptions for any code appearing within the message, and re-publishes the messages to the ingested data buffer 4802. In this manner, the information maintained at the ingested data buffer 4802 may be readily annotated or transformed by searches executed at the system 3301. Any number of types of processing or transformation may be applied to information of the ingested data buffer 4802 to produce search results, and any of such search results may be republished to the ingested data buffer 4802, such that the search results are themselves made available for searching.

As will be appreciated in view of the above description, the use of an ingested data buffer 4802 can provide many advantages within the data intake and query system 3301. Specifically, use of a ingested data buffer 4802 can enable the system 3301 to utilize worker nodes 3306 to search not-yet-indexed information, thus decoupling searching of such information from the functionality of data ingestion, as implemented by indexers 206. Moreover, because the ingested data buffer 4802 can make messages available to both indexers 206 and worker nodes 3306, searching of not-yet-indexed information by worker nodes 3306 can be expected not to detrimentally effect the operation of the indexers 206. Still further, because the ingested data buffer 4802 can operate according to a pub-sub messaging model, the system 3301 may utilize selective acknowledgement of messages (e.g., after indexing by an indexer 206 and after delivery of search results based on a message to a data destination) to increase resiliency of the data on the data intake and query system 3301. Thus, use of an ingested data buffer 4802 can substantially improve the speed, efficiency, and reliability of operation of the system 3301.

24.0. Ingested Data Buffer Flow

Figure 49:
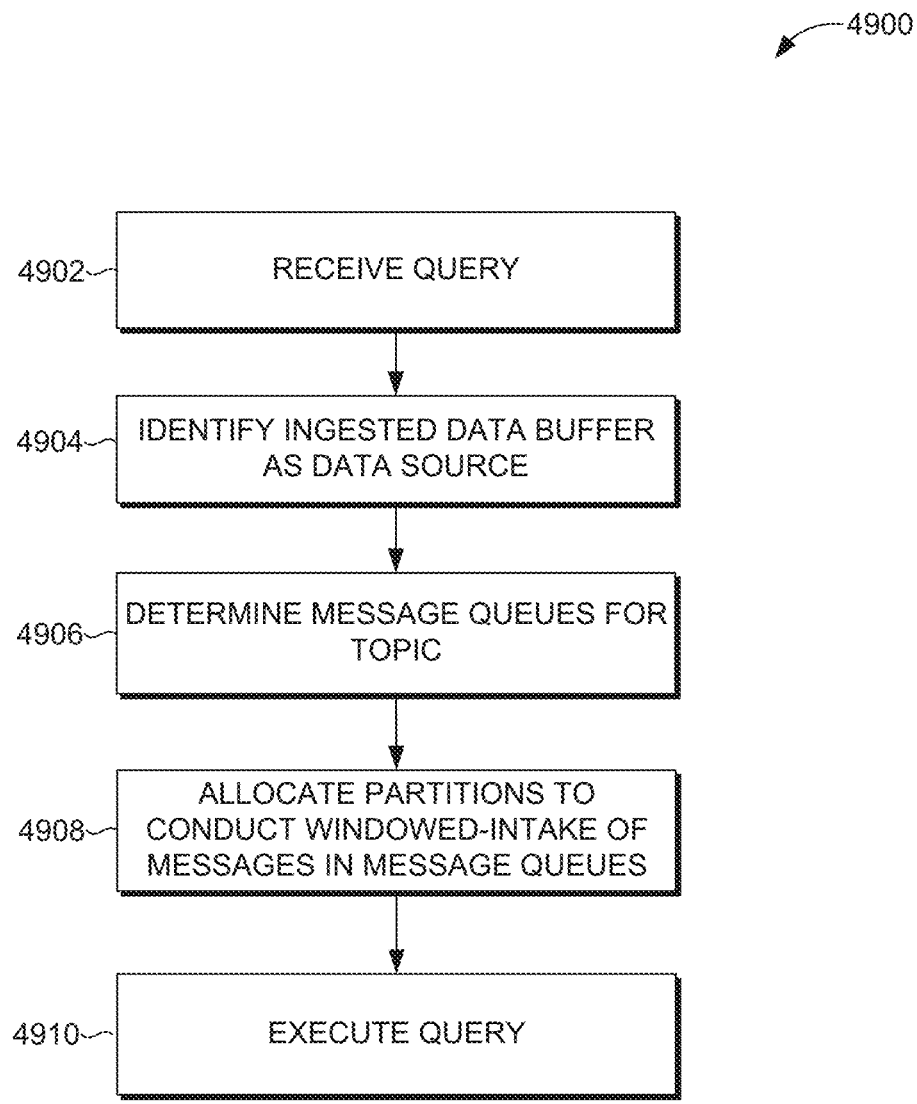
FIG. 49 is a flow diagram illustrative of an embodiment of a routine to execute a query using an ingested data buffer.

FIG. 49 is a flow diagram illustrative of an embodiment of a routine 4900 implemented by the query coordinator 3304 to execute a query on data from an ingested data buffer 4802. Although described as being implemented by the query coordinator 3304, one skilled in the relevant art will appreciate that the elements outlined for routine 4900 can be implemented by one or more computing devices/components that are associated with the system 3301, such as the search head 360, search process master 3301, indexer 206, and/or worker nodes 3306. Thus, the following illustrative embodiment should not be construed as limiting.

At block 4902, the query coordinator 3304 receives a query, as described in greater detail above with reference to block 3802 of FIG. 38. At block 4904, the query coordinator identifies the ingested data buffer 4802 as a data source for the query (e.g., based on parameters of the query, based on timing requirements as described in greater detail above with reference to block 3902 of FIG. 39, etc.).

At block 4906, the query coordinator 3304 determines a set of message queues on the ingested data buffer 4802 to which messages potentially relevant to the query are published. The message queues may be determined, for example, by querying the ingested data buffer 4802 based on a topic specified within the query. In one embodiment, the query coordinator 3304 may utilize a partition of a worker node 3306 to retrieve identifying information for the message queues from the ingested data buffer 4802. In another embodiment, the query coordinator 3304 may directly query the ingested data buffer 4802 for the identifying information of the message queues.

At block 4908, the query coordinator 3304 allocates partitions to conduct windowed-intake of messages from message queues assigned to the partitions. As described above, the query coordinator 3304 can allocate partitions based on a number of factors, including a number of message queues to which potentially relevant messages are posted, a number of partitions available to intake the buckets, or a distribution of partitions across different worker nodes 3306 (e.g., to maximize an availability of network or disk read/write bandwidth). In some embodiments, the query coordinator 3304 may interact with the workload advisor 3310 to allocate partitions to intake messages from message queues. In general, partitions may be allocated to intake potentially relevant buckets in a manner that maximizes parallelization of retrieval of messages from message queues on the ingested data buffer 4802. As noted above, each partition may function to collect messages from its respective message queue during a given time-window (such as a 30 second time window, 1 minute time window, etc.), and bundle the messages together for further processing during a processing phase 3606 of the search. The time-window may be selected based on a number of factors, as described in more detail above.

At block 4910, the query coordinator 3304 executes the query as described in greater detail above with reference to FIGS. 36 and 48. It will be understood that fewer, more, or different blocks can be used as part of the routine 4700. For example, in some embodiments, the routine 4700 can further include allocating partitions to conduct subsequent phases of a query, such as a processing phase 3606 or collection phase 3608. As another example, in certain embodiments, the identification of the ingested data buffer 4802, determination of message queues containing potentially relevant messages, and allocation of partitions to perform an intake phase 3604 can form part of a processing query block, similar to the process query block 3804 of FIG. 38.

Furthermore, it will be understood that the various blocks described herein with reference to FIG. 47 can be implemented in a variety of orders. In some cases, the system 3301 can implement some blocks concurrently or change the order as desired. For example, the system 3301 can in some instances allocate partitions to intake potentially relevant messages from message queues dynamically. For example, the system 3301 may periodically or in response to information received from the ingested data buffer 4802 determine that the number of message queues containing potentially relevant messages has changed, and alter the allocation of partitions to those message queues accordingly.

25.0. Hardware Embodiment

FIG. 50 is a block diagram illustrating a high-level example of a hardware architecture of a computing system in which an embodiment may be implemented. For example, the hardware architecture of a computing system 72 can be used to implement any one or more of the functional components described herein (e.g., indexer, data intake and query system, search head, data store, server computer system, edge device, etc.). In some embodiments, one or multiple instances of the computing system 72 can be used to implement the techniques described herein, where multiple such instances can be coupled to each other via one or more networks.

The illustrated computing system 72 includes one or more processing devices 74, one or more memory devices 76, one or more communication devices 78, one or more input/output (I/O) devices 80, and one or more mass storage devices 82, all coupled to each other through an interconnect 84. The interconnect 84 may be or include one or more conductive traces, buses, point-to-point connections, controllers, adapters, and/or other conventional connection devices. Each of the processing devices 74 controls, at least in part, the overall operation of the processing of the computing system 72 and can be or include, for example, one or more general-purpose programmable microprocessors, digital signal processors (DSPs), mobile application processors, microcontrollers, application-specific integrated circuits (ASICs), programmable gate arrays (PGAs), or the like, or a combination of such devices.

Each of the memory devices 76 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 82 can be or include one or more hard drives, digital versatile disks (DVDs), flash memories, or the like. Each memory device 76 and/or mass storage device 82 can store (individually or collectively) data and instructions that configure the processing device(s) 74 to execute operations to implement the techniques described above.

Each communication device 78 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing devices 74, each I/O device 80 can be or include a device such as a display (which may be a touch screen display), audio speaker, keyboard, mouse or other pointing device, microphone, camera, etc. Note, however, that such I/O devices 80 may be unnecessary if the processing device 74 is embodied solely as a server computer.

In the case of a client device (e.g., edge device), the communication devices(s) 78 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, the communication device(s) 78 can be or include, for example, any of the aforementioned types of communication devices, a wired Ethernet adapter, cable modem, DSL modem, or the like, or a combination of such devices.

A software program or algorithm, when referred to as "implemented in a computer-readable storage medium," includes computer-readable instructions stored in a memory device (e.g., memory device(s) 76). A processor (e.g., processing device(s) 74) is "configured to execute a software program" when at least one value associated with the software program is stored in a register that is readable by the processor. In some embodiments, routines executed to implement the disclosed techniques may be implemented as part of OS software (e.g., MICROSOFT WINDOWS® and LINUX®) or a specific software application, algorithm component, program, object, module, or sequence of instructions referred to as "computer programs."

26.0 Terminology

Computer programs typically comprise one or more instructions set at various times in various memory devices of a computing device, which, when read and executed by at least one processor (e.g., processing device(s) 74), will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium (e.g., the memory device(s) 76).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is otherwise understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed:

1. A method comprising:
  receiving, at a computerized data index and query system that maintains a set of data within a distributed set of computing devices, a query including criteria for identifying search results from the set of data, wherein the set of data is stored on the distributed set of computing devices in a plurality of buckets of data, wherein individual buckets within the plurality of buckets represent individually searchable subsets of data from the set of data, and wherein the plurality of buckets are hosted by a plurality of computing devices within the distributed set of computing devices;

defining, by the data index and query system, a query processing scheme for identifying the search results from the set of data, the query processing scheme including a dynamic allocation of computer processors to process the plurality of buckets to identify the search results, wherein defining the query processing scheme comprises:

determining, from metadata regarding the plurality of buckets, a subset of buckets from the plurality of buckets that potentially include the search results, wherein the metadata for an individual bucket identifies an attribute of the data stored within the individual bucket; and dynamically allocating individual buckets from the subset of buckets to individual computer processors, the individual computer processors to obtain in parallel data from the individual buckets allocated to the individual computer processors and to locate, within the data from the individual buckets, portions of data that potentially include one or more results of the search results; and executing the query based on the query processing scheme, wherein executing the query comprises causing the individual computer processors to obtain in parallel the data from the individual buckets allocated to the individual computer processors and to locate, within the data from the individual buckets, portions of data that potentially include one or more results of the search results.

2. The method of claim 1, wherein dynamically allocating individual buckets from the subset of buckets to individual computer processors comprises dynamically allocating the individual buckets to execution environments implemented on the individual computer processors.

3. The method of claim 1, wherein dynamically allocating individual buckets from the subset of buckets to individual computer processors comprises evenly allocating the plurality of buckets among the computer processors.

4. The method of claim 1, wherein the computer processors correspond to one or more worker node computing devices, and wherein the method further comprises, prior to receiving the query, instructing the one or more worker nodes to retrieve copies of at least some buckets of the plurality of buckets and to store the copies in local caches corresponding to the one or more worker nodes.

5. The method of claim 1, wherein the computer processors correspond to one or more worker node computing devices, wherein the method further comprises, prior to receiving the query, instructing the one or more worker nodes to retrieve copies of at least some buckets of the plurality of buckets and to store the copies in local caches corresponding to the one or more worker nodes, and wherein at least two worker node of the one or more worker nodes are instructed to retrieve copies of the same bucket of the plurality of buckets.

6. The method of claim 1, wherein computer processors correspond to one or more worker node computing devices, wherein the method further comprises, prior to receiving the query, instructing the one or more worker nodes to retrieve copies of the plurality of buckets and to store the copies in local caches corresponding to the one or more worker nodes, and wherein each bucket of the plurality of buckets is stored in a locally cache of at least at pre-determined number of worker nodes.

7. The method of claim 1, wherein a number of the computer processors is equal to a number of the plurality of buckets, and wherein dynamically allocating individual buckets from the subset of buckets to individual computer processors comprises allocating a single bucket to each of the computer processors.

8. The method of claim 1, wherein a number of the computer processors is less than a number of the plurality of buckets, and wherein dynamically allocating individual buckets from the subset of buckets to individual computer processors comprises allocating multiple buckets to each of the computer processors as a single allocation.

9. The method of claim 1, wherein a number of the computer processors is less than a number of the plurality of buckets, and wherein dynamically allocating individual buckets from the subset of buckets to individual computer processors comprises allocating a single bucket to each of the computer processors as a first allocation, and allocating one or more additional buckets to at least one of the computer processors as a second allocation.

10. The method of claim 1, wherein a number of the computer processors is less than a number of the plurality of buckets, wherein dynamically allocating individual buckets from the subset of buckets to individual computer processors comprises allocating a single bucket to each of the computer processors as a first allocation, and allocating one or more additional buckets to at least one of the computer processors as a second allocation, and wherein the second allocation occurs in response to receiving an indication from the at least one computer processor that an intake phase has completed for the single bucket allocated to the at least one computer processor as the first allocation.

11. The method of claim 1, wherein at least two of the computer processors correspond to a single worker node computing device.

12. The method of claim 1, wherein the distributed set of computing devices implement a storage system commonly accessible to the computer processors.

13. The method of claim 1, wherein the distributed set of computing devices represent at least one of a hosted computing environment, a network accessible storage (NAS) system, or a storage area network (SAN) system.

14. The method of claim 1, the individual computer processors are configured to locate, within the individual buckets, the portions of data at least partly referencing indexes of the individual buckets against the criteria of the query.

15. The method of claim 1, wherein dynamically allocating individual buckets from the subset of buckets to individual computer processors comprises determining that at least one of the computer processors is associated with a locally-cached copy of at least one bucket of the plurality of buckets, and allocating the at least one bucket to the at least one computer processor.

16. The method of claim 1, wherein dynamically allocating individual buckets from the subset of buckets to individual computer processors comprises determining that at least two buckets of the plurality of buckets include information related to a common range of time, and allocating the at least two buckets to a common computer processor.

17. The method of claim 1, wherein the attribute of the data stored within the individual bucket comprises at least one of a time range, source, source type, or host corresponding to the data stored within the bucket.

18. The method of claim 1, wherein defining the query processing scheme further comprises:

transmitting a request for a number of partitions used to execute the query to a workload advisor computing device;

receiving a response from the workload advisor computing define indicating a permitted number of partitions to be used to execute the query; and identifying the computer processors based at least partly on the permitted number of partitions.

19. The method of claim 1, wherein defining the query processing scheme further comprises:

transmitting a request for a number of partitions used to execute the query to a workload advisor computing device;

receiving a response from the workload advisor computing define indicating a permitted number of partitions to be used to execute the query; and identifying the computer processors based on at least partly the permitted number of partitions, wherein the computer processors are further identified based on information indicating which buckets of the plurality of buckets are locally cached at individual partitions of the partitions associated with the computer processors.

20. The method of claim 1, wherein defining the query processing scheme further comprises:

transmitting a request for a number of partitions used to execute the query to a workload advisor computing device;

receiving a response from the workload advisor computing define indicating a permitted number of partitions to be used to execute the query; and identifying the computer processors based on at least partly the permitted number of partitions, wherein the computer processors are further identified based on information indicating individual worker node computing devices that implement individual partitions of the partitions.

21. The method of claim 1, wherein the computer processors correspond to a first set of computer processors, and wherein defining the query processing scheme further comprises dynamically allocating a second set of computer processors to parse the portions of data to identify the search results.

22. The method of claim 1, wherein the computer processors correspond to a first set of computer processors, wherein defining the query processing scheme further comprises dynamically allocating a second set of computer processors to parse the portions of data to identify the search results, and wherein the second set of computer processors includes at least one computer processor of the first set of computer processors.

23. The method of claim 1, wherein the computer processors correspond to a first set of computer processors, wherein defining the query processing scheme further comprises dynamically allocating a second set of computer processors to parse the portions of data to identify the search results, and wherein the second set of computer processors includes at least one computer processor of the first set of computer processors and at least one other computer processor.

24. The method of claim 1, wherein the computer processors correspond to a first set of computer processors, wherein defining the query processing scheme further comprises dynamically allocating a second set of computer processors to parse the portions of data to identify the search results, wherein the second set of computer processors includes at least one computer processor of the first set of computer processor and at least one other computer processor, and wherein the at least one other computer processor is identified based at least in part on identifying a worker node computing device that includes both the at least one computer processor of the first set of computer processors and the at least one other computer processor.

25. The method of claim 1, wherein the computer processors correspond to a first set of computer processors, wherein defining the query processing scheme further comprises:

dynamically allocating a second set of computer processors to parse the portions of data to identify the search results; and dynamically allocating a third set of computer processors to aggregate the search results into an aggregate result.

26. The method of claim 1, wherein the computer processors correspond to a first set of computer processors, wherein defining the query processing scheme further comprises:

dynamically allocating a second set of computer processors to parse the portions of data to identify the search results; and dynamically allocating a third set of computer processors to aggregate the search results into an aggregate result, wherein the third set of computer processors is selected according to a grouping criteria of the query.

27. The method of claim 1 further comprising identifying, from the criteria, that the query is directed to a common storage system maintaining the plurality of buckets.

28. A system associated with a computerized data index and query system that maintains a set of data within a distributed set of computing devices, the system comprising:

a data store including computer-executable instructions; and one or more processors configured to execute the computer-executable instructions, wherein execution of the computer-executable instructions causes the system to:

obtain a query including criteria for identifying search results from the set of data, wherein the set of data is stored on the distributed set of computing devices in a plurality of buckets of data, wherein individual buckets within the plurality of buckets represent individually searchable subsets of data from the set of data, and wherein the plurality of buckets are hosted by a plurality of computing devices within the distributed set of computing devices;

define, by the data index and query system, a query processing scheme for identifying the search results from the set of data, the query processing scheme including a dynamic allocation of computer processors to process the plurality of buckets to identify the search results, wherein defining the query processing scheme comprises:

determining, from metadata regarding the plurality of buckets, a subset of buckets from the plurality of buckets that potentially include the search results, wherein the metadata for an individual bucket identifies an attribute of the data stored within the individual bucket; and dynamically allocating individual buckets from the subset of buckets to individual computer processors, the individual computer processors to obtain in parallel data from the individual buckets allocated to the individual computer processors and to locate, within the data from the individual buckets, portions of data that potentially include one or more results of the search results; and execute the query based on the query processing scheme at least partly by causing the individual computer processors to obtain in parallel the data from the individual buckets allocated to the individual computer processors and to locate, within the data from the individual buckets, portions of data that potentially include one or more results of the search results.

29. The system of claim 28, wherein dynamically allocating individual buckets from the subset of buckets to individual computer processors comprises determining that at least one of the computer processors is associated with a locally-cached copy of at least one bucket of the plurality of buckets, and allocating the at least one bucket to the at least one computer processor.

30. Non-transitory computer-readable media including computer-executable instructions that, when executed by a computing system associated with a computerized data index and query system that maintains a set of data within a distributed set of computing devices, cause the computing system to:
- obtain a query including criteria for identifying search results from the set of data, wherein the set of data is stored on the distributed set of computing devices in a plurality of buckets of data, wherein individual buckets within the plurality of buckets represent individually searchable subsets of data from the set of data, and wherein the plurality of buckets are hosted by a plurality of computing devices within the distributed set of computing devices;
- define, by the data index and query system, a query processing scheme for identifying the search results from the set of data, the query processing scheme including a dynamic allocation of computer processors to process the plurality of buckets to identify the search results, wherein defining the query processing scheme comprises:
  - determining, from metadata regarding the plurality of buckets, a subset of buckets from the plurality of buckets that potentially include the search results wherein the metadata for an individual bucket identifies an attribute of the data stored within the individual bucket; and
- dynamically allocating individual buckets from the subset of buckets to individual computer processors, the individual computer processors to obtain in parallel the data from individual buckets allocated to the individual computer processors and to locate, within the data from the individual buckets, portions of data that potentially include one or more results of the search results; and
- execute the query based on the query processing scheme at least partly by causing the individual computer processors to obtain in parallel the data from the individual buckets allocated to the individual computer processors and to locate, within the data from the individual buckets, portions of data that potentially include one or more results of the search results.

* * * * *